US012275616B2

(12) United States Patent
Itabashi et al.

(10) Patent No.: US 12,275,616 B2
(45) Date of Patent: Apr. 15, 2025

(54) LAYER TRANSFER FILM CARTRIDGE, AND LAYER TRANSFER DEVICE

(71) Applicant: BROTHER KOGYO KABUSHIKI KAISHA, Nagoya (JP)

(72) Inventors: Nao Itabashi, Nagoya (JP); Yukiko Nakanishi, Nagoya (JP); Tomoya Ichikawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 314 days.

(21) Appl. No.: 17/763,507

(22) PCT Filed: Sep. 17, 2020

(86) PCT No.: PCT/JP2020/035208

§ 371 (c)(1),
(2) Date: Mar. 24, 2022

(87) PCT Pub. No.: WO2021/060129

PCT Pub. Date: Apr. 1, 2021

(65) Prior Publication Data

US 2022/0289520 A1 Sep. 15, 2022

(30) Foreign Application Priority Data

Sep. 26, 2019 (JP) ................................ 2019-175507
Sep. 26, 2019 (JP) ................................ 2019-175534
(Continued)

(51) Int. Cl.
*B41J 17/32* (2006.01)
*B65C 9/10* (2006.01)
(Continued)

(52) U.S. Cl.
CPC .............. *B65H 75/38* (2013.01); *B41J 17/32* (2013.01); *B65C 9/10* (2013.01); *B65C 9/25* (2013.01);
(Continued)

(58) Field of Classification Search
CPC .. B65C 9/10; B65C 9/25; B65H 75/38; B65H 2701/194; B65H 2801/12; B41J 17/32
See application file for complete search history.

(56) References Cited

U.S. PATENT DOCUMENTS 4,901,090 A 2/1990 Ozawa et al.
5,026,276 A 6/1991 Hirabayashi et al.
(Continued)

FOREIGN PATENT DOCUMENTS

JP 61-211264 A 9/1986
JP 62-093165 A 4/1987
(Continued)

OTHER PUBLICATIONS

International Search Report issued in corresponding application PCT/JP2020/035208, mailed Dec. 8, 2020.
(Continued)

*Primary Examiner* — Christopher E Mahoney
*Assistant Examiner* — Marissa Ferguson-Samreth
(74) *Attorney, Agent, or Firm* — Merchant & Gould P.C.

(57) ABSTRACT

Provided is a layer transfer film cartridge, such that even if the layer transfer film cartridge is heavy in weight, the installation and removal of the layer transfer film cartridge can be performed with ease. The layer transfer film cartridge includes a supply reel on which a multilayer film having a transfer layer and a supporting layer supporting the transfer layer is wound, a supply case that houses the supply reel, and a take-up reel on which to take up the multilayer film, and a first handle supported by the supply case or the supply reel.

24 Claims, 71 Drawing Sheets

(30) Foreign Application Priority Data

| | | | |
|---|---|---|---|
| Sep. 30, 2019 | (JP) | ................................ | 2019-178372 |
| Sep. 30, 2019 | (JP) | ................................ | 2019-178792 |
| Sep. 30, 2019 | (JP) | ................................ | 2019-178897 |
| Sep. 30, 2019 | (JP) | ................................ | 2019-179187 |
| Sep. 30, 2019 | (JP) | ................................ | 2019-179873 |
| Feb. 18, 2020 | (JP) | ................................ | 2020-025402 |

(51) Int. Cl.
*B65C 9/25* (2006.01)
*B65H 75/38* (2006.01)

(52) U.S. Cl.
CPC .... *B65H 2701/194* (2013.01); *B65H 2801/12* (2013.01)

(56) References Cited

U.S. PATENT DOCUMENTS

| | | | |
|---|---|---|---|
| 5,719,616 | A | 2/1998 | Danjo et al. |
| 5,769,547 | A | 6/1998 | Igarashi |
| 5,779,373 | A | 7/1998 | Tukahara et al. |
| 5,821,975 | A | 10/1998 | Guenther et al. |
| 6,257,780 | B1 | 7/2001 | Ito et al. |
| 7,088,379 | B2 | 8/2006 | Chida |
| 7,733,361 | B2 | 6/2010 | Choi et al. |
| 9,067,447 | B2 | 6/2015 | Suzuki et al. |
| 2003/0184824 | A1 | 10/2003 | Chida |
| 2004/0062586 | A1 | 4/2004 | Harada et al. |
| 2005/0129444 | A1 | 6/2005 | Igi et al. |
| 2005/0201802 | A1 | 9/2005 | Yamamoto |
| 2005/0201803 | A1 | 9/2005 | Yamamoto et al. |
| 2005/0201804 | A1 | 9/2005 | Yamamoto |
| 2005/0201805 | A1 | 9/2005 | Yamamoto |
| 2005/0201806 | A1 | 9/2005 | Yamamoto |
| 2008/0008511 | A1 | 1/2008 | Chino |
| 2009/0046136 | A1 | 2/2009 | Choi et al. |
| 2012/0312909 | A1 | 12/2012 | Nishihiro |
| 2015/0062278 | A1 | 3/2015 | Suzuki et al. |
| 2016/0176210 | A1 | 6/2016 | Tanaka |
| 2019/0030930 | A1 | 1/2019 | Fujioka et al. |
| 2019/0030936 | A1 | 1/2019 | Nishihara et al. |
| 2019/0061395 | A1 | 2/2019 | Ota et al. |

FOREIGN PATENT DOCUMENTS

| | | | | |
|---|---|---|---|---|
| JP | 63-270174 | A | | 11/1988 |
| JP | 64-24769 | A | | 1/1989 |
| JP | 1-115668 | A | | 5/1989 |
| JP | 2-113277 | A | | 4/1990 |
| JP | 2-113278 | A | | 4/1990 |
| JP | 2-131270 | A | | 5/1990 |
| JP | 6-083357 | U | | 11/1994 |
| JP | 7-290685 | A | | 11/1995 |
| JP | 7-290803 | A | | 11/1995 |
| JP | 8-318657 | A | | 12/1996 |
| JP | 09058070 | A | * | 3/1997 |
| JP | 9-174985 | A | | 7/1997 |
| JP | 9-263027 | A | | 10/1997 |
| JP | 10-254200 | A | | 9/1998 |
| JP | 11-035205 | A | | 2/1999 |
| JP | 11-192756 | A | | 7/1999 |
| JP | 2000-37962 | A | | 2/2000 |
| JP | 2001-026156 | A | | 1/2001 |
| JP | 2002-178585 | A | | 6/2002 |
| JP | 2002-200805 | A | | 7/2002 |
| JP | 2002-248824 | A | | 9/2002 |
| JP | 2003-285493 | A | | 10/2003 |
| JP | 2004-114589 | A | | 4/2004 |
| JP | 2004-142113 | A | | 5/2004 |
| JP | 2006-099502 | A | | 4/2006 |
| JP | 2008-030436 | A | | 2/2008 |
| JP | 2008-540197 | A | | 11/2008 |
| JP | 2009-255596 | A | | 11/2009 |
| JP | 2012-139979 | A | | 7/2012 |
| JP | 2012-252298 | A | | 12/2012 |
| JP | 2015-51515 | A | | 3/2015 |
| JP | 2015-085604 | A | | 5/2015 |
| JP | 2015-085607 | A | | 5/2015 |
| JP | 2015096432 | A | * | 5/2015 |
| JP | 2017-222493 | A | | 12/2017 |
| JP | 2019-025808 | A | | 2/2019 |
| JP | 2019-025889 | A | | 2/2019 |
| JP | 2019-038179 | A | | 3/2019 |
| JP | 2019-045653 | A | | 3/2019 |
| JP | 2019-171611 | A | | 10/2019 |
| JP | 2020-122908 | A | | 8/2020 |

OTHER PUBLICATIONS

Office Action issued in corresponding Japanese Patent Application No. 2019-178792, Jun. 6, 2023.

Office Action issued in corresponding Japanese Patent Application No. 2019-175507, Jun. 20, 2023.

Office Action issued in corresponding Japanese Patent Application No. 2019-175534, Jun. 27, 2023.

Office Action issued in corresponding Japanese Patent Application No. 2019-179873, Jun. 27, 2023.

International Preliminary Report on Patentability and Written Opinion of the International Searching Authority issued in corresponding International Patent Application No. PCT/JP2020/035208, dated Mar. 15, 2022.

* cited by examiner (a)

(b)

(a)

(b)

(a)

(b)

(a)

(b)

(a)

(b)

(a)

(b)

(c)

(a)

(b)

(c)

(a)

(b)

(a)

(b)

(a)

(b)

(a)

(b)

(a)

(b)

LAYER TRANSFER FILM CARTRIDGE, AND LAYER TRANSFER DEVICE

CROSS-REFERENCE TO RELATED APPLICATIONS

This application is a National Stage Application of PCT/JP2020/035208, filed Sep. 17, 2020, which further claims priority to Japanese Patent Application No. 2019-175507, filed Sep. 26, 2019, Japanese Patent Application No. 2019-175534, filed Sep. 26, 2019, Japanese Patent Application No. 2019-178792, filed Sep. 30, 2019, Japanese Patent Application No. 2019-179187, filed Sep. 30, 2019, Japanese Patent Application No. 2019-179873, filed Sep. 30, 2019, Japanese Patent Application No. 2019-178897, filed Sep. 30, 2019, Japanese Patent Application No. 2019-178372, filed Sep. 30, 2019, Japanese Patent Application No. 2020-025402, filed Feb. 18, 2020, all of which are incorporated herein by reference in their entirety. To the extent appropriate, a claim of priority is made to the above disclosed applications.

TECHNICAL FIELD

This disclosure relates to a layer transfer film cartridge and a layer transfer device for transferring a transfer layer onto a sheet, the layer transfer film cartridge being installable in and removable from a housing of the layer transfer device.

BACKGROUND ART

A layer transfer film cartridge installable in and removable from a housing of a layer transfer device is hitherto known in the art (see JP H07-290685 A). The layer transfer film cartridge comprises a supply reel on which a multilayer film is wound, and a take-up reel on which to take up the multilayer film.

SUMMARY OF INVENTION

Hereupon, in cases where a multilayer film containing, for example, a metal layer is adopted, or a large amount of multilayer film is wound on a supply reel, or other occasions like that, the resulting heavy weight of the layer transfer film cartridge would entail the problem of loss in good handleability otherwise offered upon installation and removal of the layer transfer film cartridge into and from the layer transfer device.

It would be desirable to provide a layer transfer film cartridge which can, irrespective of its heavy weight, offer good handleability in operations for installation and removal.

A layer transfer film cartridge is disclosed herein which comprises: a supply reel on which a multilayer film including a transfer layer and a supporting layer supporting the transfer layer is wound; a supply case that houses the supply reel; a take-up reel on which to take up the multilayer film; and a first handle supported by the supply case or the supply reel.

With this configuration, the first handle of the layer transfer film cartridge is available for allowing a user's fingers to be hooked thereon; therefore, even if the layer transfer film cartridge is heavy in weight, the operations for installation and removal of the layer transfer film cartridge can be carried out with ease.

The first handle may extend in a first axial direction along a rotation axis of the supply reel. The first handle may be supported by the supply case.

One of ends of the first handle which are located apart from each other in the first axial direction may be supported at one of ends of the supply reel which are located apart from each other in the first axial direction, and another end of the ends of the first handle which are located apart from each other in the first axial direction may be supported at another end of the ends of the supply reel which are located apart from each other in the first axial direction.

The first handle may be supported movably toward and away from the supply reel.

The layer transfer film cartridge may comprise a connecting portion connecting the supply reel and the take-up reel; the supply case may have a supply opening through which to guide the multilayer film to an outside of the supply case; and the first handle may be located in a position shifted from, in a direction perpendicular to, an imaginary plane containing a rotation axis of the supply reel and a rotation axis of the take-up reel, on a side of the imaginary plane that is a same side as a side of the imaginary plane on which the supply opening is located.

The supply case may have a flat surface extending in the first axial direction, and the first handle may comprise: a first base portion extending in the first axial direction; and first legs extending from both ends of the first base portion which are located apart from each other in the first axial direction, wherein the supply reel is located between the flat surface and the first base portion in a direction perpendicular to the first axial direction and to an inter-axial direction along a straight line connecting a rotation axis of the supply reel and a rotation axis of the take-up reel.

The layer transfer film cartridge may comprise: a take-up case that houses the take-up reel; and a second handle supported by the take-up case. The second handle may extend in a second axial direction along a rotation axis of the take-up reel. A length of the first handle in the first axial direction may be longer than a length of the second handle in the second axial direction.

The layer transfer film cartridge may comprise a connecting portion connecting the supply reel and the take-up reel, and the take-up case may have a take-up opening through which to guide the multilayer film into the take-up case, wherein the second handle may be located in a position shifted from, in a direction perpendicular to, an imaginary plane containing a rotation axis of the supply reel and a rotation axis of the take-up reel, on a side of the imaginary plane that is a same side as a side of the imaginary plane on which the take-up opening is located.

The layer transfer film cartridge may comprise: a connecting portion connecting the supply reel and the take-up reel; and a shaft located at the take-up case or the take-up reel, the shaft extending along the second axial direction, and located apart from the take-up case, wherein the second handle may be located in a position shifted from, in a direction perpendicular to, an imaginary plane containing a rotation axis of the supply reel and a rotation axis of the take-up reel, on a side of the imaginary plane that is a same side as a side of the imaginary plane on which the shaft is located.

The first handle may be supported at one of ends of the supply reel which are located apart from each other in a first axial direction along a rotation axis of the supply reel and at one of ends of the take-up reel which are located apart from each other in a second axial direction along a rotation axis of the take-up reel.

The supply case may have a flat surface extending in the first axial direction, wherein the first handle may comprise: a first base portion extending in an inter-axial direction along a straight line connecting the rotation axis of the supply reel and the rotation axis of the take-up reel; a first supply-side leg extending from one of ends of the first base portion which are located apart from each other in the inter-axial direction and supported at one of ends of the supply reel which are located apart from each other in the first axial direction; and a first take-up-side leg extending from another end of the ends of the first base portion which are located apart from each other in the inter-axial direction and supported at one of ends of the take-up reel which are located apart from each other in the second axial direction, and the supply reel may be located between the flat surface and the first base portion in a direction perpendicular to the first axial direction and to the inter-axial direction.

The layer transfer film cartridge may comprise a second handle supported at another end of the ends of the supply reel which are located apart from each other in the first axial direction and at another end of the ends of the take-up reel which are located apart from each other in the second axial direction.

A layer transfer film cartridge is disclosed which comprises: a supply reel on which a multilayer film including a transfer layer and a supporting layer supporting the transfer layer is wound; a supply case that houses the supply reel; a take-up reel on which to take up the multilayer film; a take-up case that houses the take-up reel; and a slot-shaped grip formed in at least one of the supply case and the take-up case.

With this configuration, the slot-shaped grip of the layer transfer film cartridge is available for allowing a user's fingers to be hooked thereon; therefore, even if the layer transfer film cartridge is heavy in weight, the operations for installation and removal of the layer transfer film cartridge can be carried out with ease.

The layer transfer film cartridge may be configured to comprise a supply reel, a supply case, a take-up reel, a first handle, and a memory. A multilayer film including a transfer layer and a supporting layer supporting the transfer layer is wound on the supply reel. The supply case houses the supply reel. The take-up reel takes up the multilayer film. The first handle is supported by the supply case or the supply reel. At least part of the supply reel is located between the memory and the first handle.

When the layer transfer film cartridge configured as described above is installed in the layer transfer device, the layer transfer device can acquire information related to the layer transfer film cartridge.

The first handle may be supported by the supply case, and at least part of the supply reel may be located between the memory and the first handle in a perpendicular direction perpendicular to a first axial direction along a rotation axis of the supply reel and to an inter-axial direction that is a direction of arrangement of a rotation axis of the supply reel and a rotation axis of the take-up reel.

The first handle may be configured to connect one of ends of the supply reel which are located apart from each other in a first axial direction along a rotation axis of the supply reel and one of ends of the take-up reel which are located apart from each other in a second axial direction along a rotation axis of the take-up reel, and at least part of the supply reel may be located between the memory and the first handle in the first axial direction.

A layer transfer device for transferring a transfer layer onto a sheet is disclosed. The layer transfer device comprises a housing having a housing opening, an electric contact, and a layer transfer film cartridge. The electric contact is located in the housing and faces to the housing opening. The layer transfer film cartridge is removably installable in the housing through the housing opening, and comprises a supply reel, a take-up reel, and a memory. A multilayer film including a transfer layer and a supporting layer supporting the transfer layer is wound on the supply reel. The take-up reel is configured to take up up the multilayer film. The memory has a contact surface that comes in contact with the electric contact when the layer transfer film cartridge is installed and positioned in an installation position in the housing.

With this configuration, the layer transfer device can acquire information related to the layer transfer film cartridge. When the layer transfer film cartridge is installed, the contact surface of the memory faces to the electric contact that faces to the housing opening; therefore, the contact surface is unlikely to contact an object such as a wall provided in the housing along a direction of installation. Accordingly, the contact surface can be restrained from unnecessarily rubbing against the housing, so that the layer transfer device can stably read out information stored in the memory.

The layer transfer device may be configured such that when it is in the installation position, at least part of the supply reel is located between the housing opening and the electric contact in a perpendicular direction perpendicular to a first axial direction along a rotation axis of the supply reel. The perpendicular direction may be a direction perpendicular to the first axial direction and to an inter-axial direction that is a direction of arrangement of a rotation axis of the supply reel and a rotation axis of the take-up reel.

The layer transfer device may further comprise: a supply case that houses the supply reel; and a first handle supported by the supply case or the supply reel, and at least part of the supply reel may be located between the memory and the first handle in the perpendicular direction. The memory may be provided in the supply case. The supply case may have a flat surface provided in part of an outer peripheral surface thereof, and a recessed region recessed from the flat surface, and the contact surface may be located in the recessed region.

With this configuration, the contact surface of the memory does not protrude from the flat surface of the supply case; therefore, the contact surface can be restrained from being damaged.

The contact surface may be configured to be parallel to the flat surface.

The layer transfer film cartridge may further comprise a memory holder to which the memory is fixed, and the memory holder may be supported movably in a first axial direction along a rotation axis of the supply reel relative to the supply case.

With this configuration, even when the layer transfer film cartridge being installed into the housing is shifted a bit to the first axial direction relative to the housing, the contact surface of the memory can be stably brought into contact with the electric contact.

The layer transfer film cartridge may include a connecting portion connecting one of ends of the supply reel which are located apart from each other in a direction of the axis of the supply reel (first axial direction) and one of ends of the take-up reel which are located apart from each other in a direction of the axis of the take-up reel (second axial direction along a rotation axis of the take-up reel), and the memory may be provided at the connecting portion.

The contact surface may include a plurality of contact surfaces arranged in the first axial direction, and extend in an inter-axial direction that is a direction of arrangement of a rotation axis of the supply reel and a rotation axis of the take-up reel.

With this configuration, even when the layer transfer film cartridge being installed into the housing is shifted a bit to the inter-axial direction relative to the housing, the contact surface of the memory can be stably brought into contact with the electric contact.

The memory may be capable of memorizing a length of the multilayer film used.

The layer transfer film cartridge may be configured to comprise a supply reel, a container member, and a seal structure. A multilayer film including a transfer layer and a supporting layer supporting the transfer layer is wound. The container member houses the supply reel, and has a supply opening through which to draw out the multilayer film wound on the supply reel, to an outside of the container member. The seal structure is provided to close the supply opening, and includes a first contact portion which contacts a transfer layer-side surface of the multilayer film and a second contact portion which contacts a supporting layer-side surface of the multilayer film, to nip the multilayer film between the first contact portion and the second contact portion in a manner that permits the multilayer film to be drawn out.

With this configuration, the container member can be hermetically sealed by the seal structure, so that the degradation of the multilayer film can be suppressed.

In the layer transfer film cartridge described above, the first contact portion may be composed of an elastic body.

With this configuration, the transfer layer of the multilayer film can be protected.

In the layer transfer film cartridge described above, the second contact portion may be composed of an elastic body.

With this configuration, the multilayer film can be protected.

In the layer transfer film cartridge described above, the elastic body of which the first contact portion and/or the second contact portion is composed may be made of polyurethane.

The layer transfer film cartridge described above may be configured such that the supply reel includes a shaft on which the multilayer film is wound, the container member includes a pair of side walls by which the shaft is rotatably supported, the shaft has end portions protruding through the side walls to outside, and the layer transfer film cartridge comprises an end seal member that seals clearances between the shaft and each side wall.

With this configuration, the sealing performance of the container member can be increased, so that the degradation of the multilayer film can be restrained more effectively.

The layer transfer film cartridge described above may be configured to comprise a drying agent located together with the multilayer film wound on the supply reel in the container member.

With this configuration, increase in humidity inside the container member can be restrained, so that the degradation of the multilayer film can be restrained more effectively.

A layer transfer film cartridge is disclosed which comprises a supply reel, a container member, a cover member. Herein, a multilayer film including a transfer layer and a supporting layer supporting the transfer layer is wound on the supply reel. The container member houses the supply reel, and has a supply opening through which to draw out the multilayer film wound on the supply reel. The cover member is a member with which the supply opening is openably closeable.

The cover member in a state where the supply opening is closed therewith nips the multilayer film drawn out through the supply opening and positioned between the cover member and the container member.

With this configuration, the supply opening of the container member can be covered with the cover member and the container member can be hermetically sealed, so that the degradation of the multilayer film can be restrained.

The layer transfer film cartridge described above may be configured such that the cover member includes a first seal member so provided as to come in contact with the multilayer film when the supply opening is closed with the cover member. The first seal member is composed of an elastic body.

With this configuration, the multilayer film can be protected.

The layer transfer film cartridge described above may be configured such that when the supply opening is closed with the cover member, the first seal member is positioned in contact with a peripheral edge of the supply opening.

With this configuration, the sealing performance of the container member can be increased, so that the degradation of the multilayer film can be restrained more effectively.

In the layer transfer film cartridge described above, the container member may be configured to include a second seal member provided such that when the supply opening is closed with the cover member, the multilayer film drawn out through the supply opening is nipped between the first seal member and the second seal member. The second seal member is composed of an elastic body.

With this configuration, the multilayer film can be protected.

In the layer transfer film cartridge described above, the elastic body of which the first seal member and/or the second seal member are composed may be made of polyurethane.

The layer transfer film cartridge may be configured such that the supply reel includes a shaft on which the multilayer film is wound, the container member includes a pair of side walls by which the shaft is rotatably supported, the shaft has end portions protruding through the side walls to outside, and the layer transfer film cartridge comprises an end seal member that seals clearances between the shaft and each side wall.

With this configuration, the sealing performance of the container member can be increased, so that the degradation of the multilayer film can be restrained more effectively.

The layer transfer film cartridge described above may be configured to comprise a drying agent located in a same space in which the multilayer film wound on the supply reel is located, at least in a state where the supply opening is closed with the cover member With this configuration, increase in humidity in the space in which the multilayer film is located can be restricted, so that the degradation of the multilayer film can be restrained more effectively.

In the layer transfer film cartridge described above, the cover member may be provided movably relative to the container member between a close position in which the supply opening is closed and an open position in which the supply opening is opened.

In the layer transfer film cartridge described above, the cover member may be configured to be attachable to and detachable from the container member, and to cover the supply opening when the cover member is attached to the container member. The cover member may be configured to be attachable to and detachable from the container member by means of a snap-fit structure.

A layer transfer device comprising a housing in which the layer transfer film cartridge with a cover member movable between the close position and the open position is removably installable is disclosed. The housing comprises a housing main body having a housing opening through which the layer transfer film cartridge is allowed to pass when the layer transfer film cartridge is installed or removed, and a housing cover with which the housing opening is openably closeable.

The housing cover comprises a cartridge pressing portion by which when the housing cover is closed, part of the layer transfer film cartridge is pressed and the cover member is caused to move relative to the container member from the close position to the open position.

With this configuration, the cover member of the layer transfer film cartridge installed in the housing main body remains in the close position until the housing cover is closed; therefore, the container member is hermetically sealed, so that the degradation of the multilayer film can be restrained. Moreover, as the housing cover is closed, the cover member is automatically moved from the close position to the open position, so that forgetting about closing the cover member can be prevented.

The layer transfer film cartridge may be configured to comprise a supply reel, a take-up reel, a take-up case, and a remaining amount indicating member. A multilayer film including a transfer layer and a supporting layer supporting the transfer layer is wound on the supply reel. The take-up reel takes up the multilayer film. The take-up case houses the take-up reel. The remaining amount indicating member includes a contact portion that contacts a surface of the multilayer film wound on the take-up reel and moves in accordance with an amount of the multilayer film wound thereon, and an indicator end portion that is located at an outside of the take-up case and moves in accordance with movement of the contact portion to indicate a remaining amount of the multilayer film.

With this configuration, the indicator end portion of the remaining amount indicating member indicates the remaining amount of the multilayer film, and thus makes the remaining amount of the multilayer film readily legible.

The layer transfer film cartridge may be configured to further comprise a spring that causes the contact portion to be pressed against the multilayer film wound on the take-up reel.

With this configuration, the contact portion can be stably kept in contact with the surface of the multilayer film.

The remaining amount indicating member may be configured to extend in a perpendicular direction perpendicular to a second axial direction along a rotation axis of the take-up reel, and to be swingable on a pivot for swinging motion as a supporting point, and the contact portion may be positioned between the indicator end portion and the pivot for swinging motion. The indicator end portion may be configured to protrude from the take-up case on an opposite side of the take-up case which is opposite to another side of the take-up case on which the supply reel is located. With this configuration, the indicator end portion is not positioned between the take-up case and the supply reel; therefore, the indicator end portion is readily legible for a user.

The remaining amount indicating member may be configured to extend in a perpendicular direction perpendicular to a second axial direction along a rotation axis of the take-up reel, and to be slidable relative to the take-up case.

The contact portion may be configured as a roller.

With this configuration, resistance which would take place on contact of the contact portion with the surface of the multilayer film can be restrained.

The remaining amount indicating member may be movable to a brand-new position indicative of the layer transfer film cartridge being brand-new, to an initial position indicative of the multilayer film being not yet used, and to a final position indicative of the multilayer film being exhausted. The initial position is a position different from the brand-new position and from the final position when viewed in a second axial direction along a rotation axis of the take-up reel. The layer transfer film cartridge may be configured to further comprise a lock portion by which if the layer transfer film cartridge is brand-new, the remaining amount indicating member is locked in the brand-new position.

With this configuration, a user can check, by the remaining amount indicating member, whether the layer transfer film cartridge is brand-new.

The brand-new position may be a same position as the final position, or a position farther than the final position from a position of a center of rotation of the take-up reel.

The layer transfer film cartridge may be configured to comprise a supply reel, a supply case, a take-up reel, and a remaining amount indicating member. A multilayer film including a transfer layer and a supporting layer supporting the transfer layer is wound on the supply reel. The supply case houses the supply reel. The take-up reel takes up the multilayer film. The remaining amount indicating member includes a contact portion that contacts a surface of the multilayer film wound on the supply reel and moves in accordance with an amount of the multilayer film wound thereon, and an indicator end portion that is located at an outside of the supply case and moves in accordance with movement of the contact portion to indicate a remaining amount of the multilayer film.

With this configuration, the indicator end portion of the remaining amount indicating member indicates the remaining amount of the multilayer film, and thus makes the remaining amount of the multilayer film readily legible.

The layer transfer film cartridge may further comprise a spring that causes the contact portion to be pressed against the multilayer film wound on the supply reel.

With this configuration, the contact portion can be stably brought into contact with the surface of the multilayer film.

The remaining amount indicating member may be configured to extend in a perpendicular direction perpendicular to a first axial direction along a rotation axis of the supply reel, and to be swingable on a pivot for swinging motion as a supporting point, and the contact portion may be positioned between the indicator end portion and the pivot for swinging motion. The indicator end portion may be configured to protrude from the supply case on an opposite side of the supply case which is opposite to another side of the supply case on which the take-up reel is located. With this configuration, the indicator end portion is not positioned between the supply case and the take-up reel; therefore, a user can readily check the indicator end portion.

The remaining amount indicating member may be configured to extend in a perpendicular direction perpendicular to a first axial direction along a rotation axis of the supply reel, and to be slidable relative to the supply case.

The contact portion may be configured as a roller.

With this configuration, resistance which would take place on contact of the contact portion with the surface of the multilayer film can be restrained.

The remaining amount indicating member may be movable to a brand-new position indicative of the layer transfer film cartridge being brand-new, to an initial position indicative of the multilayer film being not yet used, and to a final position indicative of the multilayer film being exhausted. The initial position is a position different from the brand-new position and from the final position when viewed in a first axial direction along a rotation axis of the supply reel. The layer transfer film cartridge may be configured to further comprise a lock portion by which if the layer transfer film cartridge is brand-new, the remaining amount indicating member is locked in the brand-new position.

With this configuration, a user can check, by the remaining amount indicating member, whether the layer transfer film cartridge is brand-new.

The brand-new position may be a same position as the final position, or a position farther than the final position from a position of a center of rotation of the supply reel.

The layer transfer film cartridge may be configured to comprise a supply reel, a take-up reel, a supply case, and a draw-in mechanism. A multilayer film including a transfer layer and a supporting layer supporting the transfer layer is wound on the supply reel. The take-up reel takes up the multilayer film. The supply case houses the supply reel. The draw-in mechanism is configured to draw the multilayer film into the supply case.

With this configuration, the draw-in mechanism can serve to restrain the multilayer film from sagging badly between the supply reel and the take-up reel.

The layer transfer film cartridge may be configured such that the supply case has a supply opening through which the multilayer film wound on the supply reel is allowed to pass, the draw-in mechanism is located in the supply case, and includes a dancer roller around which the multilayer film is looped, and the dancer roller is movable along a direction of rotation of the supply reel between a first position and a second position farther than the first position from the supply opening.

With this configuration, the dancer roller moving from the first position to the second position can cause the multilayer film to be drawn into the supply case.

In the layer transfer film cartridge described above, the draw-in mechanism may be configured to include a spring that biases the dancer roller from the first position toward the second position.

With this configuration, the dancer roller can be caused to move automatically from the first position to the second position.

In the layer transfer film cartridge described above, the dancer roller may be provided in a manner that permits the dancer roller to be moved from the first position to the second position under its own weight.

With this configuration, the dancer roller can be caused to move automatically from the first position to the second position with reduced number of parts.

In the layer transfer film cartridge described above, the dancer roller may be configured to contact a supporting layer-side surface of the multilayer film.

With this configuration, the transfer layer of the multilayer film can be protected.

The layer transfer film cartridge described above may be configured such that the supply case has a supply opening through which the multilayer film wound on the supply reel is allowed to pass, the draw-in mechanism is located in the supply case, and includes a shutter with which the supply opening is openably closeable, the shutter is rotatable along a direction of rotation of the supply reel between an open position in which the shutter is opened and a close position in which the shutter is closed, and when the shutter rotates from the open position toward the close position, a contact end portion at a downstream end thereof in the direction of rotation comes in contact with the multilayer film to draw in the multilayer film into the supply case.

With this configuration, the shutter can not only restrain the multilayer film from sagging, but also restrain foreign matter from entering the supply case by closing the supply opening of the supply case.

In the layer transfer film cartridge described above, the shutter may be configured to include an elastic member located at the contact end portion.

With this configuration, the multilayer film can be protected.

In the layer transfer film cartridge described above, the contact end portion may be configured to come in contact with a supporting layer-side surface of the multilayer film.

With this configuration, the transfer layer of the multilayer film can be protected.

The layer transfer film cartridge may be configured to further comprise a connecting member connecting the supply reel and the take-up reel, wherein the supply case is supported together with the supply reel by the connecting member, movably along an inter-axial direction that is a direction along a straight line connecting a rotation axis of the supply reel and a rotation axis of the take-up reel, wherein the draw-in mechanism includes: a pinion gear that rotates together with the supply reel; and a rack gear that is provided on the connecting member and engageable with the pinion gear, and wherein movement of the supply case in such a direction as to move closer to the take-up reel causes the supply reel to rotate in a direction that is a direction in which the supply reel rotates when the multilayer film is taken up.

With this configuration, the multilayer film can be drawn into the supply case by causing the supply case to move toward take-up reel.

The layer transfer film cartridge described above may be configured such that the supply case is supported movably along the inter-axial direction between a third position farthest from the take-up reel and a fourth position closest to the take-up reel, and that when the supply case is in the third position, the rack gear is disengaged from the pinion gear.

With this configuration, the supply case in the third position can be rendered freely rotatable.

The layer transfer film cartridge may be configured to comprise a supply reel, a supply case, and a sheet guide. A multilayer film including a transfer layer and a supporting layer supporting the transfer layer is wound on the supply reel. The supply case houses the supply reel. The sheet guide has a first guide surface provided on the supply case, and a second guide surface opposed to the first guide surface, the second surface being located in such a position that the supply reel is positioned behind the first guide surface as viewed from the second guide surface.

With this configuration, the layer transfer device can be downsized and restrained from having a complicated structure.

The layer transfer film cartridge described above may comprise a first handle supported by the supply case or the supply reel.

With this configuration, operational ease for installation and removal of the layer transfer film cartridge can be increased.

In the layer transfer film cartridge described above, the second guide surface may be provided on the supply case, and the first handle may be configured to include a grip portion. The grip portion extends in a first axial direction along a rotation axis of the supply reel, and is located in such a position that the first guide surface and the second guide surface are positioned between the grip portion and the supply reel.

With this configuration, the layer transfer device can be restrained from having a complicated structure. Moreover, the layer transfer film cartridge can be restrained from having a complicated structure.

In the layer transfer film cartridge described above, the first handle may be configured to include a grip portion extending in a first axial direction along a rotation axis of the supply reel, the grip portion being located in such a position that the supply reel is positioned behind the first guide surface as viewed from the grip portion. In this configuration, the second guide surface is provided on the grip portion.

With this configuration, the layer transfer film cartridge can be made compact, and thus the layer transfer device in which the layer transfer film cartridge is to be installed can be further downsized.

In the layer transfer film cartridge described above, the grip portion on which the second guide surface is provided may be configured to be movable between a first position and a second position closer than the first position to the first guide surface, and the sheet guide may be formed by the grip portion in the second position.

With this configuration, the space between the first guide surface and the second guide surface can be optimized for conveyance of a sheet; therefore, the performance of sheet conveyance via the sheet guide can be improved.

The layer transfer film cartridge described above may be configured such that at least one of the first guide surface and the second guide surface includes a plurality of ribs extending along a sheet conveyance direction and arranged in a first axial direction along a rotation axis of the supply reel.

With this configuration, an area of contact of the guide surface with a sheet can be reduced, and thus the performance of sheet conveyance via the sheet guide can be improved.

The layer transfer film cartridge may be configured to comprise a supply reel, a supply case, a take-up reel, and a take-up case. A multilayer film including the transfer layer and a supporting layer supporting the transfer layer is wound on the supply reel. The take-up reel takes up the multilayer film. The supply case houses the supply reel. The take-up case houses the take-up reel, and has an outside diameter different from an outside diameter of the supply case.

The layer transfer film cartridge set in a first orientation and put to the housing is installable into the housing while the layer transfer film cartridge reversed from the first orientation about an axis parallel to directions of installation and removal of the layer transfer film cartridge to a second orientation and put to the housing is not installable due to interference of one of the supply case and the take-up case having a larger diameter with the housing.

With this configuration, when a user erroneously intends to install the layer transfer film cartridge in the second orientation, a case having the larger diameter will interfere with the housing before the layer transfer film cartridge reaches its installation position, so that improper placement of the layer transfer film cartridge during assembly can be prevented.

A layer transfer device for transferring a transfer layer onto a sheet is disclosed. The layer transfer device comprises a housing having a housing opening, and a layer transfer film cartridge. The layer transfer film cartridge is installable into and removable from the housing through the housing opening, and supports a multilayer film including the transfer layer and a supporting layer supporting the transfer layer.

The housing comprises: a first guide configured to guide the layer transfer film cartridge in a first orientation to an installation position; and a second guide configured to guide the layer transfer film cartridge in the first orientation to the installation position, the second guide and the first guide being asymmetrical with respect to a predetermined direction.

With this configuration, in which the first guide and the second guide are configured to be asymmetrical with respect to the predetermined direction, when a user attempts to install, into the housing, the layer transfer film cartridge held erroneously in the second orientation that is an orientation reversed from the first orientation about an axis parallel to directions of installation and removal of the layer transfer film cartridge, the layer transfer film cartridge will interfere with the housing before reaching its installation position, so that improper placement of the layer transfer film cartridge during assembly can be prevented.

The layer transfer device described above may be configured to comprise a supply reel on which the multilayer film is wound, and a take-up reel on which to take up the multilayer film, and the first guide and the second guide may be configured to extend in a direction perpendicular to a first axial direction along a rotation axis of the supply reel.

When the layer transfer film cartridge reversed from the first orientation about an axis parallel to directions of installation and removal of the layer transfer film cartridge to a second orientation is restrained from moving toward the installation position due to interference with the housing in a position apart from the installation position, at least part of the layer transfer film cartridge may protrude through the housing opening to an outside of the housing.

With this configuration, at least part of the layer transfer film cartridge in the second orientation interfering with the housing in a position apart from the installation position and restrained from moving toward the installation position protrudes through the housing opening to the outside of the housing; therefore, a user can readily become aware of the improper placement during assembly.

The second guide may be located in a position different from a position of the first guide in a perpendicular direction perpendicular to directions of installation and removal of the layer transfer film cartridge and to the predetermined direction, and the layer transfer film cartridge may further comprise: a first to-be-guided portion that is guided by the first guide when the layer transfer film cartridge in the first orientation is installed into the housing; and a second to-be-guided portion that is guided by the second guide when the layer transfer film cartridge in the first orientation is installed into the housing, the second to-be-guided portion being located in a position different from a position of the first to-be-guided portion in the perpendicular direction. Further, the second guide may include second guides provided at a plurality of locations in the housing, and the second to-be-guided portion may include second to-be-guided portions provided at a plurality of locations in the layer transfer film cartridge.

The layer transfer film cartridge may further comprise: a first connecting portion connecting one of ends of the supply reel which are located apart from each other in the first axial direction, and one of ends of the take-up reel which are located apart from each other in a second axial direction along a rotation axis of the take-up reel; and a second connecting portion connecting another end of the ends of the supply reel which are located apart from each other in the first axial direction, and another end of the ends of the take-up reel which are located apart from each other in the second axial direction, wherein the first connecting portion includes the first to-be-guided portion, and wherein the second connecting portion includes the second to-be-guided portion.

The second guide may have a width different from a width of the first guide. The layer transfer film cartridge may further comprise a first to-be-guided portion and a second to-be-guided portion. The first to-be-guided portion is guided by the first guide when the layer transfer film cartridge in the first orientation is installed into the housing. The first-to-be guided portion has a size corresponding to the width of the first guide. The second to-be-guided portion is guided by the second guide when the layer transfer film cartridge in the first orientation is installed into the housing. The second to-be-guided portion has a size corresponding to the width of the second guide.

The first to-be-guided portion may include one end portion of end portions of the take-up reel which are located apart from each other in a second axial direction along a rotation axis of the take-up reel and one end portion of end portions of the supply reel which are located apart from each other in a first axial direction along a rotation axis of the supply reel, and the second to-be-guided portion may include another end portion of the end portions of the take-up reel which are located apart from each other in the second axial direction and another end portion of the end portions of the supply reel which are located apart from each other in the first axial direction.

The layer transfer film cartridge may further comprise a supply case that houses the supply reel, and a take-up case that houses the take-up reel. Herein, the take-up case has an outside diameter different from an outside diameter of the supply case. The housing may comprise: a first guide shaft that contacts the multilayer film drawn out from the supply reel and changes a traveling direction of the multilayer film; and a second guide shaft that contacts the multilayer film guided by the first guide shaft and changes the traveling direction of the multilayer film, wherein the first guide shaft and the second guide shaft are located apart from each other in a perpendicular direction perpendicular to directions of installation and removal of the layer transfer film cartridge and to the predetermined direction. The housing opening comprises: a first end positioned on an opposite side of the first guide shaft which is opposite to another side of the first guide shaft on which the second guide shaft located; and a second end positioned on an opposite side of the second guide shaft which is opposite to another side of the second guide shaft on which the first guide shaft is located. When viewed from a direction of installation or removal of the layer transfer film cartridge, a space between the first end and the first guide shaft has a distance corresponding to an outside diameter of the supply case, and a space between the second end and the second guide shaft has a distance corresponding to an outside diameter of the take-up case.

The layer transfer device may be a layer transfer device for transferring a transfer layer onto a sheet, configured to comprise a housing main body, a layer transfer film cartridge, a rack, and a first cartridge guide. The housing main body has a housing opening that opens in a first direction perpendicular to a vertical direction, and the layer transfer film cartridge is attachable to and detachable from the housing main body through the housing opening. The layer transfer film cartridge comprises a supply reel and a take-up reel. A multilayer film including a transfer layer and a supporting layer supporting the transfer layer is wound on the supply reel. The take-up reel takes up the multilayer film. The rack protrudes out from the housing main body in the first direction to an outside of the housing main body. The first cartridge guide guides the layer transfer film cartridge placed on the rack with a rotation axis of the supply reel oriented along the first direction into the housing main body through the housing opening along the first direction.

With this configuration, the layer transfer film cartridge being installed along the first direction perpendicular to the vertical direction into the housing main body can be supported by the rack; therefore, even if the layer transfer film cartridge is heavy in weight, the layer transfer film cartridge can be installed and removed along the first direction with ease.

The rack may include the first cartridge guide.

The rack may be rotatable between an open position in which the housing opening is opened and a close position in which the housing opening is closed.

The layer transfer film cartridge described above may further comprise a connecting portion that connects an end portion of the supply reel farther from the housing opening and an end portion of the take-up reel farther from the housing opening, wherein another end portion of the supply reel opposite to the one end portion of the supply reel and another end portion of the take-up reel opposite to the one end portion of the take-up reel may not be connected.

With this configuration, the layer transfer film cartridge can be installed along the first direction without interfering with a member located between a supply unit and a take-up unit in the housing main body.

The first cartridge guide may consist of two first protrusions which are arranged apart from each other in a second direction transverse to the vertical direction and perpendicular to the first direction and between which the layer transfer film cartridge is held, and the housing main body may further comprise an inner guide that guides the layer transfer film cartridge in the first direction within the housing main body. The inner guide consists of two second protrusions which are arranged apart from each other in the second direction and between which the layer transfer film cartridge is held. A distance between the two first protrusions is longer than a distance between the two second protrusions.

With this configuration, when the layer transfer film cartridge is placed on the rack, the layer transfer film cartridge may be put in a larger space provided between the two first protrusions; therefore, the operation of placing the layer transfer film cartridge on the rack can be carried out with ease. When the layer transfer film cartridge placed on the rack is installed along the first direction into the housing main body, the layer transfer film cartridge is guided between the two second protrusions with a smaller space provided therebetween; therefore, the layer transfer film cartridge can be retained in a stable posture when it is guided to the installation position.

The rack may have a first support surface that supports the layer transfer film cartridge, the housing main body may have a second support surface that supports the layer transfer film cartridge within the housing main body, and the first support surface may be positioned higher in level than the second support surface.

With this configuration, the layer transfer film cartridge placed on the rack being installed along the first direction into the housing main body can be restrained from getting caught on an edge of the second support surface, so that the operation of installing the layer transfer film cartridge can be carried out with ease.

The housing main body may include the first cartridge guide, the rack may be movable through the housing opening between an inside position within the housing main body and an outside position out of the housing main body with guidance provided by the first cartridge guide, and the first cartridge guide may be configured to guide the layer transfer film cartridge via the rack in the first direction.

The layer transfer device described above may further comprise a cover extending upward from an end portion of the rack that is one of end portions which is positioned farther from the housing opening when the rack is located in the outside position, wherein the cover is configured to close the housing opening when the rack is located in the inside position.

The layer transfer device described above may further comprise a heating roller that heats the multilayer film. The heating roller may be configured to extend along the first direction, and provided at the rack.

The layer transfer device described above may further comprise a second cartridge guide that guides the layer transfer film cartridge toward the heating roller when the rack is located in the outside position.

The layer transfer device described above may further comprise a leg that supports the rack from below when the rack extends out of the housing main body in the first direction, the leg being configured as a member independent of the housing main body.

With this configuration, the rack can be restrained from bending under the weight of the layer transfer film cartridge by the leg.

DESCRIPTION OF EMBODIMENTS

A detailed description will be given of a first embodiment with reference made to the drawings where appropriate. In the following description, a general setup of a layer transfer device will be briefly described at the outset, and a configuration of specific features of a layer transfer film cartridge will be described thereafter.

Figure 1:
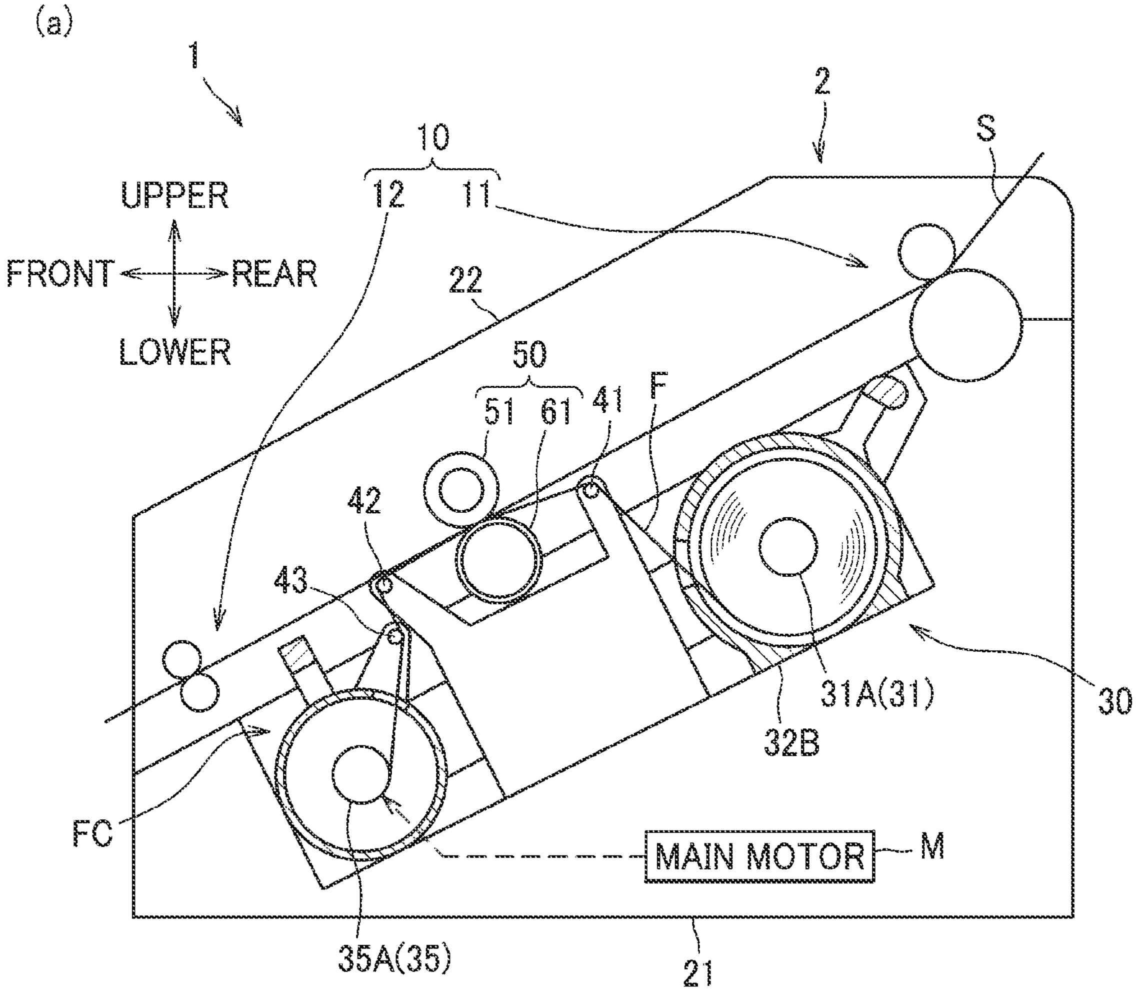
FIG. 1 includes a diagram (a) showing a layer transfer device according to a first embodiment, and a section view (b) showing a structure of a multilayer film.
Figure 1:
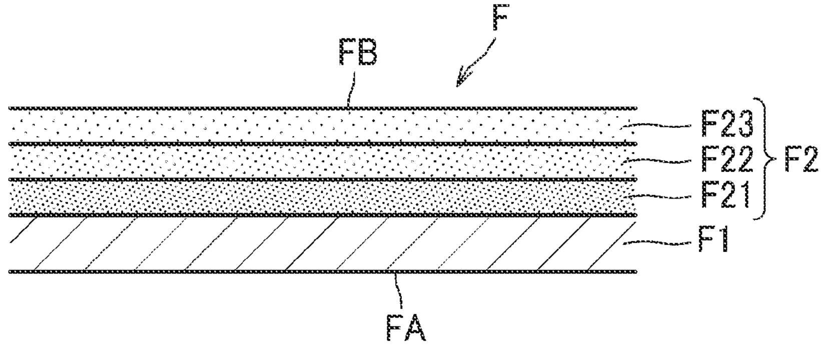

As shown in FIG. 1(*a*), a layer transfer device 1 is a device for post-processing to be subjected to a sheet S on which a toner image is formed by an image forming apparatus, for example, a laser printer or the like, that is, for transferring foil such as of aluminum or the like onto the toner image on the sheet S to thereby form a foil image on the sheet S. In other words, the layer transfer device 1 transfers foil onto a toner image on a sheet S, to thereby form a foil image on the sheet S. The layer transfer device 1 includes a housing 2, a sheet conveyor unit 10, a film supply unit 30, and a transfer unit 50.

The housing 2 is made of plastic or the like, and includes a housing main body 21 and a housing cover 22. The housing main body 21 has a housing opening 21A at its upper side (see FIG. 2). The housing opening 21A is an opening for allowing a layer transfer film cartridge FC as will be described later to be installed into or removed from the housing main body 21, and thus is configured to allow the layer transfer film cartridge FC to pass therethrough when the layer transfer film cartridge FC is installed or removed. The housing cover 22 is a member for opening and closing the housing opening 21A. The housing cover 22 is rotatably supported by the housing main body 21. The housing cover 22 is configured to be rotatable between a close position in which the housing opening 21A is closed (position in FIG. 1(*a*)) and an open position in which the housing opening 21A is opened (position in FIG. 2).

The sheet conveyor unit 10 includes a sheet feed mechanism 11 and a sheet ejection mechanism 12. The sheet conveyor unit 10 is caused to rotate by a main motor M which will be described later. The sheet feed mechanism 11 is a mechanism that conveys sheets S on a sheet tray (not shown) one by one toward the transfer unit 50.

The sheet ejection mechanism 12 is a mechanism that ejects a sheet S which has passed through the transfer unit 50, to the outside of the housing 2.

The film supply unit 30 is a unit that supplies and lays a multilayer film F onto a sheet S conveyed from the sheet feed mechanism 11. The film supply unit 30 includes a layer transfer film cartridge FC, a first guide shaft 41, a second guide shaft 42, and a main motor M as a driving source. The first guide shaft 41 and the second guide shaft 42 are provided at the housing main body 21 (see FIG. 2).

Figure 2:
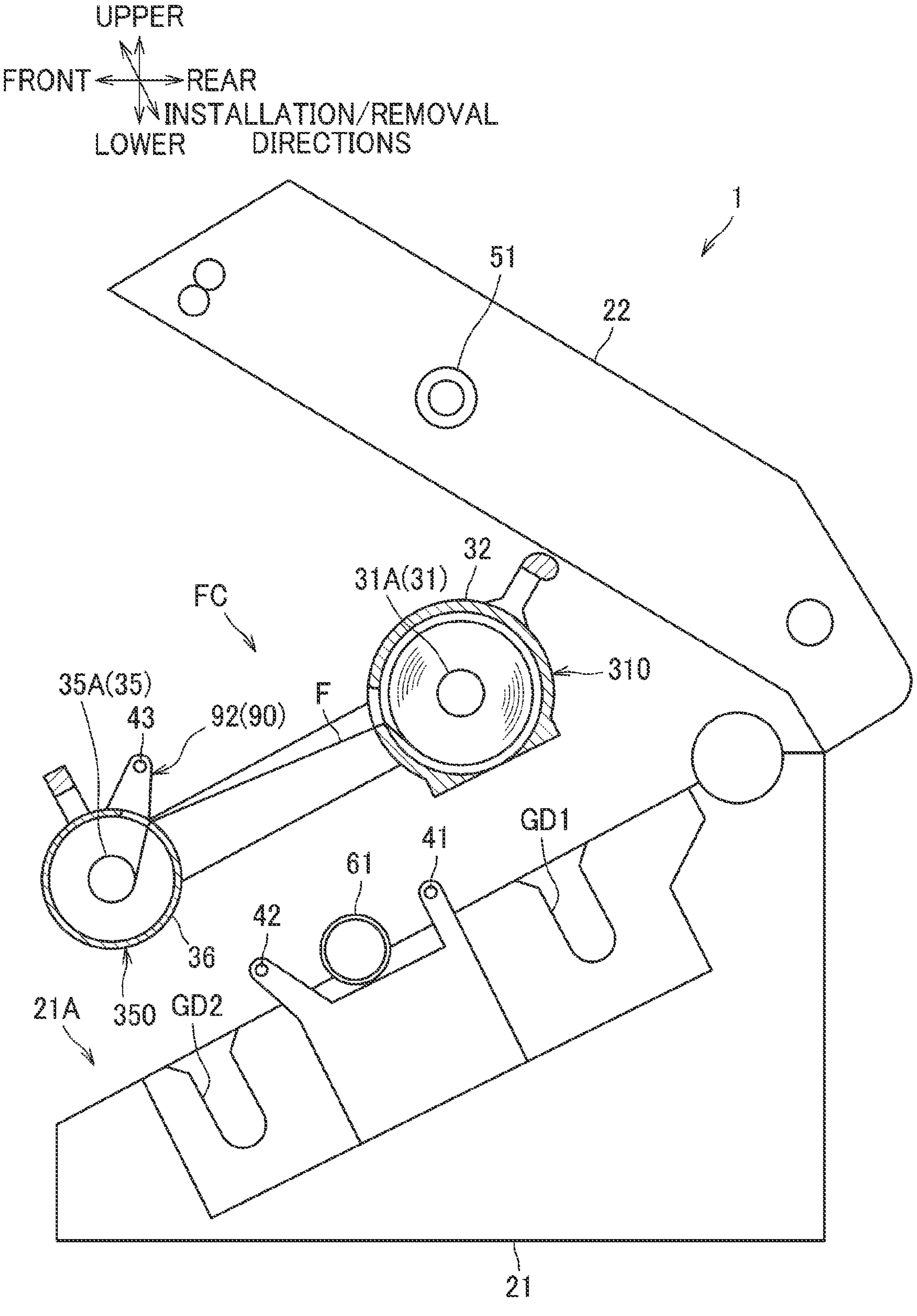
FIG. 2 is a diagram showing a state of the layer transfer device with a housing cover being open.

The layer transfer film cartridge FC is configured, as shown in FIG. 2, to be installable into and removable from the housing main body 21 through the housing opening 21A. The layer transfer film cartridge FC is a cartridge that supports a multilayer film F. The layer transfer film cartridge FC mainly includes a supply unit 310, a take-up unit 350, and a shaft 43. The supply unit 310 mainly includes a supply reel 31. The take-up unit 350 mainly includes a take-up reel 35. The multilayer film F is wound on the supply reel 31.

As shown in FIG. 1(*b*), the multilayer film F is a film consisting of a plurality of layers. Specifically, the multilayer film F includes a supporting layer F1 and a supported layer F2. The supporting layer F1 is a transparent substrate in the form of a tape and made of polymeric material, and supports the supported layer F2. The supported layer F2 includes, for example, a release layer F21, a transfer layer F22, and an adhesive layer F23. The release layer F21 is a layer for facilitating separation of the transfer layer F22 from the supporting layer F1, and is interposed between the supporting layer F1 and the transfer layer F22. The release layer F21 contains a transparent material, such as a wax-type resin, easily releasable from the supporting layer F1.

The transfer layer F22 is a layer to be transferred onto a toner image on a sheet S, and contains foil. Foil is a thin sheet of metal such as gold, silver, copper, aluminum, etc. The transfer layer F22 contains a colorant of gold-colored, silver-colored, red-colored, or other colored material, and a thermoplastic resin. The transfer layer F22 is interposed between the release layer F21 and the adhesive layer F23.

The adhesive layer F23 is a layer for facilitating adhesion of the transfer layer F22 to a toner image. The adhesive layer F23 contains a material, such as vinyl chloride resin, acrylic resin, etc., which tends to adhere to a toner image heated by the transfer unit 50 which will be described later.

The supply reel 31 is made of plastic or the like, and includes a supply shaft 31A on which a multilayer film F is wound. One end of the multilayer film F is fixed to the supply shaft 31A.

The take-up reel 35 is made of plastic or the like, and includes a take-up shaft 35A on which to take up the multilayer film F. The other end of the multilayer film F is fixed to the take-up reel 35A. The take-up shaft 35A is caused to rotate by the main motor M.

It is to be understood that the layer transfer film cartridge FC in a brand-new condition has its multilayer film F wound on the supply reel 31 in a roll of a maximum diameter, while no multilayer film F is wound on the take-up reel 35, or the multilayer film F is wound on the take-up reel 35 but in a roll of a minimum diameter. When the layer transfer film cartridge FC is at the end of its life (i.e., the multilayer film F has been exhausted), the multilayer film F is wound on the take-up reel 35 in a roll of a maximum diameter, while no multilayer film F is wound on the supply reel 31, or the multilayer film F is wound on the supply reel 31 but in a roll of a minimum diameter.

The first guide shaft 41 is a shaft that guides the multilayer film F. To be more specific, the first guide shaft 41 contacts the multilayer film F drawn out from the supply reel 31, and changes a traveling direction of the multilayer film F. The first guide shaft 41 is made, for example, of SUS (stainless steel). The second guide shaft 42 is a shaft that guides the multilayer film F. To be more specific, the second guide shaft 42 contacts the multilayer film F guided by the first guide shaft 41, and changes a traveling direction of the multilayer film F. The second guide shaft 42 is made, for example, of SUS.

When the layer transfer film cartridge FC is installed in the housing main body 21, the first guide shaft 41 and the second guide shaft 42 contact a first surface FA (see FIG. 1(*b*)) that is one of the surfaces of the multilayer film F, formed by the supporting layer F1. Moreover, when the layer transfer film cartridge FC is installed in the housing main body 21, a second surface FB (see FIG. 1(*b*)) that is one of the surfaces, of the multilayer film F stretched between the first guide shaft 41 and the second guide shaft 42, reverse to the first surface FA, formed by the supported layer F2 including the transfer layer F22 contacts a sheet S conveyed by the sheet conveyor unit 10, and a pressure roller 51.

The shaft 43 is a member, made of SUS or the like, for adjusting an angle of the multilayer film F to be separated from a sheet S, and contacts the second surface FB of the multilayer film F. The shaft 43 contacts the multilayer film F guided by the second guide shaft 42, and changes a traveling direction of the multilayer film F. The shaft 43 is pressed against the second surface FB of the multilayer film F stretched between the second guide shaft 42 and the take-up reel 35, whereby a traveling direction of the multilayer film F guided by the second guide shaft 42 is changed for adjustment of an angle of the multilayer film F bent at the second guide shaft 42 (hereinafter referred to as "peel-off angle"), such that the angle is made smaller (more acute). To be more specific, the peel-off angle is an angle formed by a portion of the multilayer film F stretched between the second guide shaft 42 and the take-up reel 35 with a portion of the multilayer film F stretched between the first guide shaft 41 and the second guide shaft 42. The more acute the peel-off angle, i.e., the smaller the peel-off angle, the more easily releasable a sheet S going past the second guide shaft 42 is.

It is understood that the first guide shaft 41 and the second guide shaft 42 may be rotatably supported by the housing main body 21, or may be supported but not rotatable. The shaft 43 may be rotatably supported by a support member 90 which will be described later, or may be supported but not rotatable.

The first guide shaft 41 guides the multilayer film F drawn out from the supply reel 31 and laid under a sheet S being conveyed with a surface thereof having a toner image formed thereon facing down. The first guide shaft 41 changes a direction of conveyance of the multilayer film F drawn out from the supply reel 31 and guides the multilayer film F in a direction substantially parallel to a direction of conveyance of the sheet S.

The second guide shaft 42 is a separator roller that contacts the multilayer film F having passed through the transfer unit 50, and changes a direction of conveyance of the multilayer film F having passed through the transfer unit 50 into a direction different from a direction of conveyance of a sheet S, to thereby guide the multilayer film F in a direction away from the sheet S. The multilayer film F having passed through the transfer unit 50 and conveyed with the sheet S laid thereon goes past the second guide shaft 42 and is thus guided in a direction different from the direction of conveyance of the sheet S, and peeled from the sheet S.

The transfer unit 50 is a unit that heats and pressurizes the sheet S and the multilayer film F laid on each other, to transfer the transfer layer F22 onto a toner image formed on a sheet S. The transfer unit 50 includes a pressure roller 51 and a heating roller 61. The transfer unit 50 applies heat and pressure to portions of a sheet S and a multilayer film F laid on each other and nipped between the pressure roller 51 and the heating roller 61.

The pressure roller 51 is a roller comprising a cylindrical metal core with its cylindrical surface coated with a rubber layer made of silicone rubber. The pressure roller 51 is located above the multilayer film F, and is contactable with a reverse side (opposite to a side on which a toner image is formed) of the sheet S.

The pressure roller 51 has two end portions supported rotatably by the housing cover 22. The pressure roller 51, which in combination with the heating roller 61, nips the sheet S and the multilayer film F, is driven to rotate by the main motor M and causes the heating roller 61 to rotate accordingly. The sheet S and the multilayer film F nipped between the pressure roller 51 and the heating roller 61 as described above are conveyed by rotation of the pressure roller 51 and the heating roller 61.

The heating roller 61 is a roller comprising a cylindrical metal tube with a heater (not shown) located inside, to heat the multilayer film F and the sheet S. The heating roller 61 is located under the multilayer film F, and contacts the first surface FA of the multilayer film F.

With the layer transfer device 1 configured as described above, sheets S stacked on the sheet tray (not shown) with front surfaces facing downward are conveyed one by one toward the transfer unit 50 by the sheet feed mechanism 11. Each sheet S is laid on a multilayer film F supplied from the supply reel 31 at a position upstream of the transfer unit 50 in a sheet conveyance direction, and conveyed to the transfer unit 50 with a toner image of the sheet S being kept in contact with the multilayer film F.

In the transfer unit 50, the sheet S and the multilayer film F nipped and passing through between the pressure roller 51 and the heating roller 61 are heated and pressurized by the heating roller 61 and the pressure roller 51, so that the transfer layer F22 is transferred onto the toner image. In the following description, the transfer of the transfer layer F22 onto a toner image is also referred to simply as "layer transfer".

After the layer transfer is done, the sheet S and the multilayer film F adhered to each other are conveyed to the second guide shaft 42. When the sheet S and the multilayer film F travel past the second guide shaft 42, the direction of conveyance of the multilayer film F is changed into a direction different from the direction of conveyance of the sheet S; thereby the multilayer film F is peeled from the sheet S.

The multilayer film F peeled from the sheet S is taken up on the take-up reel 35. On the other hand, the sheet S from which the multilayer film F is peeled has a foil transferred surface facing downward and is ejected to the outside of the housing 2 by the sheet ejection mechanism 12.

Figure 3:
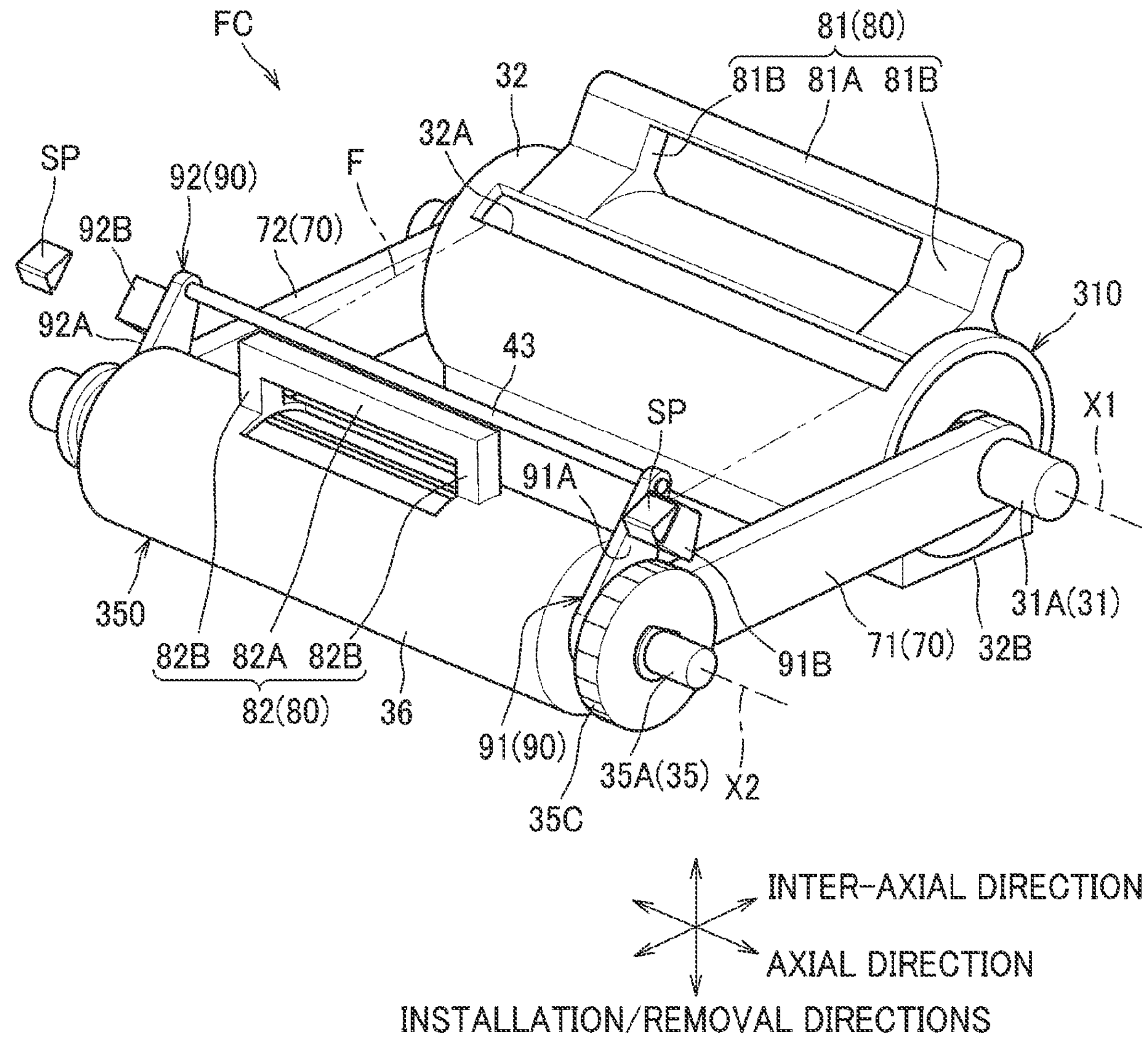
FIG. 3 is a perspective view showing a layer transfer film cartridge.

As shown in FIG. 3, the layer transfer film cartridge FC includes, in addition to the supply unit 310, the take-up unit 350 and the shaft 43 described above, a connecting portion 70, a handle 80, and a support member 90. The supply unit 310 includes, in addition to the supply reel 31 described above, a supply case 32. The take-up unit 350 includes, in addition to the take-up reel 35 described above, a take-up case 36. In the following description, a first axial direction along a rotation axis X1 of the supply reel 31 or a second axial direction along a rotation axis X2 of the take-up reel 35 will also be referred to simply as "axial direction". Also, in the following description, an inter-axial direction along a straight line connecting the rotation axes X1, X2 may also be referred to simply as "inter-axial direction".

The supply case 32 is a case that houses the supply reel 31, and is made of plastic or the like, and is formed substantially in the shape of a hollow circular cylinder. To be more specific, the supply case 32 houses the multilayer film F wound on the supply shaft 31A of the supply reel 31, inside. The supply shaft 31A of the supply reel 31 protrudes from end surfaces of the supply case 32 which are located apart from each other in the axial direction, to the outside.

The supply case 32 is engaged with or fixed to the connecting portion 70 so as not to rotate on the rotation axis X1 relative to the connecting portion 70. The supply case 32 has a flat surface 32B provided in part of an outer peripheral surface thereof. In the present embodiment, the flat surface 32B extends in the axial direction and in the inter-axial direction. With the flat surface 32A in contact with a flat surface portion of the housing main body 21, the layer transfer film cartridge FC is supported by the housing main body 21 (see FIG. 1).

The supply reel 31 is rotatably supported by the supply case 32 and the connecting portion 70. The supply reel 31 is located between the flat surface 32B and a first base portion 81A which will be described later, in a direction perpendicular to the axial direction and to the inter-axial direction.

The take-up case 36 is a case that houses the take-up reel 35, and made of plastic or the like, and formed in the shape of a hollow circular cylinder. To be more specific, the take-up case 36 houses the multilayer film F wound on the take-up shaft 35A of the take-up reel 35, inside. The take-up shaft 35A of the take-up reel 35 protrudes from end surfaces of the take-up case 36 which are located apart from each other in the axial direction, to the outside.

The take-up case 36 is engaged with or fixed to the connecting portion 70 so as not to rotate on the rotation axis X2 relative to the connecting portion 70. The take-up reel 35 is rotatably supported by the take-up case 36 and the connecting portion 70. The take-up reel 35 includes the take-up shaft 35A described above, and a take-up gear 35C. The take-up gear 35C is a gear that receives a driving force from the main motor M. The take-up gear 35C is provided at one end of ends of the take-up shaft 35A which are located apart from each other in the axial direction. To be more specific, part of the take-up shaft 35A is formed in the shape of a letter D, which fits in a D-shaped hole provided in the take-up gear 35C, so that the take-up gear 35C is fixed to the take-up shaft 35A so as not to rotate relative to the take-up shaft 35A. The take-up case 36 has a diameter smaller than a diameter of the supply case 32.

The connecting portion 70 is a member that connects the supply unit 310 and the take-up unit 350. The connecting portion 70 includes a first connecting portion 71 and a second connecting portion 72. The first connecting portion 71 and the second connecting portion 72 extend in a direction perpendicular to the axial direction (first axial direction). To be more specific, the first connecting portion 71 and the second connecting portion 72 are each formed in the shape of a long plate elongate in the inter-axial direction along a straight line connecting the rotation axis X1 of the supply reel 31 and the rotation axis X2 of the take-up reel 35. The first connecting portion 71 and the second connecting portion 72 are located in positions apart from the multilayer film F.

The first connecting portion 71 connects one end of ends of the supply unit 310 which are located apart from each other in the axial direction and one end of ends of the take-up unit 350 which are located apart from each other in the axial direction. Specifically, the first connecting portion 71 connects one end of the supply shaft 31A and one end of the take-up shaft 35A. More specifically, the first connecting portion 71 has holes which are provided at both ends thereof apart from each other in the inter-axial direction, and through which the supply shaft 31A and the take-up shaft 35A are inserted. The first connecting portion 71 is located between the take-up gear 35C and the take-up case 36 in the axial direction.

The second connecting portion 72 connects the other end of the ends of the supply unit 310 which are located apart from each other in the axial direction and the other end of ends of the take-up unit 350 which are located apart from each other in the axial direction. Specifically, the second connecting portion 72 connects the other end of the supply shaft 31A and the other end of the take-up shaft 35A. More specifically, the second connecting portion 72 has holes which are provided at both ends thereof apart from each other in the inter-axial direction, and through which the supply shaft 31A and the take-up shaft 35A are inserted. The supply case 32 and the take-up case 36 are located between the first connecting portion 71 and the second connecting portion 72 in the axial direction.

The handle 80 is a portion that allows a user's fingers to be hooked thereon. The handle 80 includes a first handle 81, and a second handle 82 located apart from the first handle 81 in the inter-axial direction.

The first handle 81 is made of plastic or the like, and so arranged, at the supply unit 310, as to extend in the axial direction. The first handle 81 is supported by the supply case 32 or the supply reel 31. In the present embodiment, the first handle 81 is supported by the supply case 32. The first handle 81 protrudes from an outer peripheral surface of the supply case 32 in a direction transverse to the rotation axis X1, specifically, in a direction perpendicular to the rotation axis X1. The first handle 81 includes a first base portion 81A as a grip portion extending in the axial direction, and two first legs 81B extending toward the supply reel 31 from both ends of the first base portion 81B located apart from each other in the axial direction. The two first legs 81B are connected to the supply case 32.

The second handle 82 is made of plastic or the like, and so arranged, at the take-up unit 350, as to extend in the axial direction. To be more specific, the second handle 82 is supported by the take-up case 36. The second handle 82 protrudes from an outer peripheral surface of the take-up case 36 in a direction transverse to the rotation axis X2, specifically, in a direction perpendicular to the rotation axis X2. The second handle 82 includes a second base portion 82A extending in the axial direction, and two second legs 82B extending toward the take-up reel 35 from both ends of the second base portion 82A which are located apart from each other in the axial direction. The two second legs 82B are connected to the take-up case 36.

The length of the first handle 81 in the axial direction is longer than the length of the second handle 82 in the axial direction. The second handle 82 is positioned within bounds, in the axial direction, defined by an extent of the first handle 81.

The shaft 43 is located at the take-up unit 350. The shaft 43 is shaped like a column having a circular cross section, extending along the axial direction (second axial direction). The shaft 43 is located apart from the take-up reel 35, specifically, from the take-up case 36. The dimension of the shaft 43 in the axial direction is greater than the width of the multilayer film F in the axial direction.

The support member 90 is a member that supports the shaft 43. The support member 90 includes a first side plate 91 and a second side plate 92. The first side plate 91 and the second side plate 92 are plate-shaped members extending from the rotation axis X2 of the take-up reel 35 radially outward, each shaped substantially like a fan, tapering toward a radially outer end. The first side plate 91 and the second side plate 92 have holes through which the take-up shaft 35A is inserted. The first side plate 91 and the second side plate 92 are rotatably connected to the take-up shaft 35A of the take-up reel 35. To be more specific, the first side plate 91 and the second side plate 92 are located at outer sides of the take-up case 36 facing outward in the axial direction, that is, in such a manner that the take-up case 36 is located between the first side plate 91 and the second side plate 92, and are connected to the take-up shaft 35A, The first side plate 91 supports one end of ends of the shaft 43 which are located apart from each other in the axial direction. The first side plate 91 is located between the take-up case 36 and the first connecting portion 71 in the axial direction. The first side plate 91 includes an outer surface 91A facing outward in the axial direction, and a protrusion 91B protruding from the outer surface 91A. The outer surface 91A is a surface that faces the first connecting portion 71.

The protrusion 91B is located between the take-up case 36 and the shaft 43, specifically, between the first connecting portion 71 and the shaft 43, in the radial direction of the take-up reel 35. The protrusion 91B is provided with a leaf spring SP. The leaf spring SP is located on a side of the protrusion 91B that is a side opposite to a side of the protrusion 91B on which the supply reel 31 is located.

The second side plate 92 supports the other end of the ends of the shaft 43 which are located apart from each other in the axial direction. The second side plate 92 is located between the take-up case 36 and the second connecting portion 72 in the axial direction. The second side plate 92 includes an outer surface 92A facing outward in the axial direction, and a protrusion 92B protruding from the outer surface 92A. The outer surface 92A is a surface that faces the second connecting portion. The protrusion 92B is provided with a leaf spring SP similar to the leaf spring SP provided at the protrusion of the first side plate 91 described above.

Figure 4:
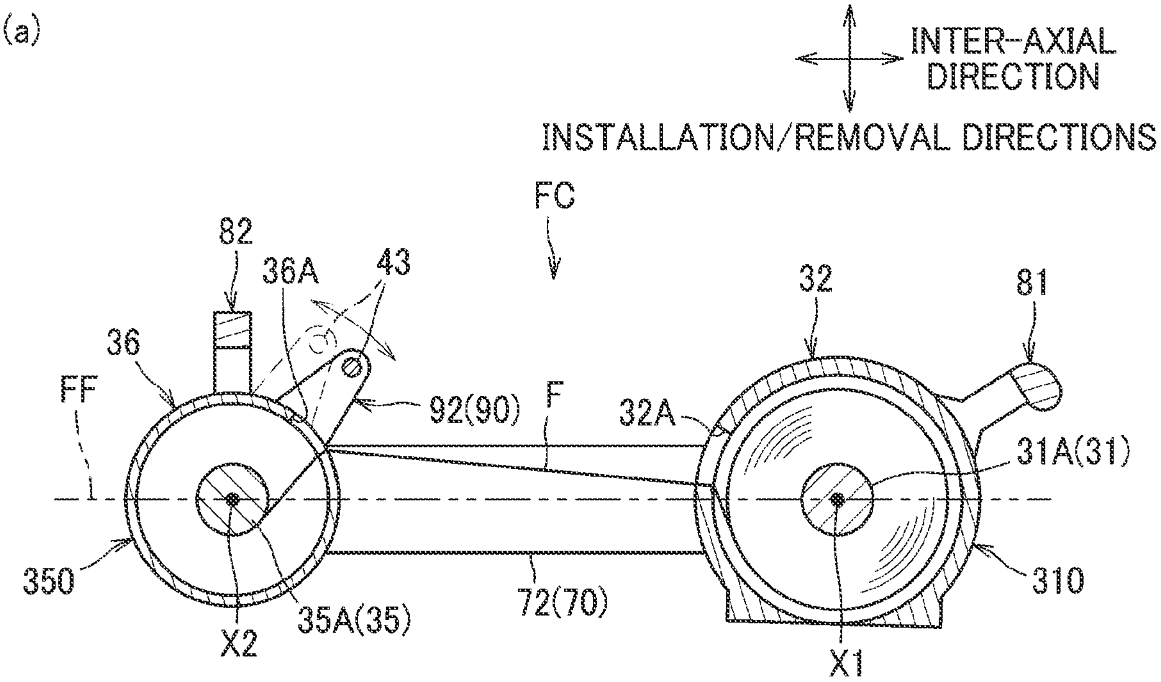
FIG. 4 includes: a section view (a) showing the layer transfer film cartridge; and a plan view (b) showing a relationship between a shaft and a multilayer film.
Figure 4:
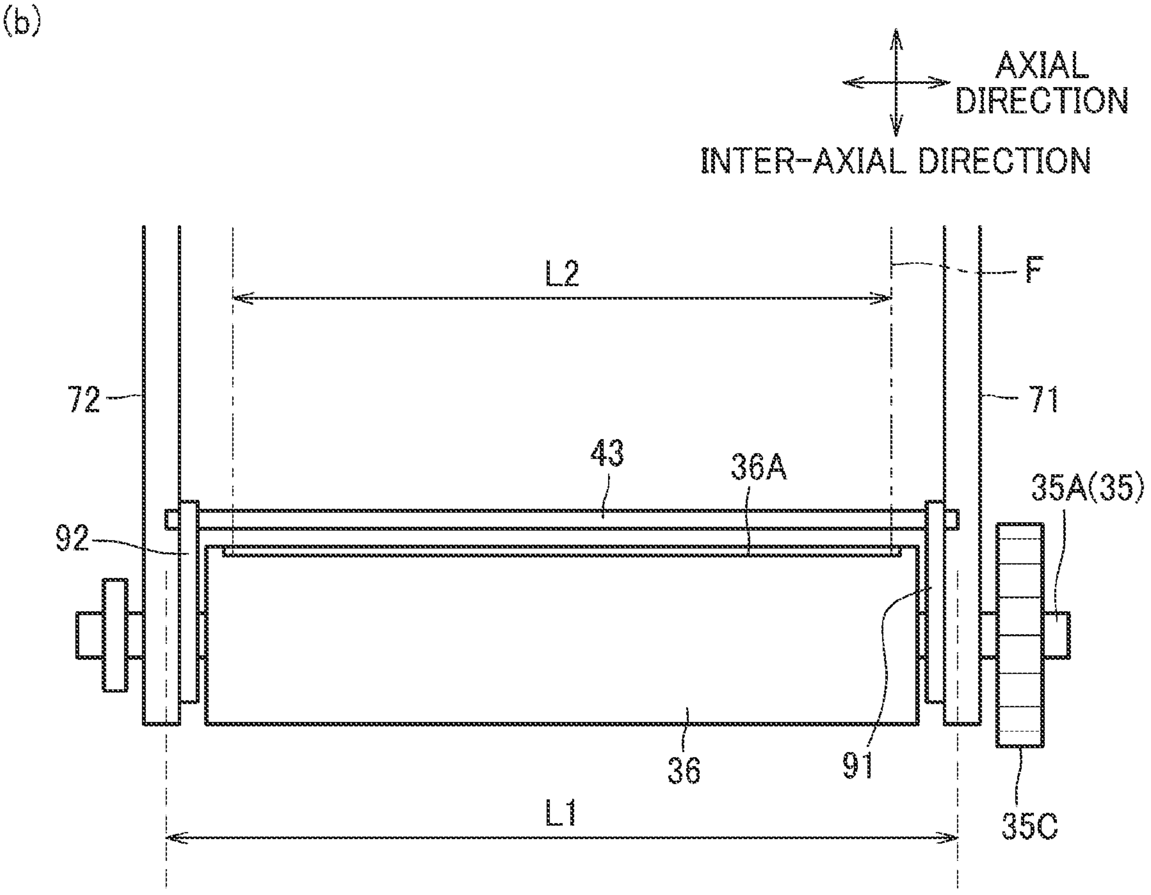

As shown in FIG. 4(*a*), the shaft 43 supported by the support member 90 is movable relative to the connecting portion 70. Specifically, the shaft 43 is movable relative to the connecting portion 70 in a direction substantially perpendicular to the axial direction. Herein, the direction substantially perpendicular to the axial direction refers to a direction of motion of the shaft 43 which forms an angle ranging from 80 to 100 degrees with the axial direction. More specifically, the shaft 43 is movable between a first position indicated by a broken line in the drawing and a second position (position indicated by a solid line) closer than the first position to the supply reel 31. It is to be understood that the take-up case 36 or the connecting portion 70 is provided with a restraining portion (not shown) which restricts the range of motion of the shaft 43 to a range from the first position to the second position.

The restraining portion may be located at the connecting portion 70. For example, the restraining portion may include a first restraining portion and a second restraining portion. In this example, when the shaft 43 moves from the first position to the second position, the support member 90 is brought into contact with the first restraining portion, and when the shaft 43 moves from the second position to the first position, the support member 90 is brought into contact with the second restraining portion.

Alternatively, the restraining portion may be of a single element. In this example, the support member 90 is biased by a torsion spring or the like toward a position in which the support member 90 is brought into contact with the restraining portion. With this configuration, when the shaft 43 moves from the second position to the first position, the support member 90 is brought into contact with the restraining portion. Further, when the housing cover 22 is closed and pressing members 22A which will be described later press the support member 90, the support member 90 moves against a mechanical force exerted by the torsion spring, and the shaft 43 moves from the first position to the second position.

As shown in FIG. 4(*b*), the shaft 43 has a dimension L1 in the axial direction, which is greater than a width L2 of the multilayer film F.

As shown in FIG. 3 and FIG. 4(*a*), the supply case 32 has a supply opening 32A through which the multilayer film F is allowed to pass. The supply opening 32A is an opening through which to draw out the multilayer film F wound on the supply reel 31 to the outside, and through which to guide the multilayer film F from inside to outside of the supply case 32. The take-up case 36 has a take-up opening 36A through which the multilayer film F is allowed to pass. The take-up opening 36A is an opening through which to guide the multilayer film F from outside to inside of the take-up case 36. The multilayer film F is supported on an edge of the supply opening 32A and an edge of the take-up opening 36A, and thus stretched between the supply reel 31 and the take-up reel 35, i.e., can be run therebetween under tension. The first handle 81 and the second handle 82 are located in positions shifted from, in a direction perpendicular to, an imaginary plane FF containing the rotation axis X1 of the supply reel 31 and the rotation axis X2 of the take-up reel 35, on a side of the multilayer film F stretched by the supply unit 310 (specifically, the supply case 32) and the take-up unit 350 (specifically, the take-up case 36) which side of the multilayer film F is an opposite side that is opposite to a side of the multilayer film F on which the imaginary plane FF is located.

The first handle 81 provided at the supply unit 310 is located in a position shifted from, in a direction perpendicular to, the imaginary plane FF, on the same side as a side of the imaginary plane FF on which the supply opening 32A is located. The second handle 82 provided at the take-up unit 350 is located in a position shifted from, in a direction perpendicular to, the imaginary plane FF, on the same side as a side of the imaginary plane FF on which the take-up opening 36A is located. The second handle 82 is located farther, than the take-up opening 36A, apart from the imaginary plane FF.

The second handle 82 provided at the take-up unit 350 is located in a position shifted from, in a direction perpendicular to, the imaginary plane FF, on the same side as a side of the imaginary plane FF on which the shaft 43 is located.

The layer transfer film cartridge FC is installable into and removable from the housing main body 21 in directions perpendicular to the imaginary plane FF. In the following description, the directions perpendicular to the imaginary plane FF will be referred to as "installation/removal directions".

Figure 5:
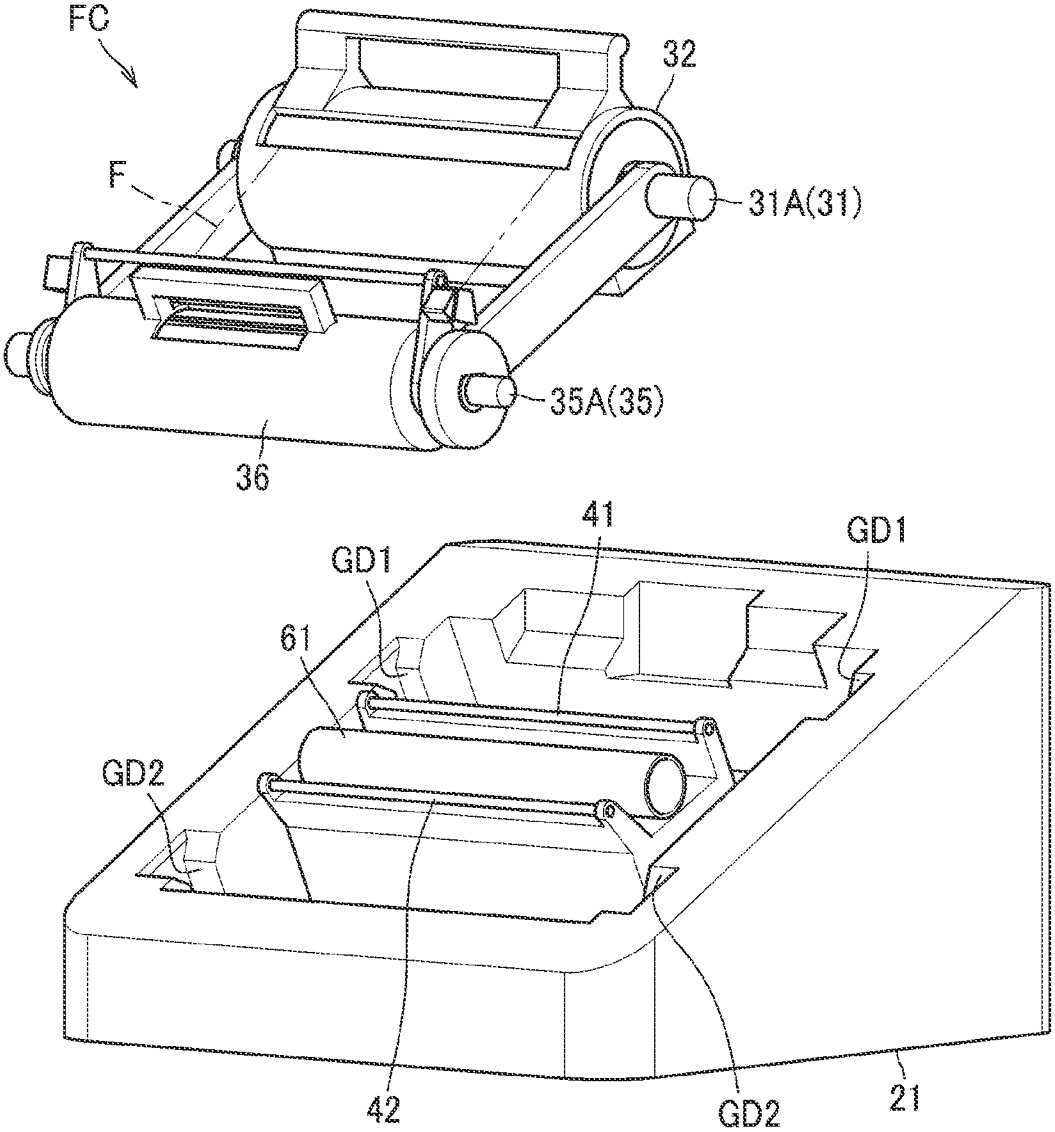
FIG. 5 is a perspective view showing the layer transfer film cartridge and a housing main body.

As shown in FIG. 5, the housing main body 21 includes a first guide GD1 and a second guide GD2. The first guide GD1 is a groove along which to guide the supply shaft 31A of the supply reel 31 when the layer transfer film cartridge FC is installed into or removed from the housing main body 21. The first guide GD1 extends in the installation/removal directions (see FIG. 2), and guides the supply shaft 31A in the installation/removal directions. The first guide GD1 is provided at one end and the other end respectively of the housing main body 21 which are located apart from each other in the axial direction.

The second guide GD2 is a groove along which to guide the take-up shaft 35A of the take-up reel 35 when the layer transfer film cartridge FC is installed into or removed from the housing main body 21. The second guide GD2 extends in the installation/removal directions (see FIG. 2), and guides the take-up shaft 35A in the installation/removal directions. The second guide GD2 is provided at one end and the other end respectively of the housing main body 21 which are located apart from each other in the axial direction.

Figure 6:
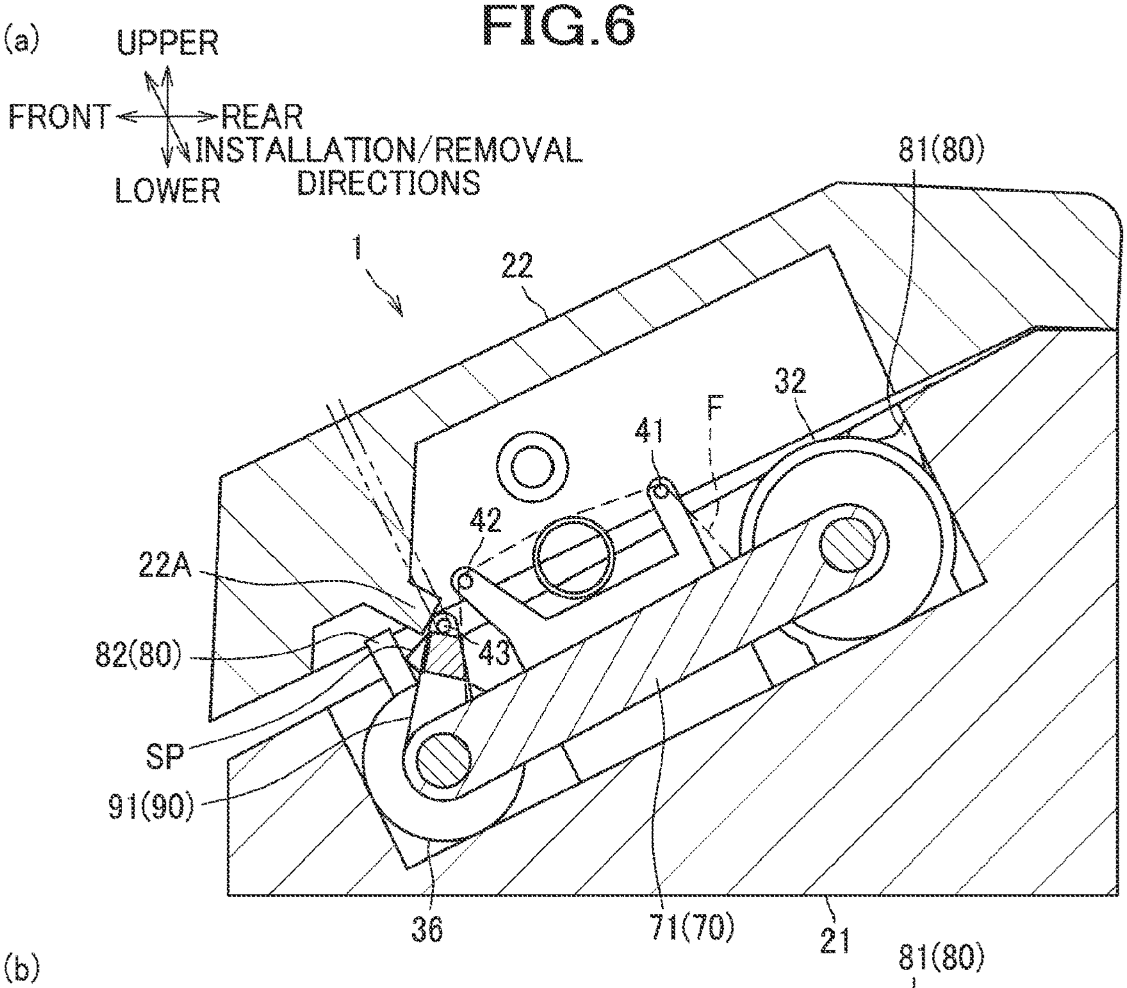
FIG. 6 includes section views (a), (b) showing a motion of the shaft moving from a first position to a second position in synchronization with a closing motion of the housing cover.
Figure 6:
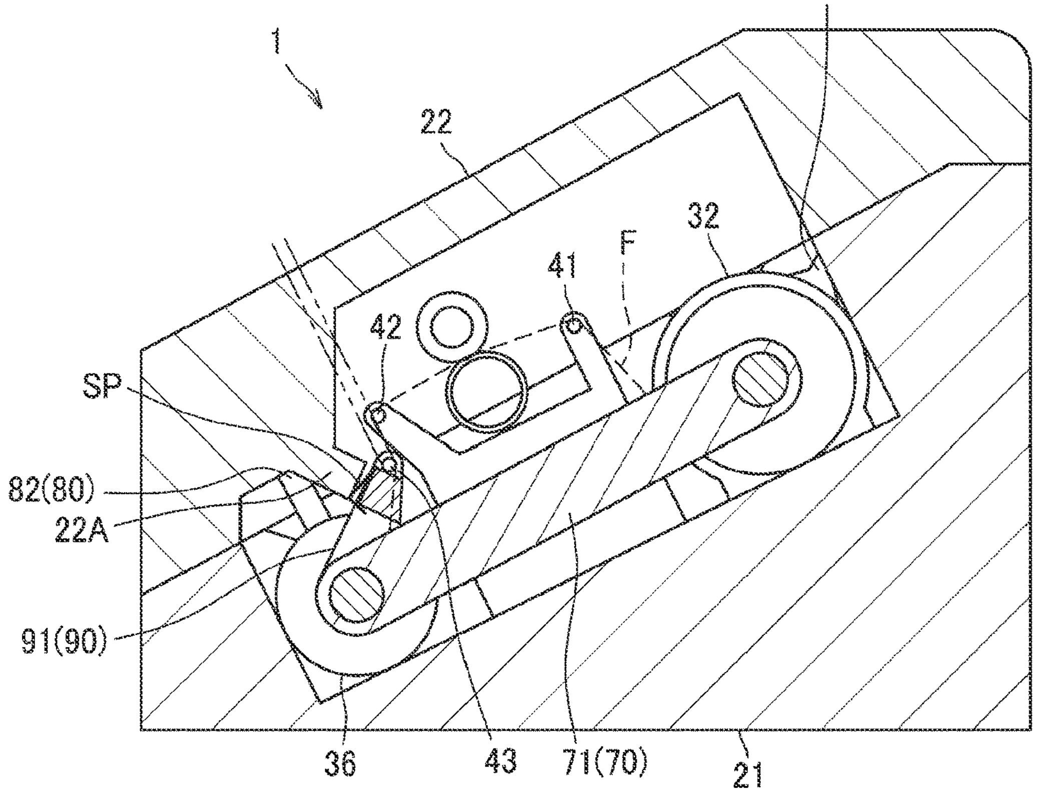

As shown in FIG. 6, the housing cover 22 includes a pressing member 22A that presses the shaft 43 from a first position shown in FIG. 6(*a*) toward a second position shown in FIG. 6(*b*). The pressing member 22A is fixed to the housing cover 22, and configured to press the shaft 43 from the first position toward the second position when the housing cover 22 is closed. The pressing member 22 may be the housing cover 22 itself, or may for example be a protrusion that is a protrusively-formed part of the housing cover 22.

The shaft 43 in the first position is so located as not to overlap, if projected in the installation/removal directions toward, the second guide shaft 42. Accordingly, when the shaft 43 is located in the first position, the layer transfer film cartridge FC can be installed and removed without hindrance of the second guide shaft 42 which would otherwise get in the way of the shaft 43.

The shaft 43 in the second position is so located as to overlap, if projected in the installation/removal directions toward, the second guide shaft 42. Accordingly, the peel-off angle of the multilayer film F at the second guide shaft 42 can be adjusted properly.

Pressing members 22A are located at one end and the other end of the shaft 43 which are located apart from each other in the axial direction. The pressing member 22A at the one end is so located as to be contactable with the leaf spring SP provided at the first side plate 91 when the layer transfer film cartridge FC is installed in the housing main body 21. Also, the pressing member 22A at the other end (not shown in the drawing) is so located as to be contactable with the leaf spring SP provided at the second side plate 92 when the layer transfer film cartridge FC is installed in the housing main body 21. Accordingly, the pressing members 22A are rendered capable of pressing the shaft 43 via the leaf springs SP and the support member 90.

Next, a description will be given of the operation and advantageous effects of the layer transfer device 1 according to the present embodiment.

As shown in FIG. 3, when the layer transfer film cartridge FC is carried by a user, the user holds the first handle 81 by one hand and holds the second handle 82 by the other hand, so that the layer transfer film cartridge FC can be held while being kept in good balance. In this operation, as the first handle 81 and the second handle 82 are located on a side of the multilayer film F stretched between the supply reel 31 and the take-up reel 35 which is an opposite side opposite to a side of the multilayer film F on which the imaginary plane FF is located, the user can hold the first handle 81 and the second handle 82 without touching the multilayer film F.

When a user holds the handle 80 and installs the layer transfer film cartridge FC from above along the first guide GD1 and the second guide GD2 into the housing main body 21 as shown in FIG. 2 and FIG. 5, the multilayer film F stretched between the supply case 32 and the take-up case 36 comes in contact with the first guide shaft 41 and the second guide shaft 42 of the housing main body 21. Thereafter, when the layer transfer film cartridge FC is further moved toward the installation position, the multilayer film F is stretched between adjacent members of the supply case 32, the first guide shaft 41, the second guide shaft 42, and the take-up case 36, and is drawn out from the supply case 32, as shown in FIG. 6(*a*).

When the housing cover 22 is being closed after the layer transfer film cartridge FC is installed in the housing main body 21, the pressing members 22A come in contact with the leaf springs SP. Thereafter, as the user is further closing the housing cover 22, the pressing members 22A press the leaf springs SP and the support member 90, causing the shaft 43 to move from the first position toward the second position.

The shaft 43, before reaching the second position, comes in contact with the multilayer film F stretched between the second guide shaft 42 and the take-up case 36. Thereafter, as the user is further closing the housing cover 22, the shaft presses the multilayer film stretched between the second guide shaft 42 and the take-up case 36 toward the supply case 32, and then reaches the second position.

When the shaft 43 reaches the second position, the support member 90 is restrained from rotating by the restraining portion (not shown); accordingly, as the user is further closing the housing cover 22, the leaf springs 22 are compressed between the pressing members 22A and the support member 90.

Consequently, when the housing cover 22 has been closed completely as shown in FIG. 6(*b*), the biasing force of the leaf springs SP can be transmitted via the support member 90 and the shaft 43 to the multilayer film F, so that the multilayer film F can be held under an appropriate tension.

To remove the layer transfer film cartridge FC from the housing main body 21, a user opens the housing cover 22, and then turns the support member 90 by hand, to move the shaft 43 from the second position to the first position. Subsequently, the user holds the first handle 81 and the second handle 82, and draws out the layer transfer film cartridge FC along the first guide GD1 and the second guide GD2 along the installation/removal directions; thus, the layer transfer film cartridge FC can be removed easily from the housing main body 21.

In the present embodiment, the shaft 43 is caused to rotate from the second position to the first position by manually rotating the support member 90; however, a spring that biases the shaft 43 from the second position toward the first position may be provided between the support member 90 and the connecting portion 70, or between the support member 90 and the take-up case 36.

In the present embodiment, with the configurations described above, the following advantageous effects can be achieved.

Since a user can hold the handle 80 with his/her fingers hooked thereon, the user can carry out the operations for installation and removal of the layer transfer film cartridge FC easily even if the layer transfer film cartridge FC is heavy in weight. Moreover, since the handle 80 is located on an opposite side of the multilayer film F stretched between the supply reel 31 and the take-up reel 35, which is opposite to a side of the multilayer film F on which the imaginary plane FF is located, the user can be restrained from touching the multilayer film F.

Since the layer transfer film cartridge FC includes the first handle 81 and the second handle 82 located apart from the first handle 81, a relatively heavy layer transfer film cartridge FC can be carried by a user with improved stability.

Since the shaft 43 is movable relative to the connecting portion 70, the shaft 43 can be restrained from getting hindered by the second guide shaft 42 upon installation/removal of the layer transfer film cartridge FC. Accordingly, the flexibility in design can be increased.

Since the shaft 43 can be caused to move from the first position to the second position by the pressing members 22A, the layer transfer with a wrong peel-off angle as would be formed by the shaft 43 left at the first position can be restrained.

Since the shaft 43 can be caused to move to the second position by the operation of closing the housing cover 22, the layer transfer with a wrong peel-off angle as would be formed by the shaft left at the first position can be restrained more effectively.

Since the pressing members 22A are located at one end and the other end of the shaft 43, the shaft 43 can be pressed while being kept in good balance.

The above-described embodiment may be modified and implemented in various forms as will be described below by way of example. In the following description, elements having substantially the same structural features as those of the above-described embodiment will be designated by the same reference characters, and a description thereof will be omitted.

Figure 7:
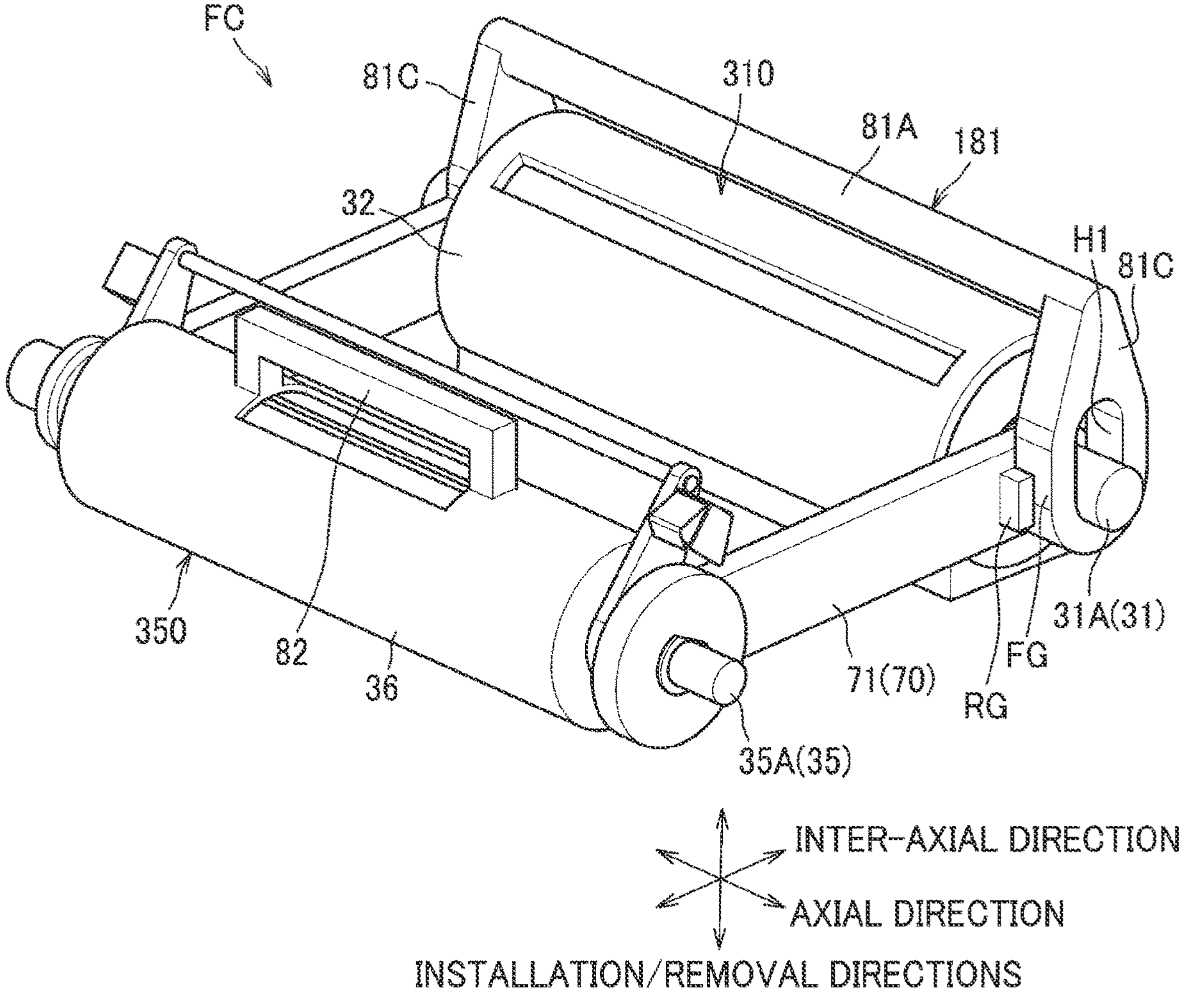
FIG. 7 is a perspective view showing a layer transfer film cartridge according to a first modified example.

In the above-described embodiment, the two first legs 81B of the first handle 81 are connected to the supply case 32; however, for example, as shown in FIG. 7, two first legs 81C may be connected to the supply shaft 31A. In other words, the one end of the ends of the first handle 81 which are located apart from each other in the axial direction may be supported at one end of ends of the supply reel 31 which are located apart from each other in the axial direction, and the other end of the first handle 81 may be supported at the other end of the ends of the supply reel 31 which are located apart from each other in the axial direction. In this example, the first handle 181 (specifically, the first base portion 81A) may be configured to be movable toward and away from the supply reel 31.

To be more specific, in the configuration shown in FIG. 7, each first leg 81C has an elongate hole H1 extending along the installation/removal directions described above, and a to-be-guided surface FG extending the installation/removal directions. On the other hand, the connecting portion 70 includes a guide rib RG that extends along the installation/removal directions to guide the to-be-guided surface FG in the installation/removal directions.

Figure 8:
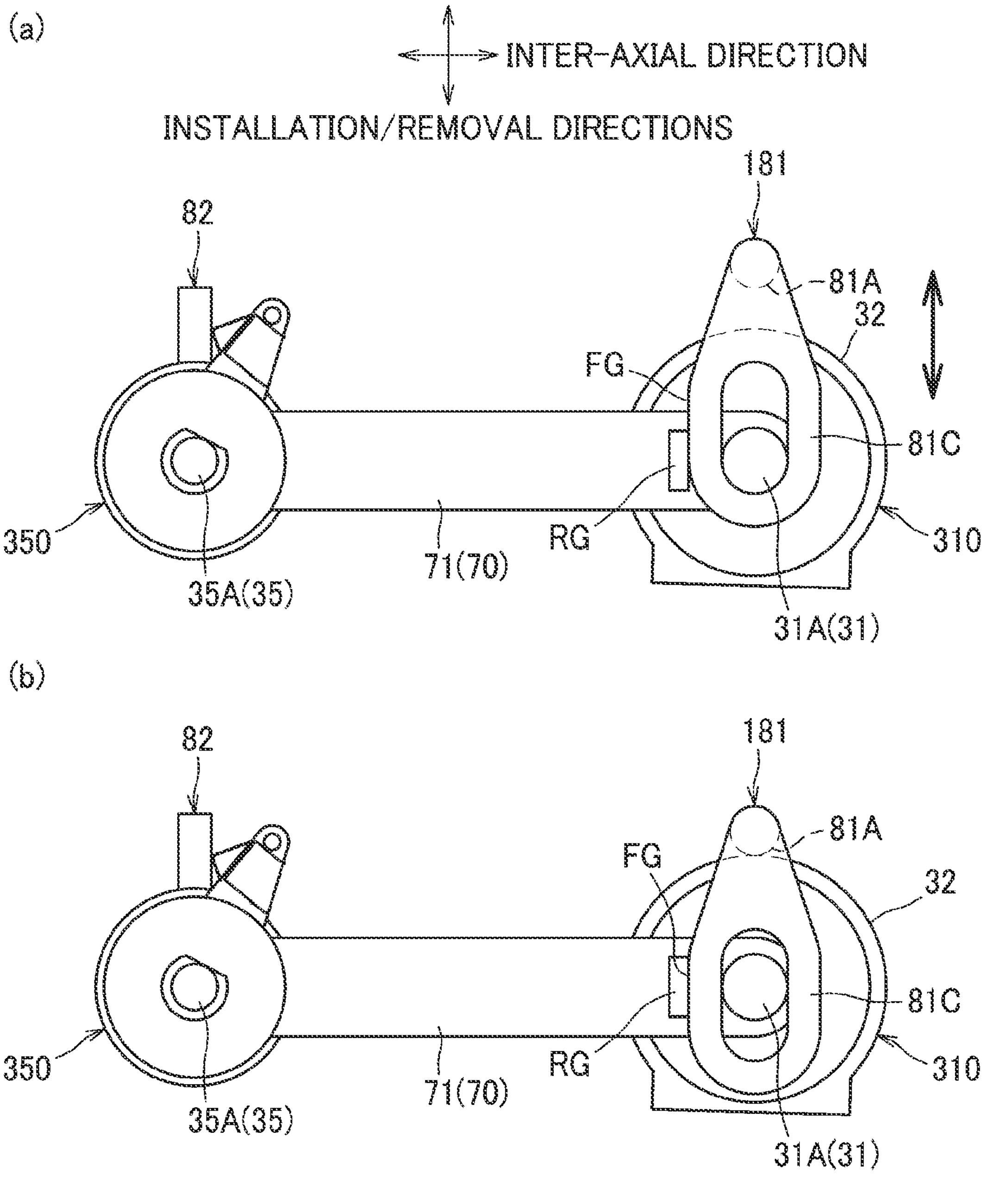
FIG. 8 includes section views (a), (b) showing the layer transfer film cartridge according to the first modified example.

Accordingly, the first base portion 81A of the first handle 181 is rendered movable between a third position shown in FIG. 8(*a*) and a fourth position shown in FIG. 8(*b*) that is closer than the third position to the supply case 32. The first base portion 81A in the third position is located apart from the supply case 32. The first base portion 81A in the fourth position is in contact with the supply case 32.

With this configuration, the first base portion 81A of the first handle 181 can be moved away from the supply case 32, so that the first base portion 81A can be made easy to hook with user's fingers. Moreover, the first base portion 81A can be located proximate to the supply case 32, so that the first handle 181 can be restrained from interfering with other members inside the housing 2. For example, the first base portion 81 located proximate to the supply case 32 is located farther away from the conveyance path of a sheet S, and thus can be restrained from interfering with a sheet S being conveyed.

It is to be understood that the second handle may be configured as a member similar to the first handle 181 shown in FIG. 8. That is, the second handle may be connected to the take-up reel, and configured to be movable closer to and away from the take-up reel.

Figure 9:
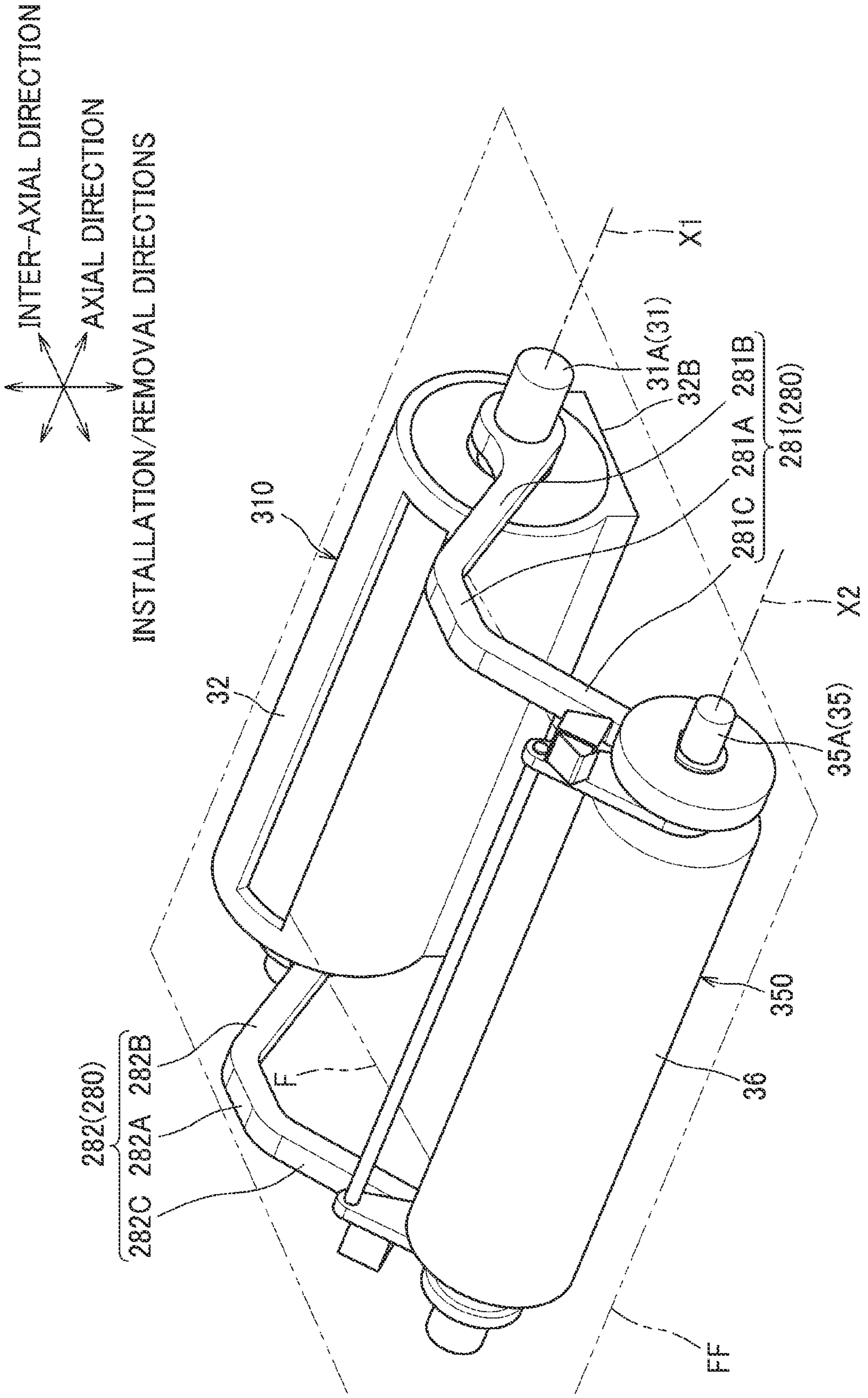
FIG. 9 a perspective view showing a layer transfer film cartridge according to a second modified example.

In the above-described embodiment, the handle 80 is provided at the supply case 32 and the take-up case 36; however, as shown in FIG. 9, a portion connecting the supply unit 310 and the take-up unit 350 may be configured as a handle 280.

To elaborate, in this configuration, the handle 280 includes a first handle 281 and a second handle 282 located apart from the first handle 281 in the axial direction. The first handle 281 connects one end of ends of the supply unit 310 which are located apart from each other in the axial direction and one end of ends of the take-up unit 350 which are located apart from each other in the axial direction. The second handle 282 connects the other end of the ends of the supply unit 310 which are located apart from each other in the axial direction and the other end of the ends of the take-up unit 350 which are located apart from each other in the axial direction. To be more specific, the first handle 281 is supported by one end of ends of the supply reel 31 which are located apart from each other in the axial direction and one end of ends of the take-up reel 35 which are located apart from each other in the axial direction. The second handle 282 is supported by the other end of the ends of the supply reel 31 which are located apart from each other in the axial direction and the other end of the ends of the take-up reel 35 which are located apart from each other in the axial direction.

The first handle 281 includes a first base portion 281A, a first supply-side leg 281B, and a first take-up-side leg 281C. The first base portion 281A extends in the inter-axial direction. The supply reel 31 is located between a flat surface 32B of the supply case 32 and the first base portion 281A in a direction perpendicular to the axial direction and to the inter-axial direction.

The first supply-side leg 281B extends from one end of ends of the first base portion 281A which are located apart from each other in the inter-axial direction, toward the supply shaft 31A of the supply reel 31. The first supply-side leg 281B is connected to one end of the supply shaft 31A.

The first take-up-side leg 281C extends from the other end of the ends of the first base portion 281A which are located apart from each other in the inter-axial direction, toward the take-up shaft 35A of the take-up reel 35. The first take-up-side leg 281C is connected to one end of the take-up shaft 35A.

The second handle 282 includes a second base portion 282A, a second supply-side leg 282B, and a second take-up-side leg 282C. The second base portion 282A extends in the inter-axial direction.

The second supply-side leg 282B extends from one end of ends of the second base portion 282A which are located apart from each other in the inter-axial direction, toward the supply shaft 31A of the supply reel 31. The second supply-side leg 282B is connected to the other end of the supply shaft 31A.

The second take-up-side leg 282C extends from the other end of the ends of the second base portion 282A which are located apart from each other in the inter-axial direction, toward the take-up shaft 35A of the take-up reel 35. The second take-up-side leg 282C is connected to the other end of the take-up shaft 35A.

Each base portion 281A, 282A, part of each supply-side leg 281B, 282B, and part of each take-up-side leg 281C, 282C are located on an opposite side of the multilayer film F stretched between the supply reel 31 and the take-up reel 35, which is opposite to a side of the multilayer film F on which the imaginary plane FF is located. To be more specific, in this embodiment, part of the handle 280 is located on an opposite side of the multilayer film F stretched between the supply unit 310 and the take-up unit 350, which is opposite to a side of the multilayer film F on which the imaginary plane FF is located, while the other part of the handle 280 is located on a side of the multilayer film F stretched between the supply reel 31 and the take-up reel 35 which is the same side as the side of the multilayer film F on which the imaginary plane FF is located.

With this configuration, the first handle 281 and the second handle 282 are located apart from each other in the axial direction with the multilayer film F located therebetween, so that the handle 280 can be restrained from getting in the way of the multilayer film F and a sheet S.

Figure 10:
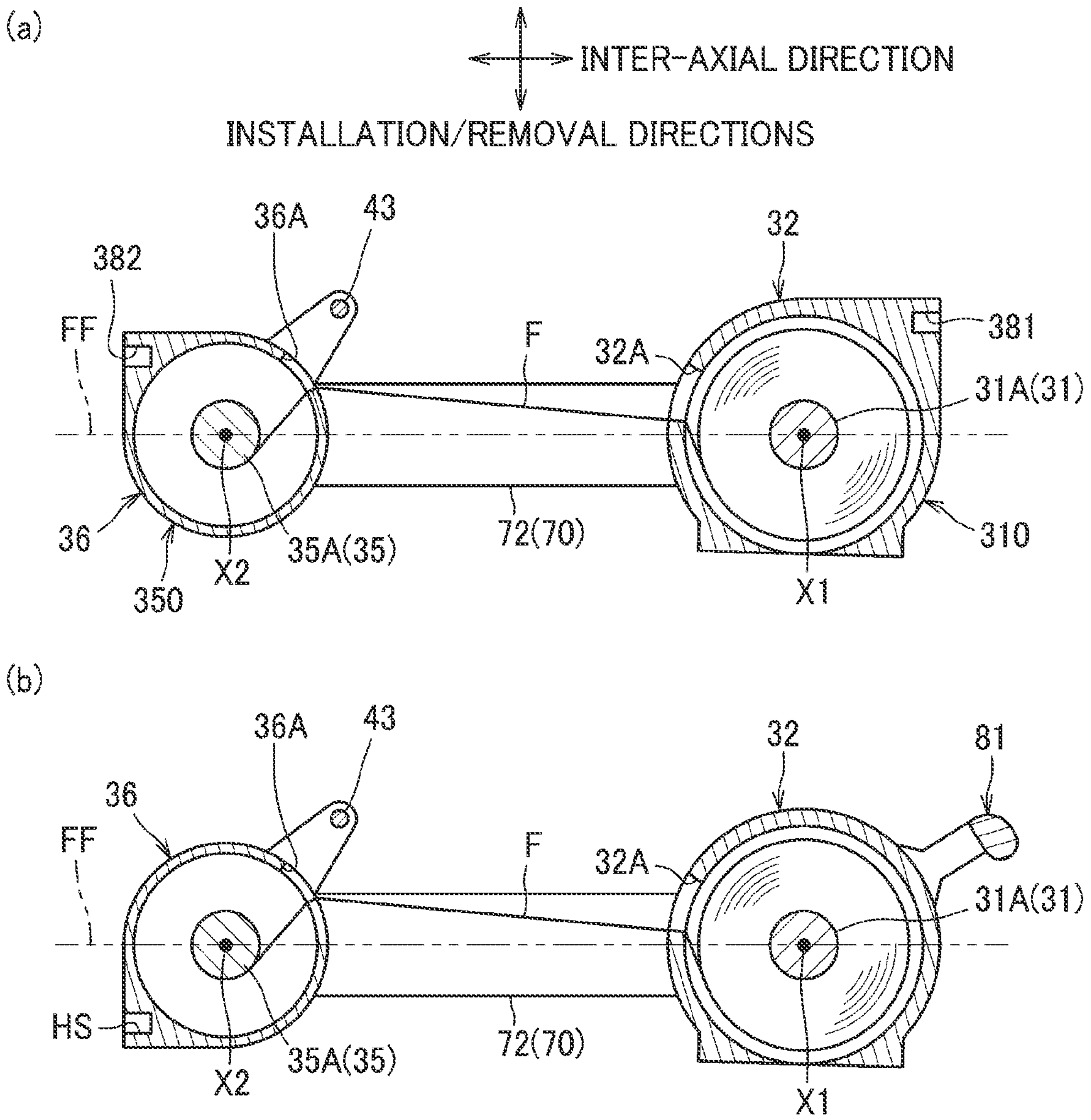
FIG. 10 includes: a section view (a) showing a layer transfer film cartridge according to a third modified example; and a section view (b) showing a layer transfer film cartridge according to a fourth modified example.

In the above-described embodiment, as an example of a portion allowing user's fingers to be hooked thereon, the first handle 81 and the second handle 82 protruding respectively from the outer surfaces of the supply case 32 and the take-up case 36 are illustrated; however, for example, as shown in FIG. 10(*a*), a slot-shaped first grip 381 extending in the axial direction and formed in the supply case 32 and a slot-shaped second grip 382 extending in the axial direction and formed in the take-up case 36 may be used as a portion that allows user's fingers to be hooked thereon. Specifically, the first grip 381 opens to a side of the supply case 32 facing outward in the inter-axial direction which is a side opposite to a side on which the take-up unit 350 is located. The second grip 382 opens to a side of the take-up case 36 facing outward in the inter-axial direction which is a side opposite to a side on which the supply unit 310 is located.

Both of the slot-shaped grip and the protruding handle may be provided for use in combination. For example, as shown in FIG. 10(*b*), the first handle 81 as in the above-described embodiment may be provided at the supply case 32, and a slot-shaped grip HS may be provided at the take-up case 36. The grip HS may be located, as illustrated in this drawing, on a side of the multilayer film F stretched between the supply reel 31 and the take-up reel 35, which is the same side as a side of the multilayer film F on which the imaginary plane FF is located.

Figure 11:
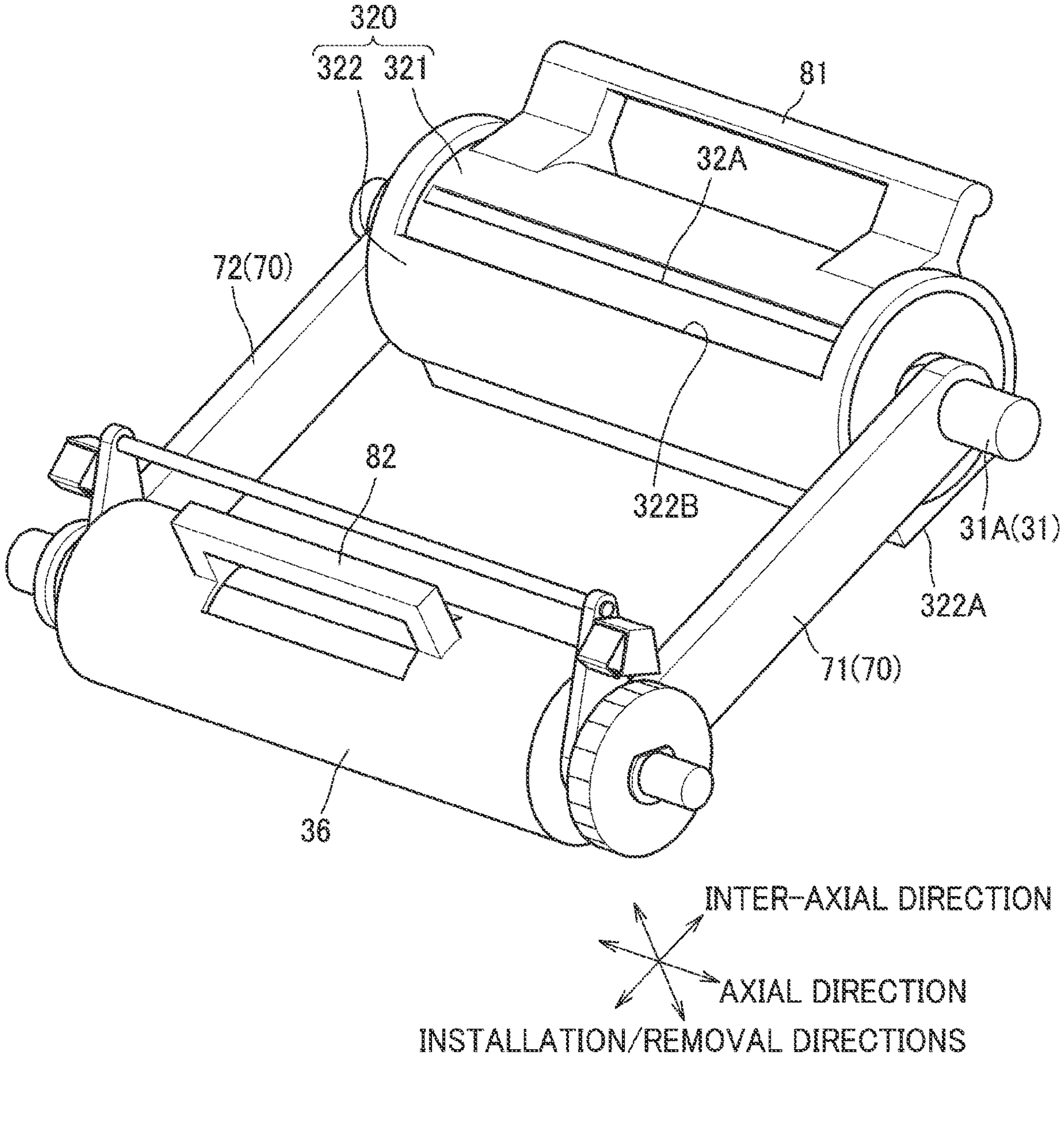
FIG. 11 is a perspective view showing a layer transfer film cartridge according to a fifth modified example.

Although the supply case 32 and the take-up case 36 in the above-described embodiment are fixed to the connecting portion 70, the supply case and the take-up case may be rotatable relative to the connecting portion. Specifically, the layer transfer film cartridge may be configured to have a structure for example as shown in FIG. 11.

In this configuration, a supply case 320 includes an inner case 321 with the first handle 81 formed thereon and an outer case 322 by which the inner case 321 is covered and rotatably supported. The inner case 321 is a case that houses the supply reel 31, and formed substantially in the shape of a hollow circular cylinder. By the inner case 321, the supply shaft 31A of the supply reel 31 is rotatably supported. The connecting portion 70 is attached to the supply shaft 31A of the supply reel 31 in a manner that renders the supply shaft 31A rotatable. Accordingly, in this configuration, the supply reel 31, the inner case 321, and the outer case 322 are rotatable independently relative to the connecting portion 70.

The inner case 321 has a supply opening 32A. The outer case 322 is a case substantially in the shape of a tube that is circular in cross section. Both ends of the inner case 321 facing outward in the axial direction are exposed to the outside of the outer case 322 thorough the open ends thereof.

The outer case 322 has a flat surface 322A provided in a part of its outer peripheral surface. When the layer transfer film cartridge FC is installed in the housing main body 21, the flat surface 322A is in contact with a flat portion of the housing main body 21. Accordingly, when the layer transfer film cartridge FC is installed in the housing main body 21, the outer case 322 is prevented from rotating relative to the housing main body 21.

The outer case 322 has an opening 322B through which to expose the first handle 81 of the inner case 321 and the supply opening 32A to the outside. The inner case 321 is rotatable relative to the outer case 322 between an open position in which the supply opening 32A is exposed to the outside through the opening 322B and a close position in which the supply opening 32A is covered with the outer case 322.

When the inner case 321 is in the open position, the first handle 81 forms a first angle approximate to 0 degrees (e.g., the angle shown in FIG. 4) with the flat surface 322A. When the inner case 321 is in the close position, the first handle 81 forms a second angle greater than the first angle, specifically an angle approximate to 90 degrees, with the flat surface 322A.

Accordingly, to install the layer transfer film cartridge FC into the housing main body 21, the inner case 321 (first handle 81) may be located in the close position so that the first handle 81 can be oriented to protrude on an upstream side in the installation direction; therefore, the operation of installation of the layer transfer film cartridge FC can be carried out with ease. Furthermore, after installation of the layer transfer film cartridge FC into the housing main body 21, the first handle 81 may be turned to the open position so that the first handle can be retreated from the conveyance path of a sheet S (e.g., see FIG. 1); therefore, the first handle 81 can be restrained from getting in the way of a sheet S.

Moreover, in this configuration, by the take-up case 36, the supply shaft 31A of the supply reel 31 is rotatably supported. The connecting portion 70 is attached to the supply shaft 31A of the supply reel 31 in a manner that permits the supply shaft 31A of the supply reel 31 to rotate. In short, in this configuration, the take-up case 36 is rotatable relative to the connecting portion 70.

Although the supply shaft 31A of the supply reel 31, in the above-described embodiment, is rotatably supported by the connecting portion 70, the supply shaft may be configured to be not rotatable relative to and fixed to the connecting portion. In this alternative, the supply reel may be configured to comprise the supply shaft and a circular cylinder through which the supply shaft is disposed and which is rotatably supported by the supply shaft. In this configuration, one end of the multilayer film may be fixed to this circular cylinder. Similarly, in the take-up reel, a take-up shaft may be configured to be not rotatable relative to and fixed to the connecting portion, and the take-up reel may include a circular cylinder through which the take-up shaft is disposed.

The above-described embodiment is configured such that the pressing member 22A causes the shaft 43 to move in synchronization with the closing motion of the housing cover 22; however, the pressing member may, for example, be movably supported by the housing main body, and the pressing member may be caused to move by a motor being activated, thereby causing the shaft to move.

The first handle may not be supported directly on the supply case or the supply reel, and may be supported via any other member(s) by the supply case or the supply reel. The first handle may be configured to extend in a direction perpendicular to the first axial direction and supported by the supply case.

The second handle may not be supported directly on the take-up case, and may be supported via any other member(s) by the take-up case. The second handle may be configured to extend in a direction perpendicular to the second axial direction and supported by the take-up case.

In the above-described embodiment, the handle or the grip are provided at the take-up case, but the handle or the grip may be provided at least at either of the supply case or the supply reel.

In the above-described embodiment, the support member 90 is provided with the leaf springs SP; however, the leaf spring may not be provided. In this alternative, the support member 90 may be directly pressed by the pressing member 22A shown in FIG. 6. As another alternative, a leaf spring may be provided at an end of the pressing member 22A.

In the above-described embodiment, the connecting portion 70 is configured to comprise two connecting portions, i.e., first connecting portion 71 and second connecting portion 72; alternatively, only one connecting portion may be provided, or no connecting portion may be provided. It is essential only that the connecting portion connects the supply unit and the take-up unit, and thus may connect the supply case and the take-up case, for example.

A detailed description will be given of a second embodiment with reference made mainly to FIGS. 12 to 17. In the following description, elements having substantially the same structural features as those of the first embodiment will be designated by the same reference characters, and a description thereof will be omitted.

Figure 12:
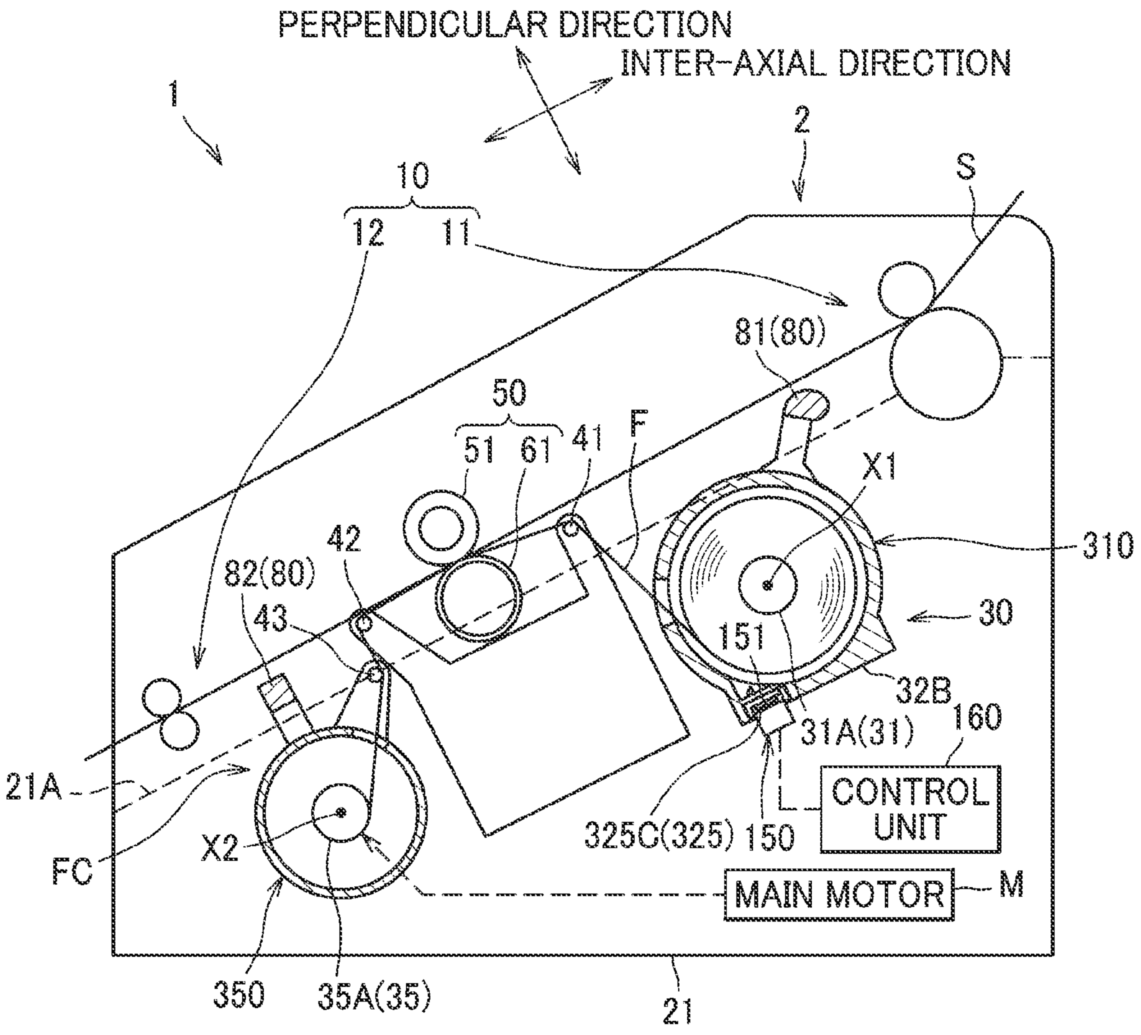
FIG. 12 is a diagram showing a layer transfer device according to a second embodiment.

As shown in FIG. 12, a layer transfer device 1 includes a housing 2, a sheet conveyor unit 10, a film supply unit 30, a transfer unit 50, and a control unit 160. The film supply unit 30 includes a layer transfer film cartridge FC, a first guide shaft 41, a second guide shaft 42, and a main motor M as a driving source.

Figure 13:
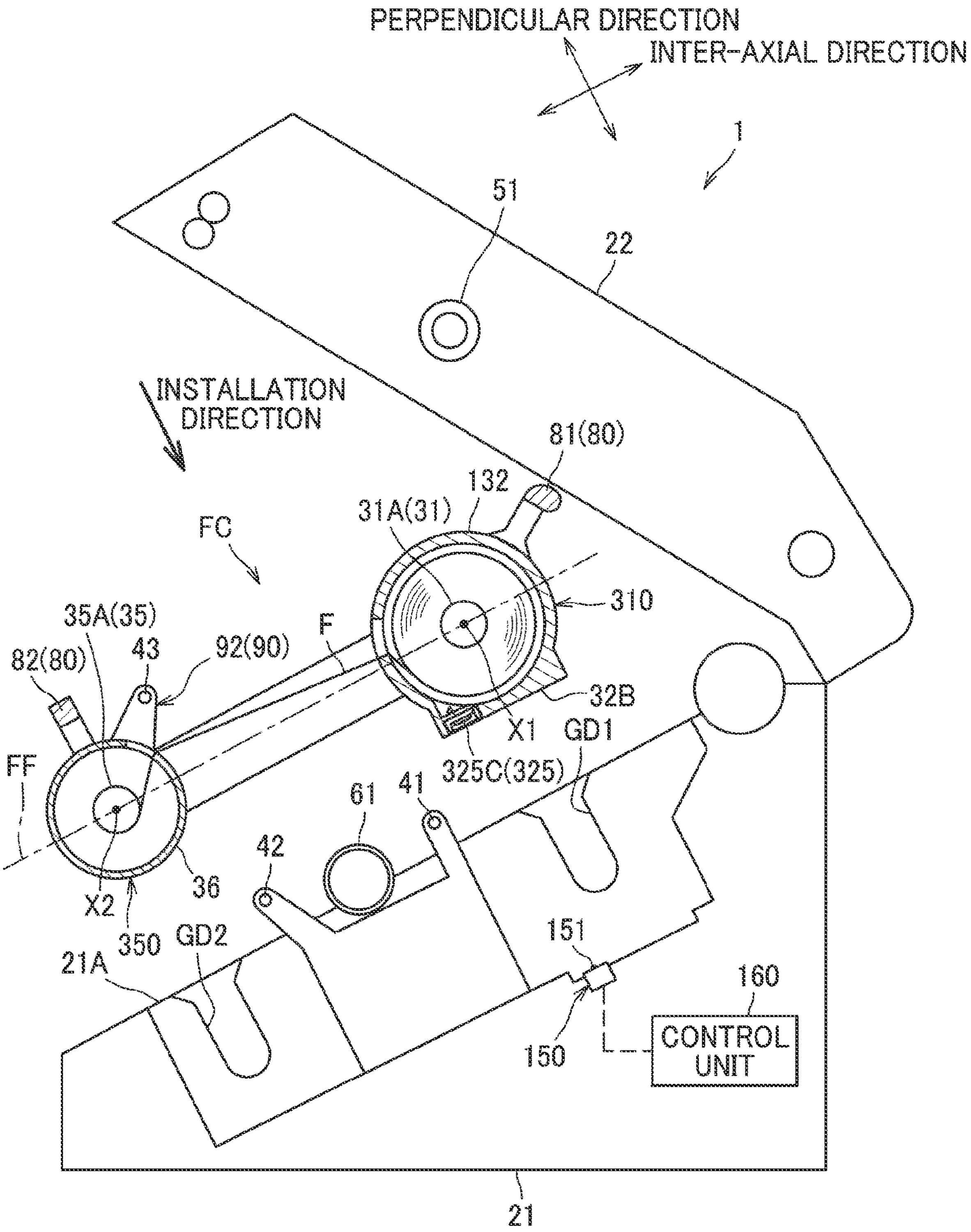
FIG. 13 shows diagram showing a state of the layer transfer device with a housing cover opened and a layer transfer film cartridge taken out therefrom

The layer transfer film cartridge FC is configured, as shown in FIG. 13, to be installable into and removable from the housing main body 21 through a housing opening 21A. The layer transfer film cartridge FC is a cartridge that supports a multilayer film F consisting of a plurality of layers as shown in FIG. 1(*b*). The layer transfer film cartridge FC mainly includes a supply unit 310, a take-up unit 350, a shaft 43, and a memory 325. The supply unit 310 includes a supply reel 31. The take-up unit 350 includes a take-up reel 35. The multilayer film F is wound on the supply reel 31.

The memory 325 is a medium that stores information, and is an IC chip, for example. The memory 325 has a contact surface 325C. The contact surface 325C faces in a direction of installation of the layer transfer film cartridge FC. In this embodiment, this direction of installation is a perpendicular direction, by way of example. It is to be understood that directions of installation and removal may be directions inclined to some degree (e.g., an angle within a range of ±20 degrees) with respect to a direction perpendicular to the axial direction and to the inter-axial direction.

The contact surface 325C is parallel to a flat surface 32B provided in part of an outer peripheral surface of the supply case 132. The contact surface 325C is also parallel to an imaginary plane FF containing the rotation axis X1 of the supply reel 31 and the rotation axis X2 of the take-up reel 35.

The memory 325 is capable of storing specification information and use history information of a multilayer film F. The specification information of the multilayer film F includes the type of the multilayer film F, the width of the multilayer film F, the length of a brand-new multilayer film F, etc. The use history information of the multilayer film F includes the length of the multilayer film F used, the remaining amount of the multilayer film F, i.e., the length of the unused multilayer film F, the time elapsed from the first use of the layer transfer film cartridge FC, etc. It is to be understood that the length of the multilayer film F used may be computed from the amount of rotation of the shaft or the take-up gear.

The control unit 160 includes a CPU, a ROM, a RAM, a non-volatile memory, etc., and is configured to perform a variety of control processes based on programs prepared in advance. In the ROM, RAM, non-volatile memory, etc., for example, use information of the multilayer film F and use history information of the multilayer film F are stored as data necessary for layer transfer control.

Figure 14:
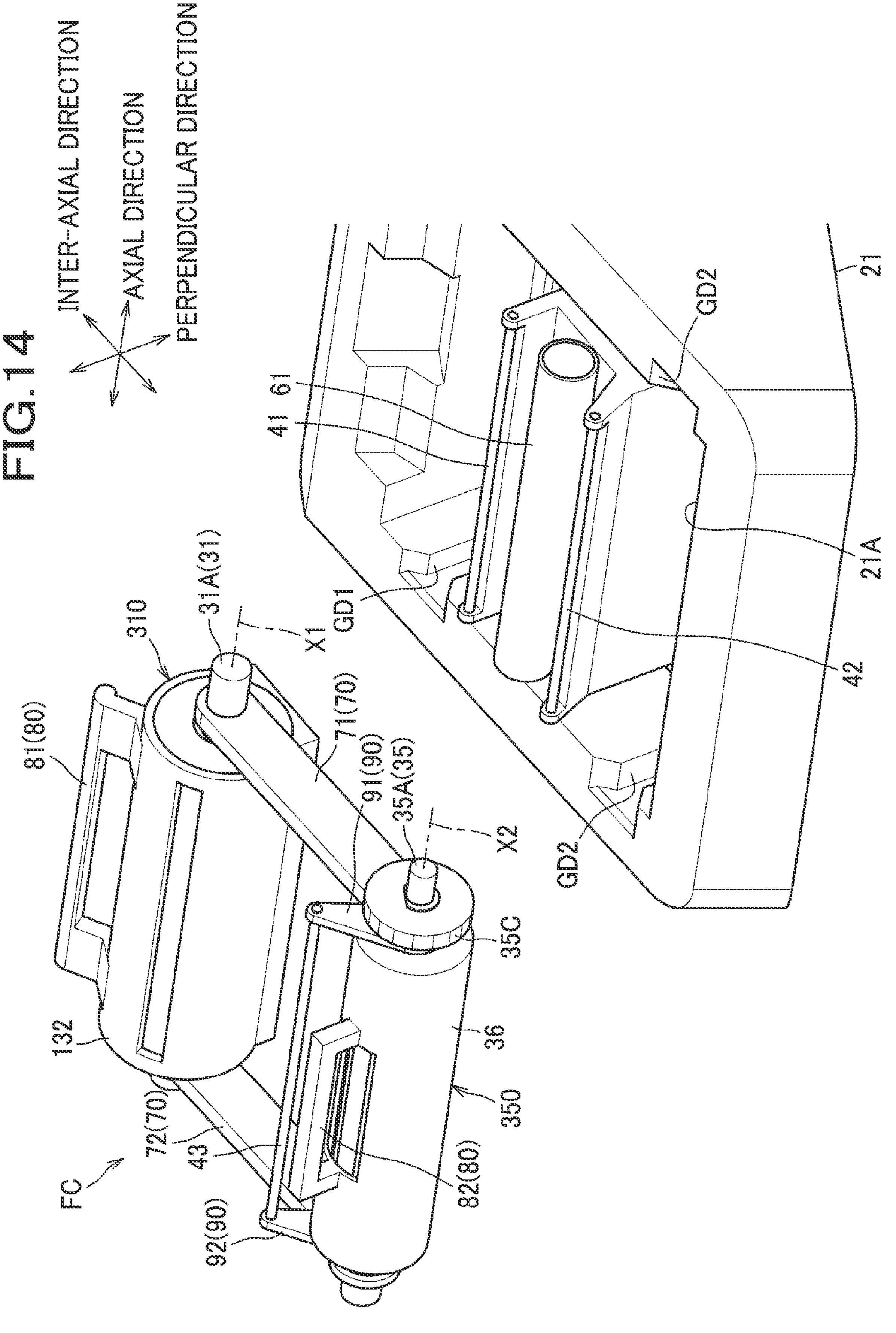
FIG. 14 is a perspective view showing the layer transfer film cartridge and a housing main body.

As shown in FIG. 14, the layer transfer film cartridge FC includes, in addition to the supply unit 310, the take-up unit 350, the shaft 43, and the memory 325 described above, a connecting portion 70, a handle 80, and a support portion 90. The supply unit 310 includes, in addition to the supply reel 31 described above, a supply case 132. The take-up unit 350 includes, in addition to the take-up reel 35 described above, a take-up case 36. The supply case 132 houses the supply reel 31, and the take-up case 36 houses the take-up reel 35.

The handle 80 is located on a side opposite to a side on which the memory 325 is located. The supply reel 31 is located in such a position that at least a part thereof is located between the memory 325 and the first handle 81 in a perpendicular direction. To be more specific, the handle 80 is located in a position shifted from, in a perpendicular direction perpendicular to, the imaginary plane FF containing the rotation axis X1 of the supply reel 31 and the rotation axis X2 of the take-up reel 35, on one side of the imaginary plane FF, while the memory 325 is located in a position shifted from, in a perpendicular direction perpendicular to, the imaginary plane FF, on the other side of the imaginary plane FF (see FIG. 13). It is to be understood that when the supply reel 31 is between the memory 325 and the first handle 81 in the perpendicular direction, the memory 325, the supply reel 31, and the first handle 81 may not necessarily be on a straight line extending in the perpendicular direction.

The support member 90 is a member that supports the shaft 43. The support member 90 includes a first side plate 91 and a second side plate 92. In the present embodiment, the first side plate 91 and the second side plate 92 are fixed to the take-up case 36 or the connecting portion 70. This makes the shaft 43 unable to move in such directions as to change a distance therefrom to the supply reel 31.

As shown in FIG. 13, the layer transfer device 1 further includes a reader 150 that contacts the memory 325 and reads out information from the memory 325.

The reader 150 is located in the housing main body 21. The reader 150 is located in a position such that when the layer transfer film cartridge FC is installed in the housing main body, the reader 150 faces the memory 325. The reader 150 includes an electric contact 151 that contacts the contact surface 325C. The electric contact 151 is located in the housing main body 21, and faces to the housing opening 21A. The reader 150 is connected to the control unit 160.

As shown in FIG. 12, when the layer transfer film cartridge FC is installed into the housing main body 21, the contact surface 325C of the memory 325 comes in contact with the electric contact 151 of the reader 150, so that the control unit 160 is made capable of communicating with the memory 325 via the reader 150.

The control unit 160 executes a layer transfer most suitable for the layer transfer film cartridge FC based on use information and use history information of the multilayer film F stored in its own memory such as RAM and non-volatile memory, and/or the memory 325. Moreover, the control unit 160 can write, into the memory 325, use history information of the multilayer film F as updated according to the progress of the layer transfer.

Figure 15:
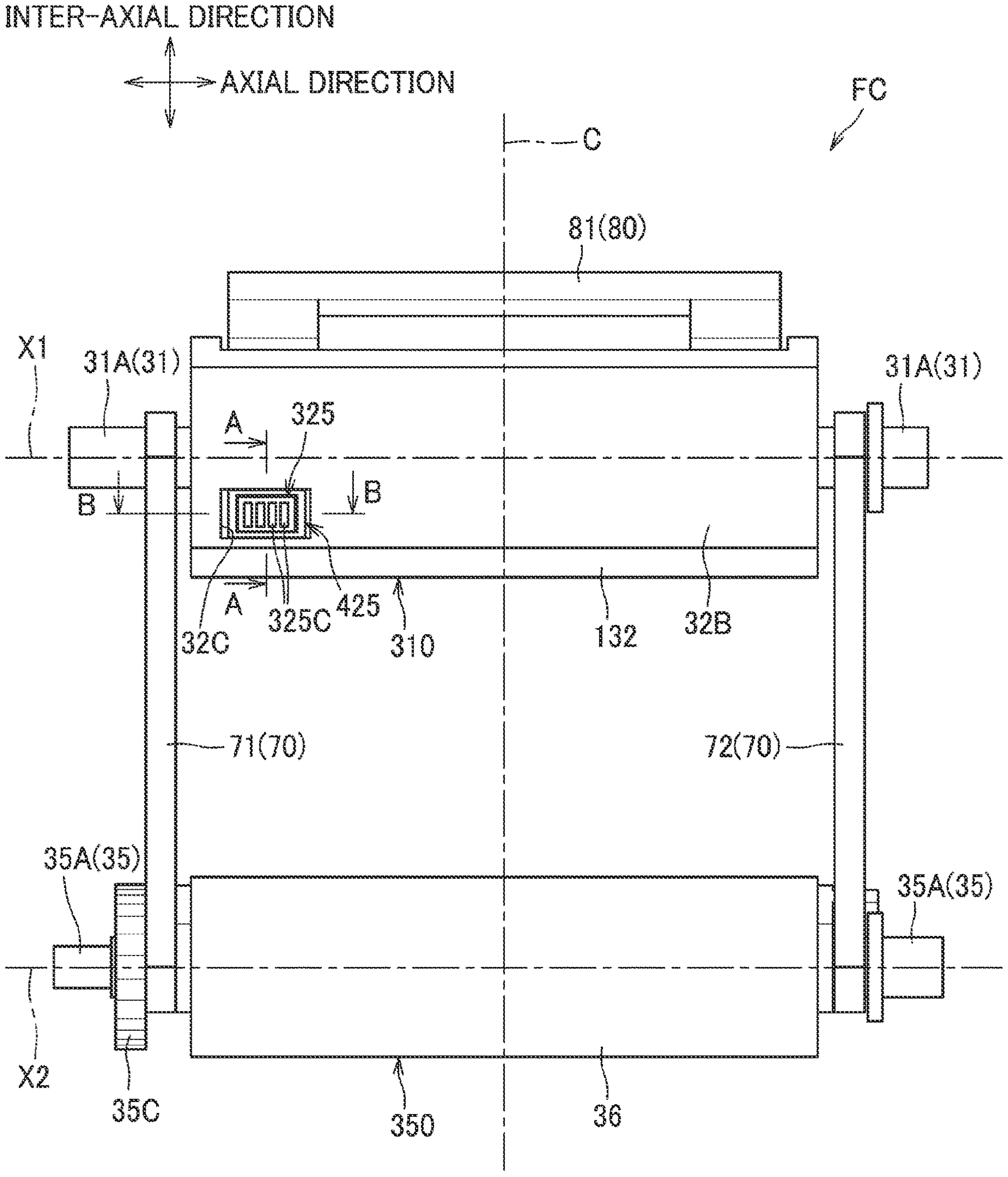
FIG. 15 is a plan view of the layer transfer film cartridge as viewed from a side on which a memory is attached thereto.

As shown in FIG. 15, the memory 325 is provided in the supply case 132. In the present embodiment, the memory 325 is located between the rotation axis X1 of the supply reel 31 and the rotation axis X2 of the take-up reel 35. The memory 325 is located in a position shifted in the axial direction of the layer transfer film cartridge FC, on one side of the center C on which the take-up gear 35C is located.

Figure 16:
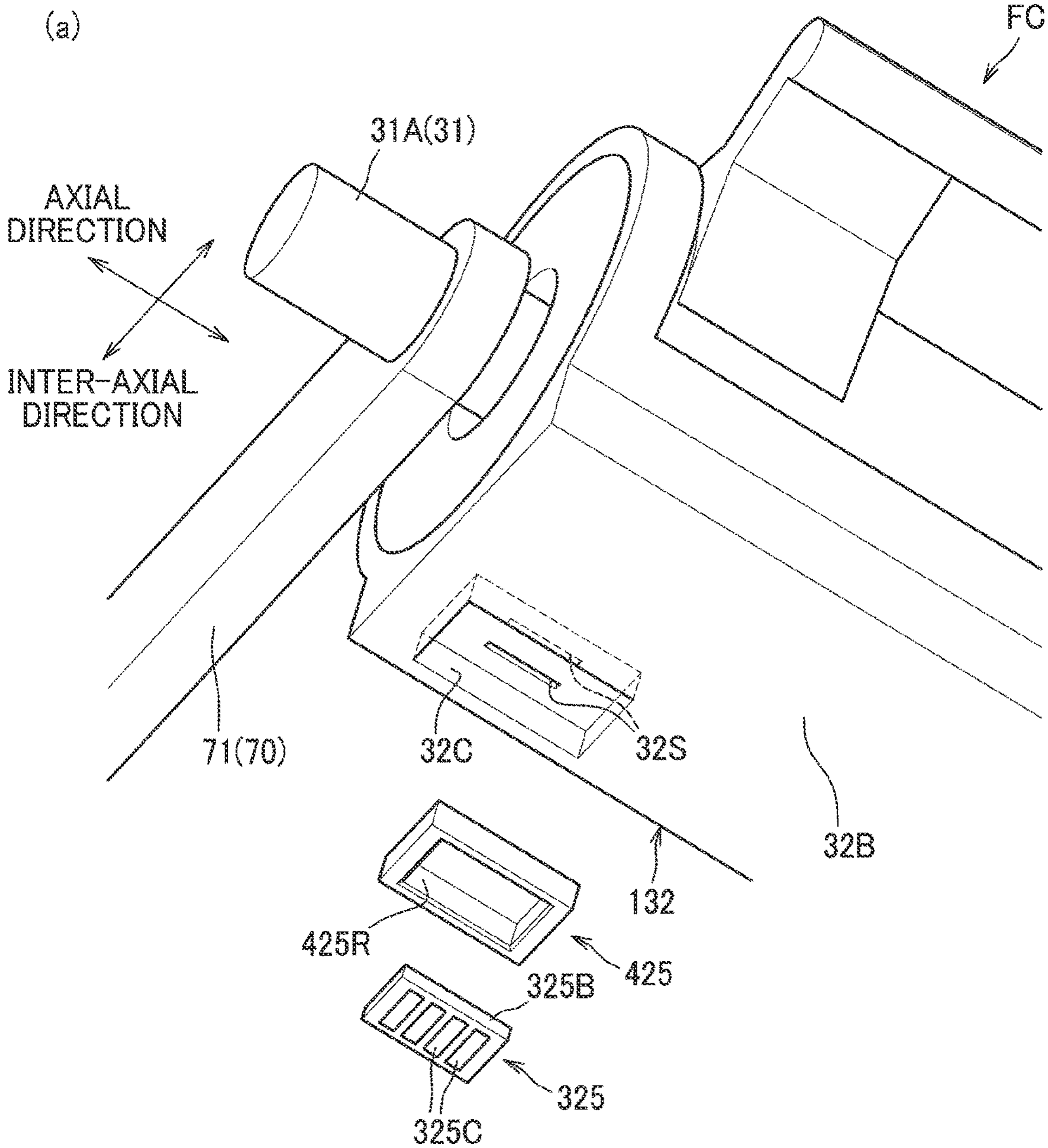
FIG. 16 includes: a perspective view (a) showing a state in which a memory holder is removed from a supply case; and a perspective view (b) of the memory holder as viewed from a viewpoint on a side of the memory holder which is opposite to a side on which a viewpoint is set in the view (a).
Figure 16:
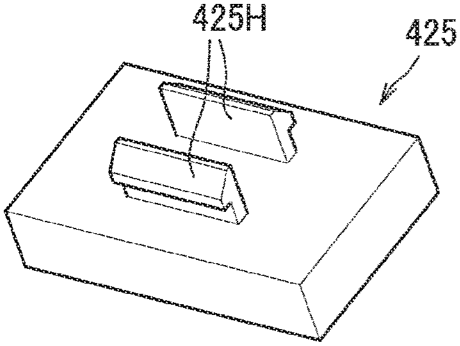

The memory 325 includes a substrate 325B (see also FIG. 16(*a*)) formed of plastic, and a contact surface 325C plated with gold. The contact surface 325C includes a plurality of contact surfaces 325C arranged in the axial direction of the supply reel 31. The contact surface 325C extends in the inter-axial direction that is a direction of arrangement of the rotation axis X1 of the supply reel 31 and the rotation axis X2 of the take-up reel 35. In the present embodiment, four contact surfaces 325C are provided, and have rectangular shapes elongate in the inter-axial direction. The contact surface 325C comes in contact with the electric contact 151 of the reader 150 when the layer transfer film cartridge FC is installed and positioned in the installation position in the housing main body 21.

As shown in FIG. 16(*a*), the supply case 132 has a recessed region 32C recessed from the flat surface 32B. The recessed region 32C has a rectangular opening. The recessed region 32C has two slits 32S extending in the axial direction formed in its bottom surface.

The layer transfer film cartridge FC further includes a memory holder 425 in which the memory 325 is fixed. The memory holder 425 is located in the recessed region 32C of the supply case 132. The contact surface 325C of the memory 325 is located in the recessed region 32C of the supply case 132.

The memory holder 425 is made of plastic, and includes a main portion 425R, and engageable portions 425H (see FIG. 16(*b*)). The main portion 425R is a recessed part in which the memory 325 can be fitted, and holds the memory 325 inside. Accordingly, the contact surface 325C of the memory 325 is positioned in the recessed region 32C of the supply case 132.

Figure 17:
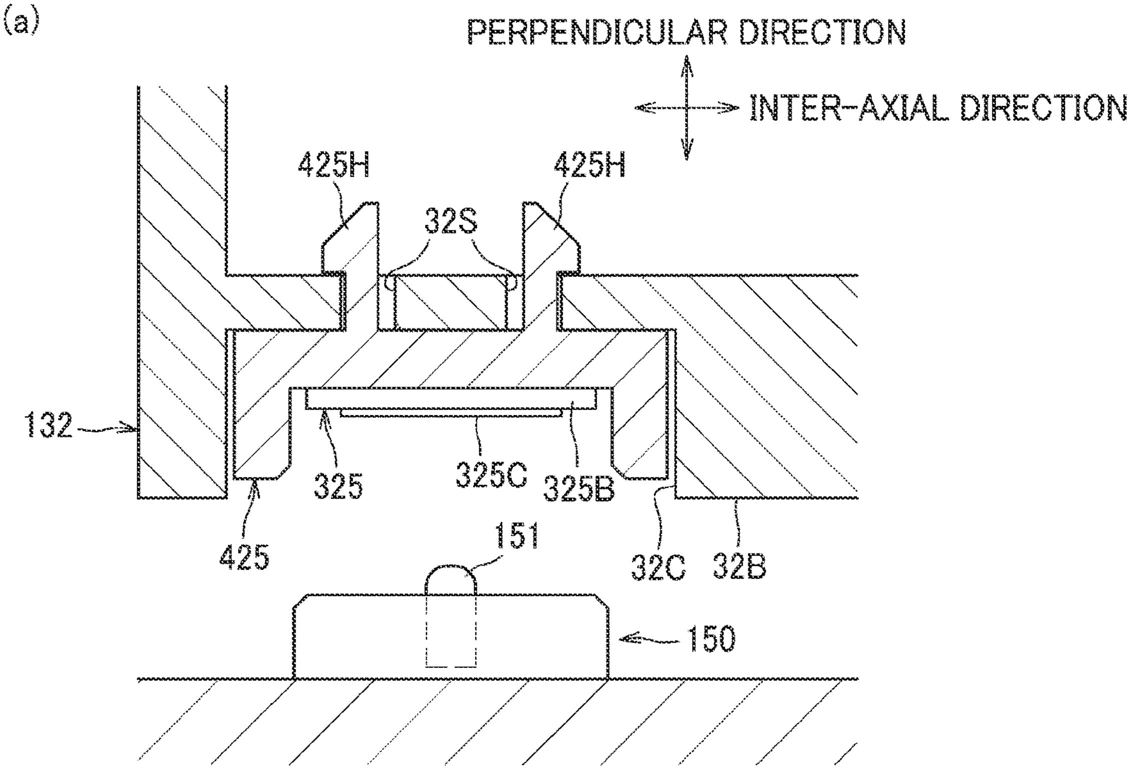
FIG. 17 includes: a section view (a) taken along line A-A in FIG. 15; and a section view (b) taken along line B-B in FIG. 15.
Figure 17:
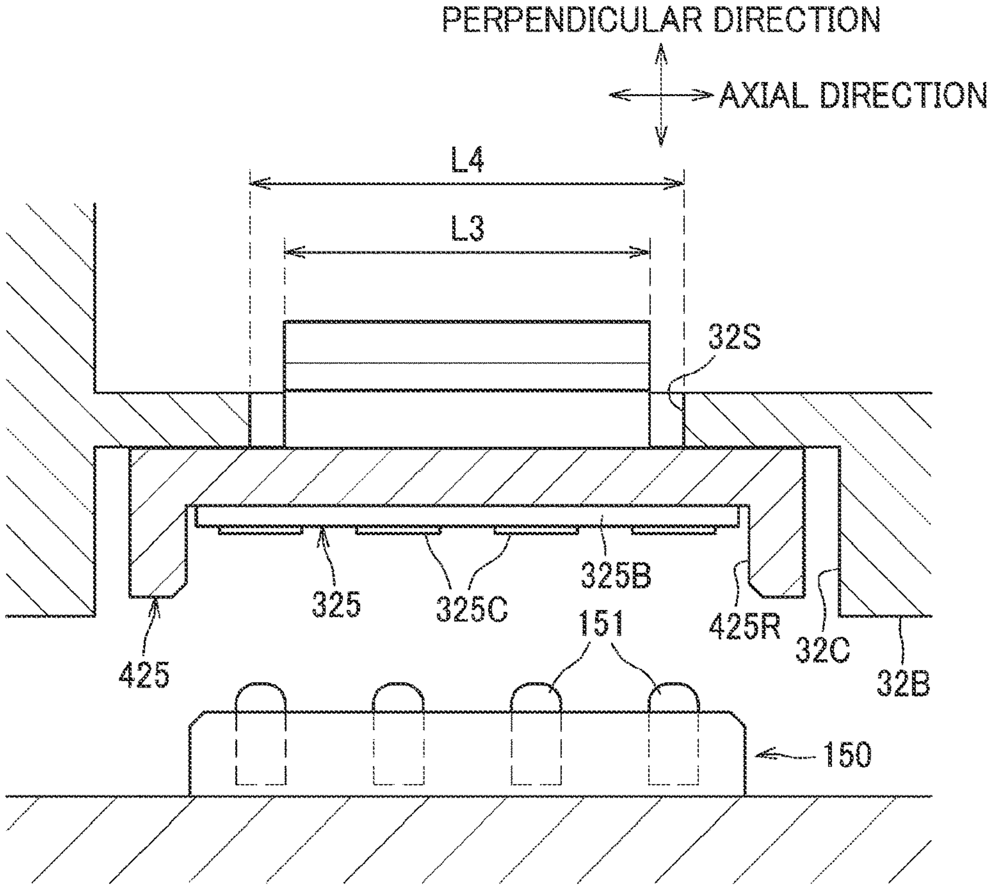

As shown in FIG. 17(*a*), the engageable portions 425H have their extreme ends formed in hooked shapes, and are configured to be subjected to elastic deformation when the extreme ends are fitted and engaged in the slits 32S.

As shown in FIG. 17(*b*), the dimension L3 of the engageable portions 425H in the axial direction is smaller than the dimension L4 of the slits 32S in the axial direction. This makes the memory holder 425 slidable in the axial direction within a space in which there is a clearance as resulting from deduction of the dimension L3 from the dimension L4. In this way, the memory holder 425 is supported movably in a direction along the axis of the supply reel 31, i.e., in the axial direction, relative to the supply case 132.

As shown in FIG. 12, when the layer transfer film cartridge FC is in the installation position, the supply reel 31 is positioned between the housing opening 21A and the electric contact 151 of the reader 150 in a perpendicular direction perpendicular to the axial direction along the axis of the supply reel 31. It is to be understood that when the supply reel 31 is positioned between the housing opening 21A and the electric contact 151 in the perpendicular direction, the electric contact 151, the supply reel 31, and the housing opening 21A may not necessarily be positioned on a straight line extending in the perpendicular direction.

In the present embodiment, with the configurations described above, the following advantageous effects can be achieved.

The layer transfer film cartridge FC to be installed in the layer transfer device 1 includes the memory 325. Thus, the layer transfer device 1 can acquire information related to the layer transfer film cartridge FC by reading out data such as specification information of the layer transfer film cartridge FC, etc. from the memory 325. Consequently, the layer transfer can be carried out under the optimum conditions according to the specifications of the installed layer transfer film cartridge FC.

The contact surface 325C of the memory 325 faces to the electric contact 151 that faces the housing opening 21A of the housing main body 21 when the layer transfer film cartridge FC is in the installation position; therefore, when the layer transfer film cartridge is installed, the contact surface 325C is unlikely to contact an object such as a wall provided in the housing main body 21 along the direction of installation. Consequently, the layer transfer device 1 can stably read out information stored in the memory 325.

The handle 80 (first handle 81 and second handle 82) of the layer transfer film cartridge FC is located on a side of the imaginary plane FF, and the memory 325 is located on the other side of the imaginary plane FF. The layer transfer film cartridge FC including a metal-foil multilayer film F or the like is too heavy to carry with one hand, and thus may advisably be firmly gripped and carried with both hands when installed or removed. The first handle 81 and the second handle 82 are both located on the upper side, and thus can be gripped with both hands by a user. On the other hand, the memory 325 is located on a side opposite to the side on which the first handle 81 and the second handle 82 are located, and thus the user can easily bring the memory 325 into contact with the reader 150.

Since the contact surface 325C of the memory 325 is positioned in the recessed region 32C of the supply case 132, the contact surface 325C does not protrude from the flat surface 32B of the supply case 132. Therefore, the contact surface 325C can be restrained from being damaged.

Since the memory holder 425 is supported movably in the axial direction of the supply reel 31 relative to the supply case 132, the contact surface 325C of the memory 325 can be stably brought into contact with the electric contact 151 of the reader 150 even when the layer transfer film cartridge FC being installed into the housing main body 21 is shifted a bit to the axial direction relative to the housing main body 21.

Since the contact surface 325C includes a plurality of contact surfaces 325C arranged in the axial direction and extends in the inter-axial direction, the contact surface 325C can be stably brought into contact with the electric contact 151 of the reader 150 even when the layer transfer film cartridge FC being installed into the housing main body 21 is shifted a bit to the inter-axial direction relative to the housing main body 21.

The second embodiment described above can be modified and implemented in various forms as will be described below by way of example. In the following description, elements having substantially the same structural features as those of the above-described embodiment will be designated by the same reference characters, and a description thereof will be omitted.

In the above-described embodiment, the memory 325 is provided at the supply case 132, but the memory 325 may be provided at the take-up case 36, or may be provided at the connecting portion 70.

Figure 18:
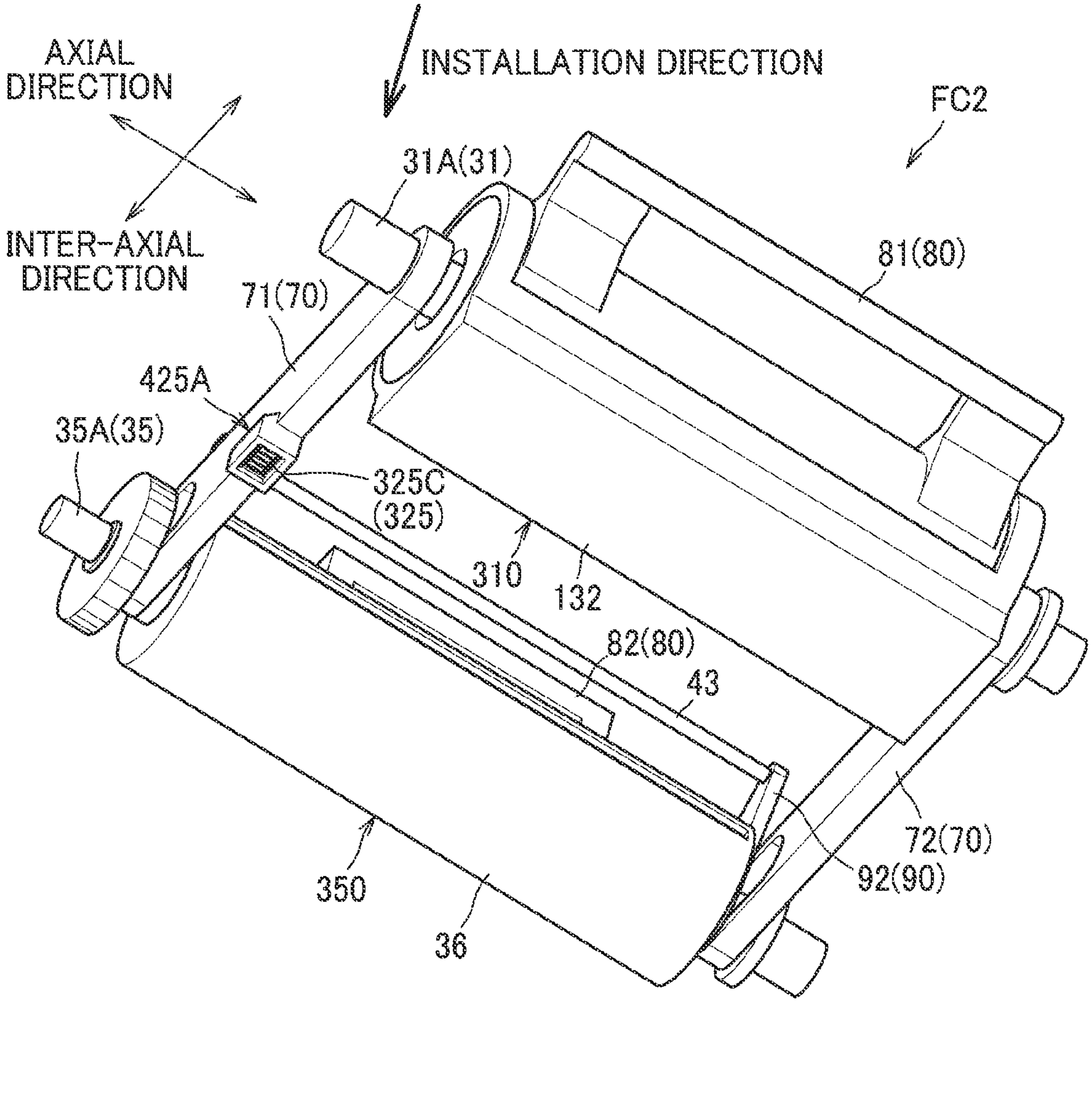
FIG. 18 is a perspective view of a layer transfer film cartridge in another embodiment.

For example, in a layer transfer film cartridge FC2 shown in FIG. 18, the memory 325 is provided at the connecting portion 70.

Specifically, the memory 325 is held by a memory holder 425A, and the memory holder 425A is fixed to the connecting portion 70. On the other hand, the housing main body includes a reader (not shown) in a portion thereof which faces the memory 325 located at the connecting portion 70 when the layer transfer film cartridge FC2 is installed. The contact surface 325C of the memory 325 faces, as in the above-described embodiment, in the direction of installation of the layer transfer film cartridge FC. Therefore, when the layer transfer film cartridge FC2 is installed in the housing main body, the contact surface 325C of the memory 325 comes in contact with the electric contact of the reader (not shown).

With this embodiment as well, the contact surface 325C can be restrained from unnecessarily rubbing when the layer transfer film cartridge FC2 is being installed, and thus the layer transfer device 1 can stably read out information stored in the memory 325.

The direction of installation of the layer transfer film cartridge is, though illustrated in the above-described embodiment as, not limited to the perpendicular direction. For example, in a layer transfer device 1A shown in FIG. 19, a layer transfer film cartridge FC3 is removably installable in the axial direction. In other words, the direction of installation of the layer transfer film cartridge FC3 is a direction along the axial direction.

To be more specific, a housing 2A of the layer transfer device 1A includes a housing main body 21J and a housing cover 22C. The housing main body 21J has a housing opening 21K at its side. The housing opening 21K is an opening through which to install or remove the layer transfer film cartridge FC3, and is positioned at the side facing outward in the axial direction of the housing 2A. At an inner side of an opposite sidewall (on a side of the housing 2A opposite to the side on which the housing opening 21K is provided) in the axial direction of the housing 2A, an electric contact 151 facing to the housing opening 21K is provided. A housing cover 22C is a member with which the housing opening 21K is openably closeable, and is rotatably supported by the housing main body 21J. A user can install the layer transfer film cartridge FC3 by opening the housing cover 22C and placing, and sliding the layer transfer film cartridge FC3 in the axial direction, on the housing cover 22C. In this configuration, the second connecting portion 72 provided in the second embodiment described above is omitted, and the supply unit 310 and the take-up unit 350 are connected only by the first connecting portion 71.

Figure 19:
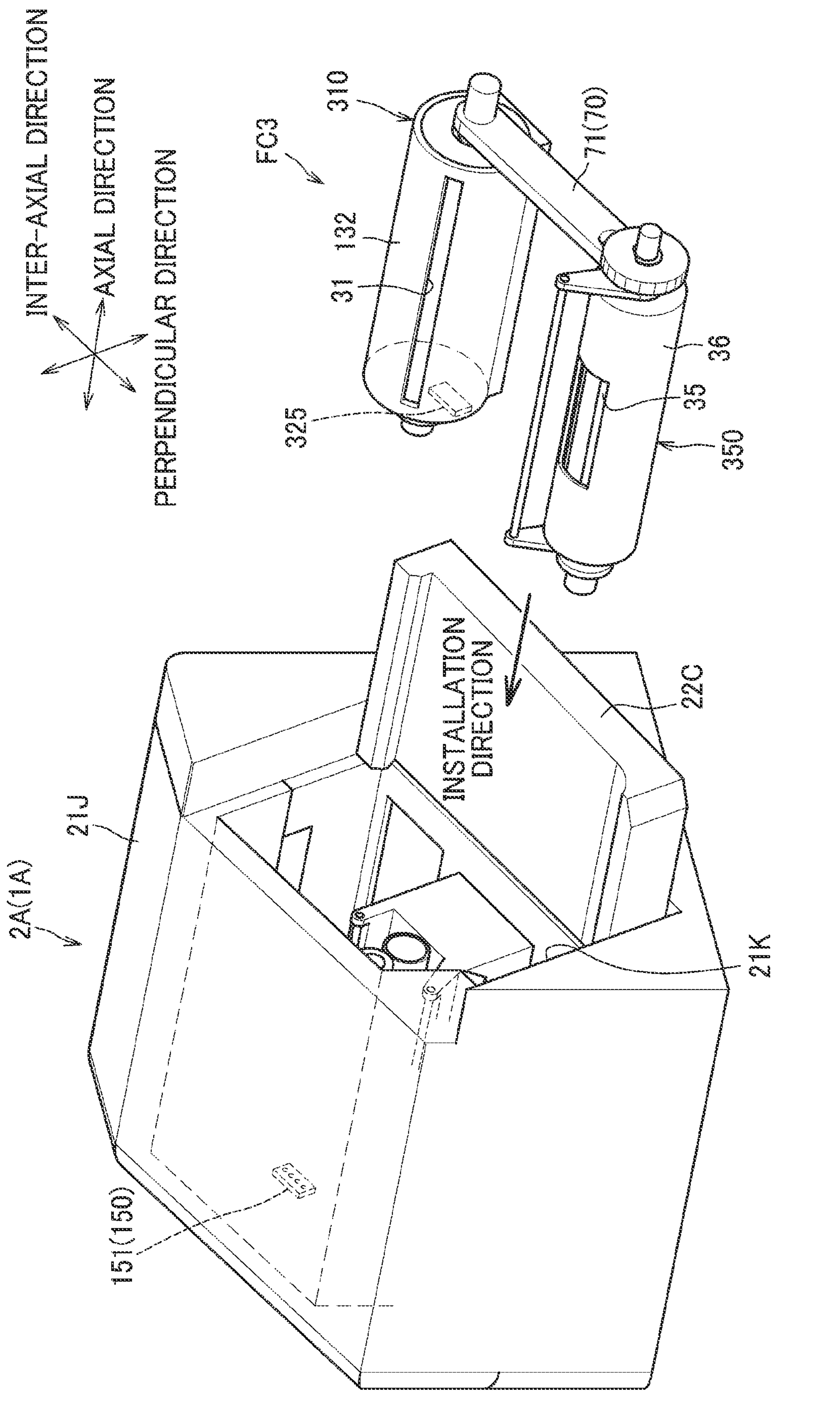
FIG. 19 is a diagram showing a state in which a housing cover is opened and a layer transfer film cartridge is taken out from a layer transfer device in yet another embodiment.

In the modified example shown in FIG. 19, the first connecting portion 71 serves as the first handle. That is, a user grasps the first connecting portion 71 to install or remove the layer transfer film cartridge FC3. In this configuration, at least part of the supply reel 31 is located between the memory 325 and the handle (first connecting portion 71) in the axial direction. To be more specific, a portion of the supply reel 31 housed in the supply case 132 is positioned between the memory 325 and the first handle (first connecting portion 71).

In this configuration as well, the contact surface of the memory 325 faces in the installation direction in which the layer transfer film cartridge FC3 is installed.

With this configuration shown in FIG. 19, as well, when the layer transfer film cartridge FC3 is installed, the contact surface can be restrained from unnecessarily rubbing against the wall surface of the housing 2A along the installation direction, or the like, and after installation, the contact surface can get in contact with the electric contact 151 of the reader 150 without fail; therefore, the layer transfer device 1A can stably read out information stored in the memory 325.

Next, a detailed description will be given of a third embodiment with reference made mainly to FIGS. 20 to 24. In the following description, elements having substantially the same structural features as those of the first embodiment will be designated by the same reference characters, and a description thereof will be omitted.

Figure 20:
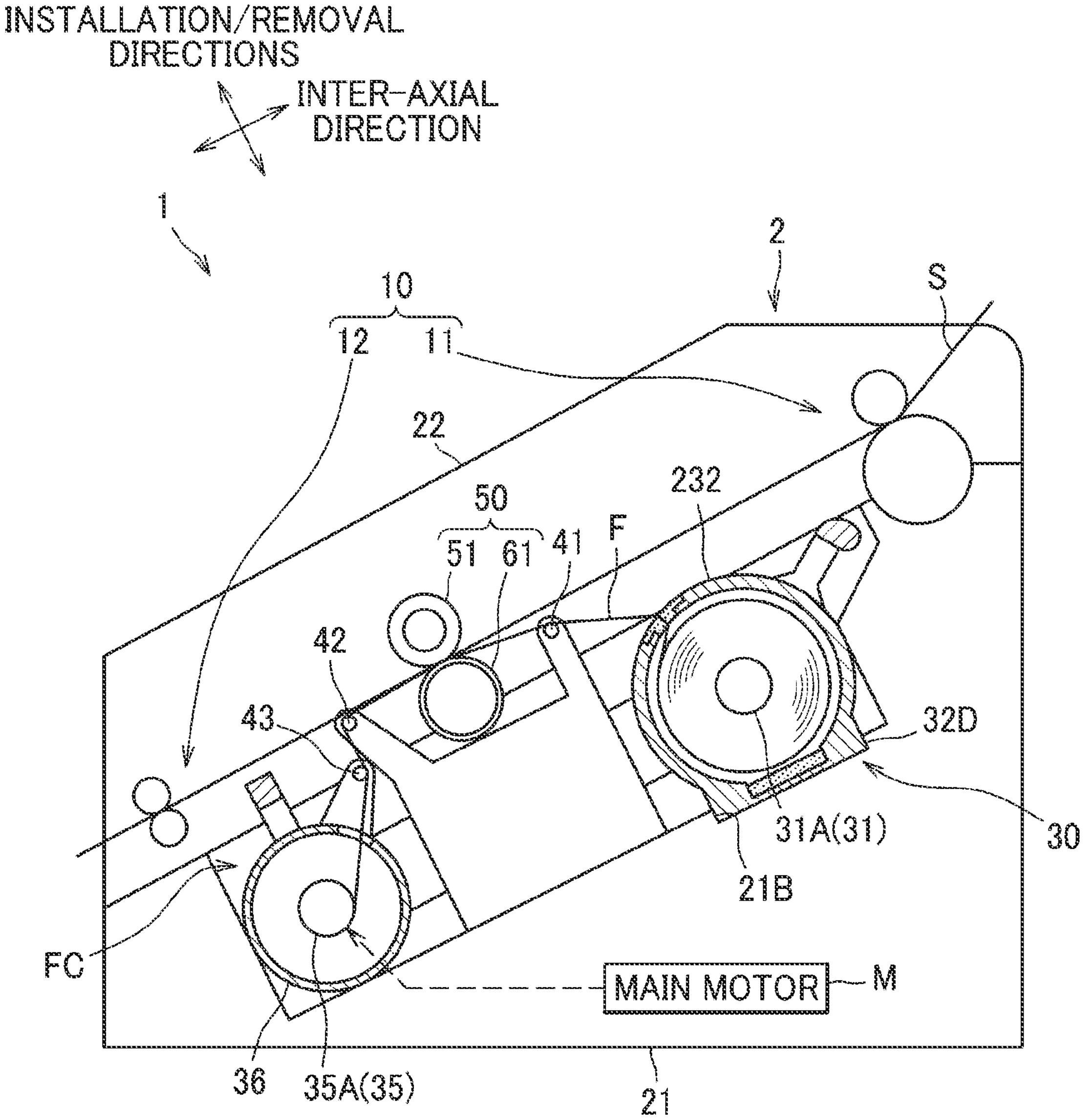
FIG. 20 is a diagram showing a layer transfer device according to a third embodiment.

As shown in FIG. 20, a layer transfer device 1 includes a housing 2, a sheet conveyor unit 10, a film supply unit 30, and a transfer unit 50. The film supply unit 30 includes a layer transfer film cartridge FC, a first guide shaft 41, a second guide shaft 42, and a main motor M as a driving source.

Figure 21:
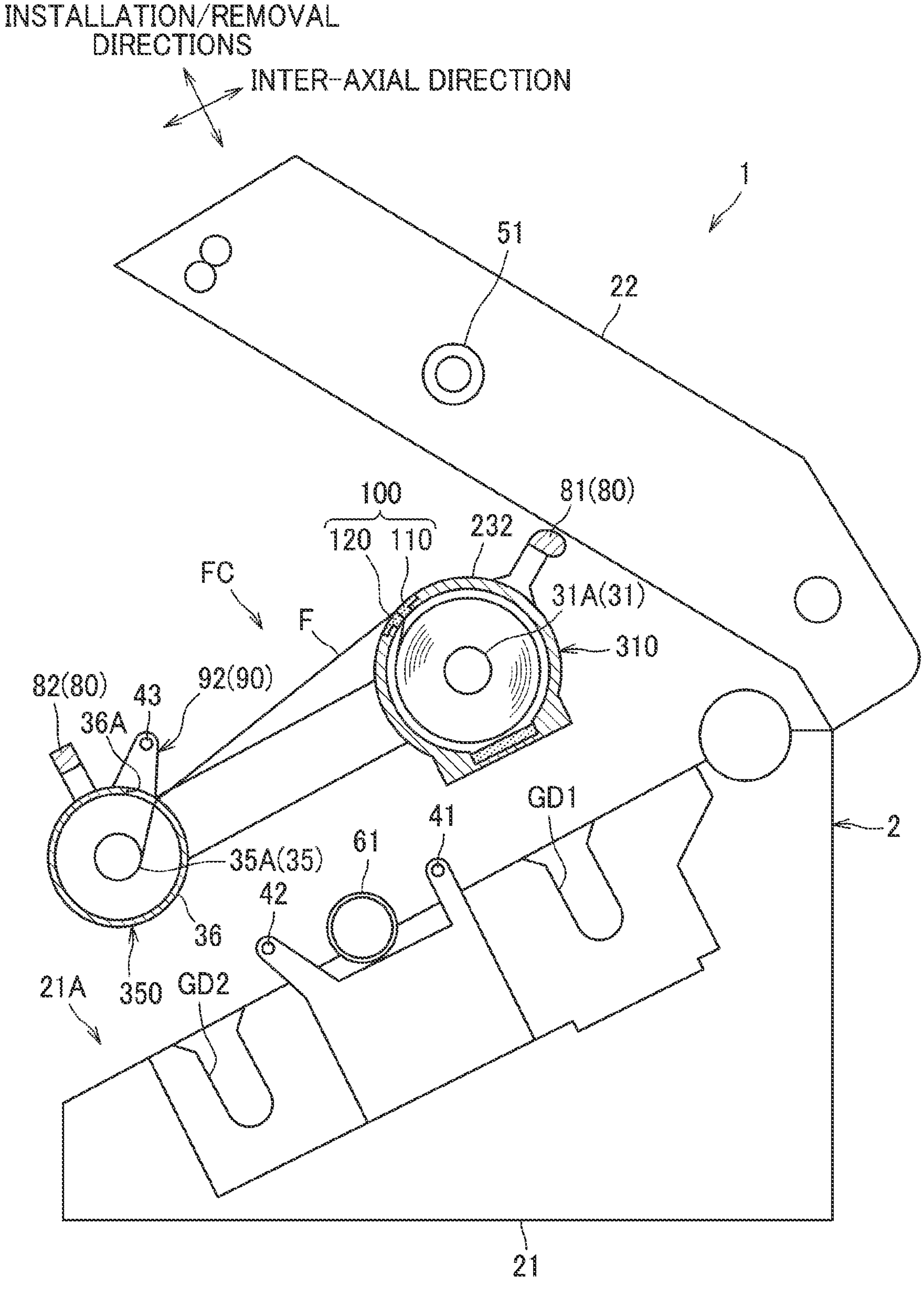
FIG. 21 is a diagram showing a state in which a housing cover of the layer transfer device is opened.

As shown in FIG. 21, the layer transfer film cartridge FC is configured to be installable into and removable from the housing 2, more specifically, to a housing main body 21, through a housing opening 21A. The layer transfer film cartridge FC is a cartridge that supports a multilayer film F consisting of a plurality of layers as shown in FIG. 1(*b*). The layer transfer film cartridge FC mainly includes a supply unit 310, a take-up unit 350, and a shaft 43. The supply unit 310 mainly includes a supply reel 31. The take-up unit 350 mainly includes a take-up reel 35. The multilayer film F is wound on the supply reel 31.

Figure 22:
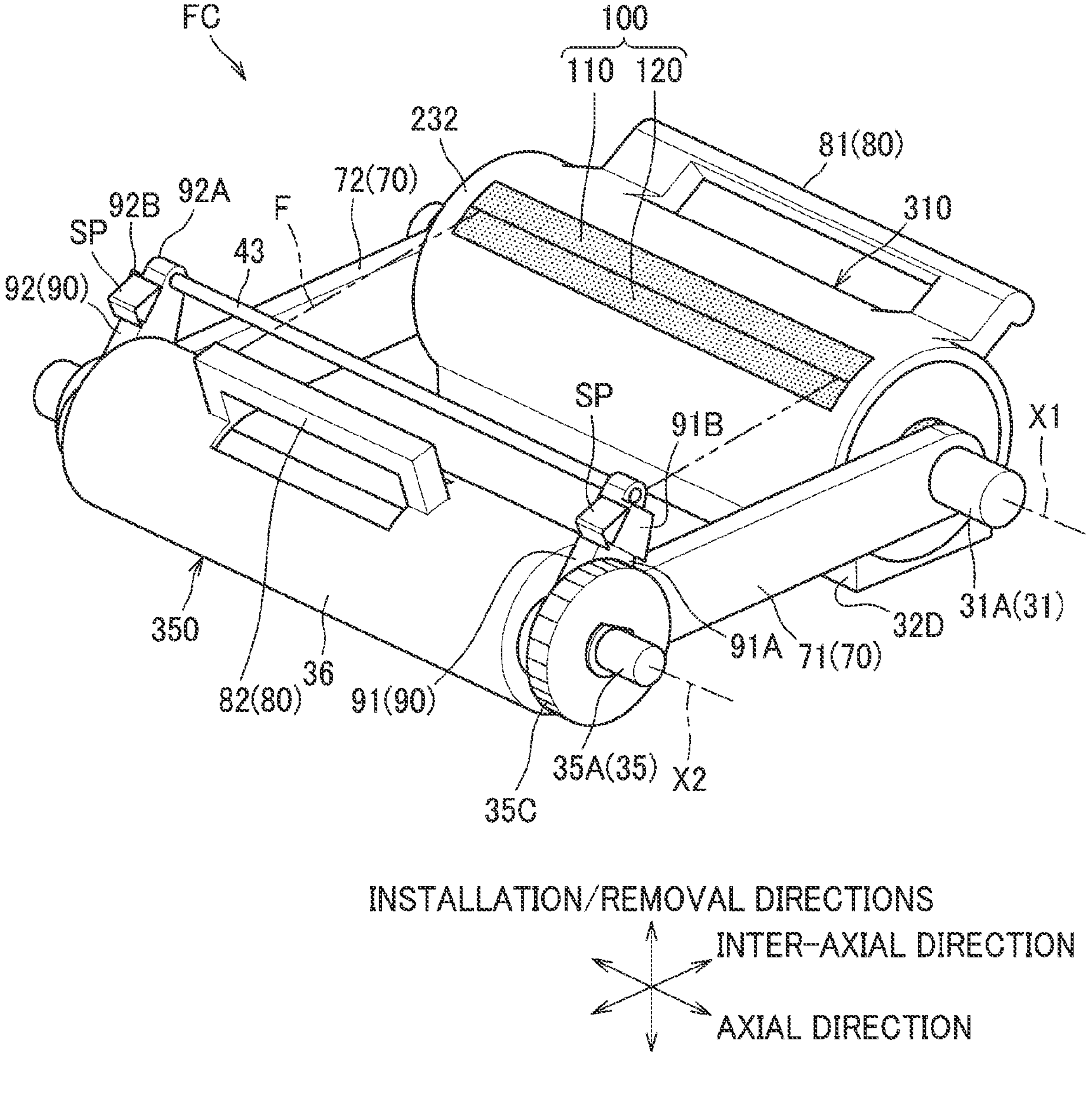
FIG. 22 is a perspective view showing a layer transfer film cartridge according to the third embodiment.

As shown in FIG. 22, the layer transfer film cartridge FC includes, in addition to the supply unit 310, the take-up unit 350 and the shaft 43 described above, a connecting portion 70, a handle 80, and a support member 90. The supply unit 310 includes, in addition to the supply reel 31 described above, a supply case 232 as an example of a container member. The take-up unit 350 includes, in addition to the take-up reel 35 described above, a take-up case 36. The supply case 232 houses the supply reel 31, and the take-up case 36 houses the take-up reel 35.

The supply case 232 includes a to-be-restrained portion 32D provided in a region of an outer peripheral surface thereof. The to-be-restrained portion 32D engages with a restraining recess 21B (see FIG. 20) of the housing main body 21, and the layer transfer film cartridge FC is thus supported by the housing main body 21.

Figure 23:
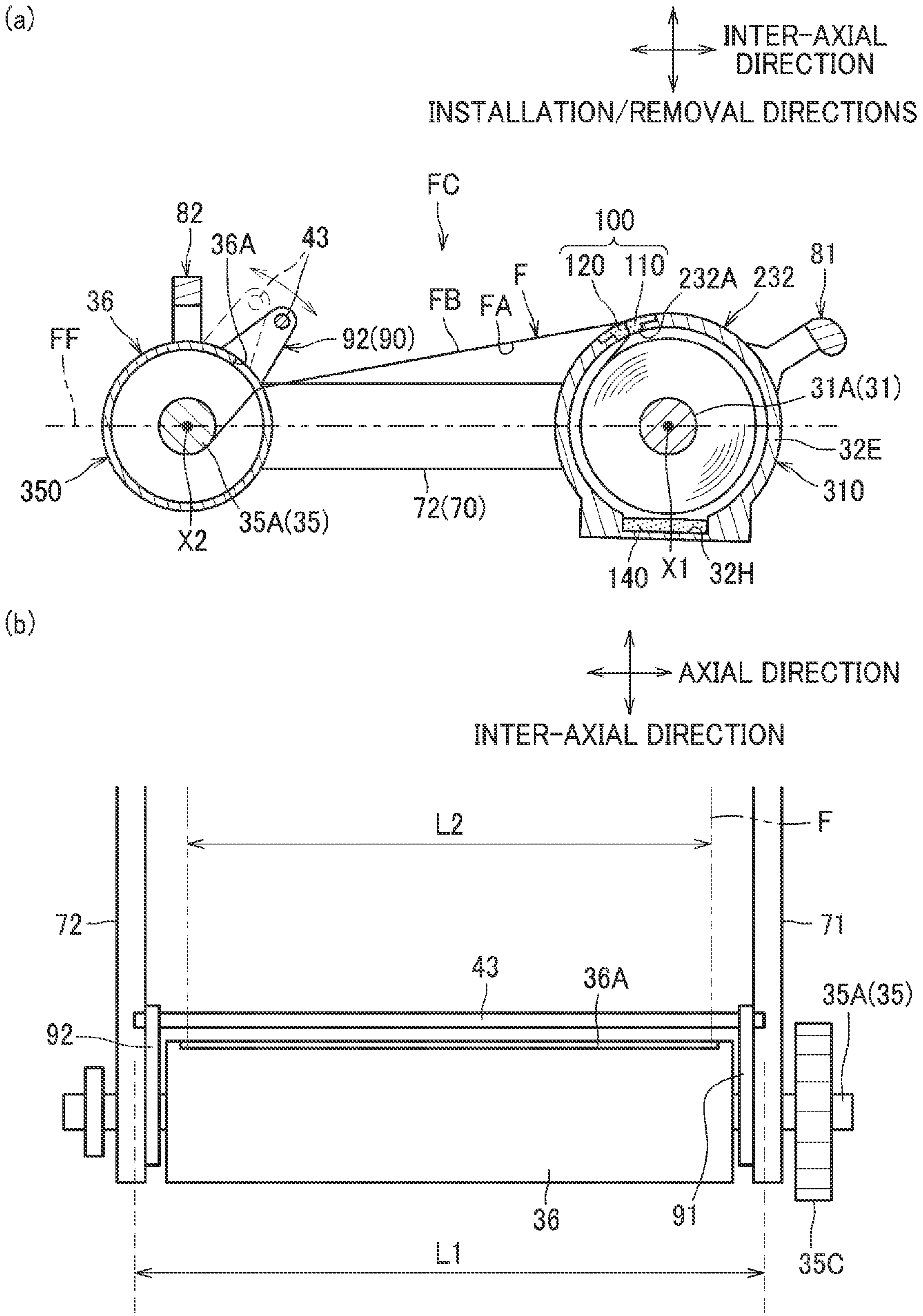
FIG. 23 includes: a section view (a) showing the layer transfer film cartridge; and a plan view (b) showing a relationship between a shaft and a multilayer film.

As shown in FIG. 23(*a*), the shaft 43 supported by the support member 90 is movable relative to the connecting portion 70. To be more specific, the shaft 43 is movable between a first position indicated by a broken line in the drawing and a second position (indicated by a solid line) closer than the first position to the supply reel 31. It is to be understood that the take-up case 36 or the connecting portion 70 is provided with a restraining portion (not shown) which restricts the range of motion of the shaft 43 to a range from the first position to the second position. Specifically, the restraining portion restricts the range of rotation of the support member 90 so that the shaft 43 moves only between the first position and the second position. The configuration and operation of the restraining portion is the same as those in the first embodiment.

As shown in FIG. 23(*b*), the shaft 43 has a dimension L1 in the axial direction, which is greater than a width L2 of the multilayer film F.

As shown in FIG. 23(*a*), the supply case 232 has a supply opening 232A through which the multilayer film F is allowed to pass. The supply opening 232A is an opening through which to draw out the multilayer film F wound on the supply reel 31 to the outside, and through which to guide the multilayer film F from inside to outside of the supply case 32. The take-up case 36 has a take-up opening 36A through which the multilayer film F is allowed to pass. The take-up opening 36A is an opening through which to guide the multilayer film F from outside to inside of the take-up case 36. The multilayer film F is supported on a second opening seal member 120 located at the supply opening 232A and an edge of the take-up opening 36A, and thus stretched between the supply reel 31 and the take-up reel 35, i.e., can be run therebetween under tension.

The layer transfer film cartridge FC is installable into and removable from the housing main body 21 in directions perpendicular to an imaginary plane FF containing the rotation axis X1 of the supply reel 31 and the rotation axis X2 of the take-up reel 35.

As shown in FIG. 21, the housing main body 21 includes a first guide GD1 and a second guide GD2. The structural features of the first guide GD1 and the second guide GD2 are the same as those in the first embodiment. The first guide GD1 is a groove along which to guide the supply shaft 31A of the supply reel 31 when the layer transfer film cartridge FC is installed into or removed from the housing main body 21. The first guide GD extends in the installation/removal directions described above, and guides the supply shaft 31A in the installation/removal directions. The first guide GD1 is provided at one end and the other end respectively of the housing main body 21 which are located apart from each other in the axial direction.

The second guide GD2 is a groove along which to guide the take-up shaft 35A of the take-up reel 35 when the layer transfer film cartridge FC is installed into or removed from the housing main body 21. The second guide GD2 extends in the installation/removal directions described above, and guides the take-up shaft 35A in the installation/removal directions. The second guide GD2 is provided at one end and the other end respectively of the housing main body 21 which are located apart from each other in the axial direction.

The housing cover 22 includes a pressing member that presses the shaft 43 from a first position toward a second position as shown in FIG. 23(*a*). The pressing member is fixed to an inside of the housing cover 22, and configured to press the shaft 43 from the first position toward the second position when the housing cover 22 is closed. The structural features, arrangement of the pressing member, and relationship with the shaft 43, and operation thereof are the same as those of the pressing member 22A in the first embodiment as described with reference to FIG. 6. Accordingly, the installation into and removal from the housing main body 21 of the layer transfer film cartridge FC can be done in the same manner as in the first embodiment.

As shown in FIG. 22 and FIG. 23(*a*), the layer transfer film cartridge FC includes a seal structure 100 provided to close the supply opening 232A of the supply case 232. The seal structure 100 includes a first opening seal member 110 as an example of a first contact portion, and a second opening seal member 120 as an example of a second contact portion, and is a structure to nip the multilayer film F between the first opening seal member 110 and the second opening seal member 120 in a manner that permits the multilayer film F to be drawn out.

The first opening seal member 110 is a long seal member elongate in the axial direction, and is located at an edge portion of a peripheral edge of the supply opening 232A, which is the portion farther than other portions of the peripheral edge, from the take-up reel 35. Accordingly, the first opening seal member 110 contacts a second surface FB that is a transfer layer F22 (see FIG. 1(*b*))-side surface of the multilayer film F. The second opening seal member 120 is a long seal member elongate in the axial direction, and is located at an edge portion of the peripheral edge of the supply opening 232A, which is the portion closer than other portions of the peripheral edge, to the take-up reel 35. Accordingly, the second opening seal member 120 contacts a first surface FA that is a supporting layer F1 (see FIG. 1(*b*))-side surface of the multilayer film F.

The first opening seal member 110 and the second opening seal member 120 are each composed of an elastic body. The elastic body of which the first opening seal member 110 and the second opening seal member 120 are composed is a material having elasticity and a high slipperiness with the multilayer film F. The elastic body is, for example, made of polyurethane.

Figure 24:
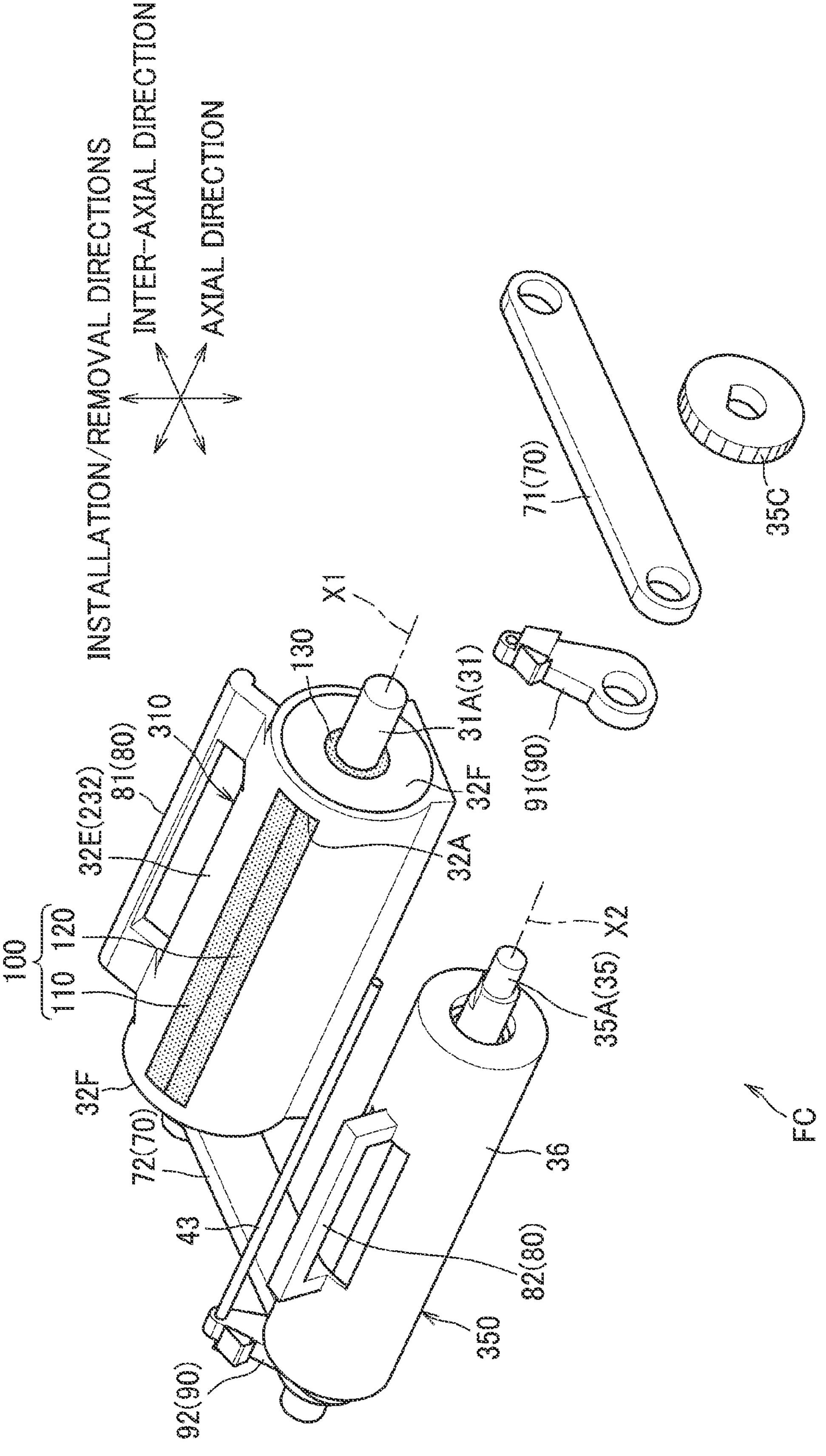
FIG. 24 is a perspective view showing the layer transfer film cartridge as disassembled.

As shown in FIG. 24, the layer transfer film cartridge FC includes end seal members 130. The end seal members 130 are seal members each formed substantially in the shape of a circular cylinder that seal clearances between the supply shaft 31A of the supply reel 31 and the supply case 232, and are composed of elastic bodies made of polyurethane, or the like, similar to the opening seal members 110, 120. The supply shaft 31A is one example of "shaft".

The supply case 232 includes a cylindrical wall 32E substantially in the shape of a circular cylinder, and a pair of side walls 32F provided to close ends of the cylindrical wall 32E facing in the axial directions. The pair of side walls 32F are walls by which the supply shaft 31A is rotatably supported. The supply shaft 31A of the supply reel 31 has two end portions protruding in the axial directions through the side walls to the outside of the supply case 232. The end seal member 130 is provided between the supply shaft 31A and each side wall 32F, to seal the clearances between the supply shaft 31A and the side walls 32F. The end seal members 130 are provided at one end and at the other end, respectively, of the supply shaft 31A.

As shown in FIG. 23(*a*), the layer transfer film cartridge FC further includes a drying agent 140. The drying agent 140 is, for example, of silica gel, and located together with the multilayer film F wound on the supply reel 31 in the supply case 232. The drying agent 140 is located in a recess 32H formed in an inner surface of the cylindrical wall 32E, and is fixed so as not to move relative to the supply case 232.

In the third embodiment, with the configurations described above, the following advantageous effects can be achieved.

Since the supply case 232 can be hermetically sealed by the seal structure 100, entry of water vapor into the supply case 232 can be restricted, and thus the degradation of the multilayer film F can be suppressed.

Since the first opening seal member 110 which contacts the second surface FB (the transfer layer F22-side surface) of the multilayer film F is composed of an elastic body, the transfer layer F22 of the multilayer film F can be protected.

Since the both of the first opening seal member 110 and the second opening seal member 120 by which the multilayer film F is nipped are composed of elastic bodies, the multilayer film F can be protected more effectively in comparison with an alternative configuration in which members for nipping the multilayer film F are not composed of elastic bodies.

Since the layer transfer film cartridge FC comprises the end seal member 130 that seals clearances between the supply shaft 31A of the supply reel 31 and the side wall 32F of the supply case 232, the sealing performance of the supply case 232 can be improved. Accordingly, the degradation of the multilayer film F can restrained more effectively.

Since the layer transfer film cartridge FC comprises the drying agent 140 located together with the multilayer film F wound on the supply reel 31 in the supply case 232, increase in humidity inside the supply case 232 can be restrained. Accordingly, the degradation of the multilayer film F can be restrained more effectively.

It is to be understood that the portion (second contact portion) which contacts the first surface FA of the multilayer film F is, although configured to be composed of an elastic body in the present embodiment, not limited to this configuration. The second contact portion may, for example, be an edge of the supply opening 232 of the supply case 232. That is, the second contact portion may not be composed of an elastic body. Also, as long as the hermetic sealing performance can be ensured enough to achieve the advantageous effects described above, the first contact portion as well may not be composed of an elastic body.

Next, a fourth embodiment will be described below. In the following description, for the same aspects as those in the third embodiment, the same reference characters are designated to the same members or in other ways where appropriate, relevant explanation will be omitted, and aspects distinct from the third embodiment will be described in detail.

Figure 25:
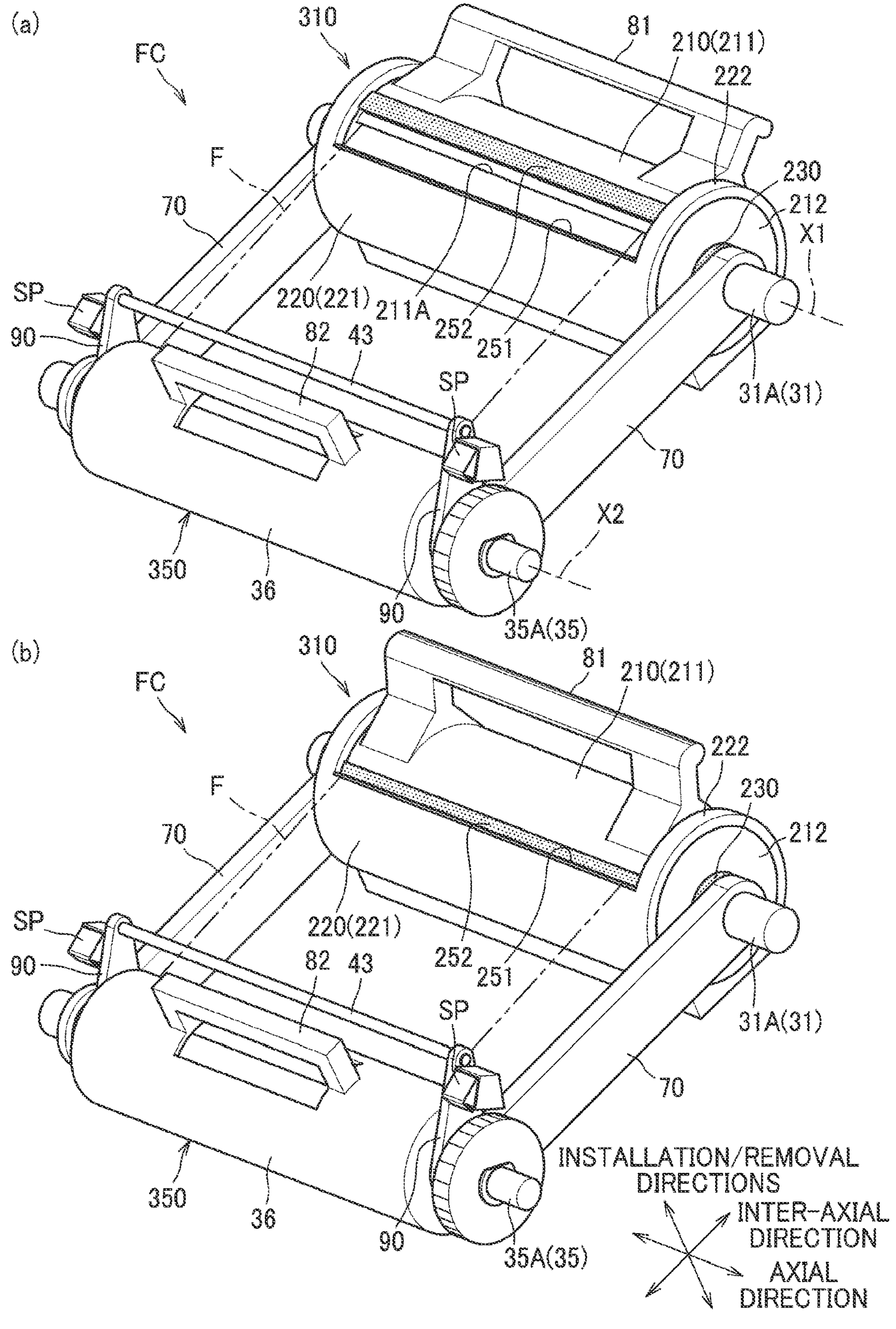
FIG. 25 shows perspective views of a layer transfer film cartridge according to a fourth embodiment, including a view (a) in which a cover member is in an open position; and a view (b) in which the cover member is in a close position.
Figure 26:
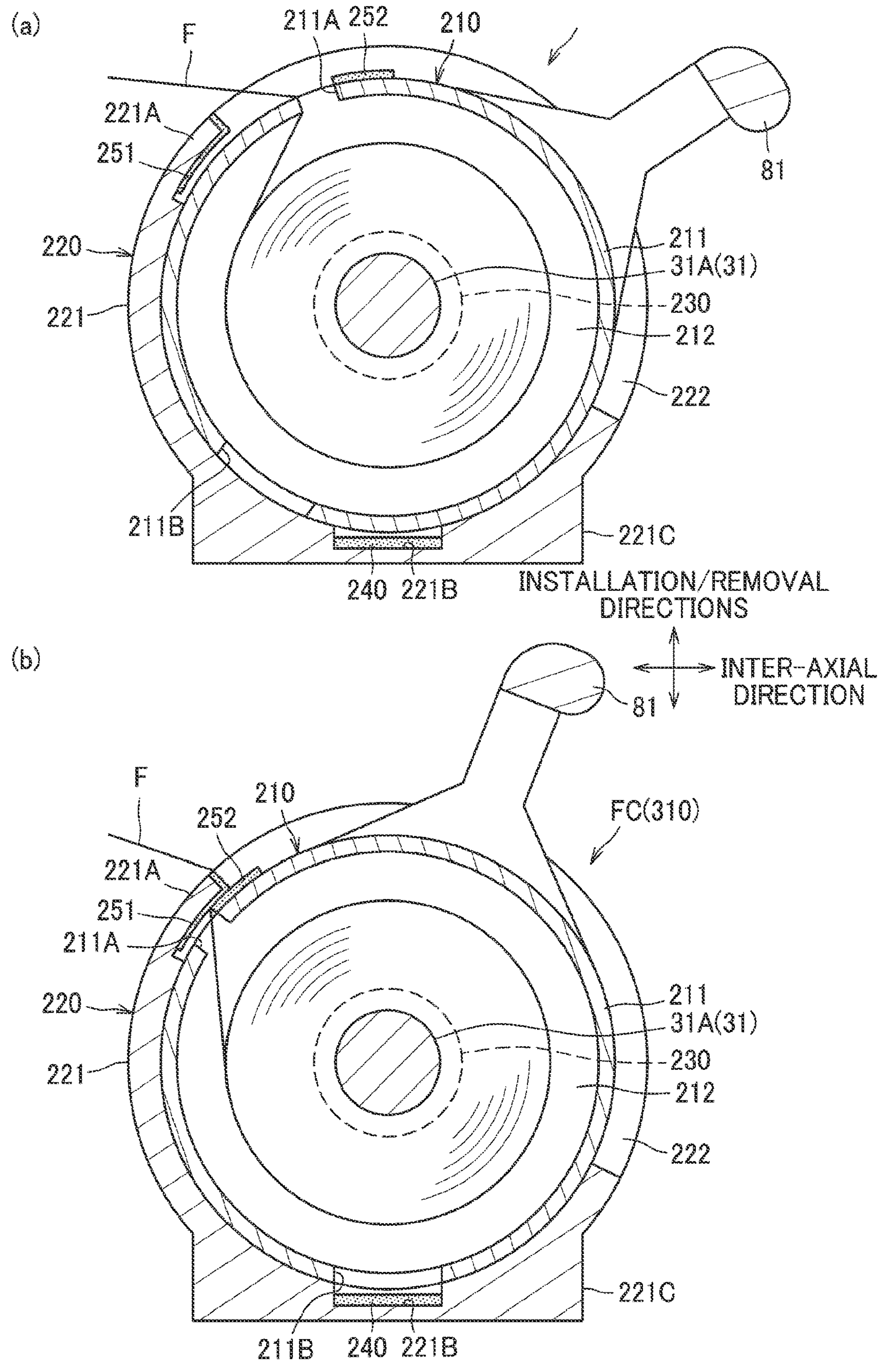
FIG. 26 shows section views of a supply unit, including a view (a) in which the cover member is in the open position; and a view (b) in which the cover member is in the close position.

As shown in FIG. 25 and FIG. 26, the supply unit 310 of the multilayer film cartridge FC mainly includes a supply reel 31, a container member 210, and a cover member 220.

The container member 210 is a member that houses the supply reel 31; it is made of plastic or the like, and formed substantially in the shape of a hollow circular cylinder. To be more specific, the container member 210 houses the multilayer film F wound on the supply shaft 31A of the supply reel 31 inside. The container member 210 includes a cylindrical wall 211 substantially in the shape of a circular cylinder, and a pair of side walls 212.

The cylindrical wall 211 has a supply opening 211A and an uncovering opening 211B. The supply opening 211A is an opening through which the multilayer film F wound on the supply reel 31 is allowed to be drawn out to the outside. The handle 81 protrudes from the outer peripheral surface of the cylindrical wall 211 (container member 210) in a direction transverse, specifically, a direction perpendicular, to the rotation axis X1.

The side walls 212 are walls by which the supply shaft 31A is rotatably supported, and are so provided as to close the ends of the cylindrical wall 211 facing in the axial directions. Similar to the third embodiment described above, the supply shaft 31A of the supply reel 31 has its both ends protruding through the side walls 212 to the outside of the container member 210, and the layer transfer film cartridge FC includes end seal members 230 each formed substantially in the shape of a circular cylinder that seal clearances between the supply shaft 31A and the side walls 212. The end seal members 230 are composed of elastic bodies made of polyurethane, or the like, and provided at one end and at the other end, respectively, of the supply shaft 31A.

The cover member 220 is a member with which the supply opening is openably closeable, and is made of plastic or the like. The cover member 220 includes an arcuate wall 211 substantially in a shape of a semicylinder, and a pair of holding portions 222 provided at both ends of the arcuate wall 211 facing in the axial directions. The arcuate wall 211 includes a cover portion 221A with which the supply opening 211A is closed and opened, a recessed portion 221B in which a drying agent 240 is located, and a to-be-restrained portion 221C that engages with a restraining recess 21B (see FIG. 28) of the housing main body 21 when the layer transfer film cartridge FC is installed in the housing main body 21. The holding portions 222 hold one end and the other end of the container member 210 which are located apart from each other in the axial directions, in such a manner that renders the container member 210 rotatable.

The cover member 220 is provided movably relative to the container member 210. To be more specific, the cover member 220 is provided rotatably relative to the container member 210 between an open position shown in FIG. 26(*a*) in which the supply opening 211A is opened and a close position shown in FIG. 26(*b*) in which the cover member 221 is closed and covered with the cover member 221A. In the present embodiment, a user grasps the first handle 81 and causes the container member 210 to be rotated relative to the cover member 220 so that the cover member 220 is moved between the open position and the close position relative to the container member 210.

The cover member 220 includes a first seal member 251, and the container member 210 includes a second seal member 252. The first seal member 251 and the second seal member 252 are each composed of an elastic body, and formed in the shape of a long plate elongate in the axial direction. The elastic body of which the first seal member 251 and the second seal member 252 are composed is a material having elasticity and a high slipperiness with the multilayer film F. The elastic body is, for example, made of polyurethane.

The first seal member 251 is so located as to extend from an end face to an inner surface of the cover member 221A, and fixed to the cover portion 221 with an adhesive, or the like. The second seal member 252 is located at an edge portion of a peripheral edge of the supply opening 211A, which is the portion farther than other portions of the peripheral edge, from the take-up reel 35.

Figure 27:
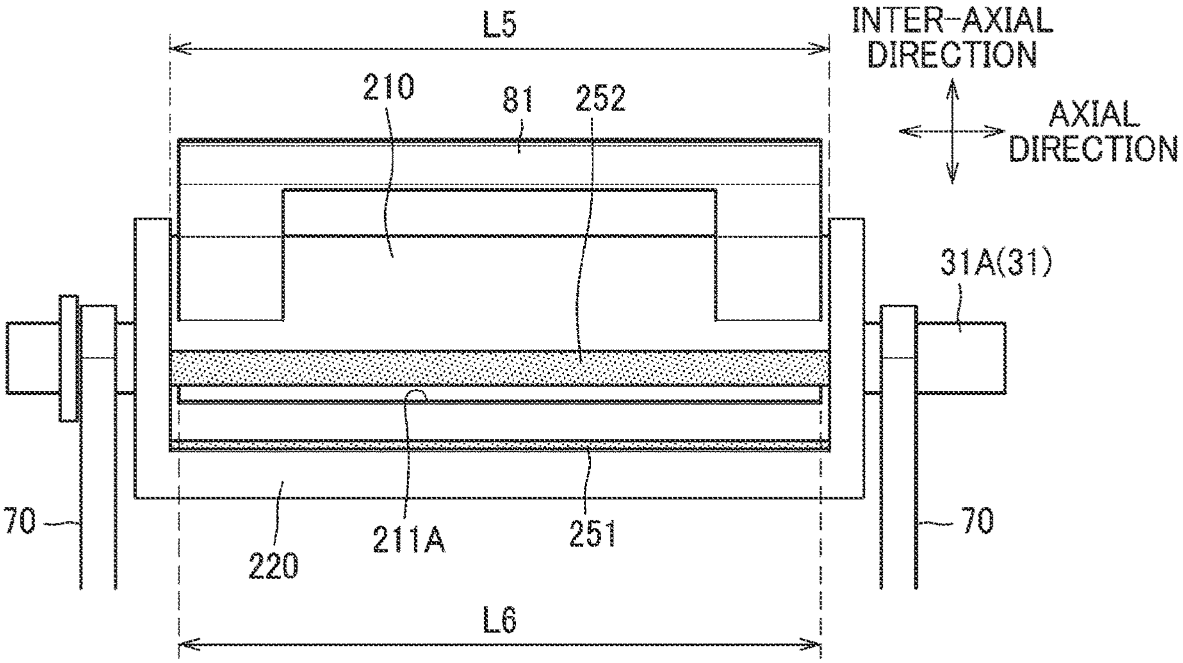
FIG. 27 is a plan view showing a relationship between a seal member and a supply opening.

As shown in FIG. 27, the first seal member 251 and the second seal member 252 have dimensions L5 in the axial direction, which are greater than a dimension L6 of the supply opening 211A in the axial direction. It is to be understood that the dimension of the first seal member 251 in the axial direction may be the same as or different from the dimension of the second seal member 252 in the axial direction.

As shown in FIG. 26(*b*), the cover member 220 is provided in such a manner that when the supply opening 211A is closed, the multilayer film F drawn out through the supply opening 211 is nipped between the container member 210 and the cover member 220. To be more specific, when the supply opening 211A is closed with the cover member 220, the first seal member 251 of the cover member 220 is in contact with the multilayer film F. In this state where the supply opening 211A is closed with the cover member 220, the second seal member 252 of the container member 210 is also in contact with the multilayer film F, so that the multilayer film F drawn out through the supply opening 211A is nipped between the second seal member 252 and the first seal member 251.

When the supply opening 211A is closed with the cover member 220, the first seal member 251 contacts the peripheral edge of the supply opening 211A of the container member 210. To be more specific, the first seal member 251 contacts a portion of the peripheral edge having the second seal member 252 fixed thereto with the multilayer film F and the second seal member 252 interposed therebetween.

The layer transfer film cartridge FC further includes a drying agent 240. The drying agent 240 is, for example, of silica gel, and located in a recess 221B formed in the cover member 220. The drying agent 240 is fixed so as not to move relative to the cover member 220. When the cover member 220 is in the close position in which the supply opening 211A is closed therewith, the recess 221B is in such a position as to overlap the uncovering opening 211B in the direction of rotation of the supply reel 31. Therefore, when the cover member 220 is in the close position, the drying agent 240 is uncovered through the uncovering opening 211B, and thereby located in the same space as a space in which the multilayer film F wound on the supply reel 31 is located.

Figure 28:
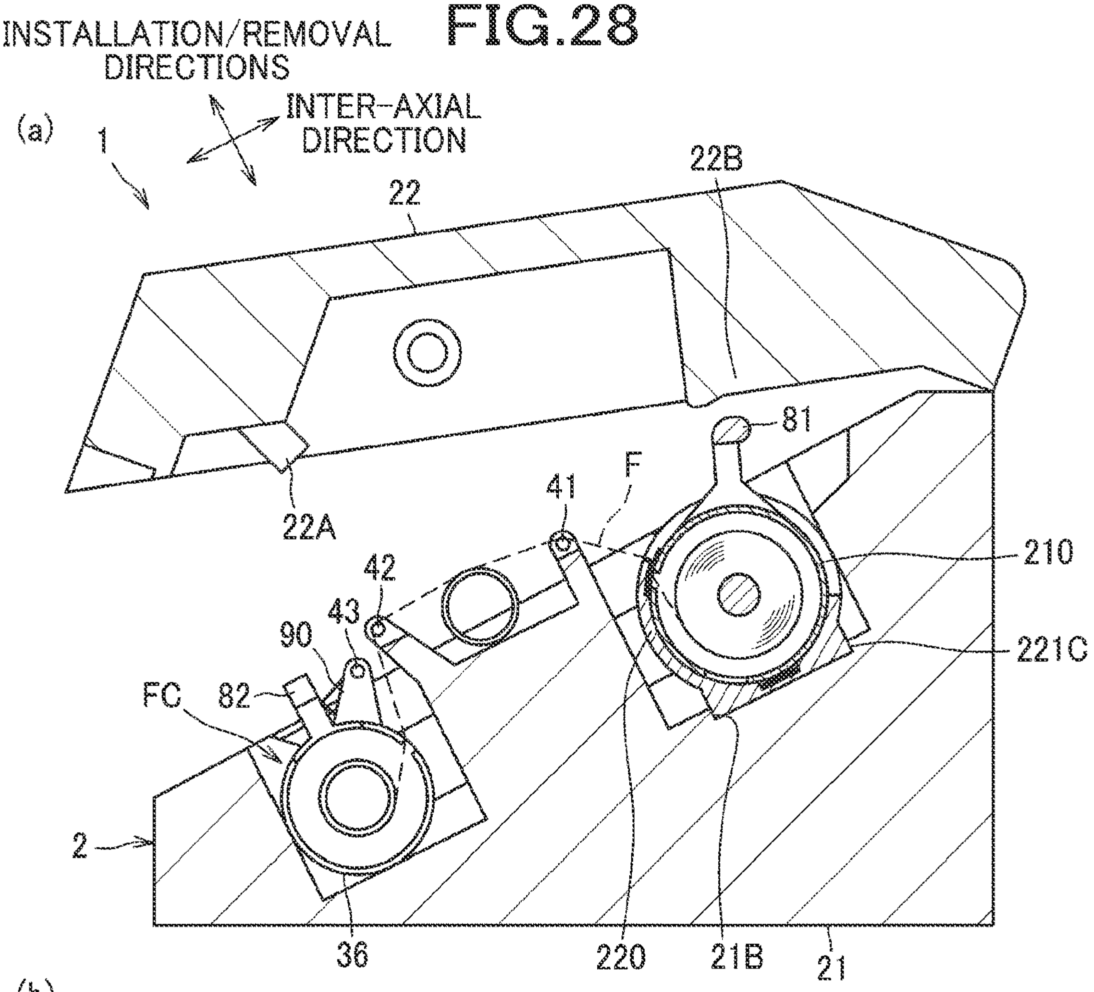
FIG. 28 includes section views (a), (b) showing a motion of the cover member moving relative to a container member in synchronization with an operation for closing a housing cover.
Figure 28:
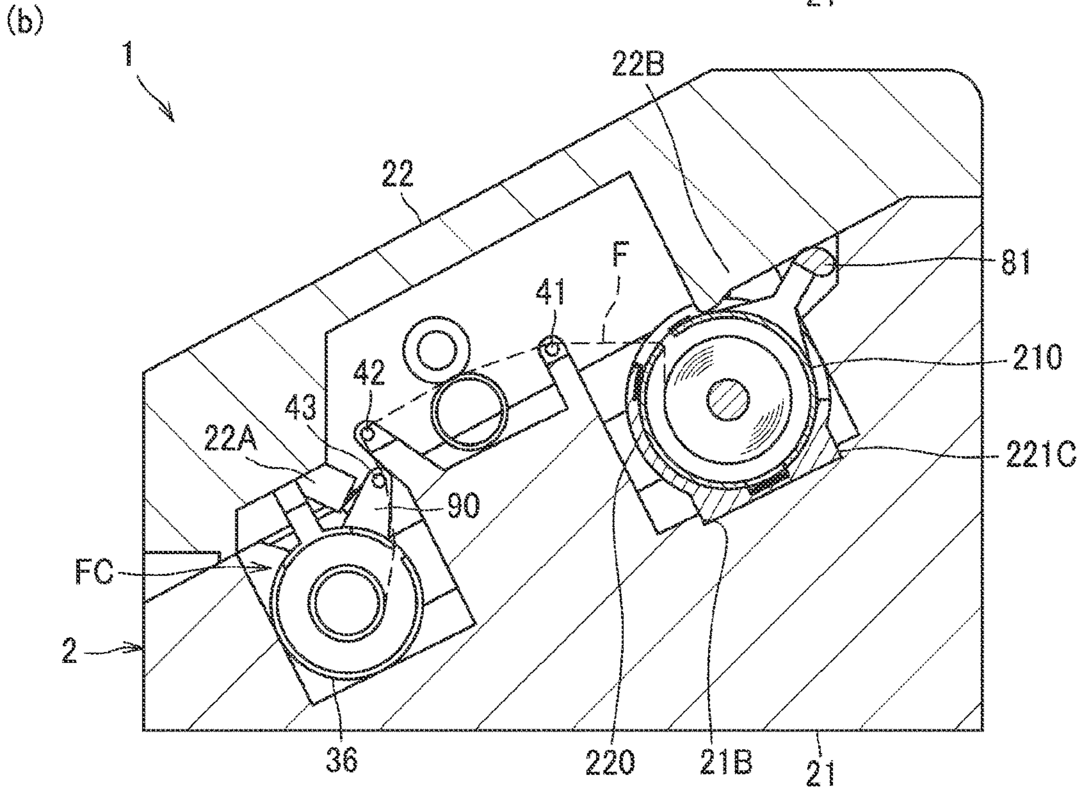

As shown in FIG. 28, the housing cover 22 includes a cartridge pressing portion 22B which causes the container member 210 to move relative to the cover member 220 from the close position shown in FIG. 25(*b*) and FIG. 28(*a*) to the open position shown in FIG. 25(*a*) and FIG. 28(*b*). The cartridge pressing portion 22B is formed integral with the housing cover 22 in one piece, and configured to press part of the layer transfer film cartridge FC when the housing cover 22 is closed. To be more specific, when the layer transfer film cartridge FC is installed in the housing main body 21, the cartridge pressing portion 22B is located in such a position that the cartridge pressing portion 22B is contactable with the first handle 81. Accordingly, the cartridge pressing portion 22B is capable of pressing the first handle 81 as part of the layer transfer film cartridge FC, when the housing cover 22 is closed.

Next, a description will be given of the operation and advantageous effects of the layer transfer device 1 according to the fourth embodiment.

As shown in FIG. 28(*a*), when a user grasps the first handle 81 and the second handle 82 and installs a layer transfer film cartridge FC into the housing main body 21, the to-be-restrained portion 221C of the cover member 220 engages with the restraining recess 21B provided in the housing main body 21. Accordingly, the cover member 220 is restrained in its position relative to the housing main body 21, so that the cover member 220 is made immovable relative to the housing 2.

Thereafter, as the user is closing the cover 22, the cartridge pressing portion 22B comes in contact with the first handle 81 provided at the container member 210. As the user is further closing the housing cover 22, the cartridge pressing portion 22B presses the first handle 81, and the container member 210 thereby rotates in the clockwise direction in the drawing. Accordingly, the cover member 220 moves relative to the container member 210 from the close position to the open position. Thereafter, when the housing cover 22 is closed completely as shown in FIG. 28(*b*), the cover member 220 is in the close position relative to the container member 210.

It is to be understood that, as is the case with the first embodiment and the third embodiment, the shaft 43 positioned in the first position shown in FIG. 28(*a*) is pressed by the pressing member 22A of the housing cover 22 and moves to the second position shown in FIG. 28(*b*).

When the layer transfer film cartridge FC is removed from the housing 2, a user opens the housing cover 22, then rotates the support member 90 with his/her hand to cause the shaft 43 to move from the second position to the first position, and rotates the first handle 81 with his/her hand in the counterclockwise direction in the drawing. Accordingly, the container member 210 rotates in the counterclockwise direction in the drawing, and the cover member 220 moves relative to the container member 210 from the open position toward the close position. Subsequently, after the cover member 220 comes in the close position relative to the container member 210, the user holds the first handle 81 and the second handle 82 and draws out the layer transfer film cartridge FC, so that the layer transfer film cartridge FC can be removed from the housing main body 21.

As shown in FIG. 26(*b*), when the cover member 220 has moved to the close position, the supply opening 211A is closed with the multilayer film F being nipped between the second seal member 252 of the container member 210 and the first seal member 251 of the cover member 250, so that the inside space of the container member 210 is hermetically sealed. Moreover, when the cover member 220 has moved to the close position, the drying agent 240 is uncovered through the uncovering opening 211B, and thus made able to absorb water vapor inside the container member 210.

In the fourth embodiment, with the configurations described above, the following advantageous effects can be achieved.

Since the supply opening 211A of the container member 210 can be covered with the cover member 220 and the container member 210 can thereby be hermetically sealed, entry of water vapor into the container member 210 can be restricted, so that the degradation of the multilayer film F can be suppressed.

Since the cover member 220 includes the first seal member 251 composed of an elastic body which contacts the multilayer film F, the multilayer film F can be protected more effectively in comparison, for example, with an alternative configuration in which the cover portion 221 directly contacts the multilayer film F.

Since the first seal member 251 contacts the peripheral edge of the supply opening 211 when the supply opening 211A is closed with the cover member 220, the hermetic sealing performance of the container member 210 can be enhanced. Accordingly, the degradation of the multilayer film F can be suppressed more effectively.

Since the container member 210 includes a second seal member 252 composed of an elastic body and configured to nip the multilayer film F in combination with the first seal member 251, the multilayer film F can be protected more effectively in comparison with an alternative configuration in which a member for nipping the multilayer film F is not composed of an elastic body.

Since the layer transfer film cartridge FC includes an end seal member 230 that seals clearances between the supply shaft 31A of the supply reel 31 and the sidewall 212 of the container member 210, the sealing performance of the container member 210 can be enhanced. Accordingly, the degradation of the multilayer film F can be suppressed more effectively.

Since the layer transfer film cartridge FC includes the drying agent 240 located in the same space as the space in which the multilayer film F wound on the supply reel 31 is located when the cover member 220 is positioned in the close position, increase in humidity in the space in which the multilayer film F is located (inside the container member 210) can be restrained. Accordingly, the degradation of the multilayer film F can be suppressed more effectively.

Since the layer transfer film cartridge FC after installed in the housing main body 21 until a user closes the housing cover 22 has the cover member 220 positioned in the close position, the container member 210 is hermetically sealed, and the degradation of the multilayer film F can be suppressed. Since the user closing the cover causes the cover member 220 to automatically move from the close position to the open position by the action of the cartridge pressing portion 22B, forgetting about closing the cover member 220 can be prevented.

The layer transfer film cartridge FC in the present embodiment is configured such that a user, after opening the housing cover 22, rotates the first handle 81 by his/her hand to thereby cause the cover member 220 to move from the open position to the close position, but this is not a prerequisite. For example, the layer transfer film cartridge FC may include a biasing member that biases and causes the container member 210 to rotate relative to the cover member 220 in a counterclockwise direction in FIG. 28, such that when the housing cover 22 is opened, the container member 210 automatically rotates and the cover member 220 automatically moves from the open position to the close position.

In the present embodiment, the drying agent 240 is located in the same space as the space in which the multilayer film F wound on the supply reel 31 is located, only when the cover member 220 is positioned in the close position, but this is not a prerequisite. The drying agent may, for example, be located in the container member. In other words, the drying agent may be located, not only when the cover member is positioned in the close position but always, in the same space as the space in which the multilayer film wound on the supply reel is located.

In the present embodiment, the housing 2 includes the cartridge pressing portion 22B provided at the housing cover 22, and the operation of closing the housing cover 22 causes the cover member 220 to move from the close position to the open position, but this is not a prerequisite. For example, the housing and the layer transfer film cartridge may have such a structure which acts on the layer transfer film cartridge to cause the cover member to move from the close position to the open position in response to the operation of installing the layer transfer film cartridge into the housing main body or in response to the operation of closing the housing cover after the layer transfer film cartridge is installed in the housing main body, and which acts on the layer transfer film cartridge to cause the cover member to move from the open position to the close position in response to the operation of opening the housing cover, or in response to the operation of removing the layer transfer film cartridge from the housing main body.

Next a fifth embodiment is described below.

Figure 29:
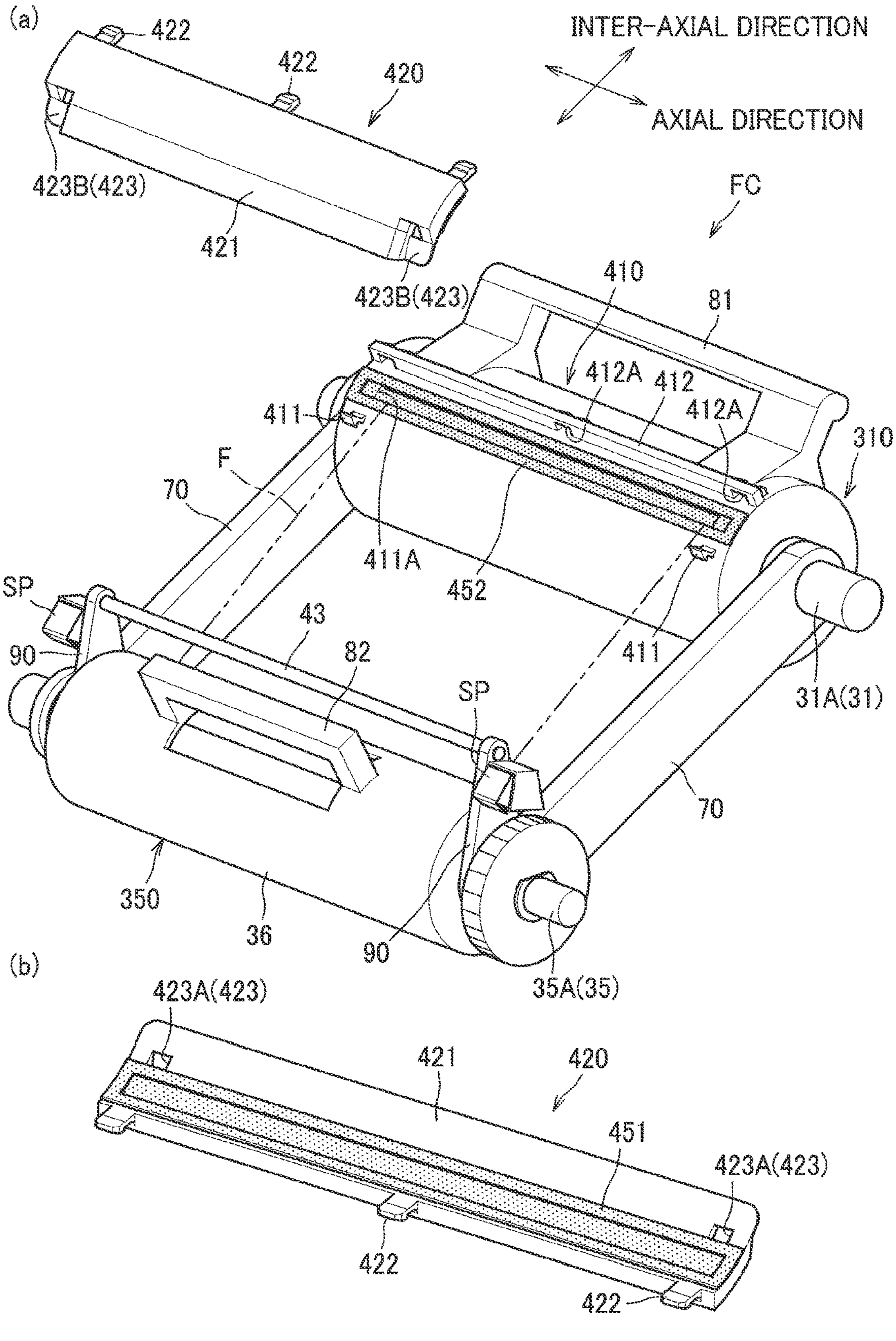
FIG. 29 includes: a perspective view (a) showing a layer transfer film cartridge according to a fifth embodiment with a cover member detached therefrom; and a perspective view (b) showing the cover member.

As shown in FIG. 29, the supply unit 310 of the layer transfer film cartridge FC mainly includes a supply reel 31, a container member 410, and a cover member 420.

The container member 410 is a member that houses the supply reel 31, and is made of plastic, and formed substantially in a shape of a hollow circular cylinder. The container member 410 has a supply opening 411A through which to draw out the multilayer film F wound on the supply reel 31, to the outside.

Figure 30:
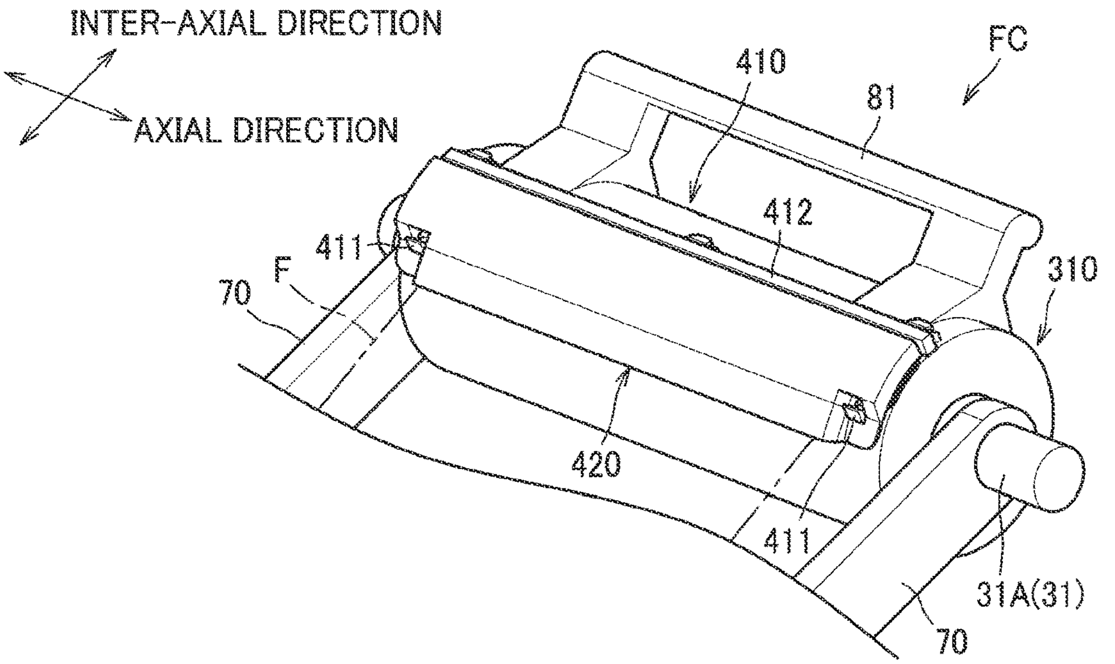
FIG. 30 is a perspective view showing a supply unit with the cover member attached thereto.

The cover member 420 is a member that can open and close the supply opening 411A, and is made of plastic, or the like. The cover member 420 is attachable to and detachable from the container member 410, and is so provided as to cover the supply opening 411 when attached to the container member 410 as shown in FIG. 30. The cover member 420 is attachable to and detachable from the container member 410 by means of a snap-fit structure.

Figure 31:
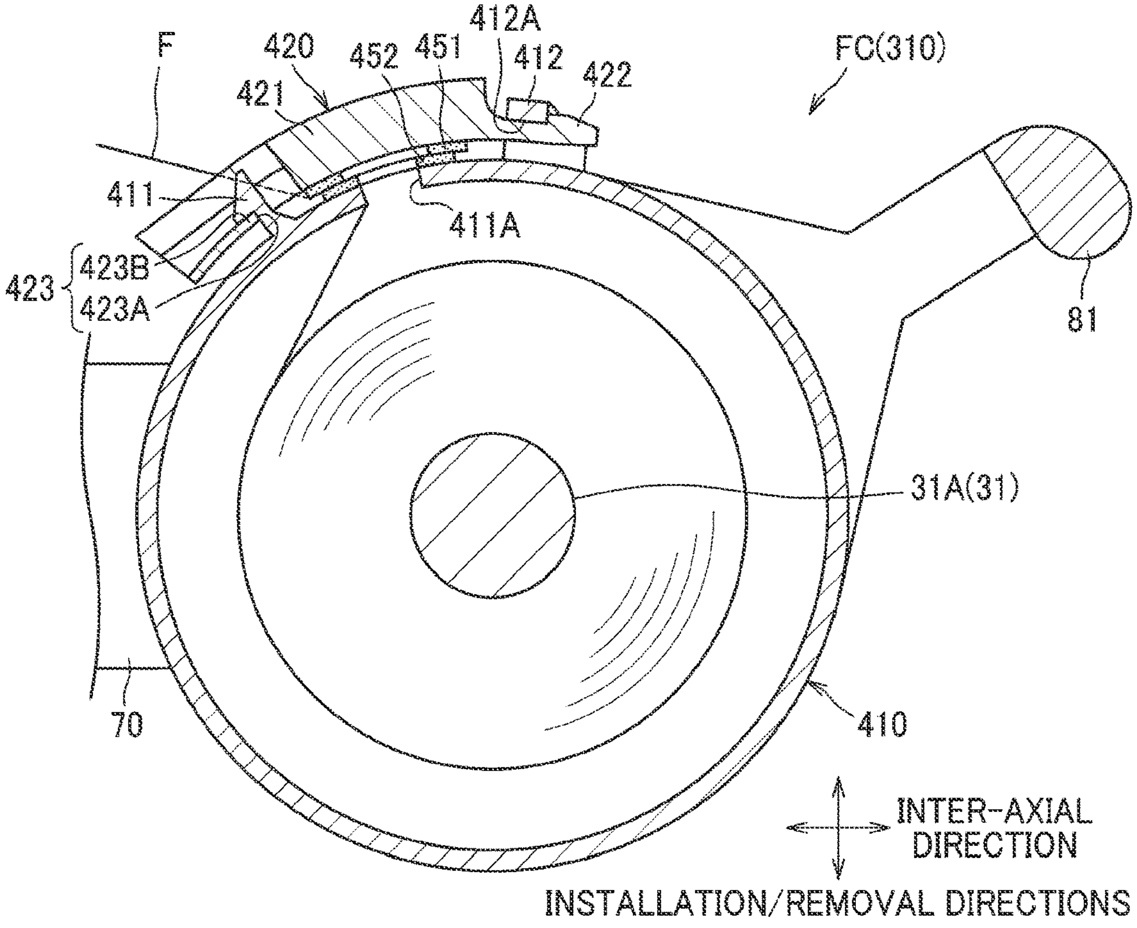
FIG. 31 is a section view showing the supply unit with the cover member attached thereto.

To be more specific, as shown in FIG. 29 and FIG. 31, the container member 410 includes two hook portions 411 and a cover retainer portion 412, which are so provided as to protrude from its outer peripheral surface. On the other hand, the cover member 420 includes a cover main body 421, three claw portions 422, and two hook retainer portions 423.

The hook portions 411 are provided in positions closer, than the supply opening 411A, to the take-up reel 35 on the outer peripheral surface of the container member 410. The hook portions 411 are elastically flexible along the direction of rotation of the supply reel 31. The hook portions 411 are provided one on each outer side of the multilayer film F. Thus, the multilayer film F stretched between the supply unit 310 and the take-up unit 350 is positioned between the two hook portions 411 in the axial direction.

The cover retainer portion 412 is provided in a position farther, than the supply opening 411A, from the take-up reel 35 on the outer peripheral surface of the container member 410. The cover retainer portion 412 is formed in a shape elongate in the axial direction. The cover retainer portion 412 has engageable holes 412A provided at three spots in both end portions and a central portion arranged in the axial direction, and configured to engage with the claw portions 422 of the cover member 420.

The cover main body 421 is a portion that covers and closes the supply opening 411A when the cover member 420 is attached to the container member 410, and is formed substantially in a shape of a long plate elongate in the axial direction. The claw portions 422 protrude from three spots at both end portions and a central portion arranged in the axial direction on the cover main body 421.

The hook retainer portion 423 is a portion with which the hook portions 411 are engaged, and includes insertion holes 423A through which the hook portions 411 pass, and retainer portions 423B which define part of peripheral edges of the insertion holes 423A and on which the hook portions 411 are hooked.

The cover member 420 includes a first seal member 451, and the container member 410 includes a second seal member 452. The first seal member 451 and the second seal member 452 are each composed of an elastic body and formed in a shape of long rectangular window frame elongate in the axial direction. The elastic body of which the first seal member 451 and the second seal member 452 are composed is a material having elasticity and a high slipperiness with the multilayer film F. The elastic body is, for example, made of polyurethane.

The second seal member 452 is so located at a peripheral edge of the supply opening 411A of the container member 410 as to surround the supply opening 411A, and fixed to the peripheral edge of the supply opening 211A with an adhesive, or the like. The first seal member 251 is so located as to surround a portion of the cover main body 421 opposed to the supply opening 411, and fixed to the cover main body 421 with an adhesive, or the like.

As shown in FIG. 31, the cover member 420, when attached to the container member 410 and closing the supply opening 411A, nips in combination with the container member 410 the multilayer film F drawn out through the supply opening 411 between the container member 410 and the cover member 420. To be more specific, when the supply opening 411A is closed with the cover member 420, the first seal member 451 of the cover member 420 is in contact with the multilayer film F. At the same time when the supply opening 411A is closed with the cover member 420, the second seal member 452 of the container member 410 is in contact with the multilayer film F, so that the multilayer film F drawn out through the supply opening 411A is nipped between the second seal member 452 and the first seal member 451.

In addition, when the supply opening 411A is closed with the cover member 420, the first seal member 451 is in contact with the peripheral edge of the supply opening 411A of the container member 410. To be more specific, the first seal member 451 is in contact with the entire peripheral edge of the supply opening 211A with the multilayer film F and the second seal member 452 interposed therebetween.

Next, a description will be given of the operation and advantageous effects of the layer transfer film cartridge FC according to the fifth embodiment.

To attach the cover member 420 to the container member 410, a user engages the three claw portions 422 of the cover member 420 with the corresponding engageable holes 412A provided on the cover retainer portions 412 of the container member 410, and the two hook portions 411 of the container member 410 are inserted through the insertion holes 423A of the cover member 420 and hooked on the retainer portions 423B. In this way, the cover member 420 can be attached to the container member 410. At this time, the first seal member 451 and the second seal member 452 nip and contact the multilayer film F, respectively, in a hermetic manner as being compressed between the cover member 420 and the container member 410.

To detach the cover member 420 from the container member 410, a user pushes and inflects the hook portions

411 of the container member 410 toward the supply opening 411A, and releases the engagement of the hook portions 411 with the retainer portions 423B. Then, the end portion of the cover member 420 is pushed upward by the restoring forces of the compressed first seal member 451 and second seal member 452, and the hook portions 411 are disengaged from the hook retainer portions 423. Thereafter, the user pulls the cover member 420 and pulls out claw portions 422 from the engageable holes 412A of the cover retainer portions 412, and thus can detach the cover member 420 from the container member 410.

Then, the layer transfer film cartridge FC from which the cover member 420 is detached is installed into the housing main body 21 (see FIG. 21), and the housing cover 22 is closed, so that the layer transfer device 1 can be made ready for layer transfer.

In the present embodiment, with the configurations described above, the following advantageous effects can be achieved.

Since the container member 410 can be hermetically sealed by covering the supply opening 411A of the container member 410 with the cover member 420, entry of water vapor into the container member 410 can be restricted, and thus the degradation of the multilayer film F can be suppressed.

Since the first seal member 451 contacts the entire peripheral edge of the supply opening 411A, the hermetic sealing performance of the container member 410 can be enhanced; thereby, the degradation of the multilayer film F can be suppressed more effectively.

Since the cover member 420 includes the first seal member 451, the multilayer film F can be protected. Moreover, since the container member 410 includes the second seal member 452 that nips the multilayer film F in combination with the first seal member 451, the multilayer film F can be protected.

It is to be understood that the layer transfer film cartridge FC in the present embodiment may, similar to the embodiments described previously, comprise an end seal member and/or a drying agent.

It is also to be understood that the snap-fit structure as described in the present embodiment is exemplary only, and various other structures may be feasible. The snap-fit structure may, for example, be a structure such that a hook portion provided in the cover member engages with a hole or the like provided in the container member. Although the cover member 420 in the present embodiment is attachable to and detachable from the container member 410 by means of a snap-fit structure, this is not a prerequisite; for example, the cover member may be attachable to and detachable from the container member by an adhesive agent provided on the cover member to provide repeatable peel and stick features.

The third embodiment to the fifth embodiment have been described above, and these embodiments may be modified where appropriate and implemented in various forms as will be described below by way of example.

In the third embodiment and the fourth embodiment, the layer transfer film cartridge FC includes end seal members 130, 230; however, this is not a prerequisite. For example, the end seal member may not be provided as long as structures with high hermetic sealing performance provided between the shaft of the supply reel and the side wall of the container member, or structures with the shaft end portions not protruding through the side wall to the outside are provided.

The layer transfer film cartridges FC in the third embodiment and the fourth embodiment include the drying agents 140, 240; however, this is not a prerequisite. For example, a structure including a container member with high hermetic sealing performance ensured sufficiently by any sealing structure or the like may obviate the necessity for a drying agent.

In the fourth embodiment and the fifth embodiment, the cover member includes the first seal member and the container member includes the second seal member, but this is not a prerequisite. For example, if provision of either one of the first seal member and the second seal member can ensure the hermetic sealing performance of the container member, the other may be omitted. Alternatively, if a structure which can ensure the hermetic sealing performance of the container member by the cover member in a closed state without having any seal member is implemented, both of the first seal member and the second seal member may be omitted.

In the above-described embodiments, the container member is exemplified by a member such as the supply case 232 of a hard material formed substantially in the shape of a hollow circular cylinder; however, this is not a prerequisite. The container member may be configured, for example, as a soft bag-like member made of plastic, such as a container bag 510 shown in FIG. 32.

Figure 32:
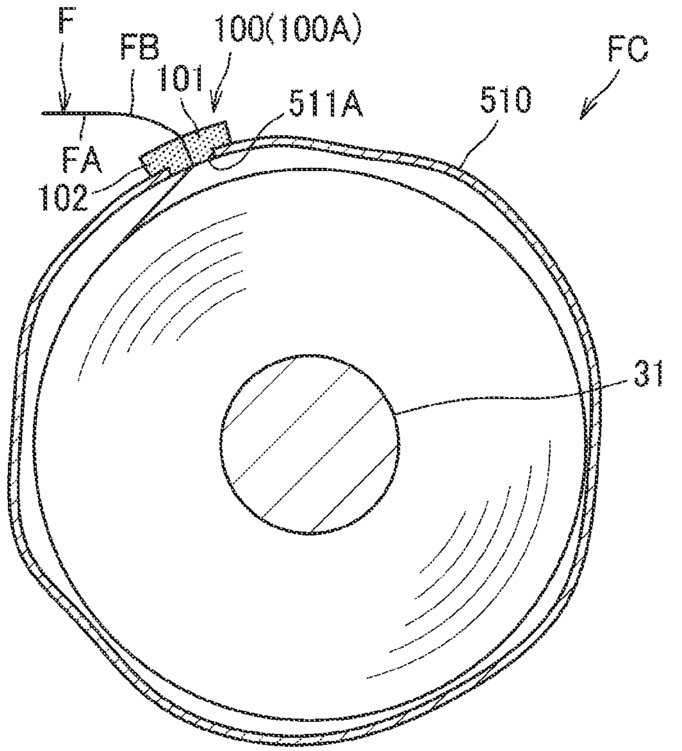
FIG. 32 is a section view showing a layer transfer film cartridge according to a modified example.
Figure 33:
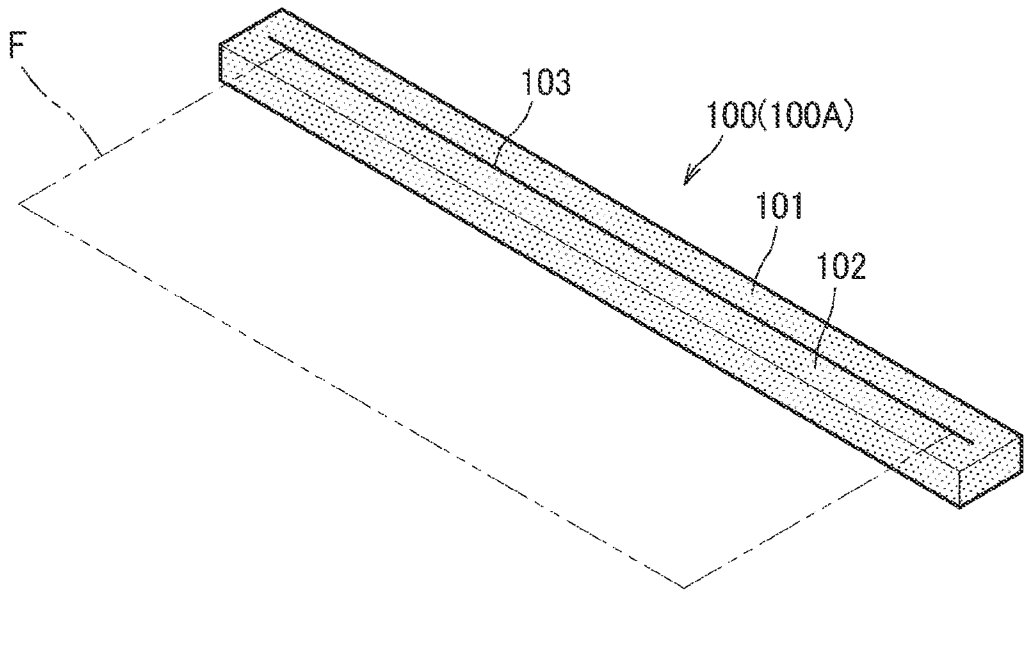
FIG. 33 is a diagram showing a modified example of a seal structure.

In contrast to the configuration of the third embodiment in which the seal structure 100 comprises two opening seal members 110, 123 (see FIG. 22), a seal structure 100 of the layer transfer film cartridge FC shown in FIG. 32 is configured to comprise a single opening seal member 100A so provided as to seal a supply opening 511A of the container bag 510. To be more specific, as shown in FIG. 33, the opening seal member 100A has a slit 103 through which to pass the multilayer film F.

This seal structure 100 (opening seal member 100A) includes a first contact portion 101 and a second contact portion 102 provided with the slit 103 located therebetween, and configured to have the multilayer film F nipped, and allowed to be drawn out through, between the first contact portion 101 and the second contact portion 102. As shown in FIG. 32, the first contact portion 101 contacts the second surface FB of the multilayer film F, and the second contact portion 102 contacts the first surface FA of the multilayer film F.

In the above-described embodiments, the layer transfer film cartridge FC includes the supply reel 31 and the take-up reel 35; however, this is not a prerequisite. A layer transfer film cartridge FC may be configured, for example, as shown in FIG. 32, to include a supply reel 31, but not include a take-up reel.

Next, a detailed description will be given of a sixth embodiment with reference made mainly to FIGS. 34 to 39. In the following description, elements having substantially the same structural features as those of the first embodiment will be designated by the same reference characters, and a description thereof will be omitted.

Figure 34:
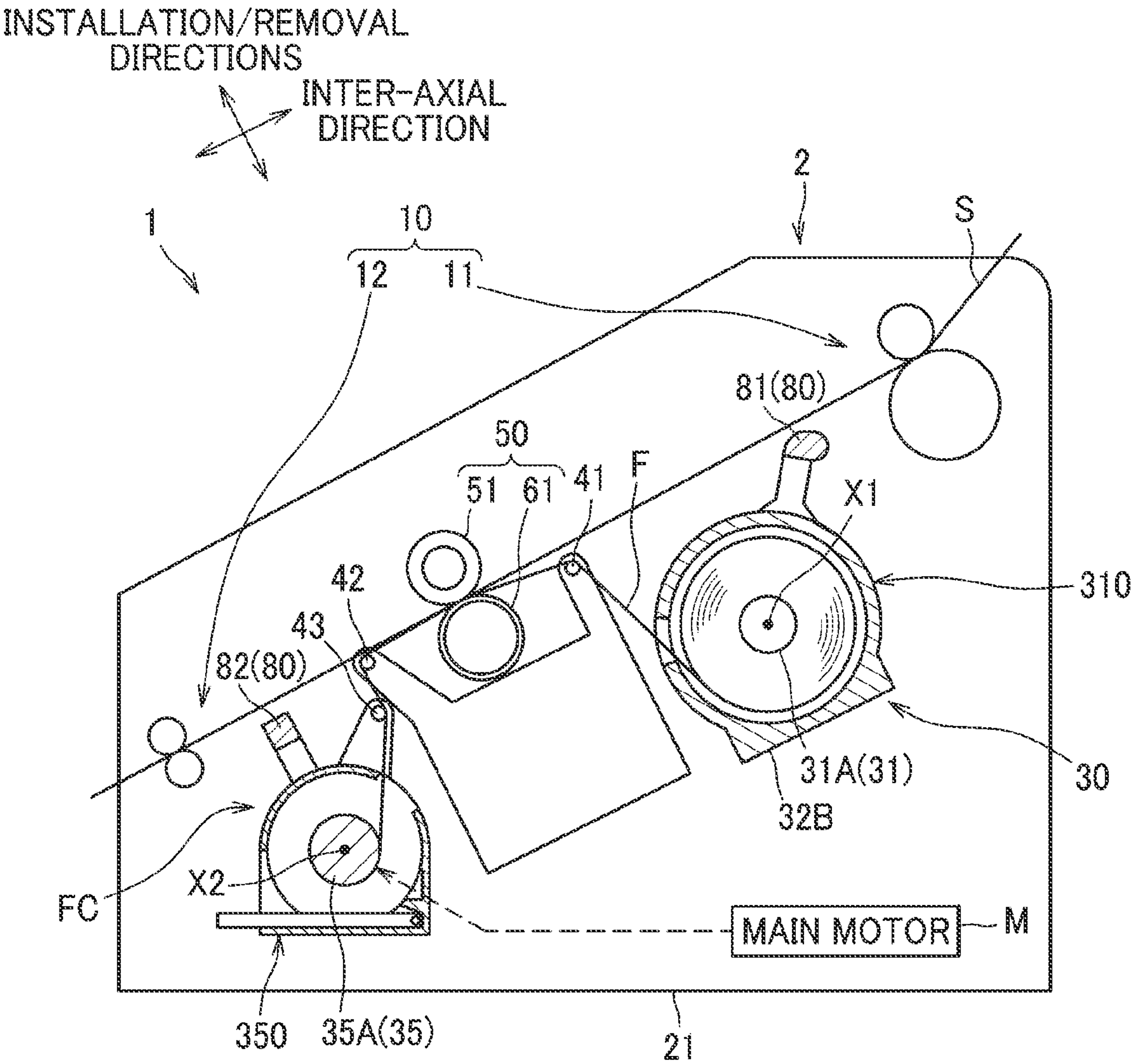
FIG. 34 is a diagram showing a layer transfer device according to a sixth embodiment.

As shown in FIG. 34, a layer transfer device 1 includes a housing 2, a sheet conveyor unit 10, a film supply unit 30, and a transfer unit 50. The film supply unit 30 includes a layer transfer film cartridge FC, a first guide shaft 41, a second guide shaft 42, and a main motor M as a driving source.

Figure 35:
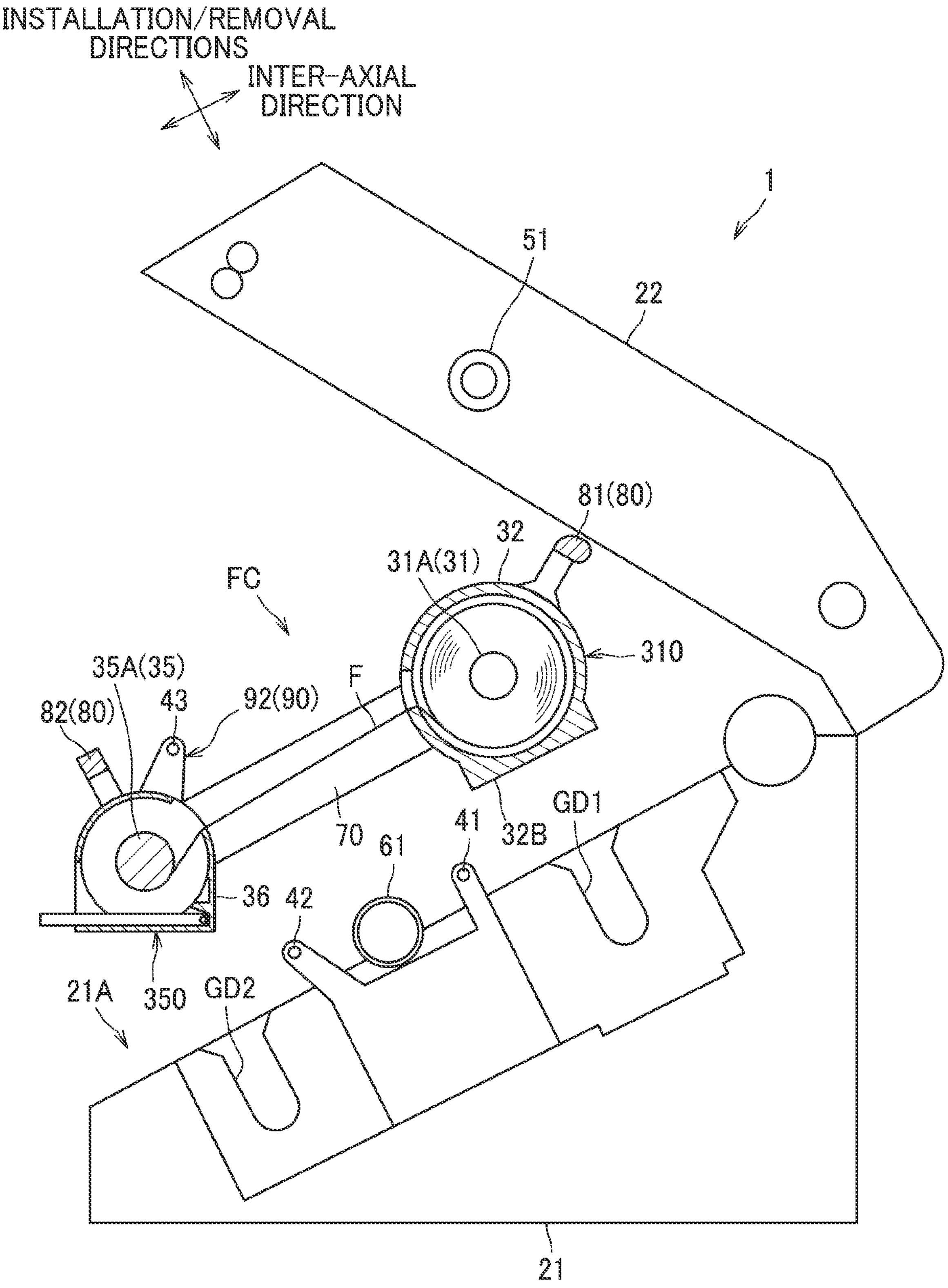
FIG. 35 is a diagram showing a state of the layer transfer device with a housing cover opened and a layer transfer film cartridge is taken out therefrom.

As shown in FIG. 35, the layer transfer film cartridge FC is configured to be installable into and removable from the housing main body 21 through the housing opening 21A. The layer transfer film cartridge FC is a cartridge that supports a multilayer film F consisting of a plurality of layers as shown in FIG. 1(*b*). The layer transfer film cartridge FC mainly includes a supply unit 310, a take-up unit 350, and a shaft 43. The supply unit 310 mainly includes a supply reel 31. The take-up unit 350 mainly includes a take-up reel 35. The multilayer film F is wound on the supply reel 31.

It is to be understood that the layer transfer film cartridge FC in a brand-new condition (i.e., a condition in which its multilayer film F wound on the supply reel 31 in the supply case 32 as will be described later has not been used at all) has the multilayer film F wound on the supply reel 31 in a roll of a maximum diameter, while no multilayer film F is wound on the take-up reel 35, or the multilayer film F is wound on the take-up reel 35 but in a roll of a minimum diameter. In other words, when the layer transfer film cartridge FC is in a brand-new condition, the remaining amount of the multilayer film F as an amount of unused multilayer film F remaining wound in the supply case 32 is the largest. When the layer transfer film cartridge FC is at the end of its life (i.e., the multilayer film F in the supply case 32 has been exhausted for layer transfer), the multilayer film F is wound on the take-up reel 35 in a roll of a maximum diameter, while no multilayer film F is wound on the supply reel 31, or the multilayer film F is wound on the supply reel 31 but in a roll of a minimum diameter. In other words, when the multilayer film cartridge FC is at the end of its life, the remaining amount of the multilayer film F is the smallest.

Figure 36:
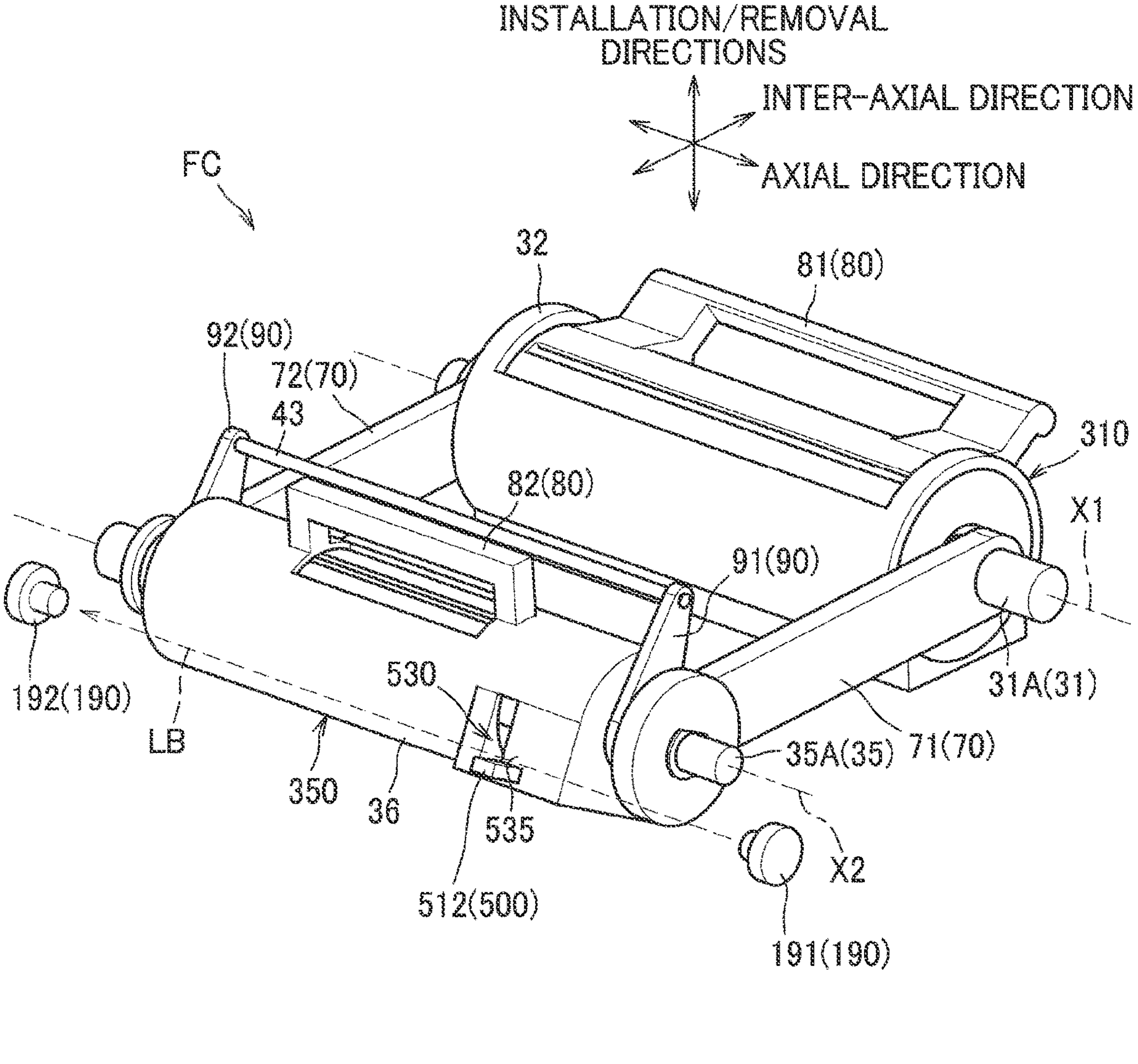
FIG. 36 is a perspective view showing the layer transfer film cartridge.

As shown in FIG. 36, the layer transfer film cartridge FC includes, in addition to the supply unit 310, the take-up unit 350 and the shaft 43 described above, a connecting portion 70, and a handle 80. The supply unit 310 includes, in addition to the supply reel 31 described above, a supply case 32. The take-up unit 350 includes, in addition to the take-up reel 35 described above, a take-up case 36, and a support member 90.

The supply case 32 is engaged with or fixed to the connecting portion 70 so as not to rotate on the rotation axis X1 relative to the connecting portion 70. The supply case 32 has a flat surface 32B provided in part of an outer peripheral surface thereof. In the present embodiment, the flat surface 32B extends in the axial direction and in the inter-axial direction. With the flat surface 32B in contact with a flat surface portion of the housing main body 21, the layer transfer film cartridge FC is supported by the housing main body 21 (see FIG. 34).

The support member 90 is a member that supports the shaft 43. The support member 90 includes a first side plate 91 and a second side plate 92. In the present embodiment, the first side plate 91 and the second side plate 92 are swingably connected to the take-up case 36. Therefore, when the layer transfer film cartridge FC is installed or removed, the first side plate 91 and the second side plate 92 are swung, to allow the shaft 43 to steer around the second guide shaft 42.

The layer transfer film cartridge FC is configured to be installable into and removable from the housing main body 21 in a predetermined direction perpendicular to the axial direction and to the inter-axial direction. In the present embodiment, this predetermined direction is also called "installation/removal direction(s)".

Figure 37:
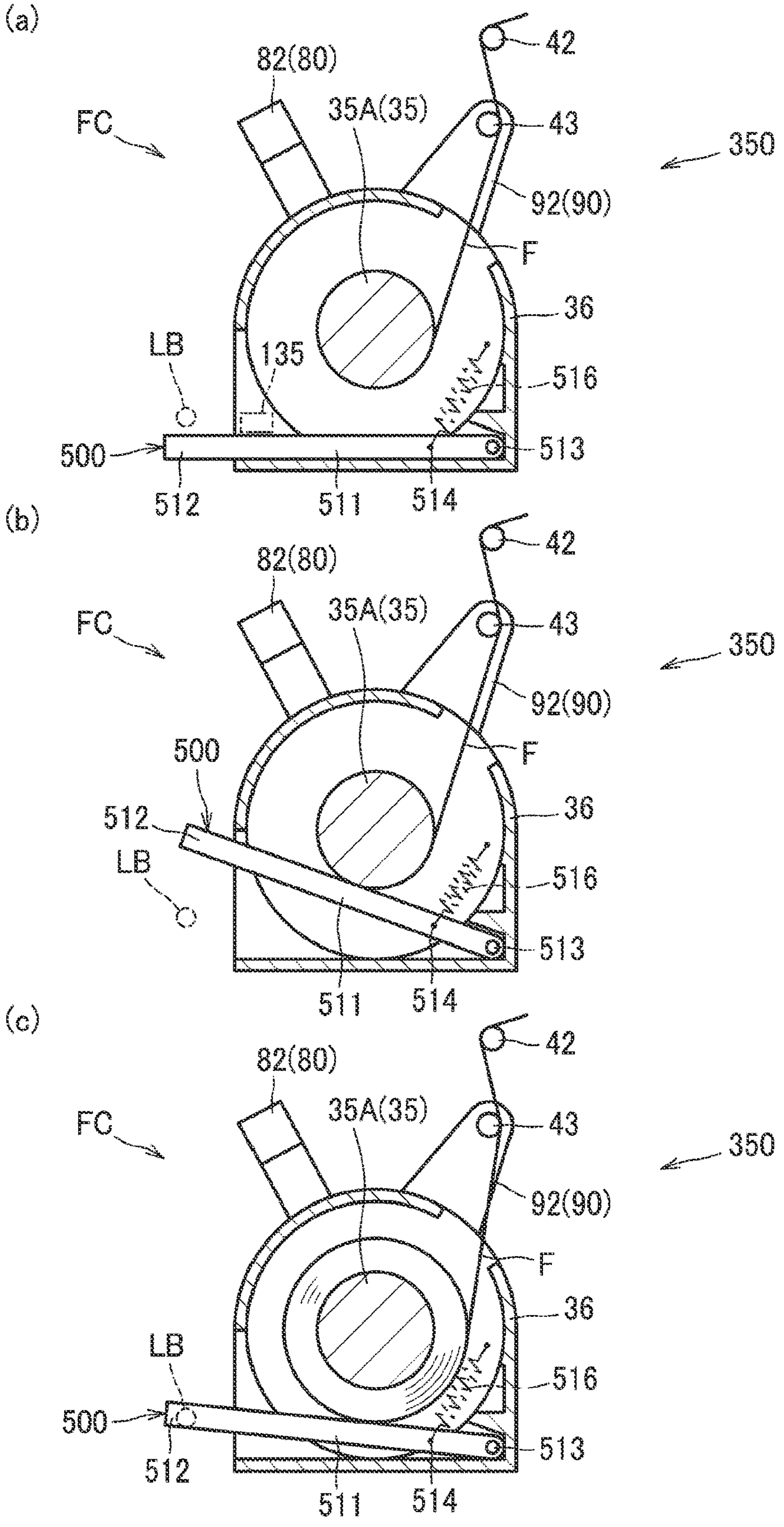
FIG. 37 shows section views of the layer transfer film cartridge as viewed from a viewpoint on a line along an axial direction, including: a view (a) showing a state in which a remaining amount indicating member is in a brand-new position; a view (b) showing a state in which the remaining amount indicating member is in an initial position; and a view (c) showing a state in which the remaining amount indicating member is in a final position.

As shown in FIG. 37(*a*), (*b*), (*c*), the layer transfer film cartridge FC further includes a remaining amount indicating member 500 and a spring 516.

The remaining amount indicating member 500 is a member indicating a remaining amount of the multilayer film F. The remaining amount indicating member 500 is movable to a brand-new position indicative of the layer transfer film cartridge FC being brand-new as shown in FIG. 37(*a*), to an initial position indicative of the multilayer film F being not yet used as shown in FIG. 37(*b*), and to a final position indicative of the multilayer film F being exhausted as shown in FIG. 37(*c*).

The state in which the layer transfer film cartridge FC is brand-new refers to a state such that the layer transfer film cartridge FC has not been placed in a state of being installed in the housing main body 21 with power turned on, and the housing cove 22 being closed.

The state in which the layer transfer film cartridge FC is not yet used refers to a state such that it has been placed in a state of being installed in the housing main body 21 with power turned on, and the housing cover 22 being closed, though having not yet been used for layer transfer at all.

The state in which the layer transfer film F is exhausted refers to a state such that the layer transfer film cartridge FC is at the end of its life, that is, the multilayer film F in the supply case 32 has been exhausted for layer transfer.

The remaining amount indicating member 500 consists of a single part having a shape of a long slender plate, that is, approximately in a shape of a rectangular parallelepiped, extending with its length oriented in a perpendicular direction perpendicular to the axial direction along the axis of the take-up reel 35. One end of ends of the remaining amount indicating member 500 which are located apart from each other in the direction of the length thereof is supported swingably on a pivot 513 for swinging motion as a supporting point relative to the take-up case 36.

The remaining amount indicating member 500 includes a contact portion 511 and an indicator end portion 512. The indicator end portion 512 is at the other end of the ends of the remaining amount indicating member 500 which are located apart from each other in the direction of the length. The indicator end portion 512 is located at an outside of the take-up case 36. The indicator end portion 512 is configured to move in accordance with movement of the contact portion 511 to indicate, in such a manner as to make legible from outside the take-up case 36, a remaining amount of the multilayer film F. The indicator end portion 512 protrudes from a side of the take-up case 36 that is on a side opposite to a side on which the supply reel 31 is located.

The contact portion 511 is a portion that contacts a surface of the multilayer film F wound on the take-up reel 35 and moves in accordance with an amount of the multilayer film F wound thereon. The contact portion 511 is a portion, located between one end and the other end which are located apart from each other in the direction of the length, of the remaining amount indicating member 500. In other words, the contact portion 511 is positioned between the indicator end portion 512 and the pivot 513 for swinging motion.

The spring 516 is, for example, a tension spring. The spring 516 has one end engaged with a spring engageable portion 514, and the other end engaged with a portion of the take-up case 36. The spring engageable portion 514 is attached to the remaining amount indicating member 500. The spring engageable portion 514 is positioned between the contact portion 511 and the pivot 513 for swinging motion. The spring 516 biases the contact portion 511 toward the take-up shaft 35A, i.e., causes the contact portion 511 to be pressed against the multilayer film F wound on the take-up reel 35.

Figure 38:
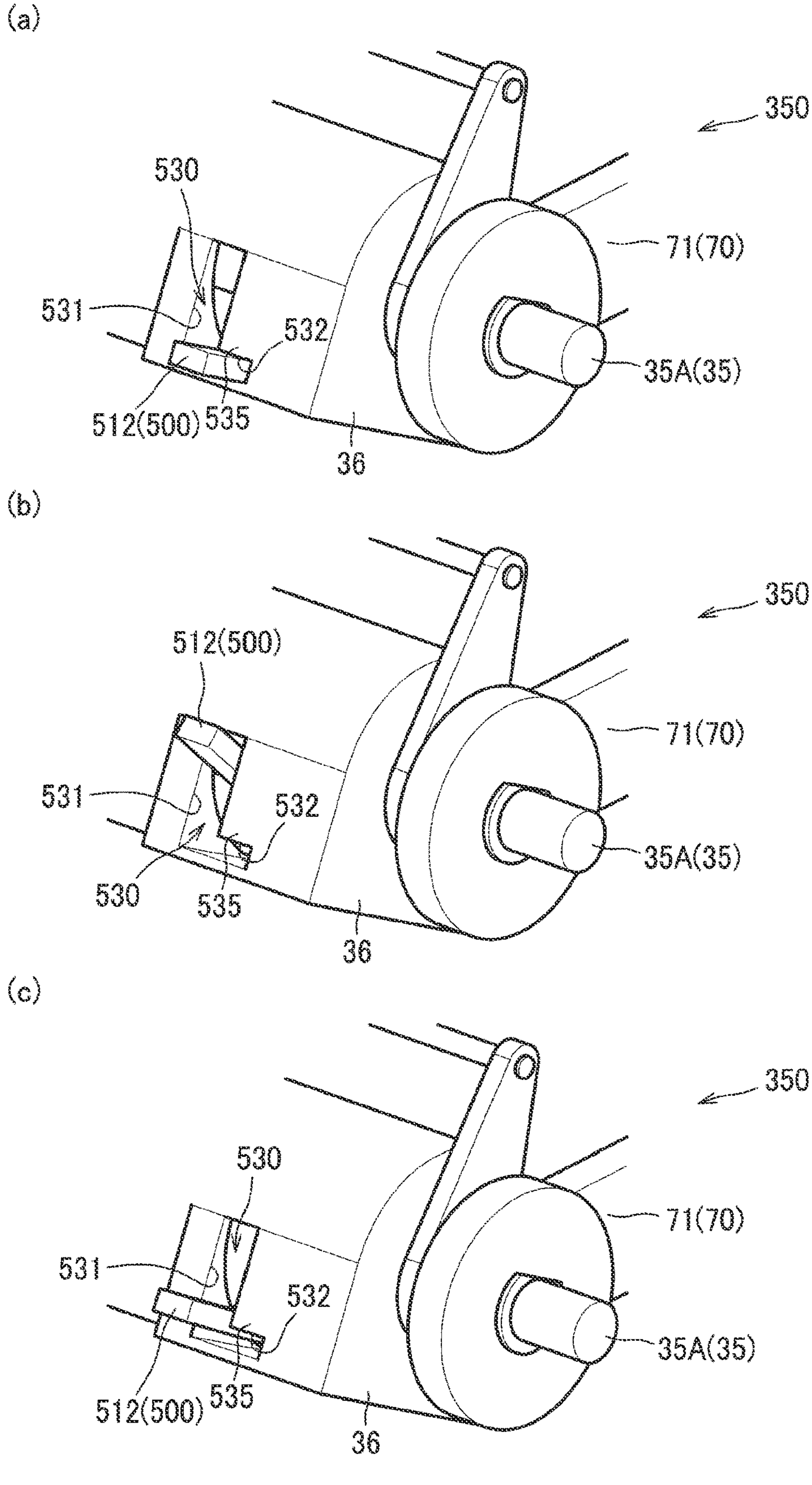
FIG. 38 includes perspective views (a), (b), (c) partially showing layer transfer film cartridges corresponding to those shown in the views (a), (b), (c) of FIG. 37.

As shown in FIG. 38(*a*), (*b*), (*c*), the take-up case 36 has a through hole 530 in a shape of a letter L provided in a side wall thereof extending along the axial direction. The through hole 530 includes a first hole 531 extending in a direction perpendicular to the axial direction, and a second hole 532 extending from the first hole 531 in a direction along the axial direction.

The remaining amount indicating member 500 protrudes through the through hole 530 from the inside to the outside of the take-up case 36. The end portion of the remaining amount indicating member 500 protruding from the take-up case 36 forms the indicator end portion 512 that indicates the remaining amount of the multilayer film F.

As shown in FIG. 38(*a*), if the layer transfer film cartridge FC is brand-new, the remaining amount indicating member 500 is located in a segment of the through hole 530, that is, the second hole 532. In this state, the remaining amount indicating member 500 is caused to be pressed against an edge of the second hole 532 extending in the axial direction by the spring 516, and kept in place inside the second hole 532. In other words, the edge of the second hole 532 extending in the axial direction serves as a lock portion 535 that locks the remaining amount indicating member 500 in the brand-new position.

The layer transfer device 1 includes an actuator (not shown) by which the remaining amount indicating member 500 of a brand-new layer transfer film cartridge FC installed in the housing main body 21 is pressed in the axial direction when the housing cover 22 is closed and the power is turned on. This actuator is configured to contact the indicator end portion 512 of the remaining amount indicating member 500 and causes the remaining amount indicating member 500 to move from the position in the second hole 532, i.e., the brand-new position, toward the first hole 531. As shown in FIG. 38 (*b*), the remaining amount indicating member 500 pressed and caused to move from the position in the second hole 532 to the inside of the first hole 531 by the actuator is biased by the spring 516 and caused to move to a position apart from the second hole 532 in a direction perpendicular to the axial direction. In other words, the remaining amount indicating member 500 moves to the initial position. The remaining amount indicating member 500 is thus made swingable in the direction perpendicular to the axial direction along the first hole 531.

As shown in FIG. 36, the layer transfer device 1 further includes an optical sensor 190. The optical sensor 190 includes a light-emitting element 191 and a light-receptive element 192. The light-receptive element 192 is provided, opposite to the light-emitting element 191, and thus allowed to receive light LB emitted from the light-emitting element 191. If there is no object interrupting light LB between the light-emitting element 191 and the light-receptive element 192, the optical sensor 190 outputs an ON signal that is higher in level as the light-receptive element 192 receives the light LB. On the other hand, if there is an object interrupting light LB between the light-emitting element 191 and the light-receptive element 192, the optical sensor 190 outputs an OFF signal that is lower in level as the light-receptive element 192 fails to receive the light LB. It is understood that the levels of the ON signal and the OFF signal may be reversed.

As shown in FIG. 37(*a*), if the remaining amount indicating member 500 is in the brand-new position, the indicator end portion 512 is located in a position farther, than the light LB of the optical sensor 190, from the take-up shaft 35A. In the present embodiment, the brand-new position is a position farther, than the final position shown in FIG. 37(*c*), apart from the center of rotation of the take-up reel 35.

As shown in FIG. 37(*b*), if the remaining amount indicating member 500 is in the initial position, the indicator end portion 512 is located in a position closer, than the light LB of the optical sensor 190, to the take-up shaft 35A.

As shown in FIG. 37(*c*), if the remaining amount indicating member 500 is in the final position, the indicator end portion 512 is located in such a position as to overlap the light LB of the optical sensor 190.

With the configurations described above, the layer transfer device 1 can carry out operation with advantageous effects as described below.

Figure 39:
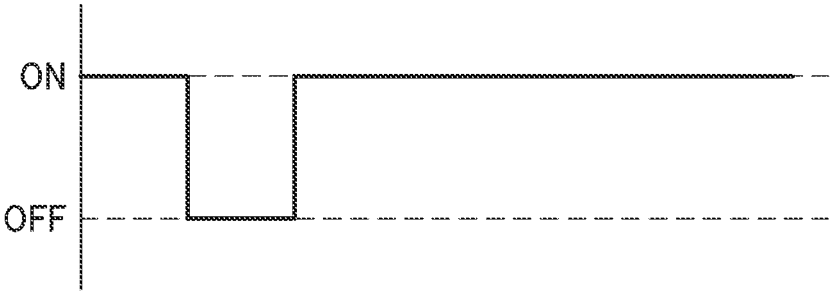
FIG. 39 shows a waveform (a) acquired based on detection by an optical sensor after installation of a brand-new layer transfer film cartridge, a waveform (b) acquired based on detection by the optical sensor when there remains the multilayer film unused, and a waveform (c) acquired based on detection by the optical sensor when the multilayer film has been exhausted.
Figure 39:
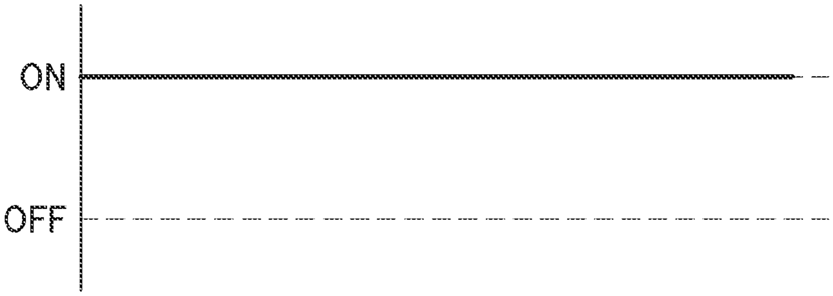
Figure 39:
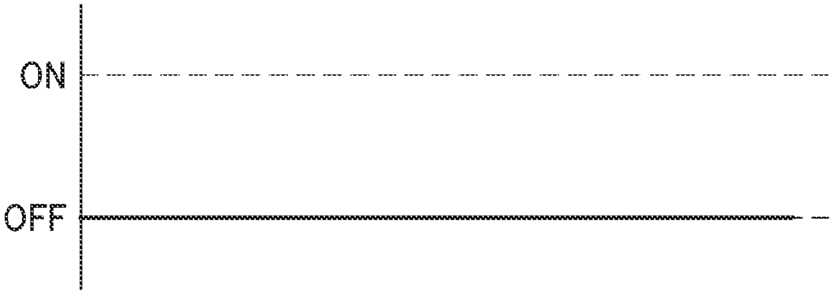

If a brand-new layer transfer film cartridge FC is installed in the layer transfer device 1, the remaining amount indicating member 500 is in the brand-new position, and located apart from the take-up shaft 35A and the multilayer film F wound thereon. When the housing cover 22 of the layer transfer device 1 is closed, and the power is turned on, a pressing mechanism, such as an actuator (not shown), presses the remaining amount indicating member 500 in the axial direction. Then, the remaining amount indicating member 500 moves from the second hole 532 to the first hole 531, and is released from the lock portion 535, and the remaining amount indicating member 500 is biased by the spring 516 and caused to move from the brand-new position shown in FIG. 37(*a*) to the initial position shown in FIG. 37(*b*). In this process, the indicator end portion 512 of the remaining amount indicating member 500 crosses a path of the light LB of the optical sensor 190 and interrupts the light LB only during the time period of crossing the path; thus, as shown in FIG. 39(*a*), the waveform of the optical sensor 190 changes from the ON signal to the OFF signal and then changes from the OFF signal back to the ON signal again. The layer transfer device 1 can make a determination such that if this change in signal is detected and the time period over which the OFF signal is outputted is shorter than a predetermined period of time, then the layer transfer film cartridge FC is brand-new. The predetermined period of time is set at a time period longer than a time period required for the indicator end portion 512 of the remaining amount indicating member 500 entering the path of the light LB of the optical sensor 190 to pass through the path when the remaining amount indicating member 500 moves from the brand-new position to the initial position.

When the layer transfer process is executed after the remaining amount indicating member 500 moves to the initial position, the multilayer film F as used is wound up on the take-up reel 35; accordingly, the roll diameter of the multilayer film F wound on the take-up reel 35 becomes larger. The contact portion 511 in contact with the multilayer film wound on the take-up reel 35 moves in a radial direction (that is a direction from the axis to the outer peripheral surface) of the take-up reel 35 according as the diameter of the multilayer film F becomes larger. In this way, the remaining amount indicating member 500 swings gradually from the initial position to the final position. Therefore, a user can find out the remaining amount of the multilayer film F by checking the indicator end portion 512. For a period of time over which the indicator end portion 512 of the remaining amount indicating member 500 fails to interrupt the light LB of the optical sensor 190, the optical sensor 190 keeps outputting the ON signal, as shown in FIG. 39(*b*). The layer transfer device 1 can make a determination such that if the ON signal from the optical sensor is detected, then the multilayer film F has not been exhausted.

Thereafter, the multilayer film F is further wound on the take-up reel 35, and when the remaining amount indicating member 500 reaches the final position, the indicator end portion 512 interrupts the light LB of the optical sensor 190, as shown in FIG. 39(*c*). Accordingly, the signal from the optical sensor 190 becomes the OFF signal. The layer transfer device 1 can make a determination such that if the OFF signal from the optical sensor 190 is being detected continuously for a predetermined period of time, then the multilayer film F has been exhausted. When the determination turns out that the multilayer film F is exhausted, the layer transfer device 1 can make a message, to be shown on a display provided for example on the housing cover 22, to the effect that the multilayer film F has been exhausted and/or the layer transfer film cartridge FC needs replacing.

With the layer transfer film cartridge FC described above, the indicator end portion 512 of the remaining amount indicating member 500 indicates the remaining amount of the multilayer film F; therefore, the remaining amount of the multilayer film F is readily legible. This remaining amount indicating member 500 can indicate the remaining amount of the multilayer film F regardless of whether the layer transfer film cartridge FC is installed in or removed from the layer transfer device 1.

Since the remaining amount indicating member 500 is biased toward, with the contact portion 511 being pressed against, the multilayer film F by the spring 516, the contact portion 511 can be kept in contact stably with the surface of the multilayer film F. For example, even if the layer transfer film cartridge FC removed from the layer transfer device 1 is turned and placed upside down, the contact is maintained as it is.

Since the indicator end portion 512 of the remaining amount indicating member 500 protrudes from the take-up case 36 on an opposite side that is a side of the take-up case 36 opposite to a side on which the supply reel 31 is located, the indicator end portion 512 is not positioned between the take-up case 36 and the supply reel 31. Therefore, the indicator end portion is readily legible for a user.

When the layer transfer film cartridge FC is brand-new, the remaining amount indicating member 500 is locked in the brand-new position by the lock portion 535. Therefore, a user can check, by the remaining amount indicating member 500, whether the layer transfer film cartridge FC is brand-new.

Next, a description will be given of a seventh embodiment with reference to FIG. 40 and FIG. 41. In the following description, elements having substantially the same structural features as those of the sixth embodiment will be designated by the same reference characters, and a description thereof will be omitted.

In contrast to the sixth embodiment in which the remaining amount indicating member 500 is provided at the take-up case 36, a remaining amount indicating member 540 in the seventh embodiment is provided at the supply case 32.

The remaining amount indicating member 540 includes a contact portion 541 and an indicator end portion 542. The remaining amount indicating member 540 is supported swingably on a pivot 543 for swinging motion as a supporting point relative to the supply case 32. There is a spring 546 having one end engaged with a spring engageable portion 544 and the other end engaged with a portion of the supply case 32. The spring engageable portion 544 is attached to the remaining amount indicating member 540. The remaining amount indicating member 540 is biased by the spring 546 toward the multilayer film F wound on the supply reel 31. The contact portion 541 contacts the surface of the multilayer film F wound on the supply reel 31, and moves in accordance with an amount of the multilayer film F wound thereon. The indicator end portion 542 protrudes from a side of the supply case 32 that is on a side opposite to a side on which the take-up reel 35 is located. The indicator end portion 542 has a shape of a letter L, and is bent at an outside of the supply case 32 in a direction of swinging motion of the remaining amount indicating member 540.

Figure 40:
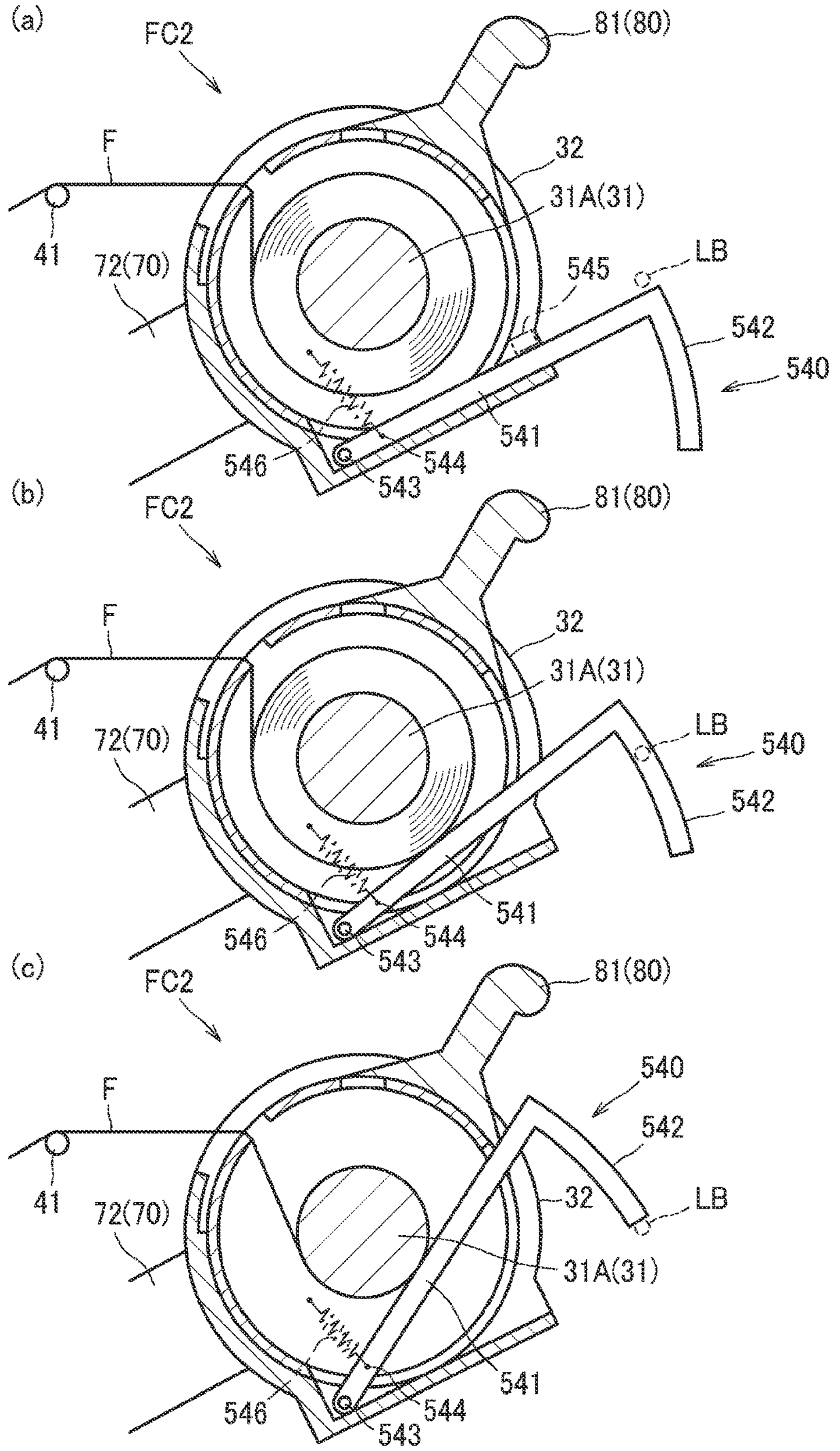
FIG. 40 shows section views of a layer transfer film cartridge of a seventh embodiment as viewed from a viewpoint on a line along an axial direction, including: a view (a) showing a state in which a remaining amount indicating member is in a brand-new position; a view (b) showing a state in which the remaining amount indicating member is in an initial position; and a view (c) showing a state in which the remaining amount indicating member is in a final position.

As shown in FIG. 40(*a*), if the remaining amount indicating member 540 is in the brand-new position, the indicator end portion 542 is located in a position farther, than the light LB of the optical sensor 190, from the supply shaft 31A.

As shown in FIG. 40(*b*), if the remaining amount indicating member 540 is in the initial position, the indicator end portion 542 is located in such a position as to overlap the light LB of the optical sensor 190.

As shown in FIG. 40(*c*), if the remaining amount indicating member 540 is in the final position, the indicator end portion 542 is located in a position closer, than the light LB of the optical sensor 190, to the supply shaft 31A.

If a brand-new layer transfer film cartridge FC2 is installed in the layer transfer device 1, the remaining amount indicating member 540 is in the brand-new position, and located apart from the multilayer film F. When the power of the layer transfer device 1 is turned on, a pressing mechanism, such as an actuator (not shown), presses the remaining amount indicating member 540 in the axial direction. Then, the remaining amount indicating member 540 is released from a lock portion 545, and, as is biased by the spring 516, is caused to move from the brand-new position shown in FIG. 40(*a*) to the initial position shown in FIG. 40(*b*).

Figure 41:
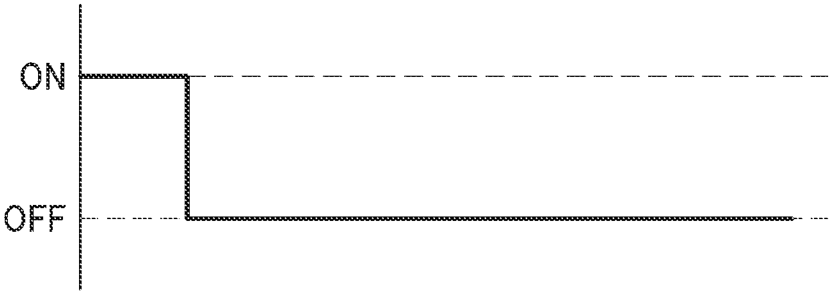
FIG. 41 shows a waveform (a) acquired based on detection by an optical sensor after installation of a brand-new layer transfer film cartridge of the seventh embodiment, a waveform (b) acquired based on detection by the optical sensor when there remains the multilayer film, and a waveform (c) acquired based on detection by the optical sensor when the multilayer film has been exhausted.
Figure 41:
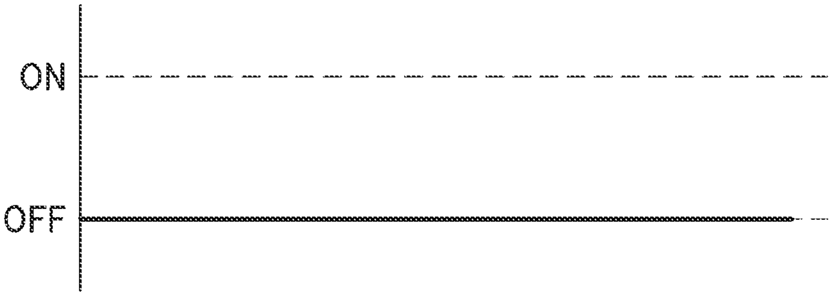
Figure 41:
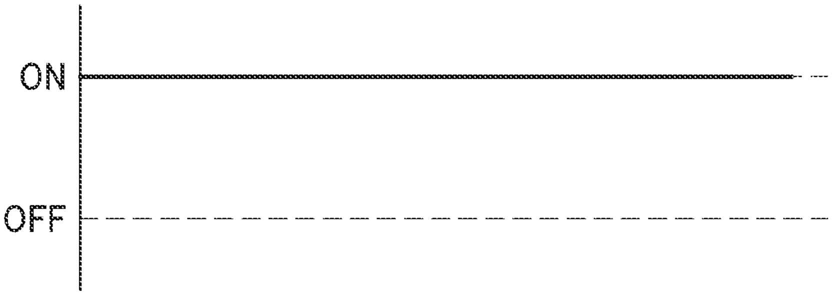

In this process, the indicator end portion 542 of the remaining amount indicating member 540 interrupts the light LB of the optical sensor 190, and thus the output signal of the optical sensor 190 is changed from the ON signal to the OFF signal, as shown in FIG. 41(*a*). The layer transfer device 1 can make a determination such that if this change in the output signal of the optical sensor 190 from the ON signal to the OFF signal is effected within a predetermined time period from a start of pressing by the pressing mechanism, then the layer transfer film cartridge FC2 is brand-new.

When the layer transfer process is executed after the remaining amount indicating member 540 moves from the brand-new position to the initial position, the multilayer film F is supplied from the supply reel 31; accordingly, the roll diameter of the multilayer film F wound on the supply reel 31 becomes smaller. The contact portion 541 moves according as the diameter of the multilayer film F becomes smaller; thus, the remaining amount indicator member 540 moves gradually from the initial position toward the final position. Therefore, a user can find out the remaining amount of the multilayer film F by checking the indicator end portion 542. As shown in FIG. 41(*b*), for a period of time over which the indicator end portion 542 of the remaining amount indicating member 540 continues interrupting the light LB of the optical sensor 190, the optical sensor 190 keeps outputting the OFF signal. The layer transfer device 1 can make a determination such that if the OFF signal from the optical sensor 190 is detected, then the multilayer film F has not been exhausted.

Thereafter, the multilayer film F is further supplied from the supply reel 31, and when the remaining amount indicating member 540 reaches the final position, the indicator end portion 542 fails to interrupt the light LB of the optical sensor 190, as shown in FIG. 40(*c*). Accordingly, the signal from the optical sensor 190 becomes the ON signal, as shown in FIG. 41(*c*). The layer transfer device 1 can make a determination such that if the ON signal from the optical sensor 190 is detected, then the multilayer film F has been exhausted.

As described above, with the layer transfer film cartridge FC2 of the seventh embodiment, as well, similar to the sixth embodiment, the remaining amount of the multilayer film F is readily legible.

Next an eighth embodiment will be described with reference to FIG. 42 and FIG. 43. In the following description, elements having substantially the same structural features as those of the sixth embodiment will be designated by the same reference characters, and a description thereof will be omitted.

Figure 42:
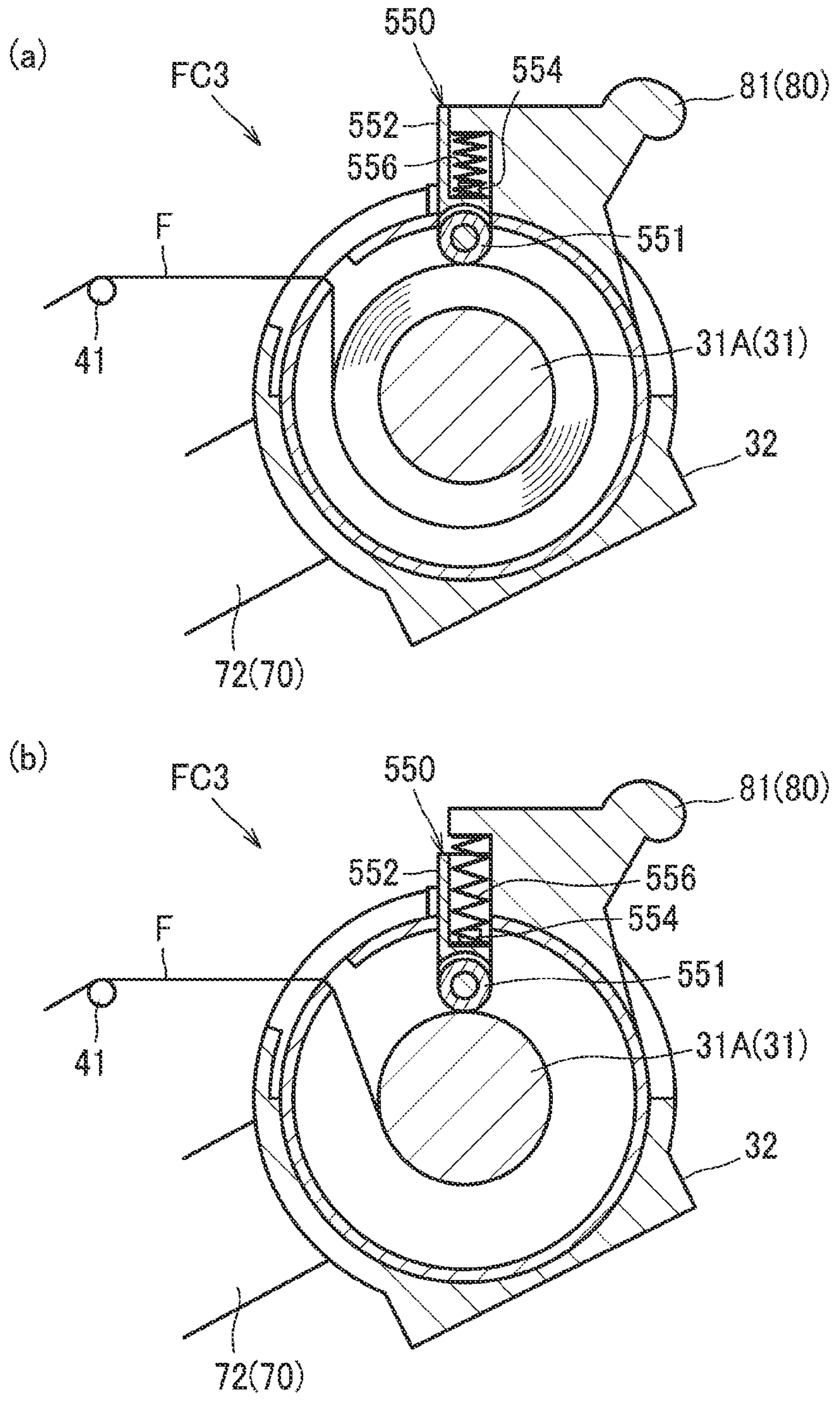
FIG. 42 shows section views of a layer transfer film cartridge of an eighth embodiment as viewed from a viewpoint on a line along an axial direction, including: a view (a) showing a state in which the remaining amount indicating member is in an initial position; and a view (b) showing a state in which the remaining amount indicating member is in a final position.

In contrast to the sixth embodiment in which the remaining amount indicating member swings to indicate the remaining amount of the multilayer film F, a remaining amount indicating member 550 of a layer transfer film cartridge FC3 in the eighth embodiment shown in FIG. 42 slides to indicate the remaining amount of the multilayer film F. It is to be understood that the remaining amount indicating member 550 may either be provided at the supply case 32, or be provided at the take-up case 36; herein described is an illustrative configuration in which it is provided at the supply case 32.

As shown in FIG. 42, the remaining amount indicating member 550 of the layer transfer film cartridge FC3 extends in a perpendicular direction perpendicular to an axial direction along the axis of the take-up reel 35, and is slidable relative to the supply case 32. The remaining amount indicating member 550 is biased toward the supply shaft 31A by a spring 556. The remaining amount indicating member 550 includes a contact portion 551 and an indicator end portion 552. One end of ends of the indicator end portion 552 which are located apart from each other in a direction perpendicular to the axial direction along the axis of the take-up reel 35 is located at an outside of the take-up case 36. At the other end of the ends of the indicator end portion 552 which are located apart from each other in the direction perpendicular to the axial direction along the axis of the take-up reel 35, the contact portion 553 is provided. The contact portion 551 is a roller rotatably supported by the indicator end portion 552. The spring 556 is a compression spring, and has one end engaged with a spring engageable portion 554 attached to the indicator end portion 552, and the other end engaged with a portion of the supply case 32.

When the layer transfer film cartridge FC3 is installed into the layer transfer device 1, and the layer transfer process is executed, the multilayer film F is supplied from the supply reel 31; accordingly, the roll diameter of the multilayer film F wound on the supply reel 31 decreases. According as the roll diameter of the multilayer film F decreases, the contact portion 551 moves; thus, the remaining amount indicating member 550 slides gradually from the initial position shown in FIG. 42(*a*) toward the final position shown in FIG. 42(*b*).

Figure 43:
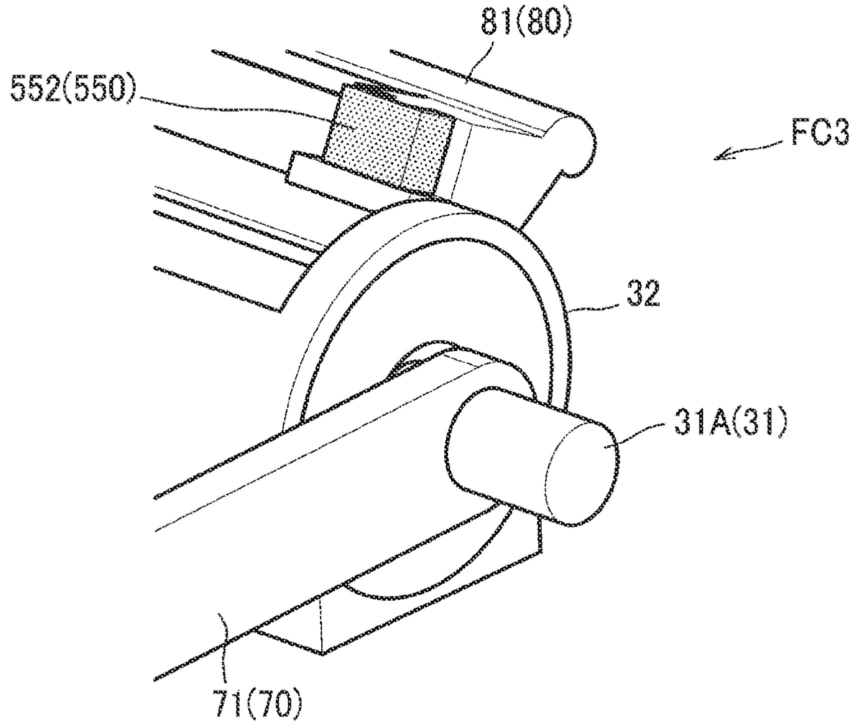
FIG. 43 includes perspective views (a), (b) partially showing layer transfer film cartridges corresponding to those shown in the views (a), (b) of FIG. 42.
Figure 43:
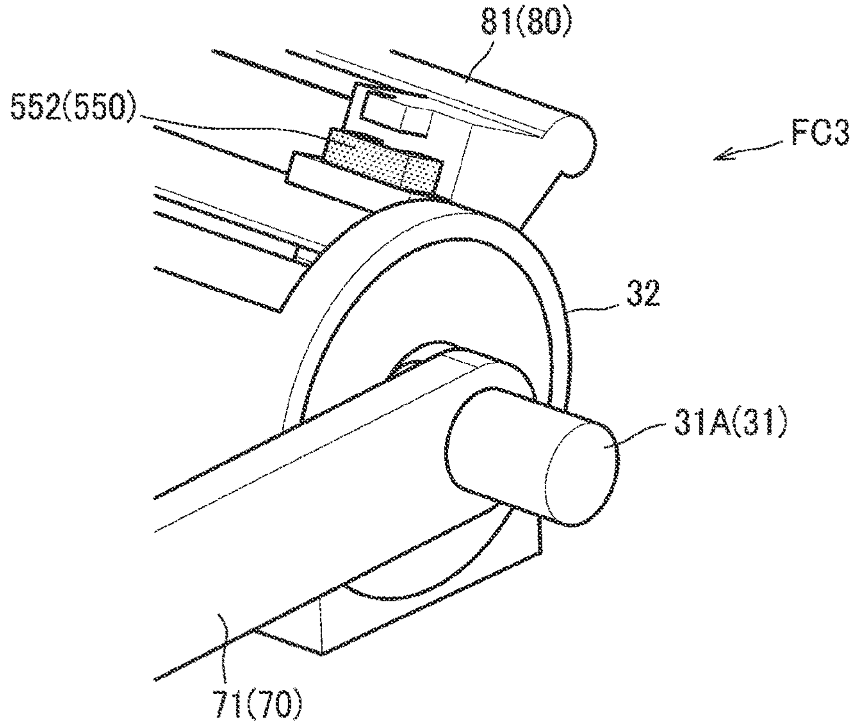

Then, the indicator end portion 552 that has protruded from the supply case 32 as shown in FIG. 43(*a*) retracts into the supply case 32 as shown in FIG. 43(*b*). If the amount of protrusion of the indicator end portion 552 from the supply case 32 is large, a user can recognize that the remaining amount of the multilayer film F is large. On the other hand, if the indicator end portion 552 has been retracted and the amount of protrusion thereof is small, a user can recognize that the remaining amount of the multilayer film is small. In FIG. 43(*a*), (*b*), the indicator end portion 552 is shown by dot hatching. As evident from this illustration, a user can readily recognize the remaining amount of the multilayer film F by checking the indicator end portion 552.

Since the indicator end portion 552 of the layer transfer film cartridge FC3 of the eighth embodiment as well indicates the remaining amount of the multilayer film F, similar to the sixth embodiment, the remaining amount of the multilayer film F is readily legible.

Since the contact portion 551 is configured as a roller, the resistance which would take place on contact of the contact portion 551 with the surface of the multilayer film F can be restrained.

The above-described embodiments may be modified and implemented in various forms as will be illustrated below.

In the above-described embodiments, the layer transfer film cartridge includes a spring that biases the contact portion of the remaining amount indicating member against the multilayer film wound on the take-up reel; however, such a spring may be omitted. For example, even if the spring 556 of the eighth embodiment is omitted, the remaining amount indicating member 550 may be slid by gravitation in accordance with the roll diameter of the multilayer film F wound on the supply reel 31 under its own weight. To cause the contact portion to be pressed strongly against the multilayer film, additional weight(s) may be provided.

In the above-described embodiments, the spring that biases the contact portion of the remaining amount indicating member is configured as a tension spring or a compression spring; however, the spring may alternatively be a torsion spring, or the like.

In the above-described embodiments, the remaining amount indicating member 500 has a shape of a long slender plate, that is, approximately in a shape of a rectangular parallelepiped; however, the shape like this is not a prerequisite. For example, the remaining amount indicating member may have any other shapes such as prisms in circular or polygonal cross section.

In the above-described embodiments, the layer transfer device 1 includes the optical sensor 190, and the layer transfer device 1 detects the remaining amount of the multilayer film F by the optical sensor 190; however, the optical sensor may be omitted. In this alternative, a user can grasp the remaining amount of the unused multilayer film by visually checking the position of the indicator end portion of the remaining amount indicating member. In this configuration, scale marks for the remaining amount may be provided to make the remaining amount readily legible so that a user can make a visual check easily.

In the above-described embodiments, the brand-new position is a position farther, than the final position, from a position of the center of rotation of the take-up reel; however, the brand-new position may be the same position as that of the final position.

Next, a detailed description will be given of a ninth embodiment with reference made mainly to FIGS. 44 to 49. In the following description, elements having substantially the same structural features as those of the first embodiment will be designated by the same reference characters, and a description thereof will be omitted.

Figure 44:
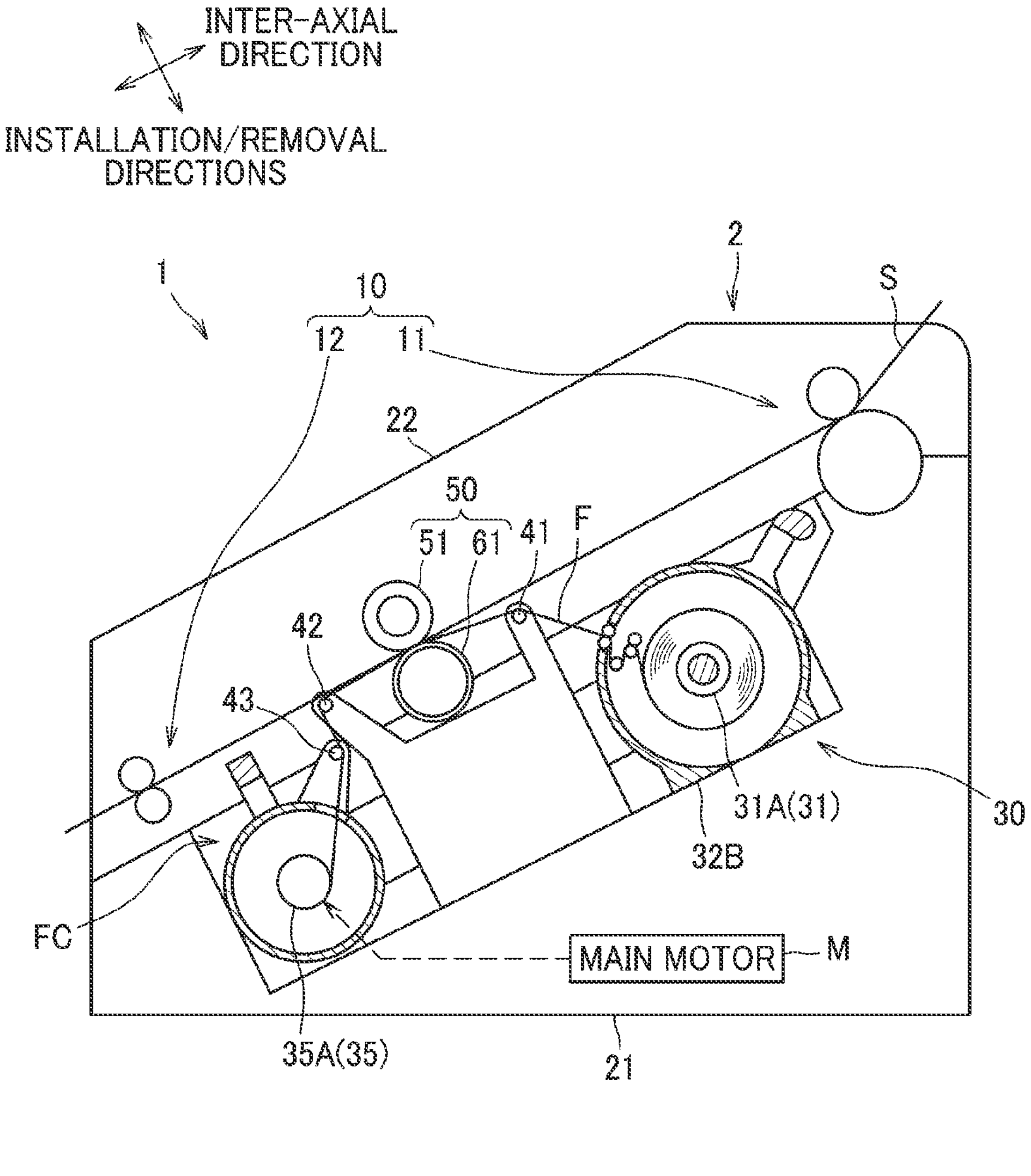
FIG. 44 is a diagram showing a layer transfer device according to a ninth embodiment.

As shown in FIG. 44, the layer transfer device 1 includes a housing 2, a sheet conveyor unit 10, a film supply unit 30, and a transfer unit 50. The film supply unit 30 includes a layer transfer film cartridge FC, a first guide shaft 41, a second guide shaft 42, and a main motor M as a driving source.

Figure 45:
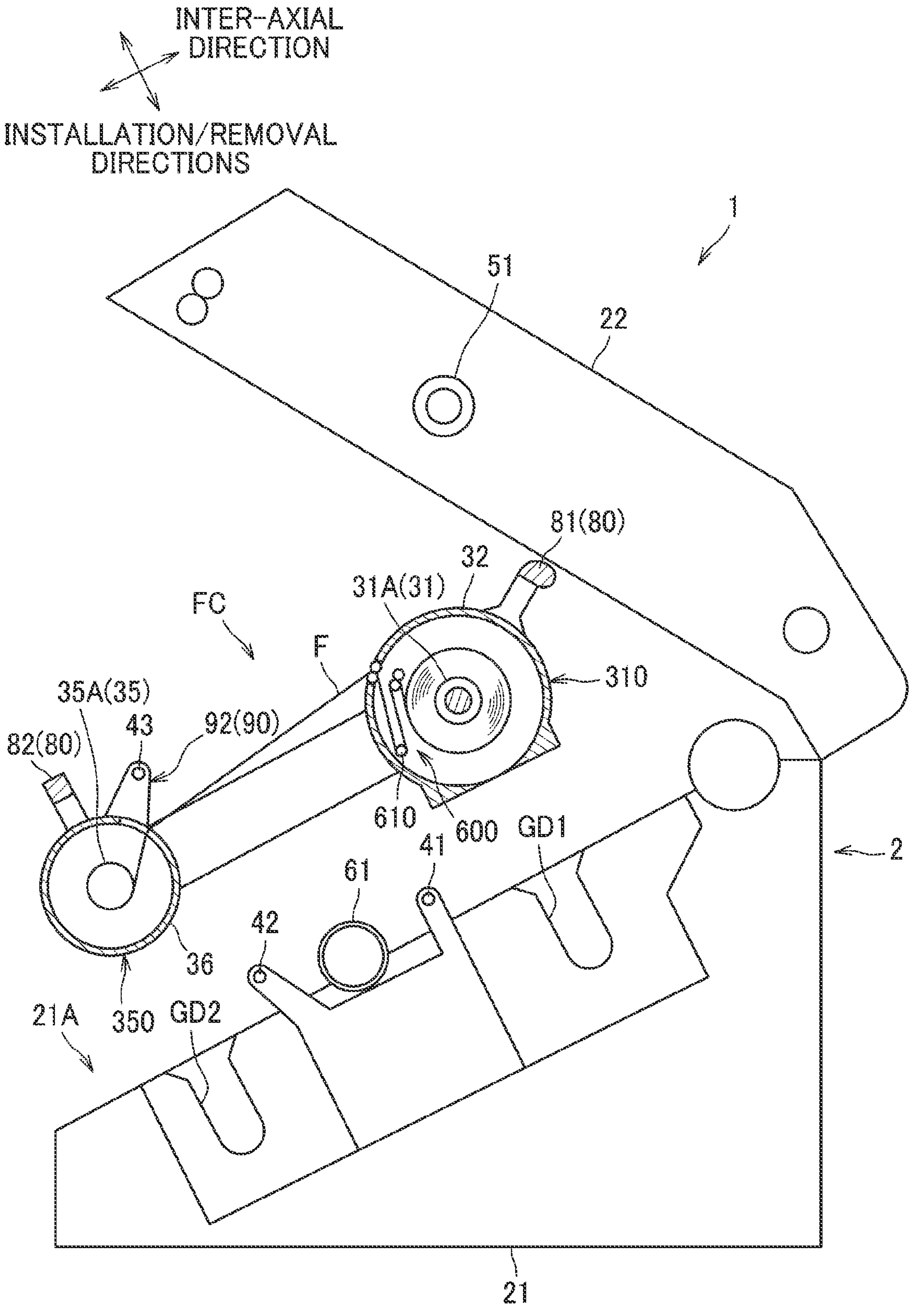
FIG. 45 is a diagram showing a state of the layer transfer device with a housing cover being open.

As shown in FIG. 45, the layer transfer film cartridge FC is configured to be installable into and removable from the housing 2, specifically, a housing main body 21 thereof, of the layer transfer device 1 through a housing opening 21A. The layer transfer film cartridge FC is a cartridge that supports a multilayer film F consisting of a plurality of layers as shown in FIG. 1(*b*). The layer transfer film cartridge FC mainly includes a supply unit 310, a take-up unit 350, and a shaft 43. The supply unit 310 mainly includes a supply reel 31. The take-up unit 350 mainly includes a take-up reel 35. The multilayer film F is wound on the supply reel 31.

Figure 46:
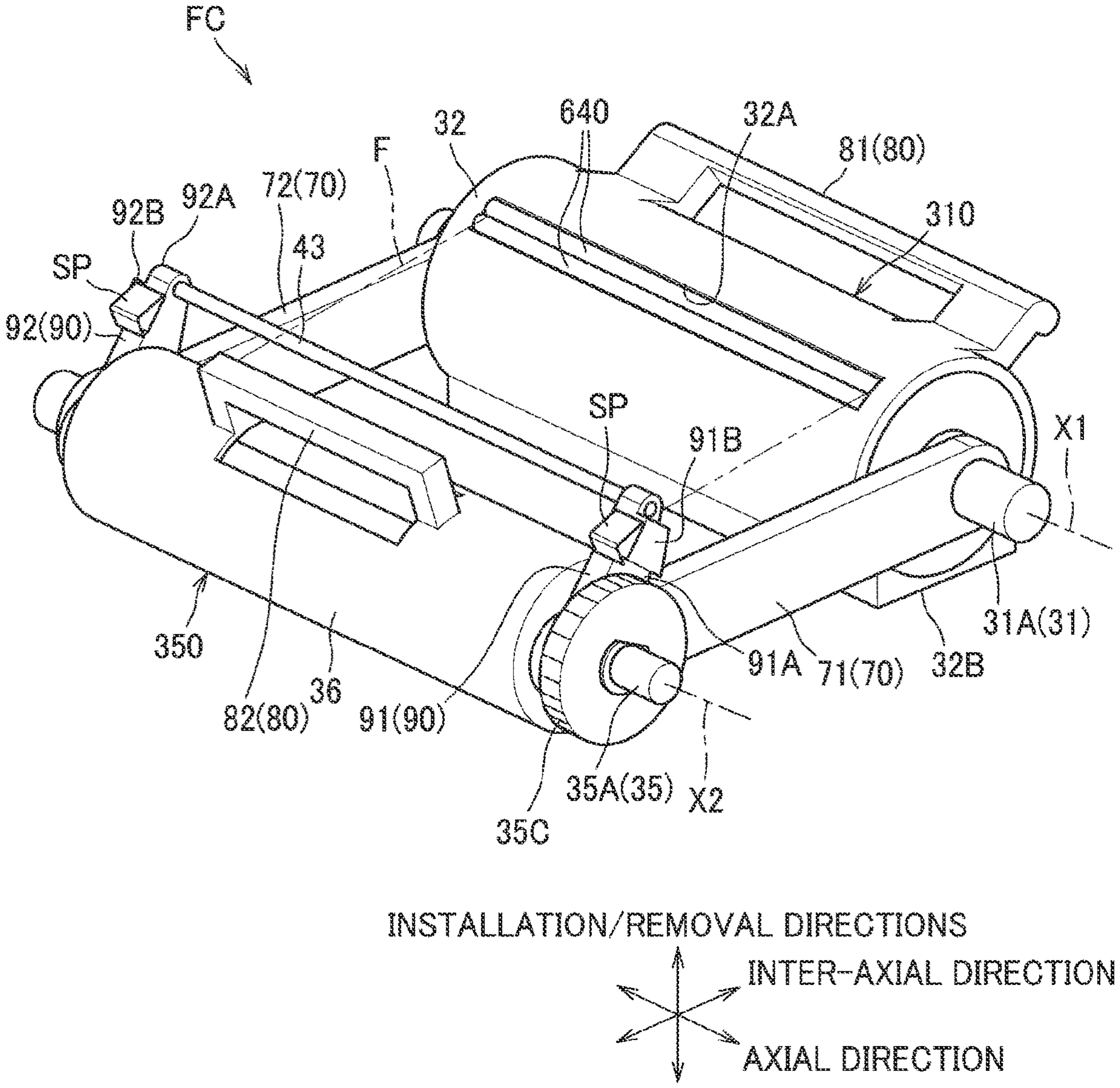
FIG. 46 is a perspective view showing a layer transfer film cartridge according to the ninth embodiment.

As shown in FIG. 46, the layer transfer film cartridge FC includes, in addition to the supply unit 310, the take-up unit 350 and the shaft 43 described above, a connecting portion 70, a handle 80, and a support member 90. The supply unit 310 includes, in addition to the supply reel 31 described above, a supply case 32. The take-up unit 350 includes, in addition to the take-up reel 35 described above, a take-up case 36. The supply case 32 houses the supply reel 31, and the take-up case 36 houses the take-up reel 35.

The supply reel 31 is rotatably supported by the supply case 32 and the connecting portion 70. The supply reel 31 is supported with an adequate level of friction produced against the take-up case 36 so as to be rotatable but prohibited from being rotated by a biasing force of torsion springs 620 (see FIG. 48) as will be described below.

Figure 47:
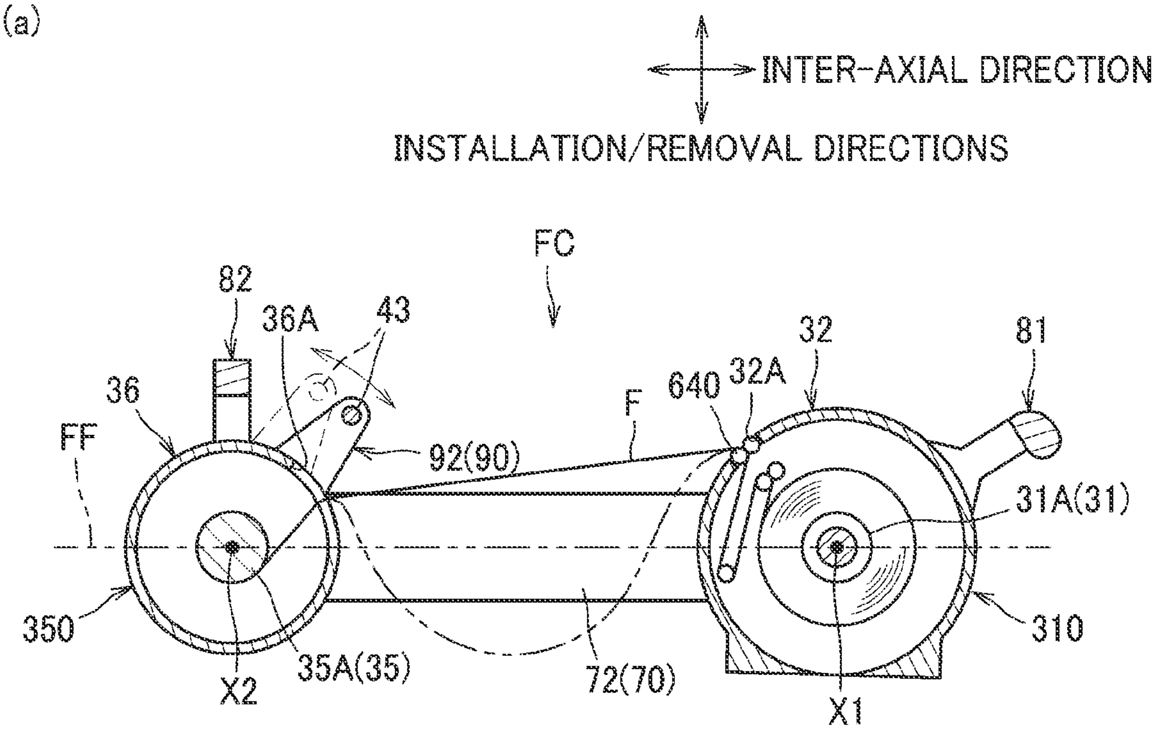
FIG. 47 includes: a section view (a) showing the layer transfer film cartridge; and a plan view (b) showing a relationship between a shaft and a multilayer film.
Figure 47:
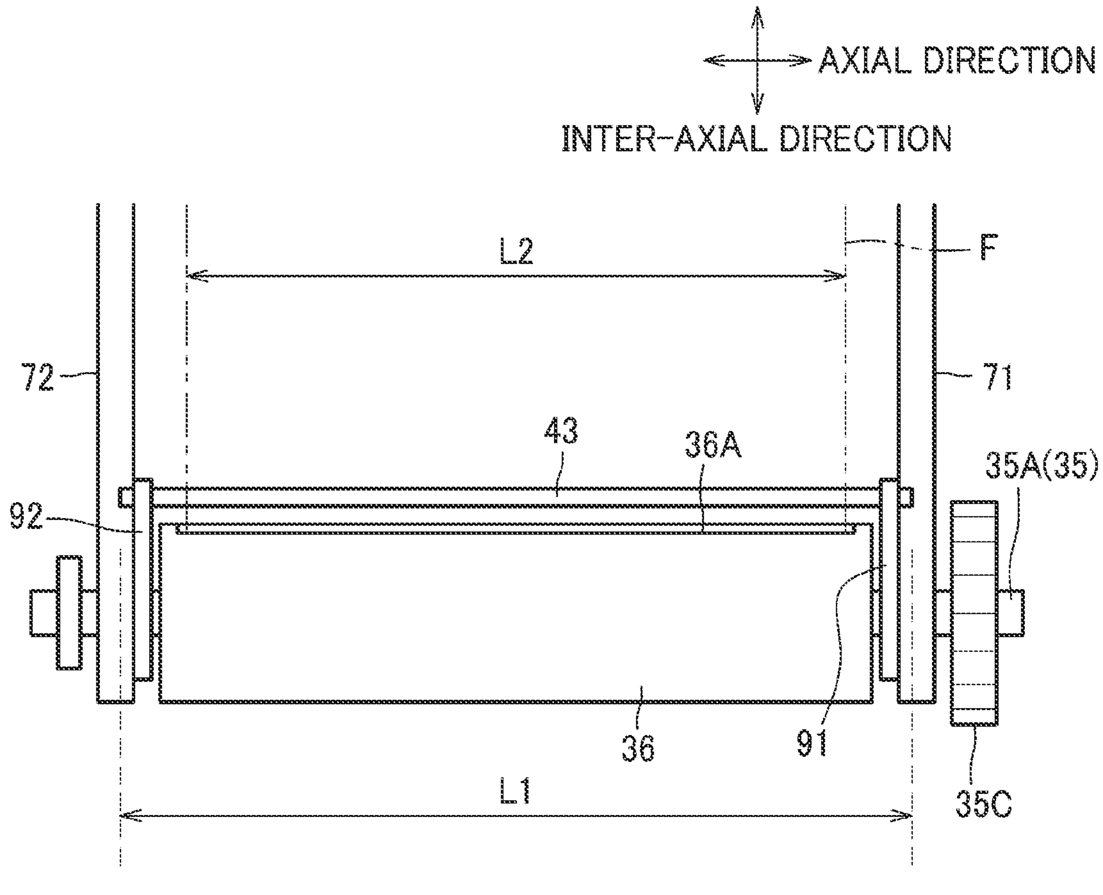

As shown in FIG. 47(*a*), the shaft 43 supported by the support member 90 is movable relative to the connecting portion 70. Specifically, the shaft 43 is configured to be movable between a retreat position indicated by a broken line in the drawing and a use position (position indicated by a solid line) closer than the retreat position to the supply reel 31. The "retreat position" and the "use position" correspond to the "first position" and the "second position" respectively as mentioned in the first embodiment. It is to be understood that the take-up case 36 or the connecting portion 70 is provided with a restraining portion (not shown) which restricts the range of motion of the shaft 43 to a range from the retreat position to the use position. To be more specific, the restraining portion restrains the range of motion of the support member 90 so that the shaft 43 can move only between the retreat position and the use position. The restraining portion has structural features and operations similar to those described in the first embodiment.

As shown in FIG. 47(*b*), the shaft 43 has a dimension L1 in the axial direction, which is greater than a width L2 of the multilayer film F.

As shown in FIG. 46 and FIG. 47(*a*), the supply case 32 has a supply opening 32A through which the multilayer film F is allowed to pass. The supply opening 32A is an opening through which to guide the multilayer film F from inside to outside of the supply case 32. The take-up case 36 has a take-up opening 36A through which the multilayer film F is allowed to pass. The take-up opening 36A is an opening through which to guide the multilayer film F from outside to inside of the take-up case 36. The multilayer film F is supported on a pair of second guide rollers 640 located at the supply opening 32A and an edge of the take-up opening 36A, and thus stretched between the supply reel 31 and the take-up reel 35, i.e., can be run therebetween under tension.

The layer transfer film cartridge FC is installable into and removable from the housing main body 21 in directions perpendicular to an imaginary plane FF containing a rotation axis X1 of the supply reel 31 and a rotation axis X2 of the take-up reel 35. In this embodiment, the directions perpendicular to the imaginary plane FF will be referred to as "installation/removal directions".

As shown in FIG. 45, the housing main body 21 includes a first guide GD1 and a second guide GD2. The first guide GD1 and the second guide GD2 has structural features similar to those of the first embodiment shown in FIG. 5. The first guide GD1 is a groove along which to guide the supply shaft 31A of the supply reel 31 when the layer transfer film cartridge FC is installed into or removed from the housing main body 21. The first guide GD1 extends in the installation/removal directions mentioned above, and guides the supply shaft 31A in the installation/removal directions. The first guide GD1 is provided at one end and the other end respectively of the housing main body 21 which are located apart from each other in the axial direction.

The second guide GD2 is a groove along which to guide the take-up shaft 35A of the take-up reel 35 when the layer transfer film cartridge FC is installed into or removed from the housing main body 21. The second guide GD2 extends in the installation/removal directions mentioned above, and guides the take-up shaft 35A in the installation/removal directions. The second guide GD2 is provided at one end and the other end respectively of the housing main body 21 which are located apart from each other in the axial direction.

The housing cover 22 includes a pressing member that presses the shaft 43 from the retreat position shown in FIG. 47(*a*) toward the use position. The pressing member is fixed to the inside of the housing cover 22, and configured to press the shaft 43 from the retreat position toward the use position when the housing cover 22 is closed. The structural features, arrangement, relationship with the shaft 43, and operation of the pressing member are similar to those of the pressing member 22A of the first embodiment described with reference to FIG. 6. Thus, the installation and removal of the layer transfer film cartridge FC into and from the housing main body 21 can be carried out in the same way as illustrated in the first embodiment.

Figure 48:
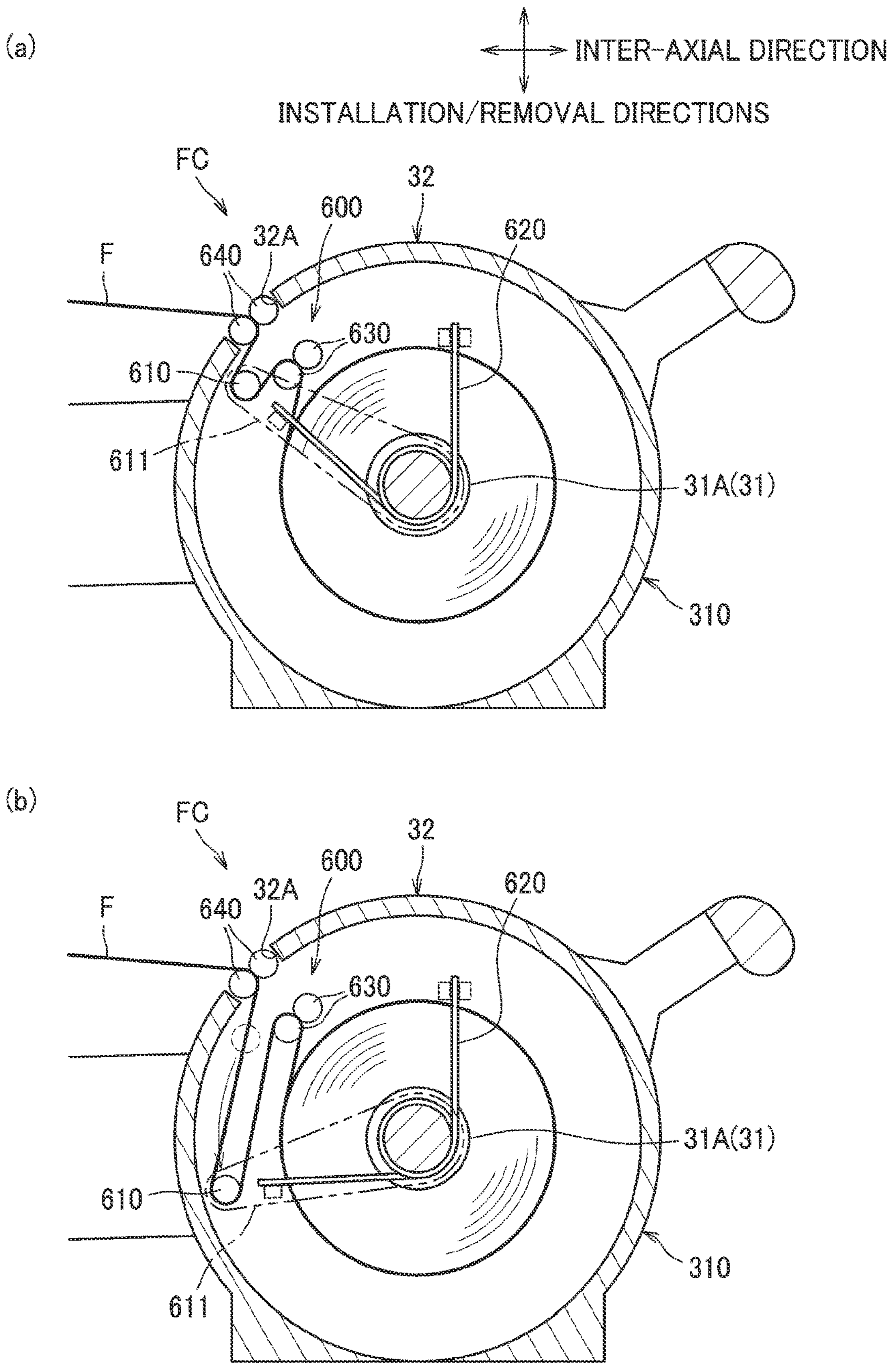
FIG. 48 includes section views (a), (b) showing a draw-in mechanism of the ninth embodiment.

As shown in FIG. 48, the layer transfer film cartridge FC further includes a draw-in mechanism 600. The draw-in mechanism 600 is a mechanism for drawing the multilayer film F into the supply case 32, and is located in the supply unit 310. The draw-in mechanism 600 includes a dancer roller 610, roller support members 611, torsion springs 620 as one example of a spring, a pair of first guide rollers 630, and a pair of second guide rollers 640.

The dancer roller 610 is a roller that draws the multilayer film F into the supply case 32, and located in the supply case 32. The dancer roller 610 is rotatably supported by the roller support members 611 located in the supply case 32, and thus is rotatable relative to the supply case 32. The roller support members 611 are provided at one end and at the other end respectively of the dance roller 610 which are located apart from each other in the axial direction.

The dancer roller 610 is supported by the roller support members 611, movably relative to the supply case 32 along a direction of rotation of the supply reel 31. To be more specific, the dancer roller 610 is rotatable between a first position shown in FIG. 48(*a*) and a second position shown in FIG. 48(*b*) farther than the first position from the supply opening 32A. The supply case 32 includes a restraining portion (not shown) which restricts the range of motion of the dancer roller 610 to a range from the first position to the second position. To be more specific, the restraining portion restrains the range of motion of the roller support members 611 so that the dancer roller 610 can move only between the first position and the second position.

The multilayer film F is looped on the dancer roller 610. The dancer roller 610 is in contact with the second surface FB (see FIG. 1(*b*)) of the multilayer film F.

The torsion spring 620 is a spring that biases the dancer roller 610 from the first position toward the second position. To be more specific, the torsion spring 620 has one end fixed to the supply case 32, and the other end biases and causes the roller support members 611 to rotate in a counterclockwise direction in the drawing, to thereby bias the dancer roller 610 from the first position toward the second position. The torsion springs 620 are provided at one end and at the other end respectively of the dance roller 610 which are located apart from each other in the axial direction.

The torsion spring 620 is configured to exert a biasing force having a magnitude such that when the layer transfer film cartridge FC is removed from the housing main body 21, the dancer roller 610 can be rotated from the first position toward the second positon so that the multilayer film F positioned between the supply case 32 and the take-up case 36 can be drawn into the supply case 32 by the dancer roller 610.

On the other hand, the biasing force of the torsion spring 620 exerted when the layer transfer film cartridge FC is installed into the housing main body 21 and the multilayer film F is drawn out from the supply case 32 has a magnitude such that the dancer roller 610 is caused to rotate from the second position to the first position by the tension of the multilayer film F. The biasing force of the torsion spring 620 exerted when the layer transfer film cartridge has been installed in the housing 2 has a magnitude such that the dancer roller 610 is kept in the first position irrespective of whether or not the multilayer film F is being drawn out from the supply case 32.

The first guide rollers 630 are rollers that change a traveling direction of the multilayer film F drawn out from the supply reel 31 toward the dancer roller 610, and are rotatable relative to the supply case 32. The first guide rollers 630 are located in the supply case 32, and provided with the multilayer film F nipped therebetween. The first guide rollers 630 are supported in positions fixed relative to the supply case 32.

The second guide rollers 640 are rollers that change a traveling direction of the multilayer film F guided by the dancer roller 610 toward the outside of the supply case 32, and are rotatable relative to the supply case 32. The second guide rollers 640 are located at the supply opening 32A, and provided with the multilayer film F nipped therebetween. The second guide rollers 640 are supported in positions fixed relative to the supply case 32.

Next, a description will be given of the operation and advantageous effects of the layer transfer device 1 according to the present embodiment.

When the layer transfer film cartridge FC is removed from the housing main body 21, starting from the state shown in FIG. 44, a user opens the housing cover 22, and then rotates the support member 90 with his/her hand to cause the shaft 43 to move from the use position to the retreat position. Thereafter, as shown in FIG. 45, the user holds the first handle 81 and the second handle 82 and pulls out the layer transfer film cartridge FC along the first guide GD1 and the second guide GD2 in the installation/removal direction, so that the layer transfer film cartridge FC can be removed easily from the housing main body 21.

As the layer transfer film cartridge FC is being removed from the housing main body 21, the dancer roller 610 moves from the first position shown in FIG. 48(*a*) toward the second position shown in FIG. 48(*b*) by the action of the biasing force of the torsion spring 620, and draws the multilayer film F into the supply case 32. Accordingly, with the layer transfer film cartridge FC removed from the housing main body 21 as shown in FIG. 47(*a*), the multilayer film F can be restrained from sagging badly as represented by the chain double-dashed line.

When the layer transfer film cartridge FC is installed into the housing main body 21 and the multilayer film F is drawn out from the inside of the supply case 32, the dancer roller 610 moves from the second position shown in FIG. 48(*b*) toward the first position shown in FIG. 48(*a*) by the tension of the multilayer film F against the biasing force of the torsion spring 620.

In the present embodiment, with the configurations described above, the following advantageous effects can be achieved.

When the layer transfer film cartridge FC is removed from the housing main body 21, the multilayer film can be restrained from sagging badly between the supply reel 31 and the take-up reel 35 by the draw-in mechanism 600.

Specifically, the multilayer film F can be drawn into the supply case 32 by the dancer roller 610 moving from the first position to the second position.

Since the draw-in mechanism 600 includes the torsion spring 620 that biases the dancer roller 610 from the first position toward the second position, the dancer roller 610 can be caused to automatically move from the first position to the second position without user's manual intervention for moving the dancer roller 610.

It is to be understood that the torsion spring is illustrated as an example of a spring in the present embodiment, but this is not a prerequisite; for example, the spring may be any spring other than the torsion spring, such as a helical extension spring, etc.

Figure 49:
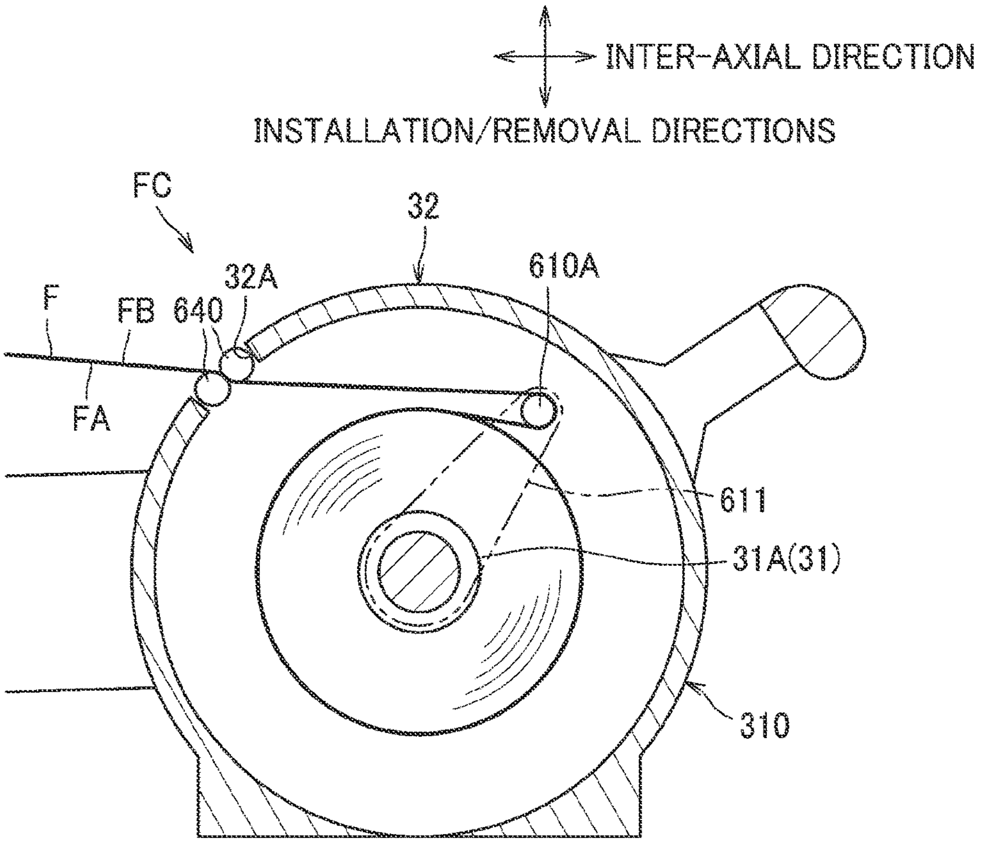
FIG. 49 includes section views (a), (b) showing a modified example of a draw-in mechanism of the ninth embodiment.
Figure 49:
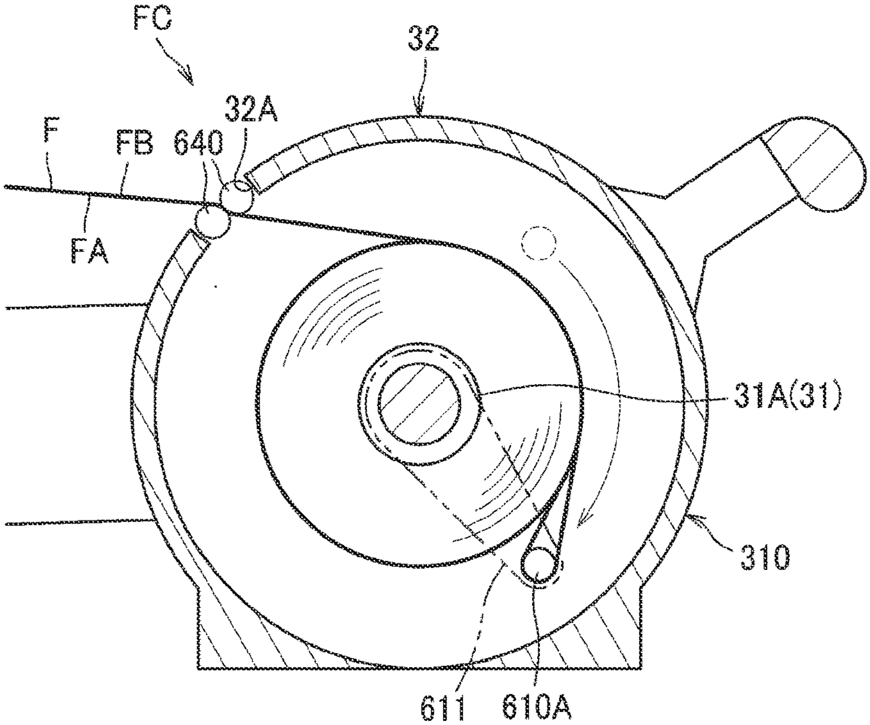

The dancer roller 610 in the present embodiment is provided movably from the first position toward the second position by the biasing force of the torsion spring 620 (spring); however, this is not a prerequisite. For example, as shown in FIG. 49, the dancer roller 610A may be so provided as to be movable from the first position shown in FIG. 49(*a*) to the second position shown in FIG. 49(*b*) under its own weight. In this alternative configuration, the draw-in mechanism may be configured to include neither the spring nor the first guide roller 630. With this configuration, the number of parts of the layer transfer film cartridge FC can be reduced and the dancer roller 610A can be caused to move automatically from the first position to the second position.

In the present embodiment, the dance roller 610 is so provided as to contact the second surface FB (see FIG. 1(*b*)) that is the transfer layer F22-side surface of the multilayer film F; however, this is not a prerequisite. For example, as shown in FIG. 49, the dancer roller 610A may be so provided as to contact the first surface FA that is a supporting layer F1-side surface of the multilayer film F. With this alternative configuration, the transfer layer F22 of the multilayer film F can be protected.

In the present embodiment, the dancer roller 61 that is rotatable relative to the supply case 32 is illustrated as an example of the draw-in member configured to draw the multilayer film F into the supply case 32; however, this is not a prerequisite, and the draw-in member may be a rod-shaped member which does not rotate relative to the supply case.

Next, a tenth embodiment will be described below. In the following description, for the same aspects as those in the ninth embodiment described above, the same reference characters are designated to the same members or in other ways where appropriate, relevant explanation will be omitted, and aspects distinct from the above-described embodiments will be described in detail.

Figure 50:
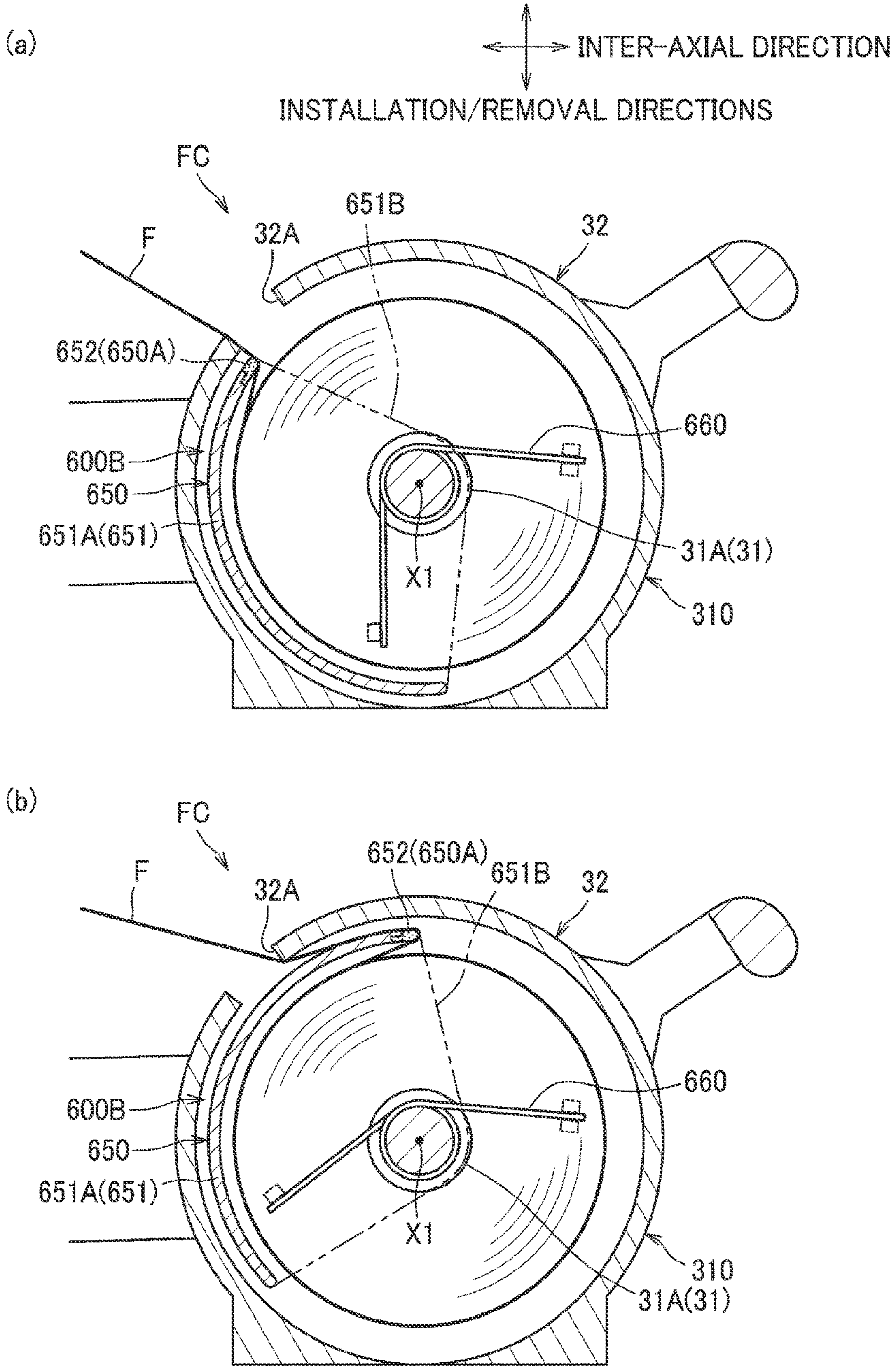
FIG. 50 includes section views (a), (b) showing a draw-in mechanism of a tenth embodiment.

As shown in FIG. 50, the layer transfer film cartridge FC includes a draw-in mechanism 600B for drawing the multilayer film F into the supply case 32. The draw-in mechanism 600B includes a shutter 650 and torsion springs 660.

The shutter 650 is a member that opens and closes the supply opening 32A of the supply case 32, and is located in the supply case 32. The shutter 650 includes a shutter main body 651 and an elastic member 652. The shutter main body 651 is made of plastic or the like, and includes a shutter portion 651A and a pair of support portions 651B. The shutter portion 651A is formed in a shape of a long plate elongate in the axial direction, having an approximately arc-shaped cross-section. The support portions 651B are plate-shaped portions extending from both ends of the shutter portion 651, apart from each other in the axial direction, toward the rotation axis X1, and formed substantially in a shape of a sector tapering toward the rotation axis X1.

The shutter 650 is supported rotatably in a direction of rotation of the supply reel 31 relative to the supply case 32 by the pair of support portions 651B. To be more specific, the shutter 650 is rotatable relative to the supply case 32 between an open position shown in FIG. 50(*a*) in which the shutter portion 651A is opened to uncover the supply opening 32A, and a close position shown in FIG. 50(*b*) in which the supply opening 32B is closed with the shutter portion 651A. It is to be understood that the supply case 32 is provided with a restraining portion (not shown) which restricts the range of motion of the shutter 650 to a range from the open position to the close position. To be more specific, the restraining portion restrains the range of motion of the shutter 650 so that the shutter 650 can move only between the open position and the close position.

When the shutter 650 rotates from the open position to the close position, its contact end portion 650A facing downstream in the direction of rotation thereof contacts the multilayer film F, whereby the multilayer film F is drawn into the supply case 32. The contact end portion 650A contacts a first surface FA that is a supporting layer F1 (see FIG. 1(*b*))-side surface of the multilayer film F.

The elastic member 652 is composed of a member having elasticity, and located at the contact end portion 650A. In other words, the shutter 650 has its contact end portion 650A formed of a member having elasticity. The elastic member 652 is made of a material having a high slipperiness with the multilayer film F. The material for use in the elastic member 652 may include, for example, PU (polyurethane), PTFE (polytetrafluoroethylene), PFA (perfluoroalkoxy alkane), etc.

The torsion springs 660 are springs that bias the shutter 650 from an open position shown in FIG. 50(*a*) toward a close position shown in FIG. 50(*b*). To be more specific, the torsion spring 660 has one end fixed to the supply case 32, and the other end biasing and causing the support portion 651B to rotate in a clockwise direction in the drawing, thereby biasing the shutter 650 from the open position toward the close position. The torsion springs 660 are provided at one end and at the other end respectively of the shutter 650 which are located apart from each other in the axial direction.

The torsion spring 660 is configured to exert a biasing force having a magnitude such that when the layer transfer film cartridge FC is removed from the housing main body 21 (see FIG. 45), the shutter 650 can be caused to rotate from the open position to the close position so that the multilayer film F positioned between the supply case 32 and the take-up case (not shown) can be drawn into the supply case 32 by the shutter 650.

On the other hand, the biasing force of the torsion spring 660 exerted when the layer transfer film cartridge FC is installed into the housing main body 21 and the multilayer film F is drawn out from the supply case 32 has a magnitude such that the shutter 650 is caused to rotate from the close position to the open position by the tension of the multilayer film F. The biasing force of the torsion spring 660 exerted when the layer transfer film cartridge FC has been installed in the housing 2 has a magnitude such that the shutter 650 is kept in the close position irrespective of whether or not the multilayer film F is being drawn out from the supply case 32.

When the layer transfer film cartridge FC is being removed from the housing main body 21 of the layer transfer device 1, the shutter 650 rotates from the open position shown in FIG. 50(*a*) to the close position shown in FIG. 50(*b*) by the biasing force of the torsion spring 660. Accordingly, the contact end portion 650A comes in contact with the multilayer film F, and the multilayer film F is thereby drawn into the supply case 32. Therefore, when the layer transfer film cartridge FC has been removed from the housing main body 21, the multilayer film F can be restrained from badly sagging.

With the configuration described above, in the present embodiment, similar to the ninth embodiment, the multilayer film F can be restrained from sagging badly between the supply reel 31 and the take-up reel (not shown) by the draw-in mechanism 600B.

Also, because the draw-in mechanism 600B includes the shutter 650 that opens and closes the supply opening 32A, the multilayer film F can be restrained from sagging by the shutter 650, and entry of foreign matter into the supply case 32 can be restrained by closing the supply opening 32A of the supply case 32.

Since the shutter 650 includes the elastic member 652 located at the contact end portion 650A, the multilayer film F can be protected more effectively in comparison with an alternative configuration in which the shutter main body 651 comes in direct contact with the multilayer film F.

Since the contact end portion 650A contacts the first surface FA that is the supporting layer F1-side surface of the multilayer film F, the transfer layer F22 of the multilayer film F can be protected more effectively in comparison with an alternative configuration in which the contact end portion contacts the second surface FB that is the transfer layer F22-side surface.

In the present embodiment, the shutter 650 is so provided as to rotate from the open position to the close position by the biasing force of the torsion spring 660; however, this is not a prerequisite. For example, the layer transfer film cartridge may be provided with an operating part for use in rotating the shutter, so that a user can operate the operating part to cause the shutter to rotate between the open position and the close position. In this configuration, the draw-in mechanism 600B may be configured to include no spring for causing the shutter to rotate.

Further, an actuating part that contacts the operating part mentioned above of the layer transfer film cartridge to move the operating part may be provided in the housing main body 21 or the housing cover 22 of the housing 2, such that when the layer transfer film cartridge is installed into the housing main body 21 or when the housing cover 22 is closed after installation of the layer transfer film cartridge into the housing main body 21, the actuating part contacts the operating part and causes the shutter to move from the close position to the open position.

Further, in the present embodiment, the contact end portion 650A of the shutter 650 is composed of the elastic member 652 having elasticity; however, this is not a prerequisite. The contact end portion of the shutter may be formed, for example, of plastic, etc. having no elasticity, as long as it has a high slipperiness with the multilayer film.

Next, an eleventh embodiment will be described below.

Figure 51:
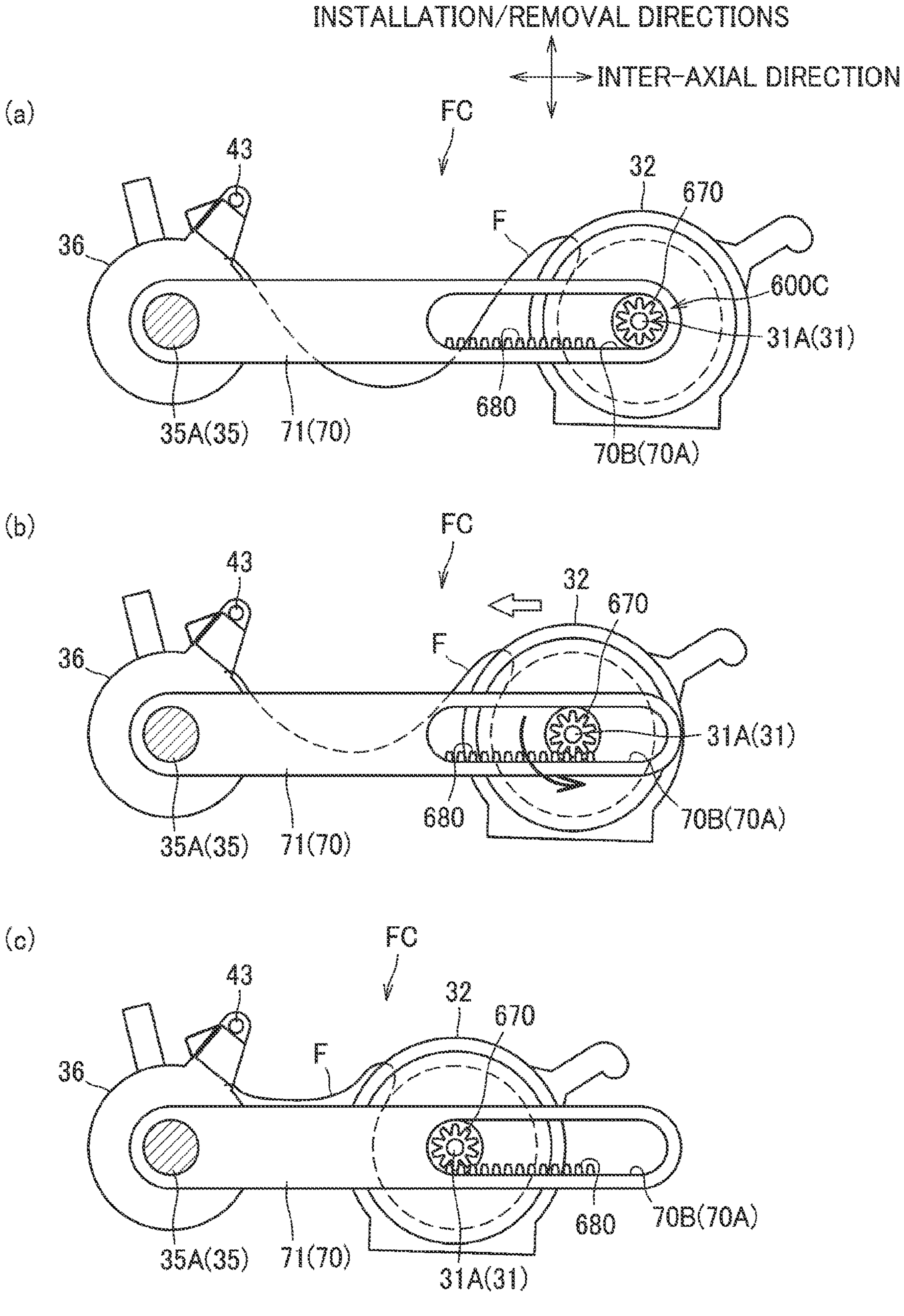
FIG. 51 is a side views (a) to (c) showing a layer transfer film cartridge according to an eleventh embodiment.

As shown in FIG. 51, in the layer transfer film cartridge FC, the supply case 32 is supported, together with the supply reel 31, by the connecting portion 70 as a connecting member, movably in the axial direction. To elaborate, the connecting portion 70 (first connecting portion 71 and the second connecting portion 72 which are not illustrated in the drawing) has an elongate hole 70A. The elongate hole 70A is a long hole elongate in the axial direction, with which the supply shaft 31A of the supply reel 31 is engageable, and is formed at one of ends of the connecting portion 70 which are located apart from each other in the inter-axial direction.

The supply case 32 with the supply shaft 31A of the supply reel 31 engaged in the elongate hole 70A formed in the connecting portion 70 is supported together with the supply reel 31 movably along the inter-axial direction relative to the connecting portion 70. The supply case 32 is supported by the connecting portion 70 movably in the inter-axial direction between a third position shown in FIG. 51(*a*) farthest form the take-up reel 35 and a fourth position shown in FIG. 51(*c*) closest to the take-up reel 35.

The layer transfer film cartridge FC includes a draw-in mechanism 600C for drawing the multilayer film F into the supply case 32. The draw-in mechanism 600C includes a pinion gear 670 and a rack gear 680.

The pinion gear 670 is a gear that rotates integrally with the supply reel 31, and is provided at one end of the supply shaft 31A of the supply reel 31. The pinion gear 670 is located, together with the one end of the supply shaft 31A, inside the elongate hole 70A.

The rack gear 680 is a gear engageable with the pinion gear 670, and provided at the connecting portion 70. To be more specific, the rack gear 680 is provided on one of side surfaces opposed to each other in the installation/removal directions that forms part of the inner peripheral surface of the elongate hole 70A formed in the first connecting portion 71 (the bottom side surface in the drawing; hereinafter referred to as "opposite surface 70B").

The rack gear 680 is provided from a position near the center of the opposite surface 70B to a take-up reel 35-side end of the opposite surface 70B along the axial direction. In other words, the rack gear 680 is not provided in a portion on a supply reel 32-side end of the opposite surface 70B. Therefore, the rack gear 680 is disengaged from the pinion gear 670 when the supply case 32 is positioned in the third positon shown in FIG. 51(*a*), and engages with the pinion gear 670 when the supply case 32 moving from the third position to the fourth position comes in a position between the third position and the fourth position, and from then on until reaching the fourth position, as shown in FIG. 51(*b*), (*c*).

After the layer transfer film cartridge FC is removed from the housing main body 21 (see FIG. 45), the supply case 32 is caused to move in a such a direction as to approach the take-up reel 35, i.e., from the third position shown in FIG. 51(*a*) toward the fourth position shown in FIG. 51(*c*), and the pinion gear 670 engages with the rack gear 680; accordingly, the supply shaft 31A is caused to rotate together with the pinion gear 670 in a counterclockwise direction in the drawing (see FIG. 51(*b*)). In this way, the supply reel 31 rotates in such a direction as to take up the multilayer film F, so that the multilayer film F can be drawn into the supply case 32.

With this operation, in the present embodiment, as is the case with the embodiment described above, the multilayer film F can be restrained from sagging badly between the supply reel 31 and the take-up reel 35 by the draw-in mechanism 600C.

Specifically, since the supply case 32 is caused to move in such a direction as to move closer to the take-up reel 35, the multilayer film F can be drawn into the supply case 32.

Since the rack gear 680 is disengaged from the pinion gear 670 when the supply case 32 is in the third position, the supply reel 31 can be allowed to rotate freely when the supply case 32 is in the third position.

Although the supply case 32 is, in the present embodiment, movable in a path following a straight line along the inter-axial direction, this is not a prerequisite. The supply case may be configured to be movable, for example, in a path following an arc, as long as the supply case 32 can be moved in such a direction as to move closer to the take-up reel.

Although the present embodiment has been described above, the present embodiment may be modified where appropriate for practical implementation as described below.

In the ninth embodiment through the eleventh embodiment, the connecting portion 70 is configured as two connecting portions, i.e., the first connecting portion 71 and the second connecting portion 72, but this is not a prerequisite; rather, the connecting portion may be made up of a single part (e.g., only of the first connecting portion).

Next, a detailed description will be given of a twelfth embodiment with reference made mainly to FIG. 52 to FIG. 57. In the following description, elements having substantially the same structural features as those of the first embodiment will be designated by the same reference characters, and a description thereof will be omitted.

Figure 52:
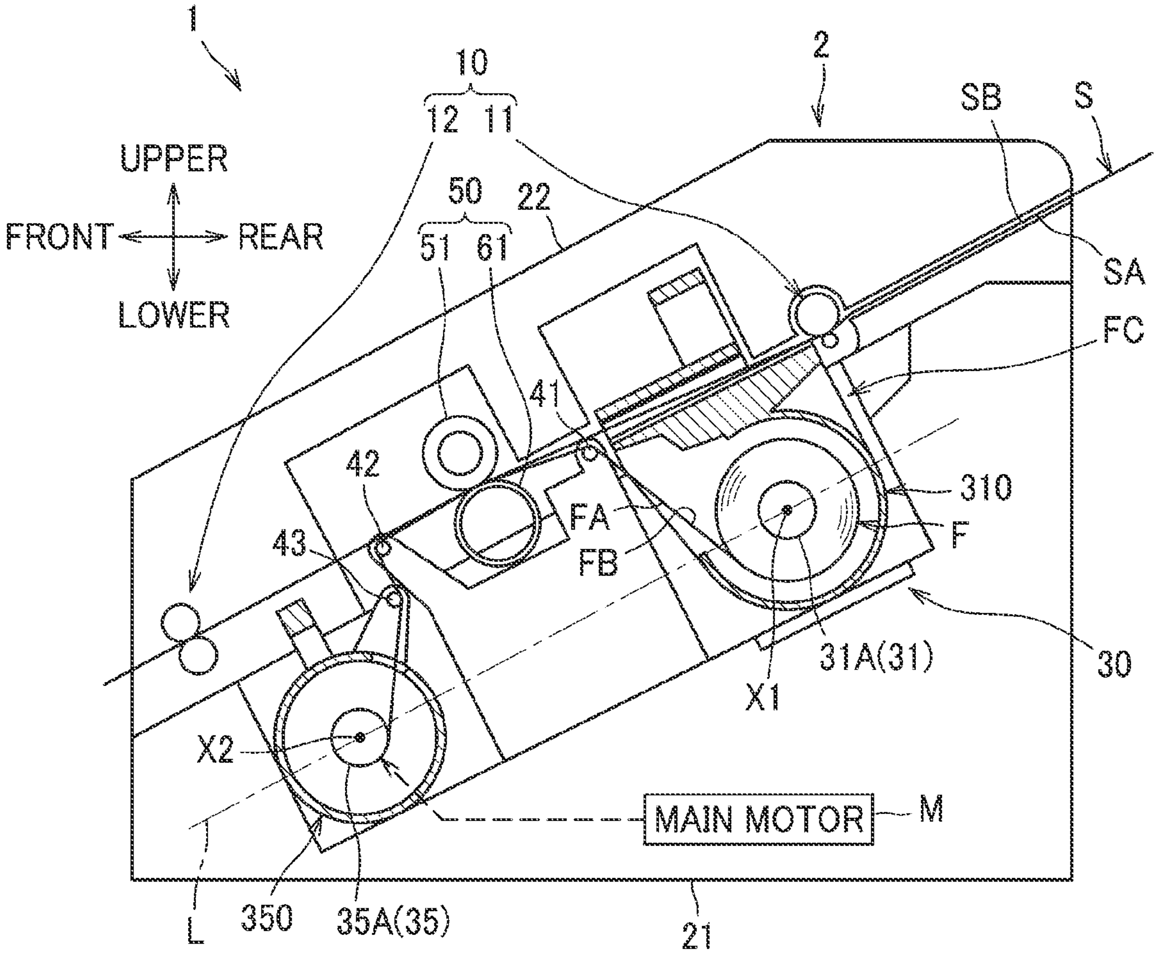
FIG. 52 is a diagram showing a layer transfer device according to a twelfth embodiment.

As shown in FIG. 52, the layer transfer device 1 includes a housing 2, a sheet conveyor unit 10, a film supply unit 30, and a transfer unit 50. The film supply unit 30 includes a layer transfer film cartridge FC, a first guide shaft 41, a second guide shaft 42, and a main motor M as a driving source.

Figure 53:
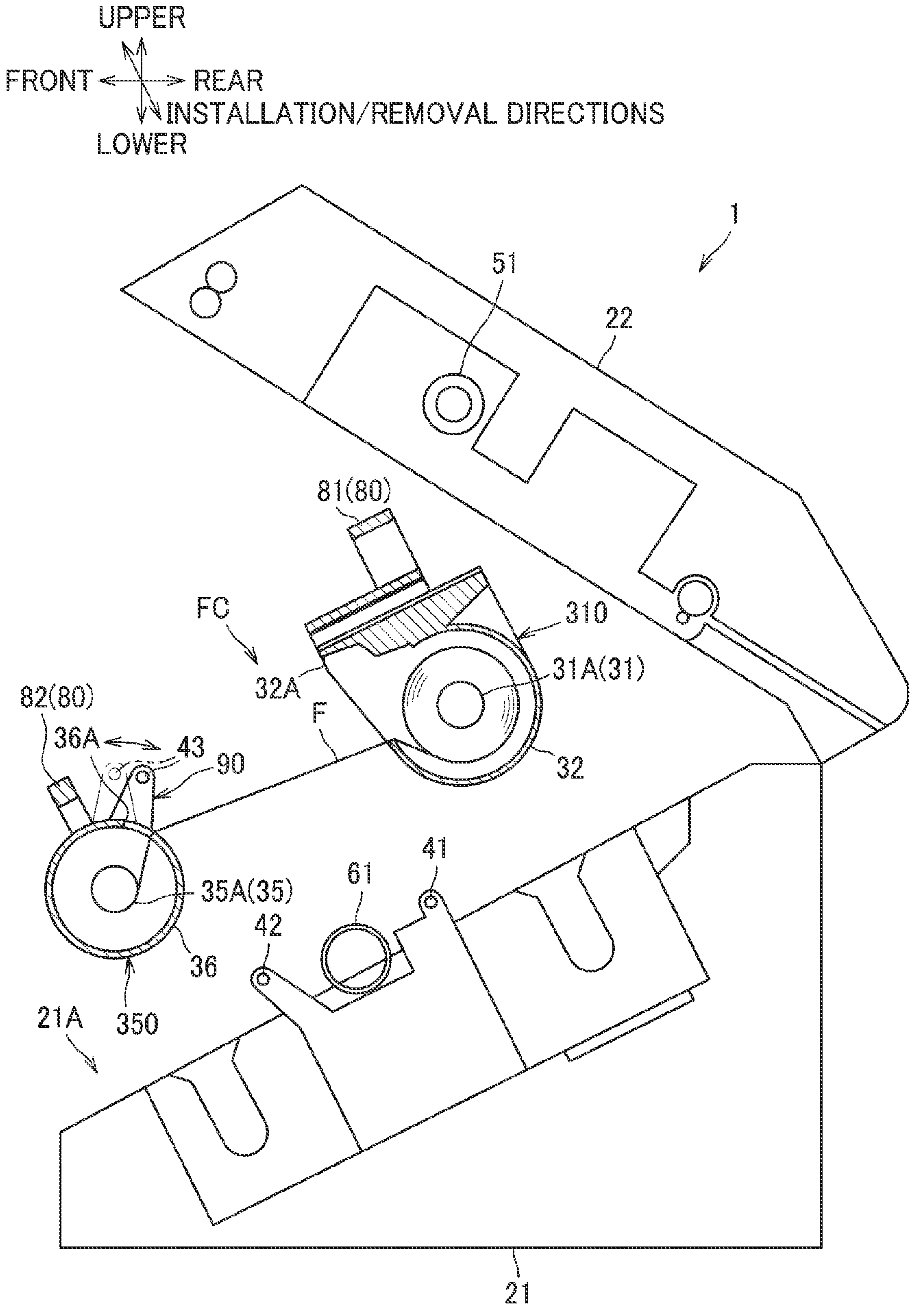
FIG. 53 is a diagram showing a state of the layer transfer device with a housing cover being open.

The layer transfer film cartridge FC is, as shown in FIG. 53, configured to be installable into and removable from a housing main body 21 through a housing opening 21A. The layer transfer film cartridge FC is a cartridge that supports a multilayer film F consisting of a plurality of layers as shown in FIG. 1(*b*). The layer transfer film cartridge FC mainly includes a supply unit 310, a take-up unit 350, and a shaft 43 as a third guide shaft.

The supply unit 310 mainly includes a supply reel 31. The take-up unit 350 mainly includes a take-up reel 35. The supply reel 31 is a reel for supplying the multilayer film F toward the transfer unit 50, and the take-up reel 35 is a reel for taking up the multilayer film F having passed through the transfer unit 50. The multilayer film F is wound on the supply reel 31.

Figure 54:
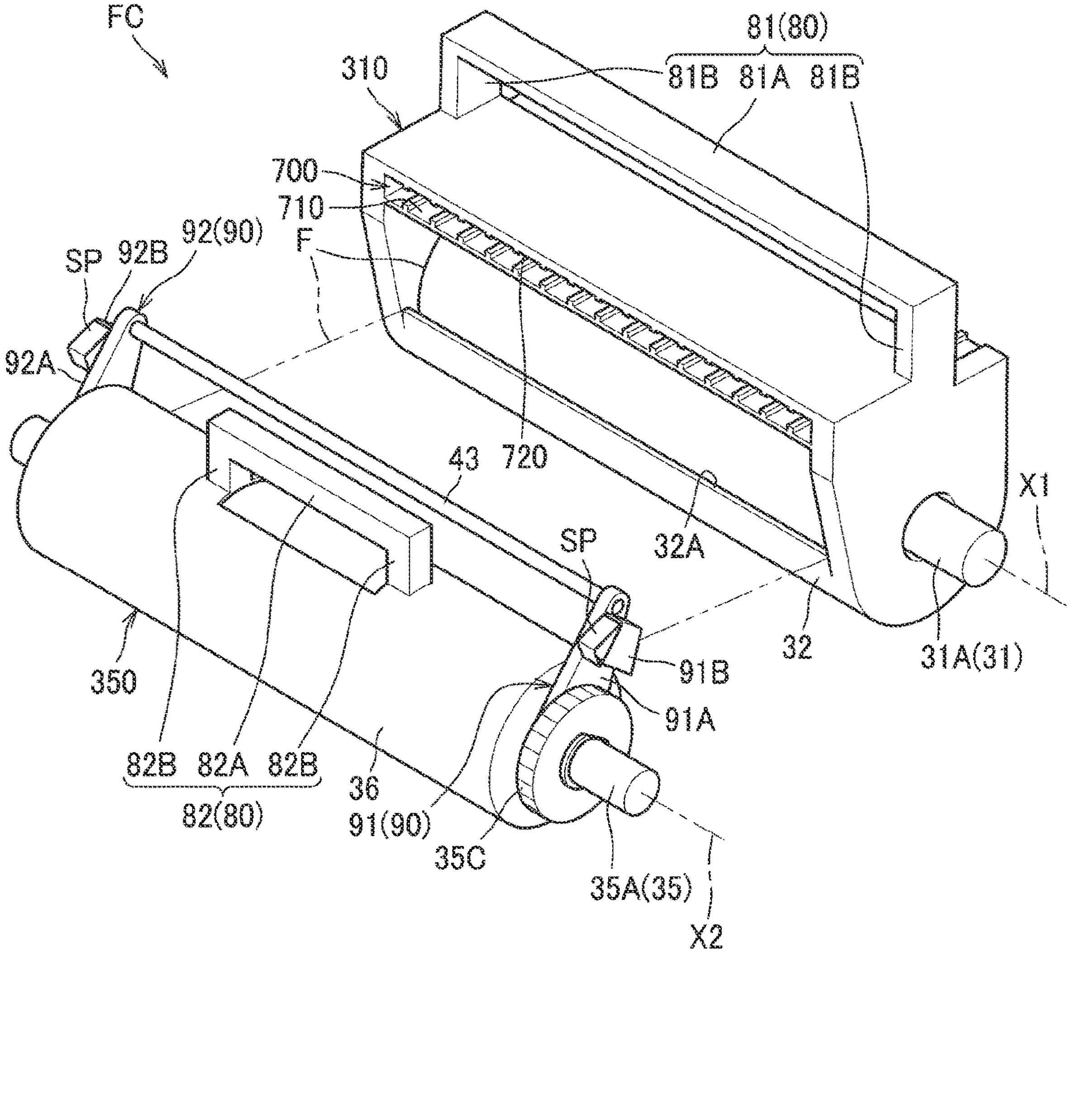
FIG. 54 is a perspective view showing a layer transfer film cartridge according to the twelfth embodiment.

As shown in FIG. 54, the layer transfer film cartridge FC further includes a handle 80, a support member 90, and a sheet guide 700, in addition to the supply unit 310, the take-up unit 350 and the shaft 43. In the layer transfer film cartridge configured according to the present embodiment, a member corresponding to the connecting portion 70 as in the first embodiment which connects the supply unit 310 and the take-up unit 350 is not provided.

The supply unit 310 further includes a supply case 32, in addition to the supply reel 31. The take-up unit 350 further includes a take-up case 36, in addition to the take-up reel 35. The supply case 32 houses the supply reel 31, and the take-up case 35 houses the take-up reel 35.

The handle 80 is a portion that allows a user's fingers to be hooked thereon, and includes a first handle 81 and a second handle 82. The first handle 81 supported by the supply case 32 includes a first base portion 81A as a grip portion extending in the axial direction, and two first legs 81B extending toward the supply reel 31 from both ends of the first base portion 81B which are located apart from each other in the axial direction. The two first legs 81B are connected to the supply case 32. The second handle 82 supported by the take-up case 36 includes a second base portion 82A as a grip portion extending in the axial direction, and two second legs 82B extending toward the take-up reel 35 from both ends of the second base portion 82A which are located apart from each other in the axial direction. The two second legs 82B are connected to the take-up case 36.

As shown in FIG. 53, the shaft 43 supported by the support member 90 is movable relative to the take-up case 36. Specifically, the shaft 43 is movable between a retreat position indicated by a chain double-dashed line and a use position indicated by a solid line which is closer than the retreat position to the supply reel 31. Herein, the "retreat position" and the "use position" correspond to the "first position" and the "second position" respectively as mentioned in the first embodiment.

The supply case 32 has a supply opening 32A through which the multilayer film F is allowed to pass. The supply opening 32A is an opening through which to guide the multilayer film F from inside to outside of the supply case 32. The take-up case 36 has a take-up opening 36A through which the multilayer film F is allowed to pass. The take-up opening 36A is an opening through which to guide the multilayer film F from outside to inside of the take-up case 36. The multilayer film F is supported on the edge of the supply opening 32A and the edge of the take-up opening 36A, and thus stretched between the supply reel 31 and the take-up reel 35, i.e., can be run therebetween under tension.

The layer transfer film cartridge FC is installable into and removable from the housing main body 21 in the installation/removal directions. In the present embodiment, the installation/removal directions are perpendicular to the axial direction. Further, the installation/removal directions are perpendicular to a straight line L connecting the rotation axes X1, X2 (see FIG. 52) in the layer transfer film cartridge FC installed in the housing main body 21.

Figure 55:
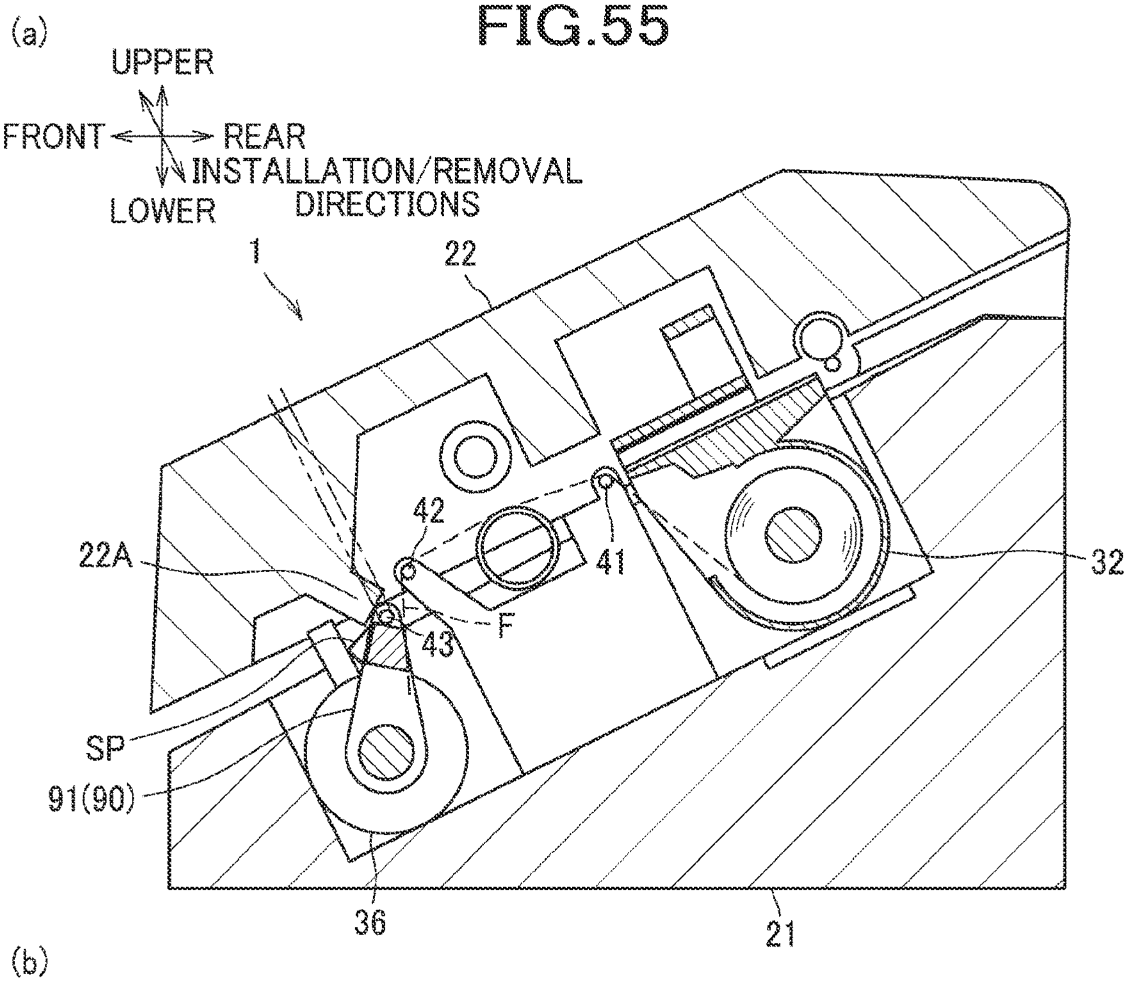
FIG. 55 includes section views (a), (b) showing a motion of a shaft moving in synchronization with a closing motion of the housing cover.
Figure 55:
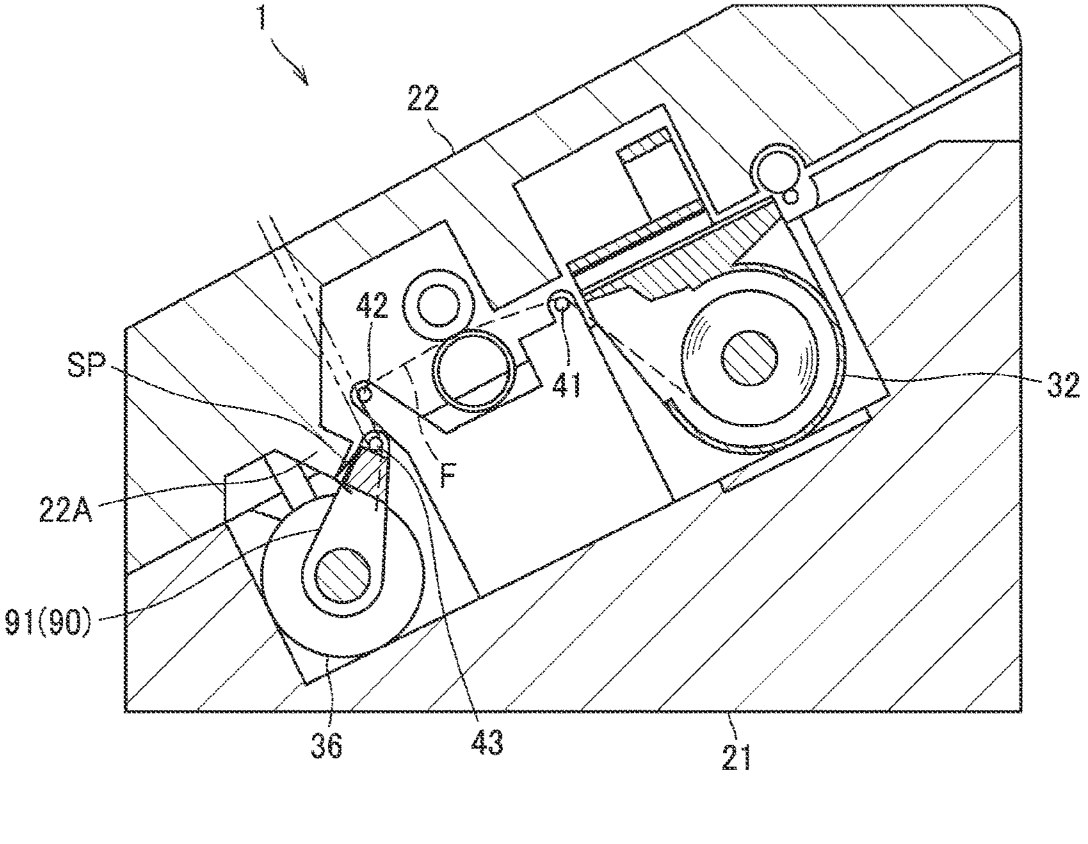

As shown in FIG. 55, the housing cover 22 includes a pressing member 22A that presses the shaft 43 from the retreat position shown in FIG. 55(*a*) toward the use position shown in FIG. 55(*b*). The pressing member 22A is fixed to the housing cover 22, and configured to press the shaft 43 from the retreat position toward the use position when the housing cover 22 is closed.

The shaft 43 positioned in the retreat position shown in FIG. 55(*a*) is so located as not to overlap, if projected in the installation/removal directions toward, the second guide shaft 42. Accordingly, when the shaft 43 is located in the first position, the layer transfer film cartridge FC can be installed and removed without hindrance of the second guide shaft 42 as would otherwise get in the way of the shaft 43. On the other hand, the shaft 43 in the use position shown in FIG. 55(*b*) is so located as to overlap, if projected in the installation/removal directions toward, the second guide shaft 42. Accordingly, the peel-off angle of the multilayer film F at the second guide shaft 42 can be adjusted properly.

Pressing members 22A are located at one end and the other end of the shaft 43, apart from each other in the axial direction. The pressing member 22A at the one end is so located as to be contactable with the leaf spring SP provided in the first side plate 91 when the layer transfer film cartridge FC is installed in the housing main body 21. Also, the pressing member 22A at the other end (not shown in the drawing) is so located as to be contactable with the leaf spring SP provided in the second side plate 92 when the layer transfer film cartridge FC is installed in the housing main body 21. Accordingly, the pressing members 22A are rendered capable of pressing the shaft 43 via the leaf springs SP and the support member 90.

Figure 56:
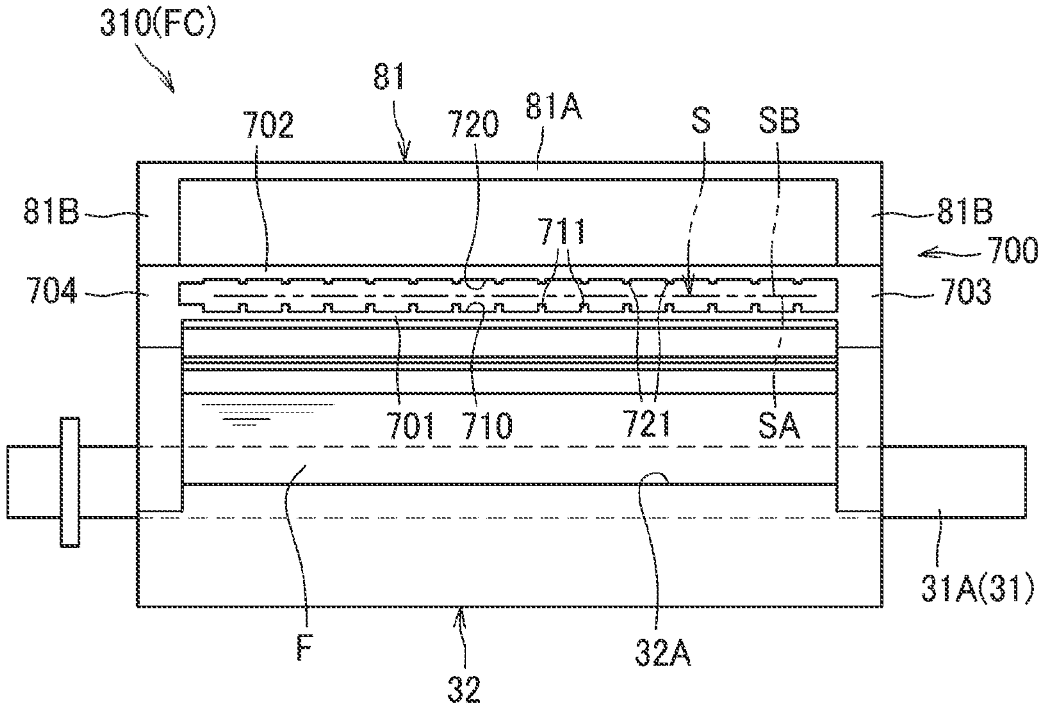
FIG. 56 is a front view showing a supply unit of the layer transfer film cartridge according to the twelfth embodiment.

As shown in FIG. 56, the sheet guide 700 is a portion that guides a sheet S conveyed by the sheet conveyor unit 10 when the layer transfer film cartridge FC is installed in the housing 2. The sheet guide 700 is provided in the supply unit 310. In the present embodiment, the sheet guide 700 is provided at the supply case 32.

The supply case 32 includes a first wall 701 extending in the axial direction, a second wall 702 located on a side of the first wall 701 opposite to a side on which the supply reel 31 is located, a third wall 703 connecting one ends of the first wall 701 and the second wall 702 (one end of each wall is one of ends which are located apart from each other in the axial direction), and a fourth wall 704 connecting the other ends of the first wall 701 and the second wall 702 (the other end of each wall 701, 702 is the other of the ends which are located apart from each other in the axial direction). The first wall 701 and the second wall 702 are located apart from each other at a predetermined distance in a direction (installation/removal directions) perpendicular to the axial direction, while the third wall 703 and the fourth wall 704 are located apart from each other at a predetermined distance in the axial direction. The distance in the axial direction between the third wall 703 and the fourth wall 704 is greater than the width in the axial direction, of a sheet S having a maximum size conveyable in the layer transfer device 1.

The sheet guide 700 is formed of the first wall 701, the second wall 702, the third wall 703 and the fourth wall 704. The sheet guide 700 is provided through the supply case 32. The sheet guide 700 has a first guide surface 710 and a second guide surface 720.

The first guide surface 710 is a surface that is to be opposed to a front surface SA of a sheet S on which the transfer layer F22 of the sheet S is to be transferred, and is provided on the first wall 701 of the supply case 32. The first guide surface 710 is a surface of the first wall 701 facing away from a reverse surface thereof facing on a side on which the supply reel 31 is located.

The second guide surface 720 is a surface opposed to the first guide surface 710. By extension, the second guide surface 720 is a surface that is to be opposed to a reverse surface SB of the sheet S. The second guide surface 720 is located in such a position that the supply reel 31 is located behind the first guide surface 710 as viewed from the second guide surface 720. In the present embodiment, the second guide surface 720 is provided on the second wall 702. The second guide surface 720 is a surface of the second wall 702 facing toward the supply reel 31. The first guide surface 710 and the second guide surface 720 are provided, apart from each other in a direction (installation/removal directions) perpendicular to the axial direction, to allow a sheet S to be positioned therebetween.

In the present embodiment, the first base portion 81A of the first handle 81 is located in such a position that the both of the first guide surface 710 and the second guide surface 720, i.e., the sheet guide 700, are positioned between the first base portion 81A and the supply reel 31. The first base portion 81A is located above the supply case 32.

The first guide surface 710 is provided with first ribs 711. The first ribs 711 are ribs extending along a direction of conveyance of a sheet S, and so provided as to protrude from the first guide surface 710 toward the second guide surface 720. The first ribs 711 are a plurality of ribs arranged in the axial direction.

The second guide surface 720 is provided with second ribs 721. The second ribs 721 are ribs extending along the direction of conveyance of a sheet S, and so provided as to protrude from the second guide surface 720 toward the first guide surface 710. The second ribs 721 are a plurality of ribs arranged in the axial direction. Each of the second ribs 721 is so provided as to be opposed to a corresponding one of the first ribs 711 in a direction perpendicular to the axial direction.

Figure 57:
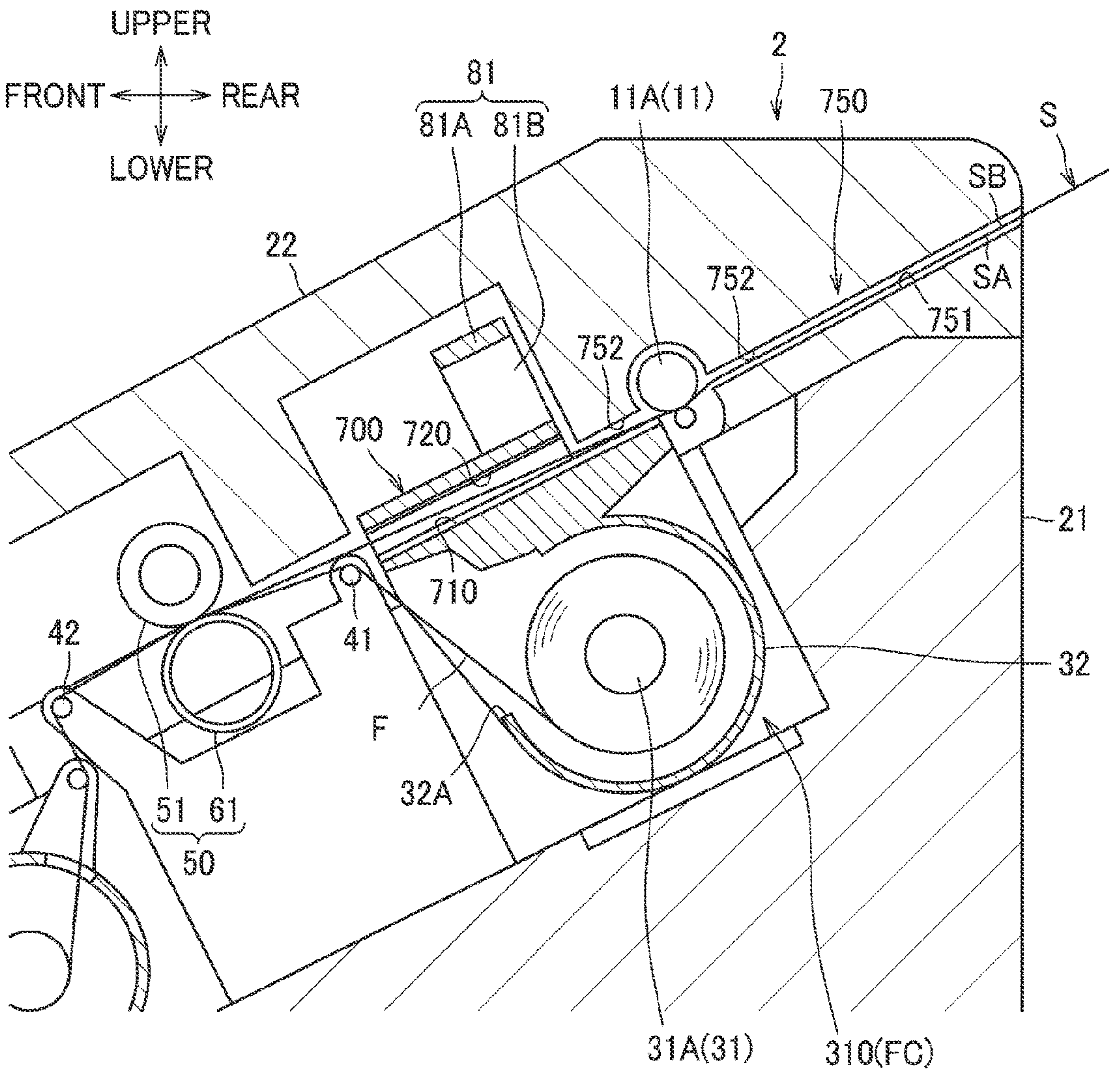
FIG. 57 is an enlarged section view showing a supply unit and its vicinity of the layer transfer film cartridge installed in the housing.

As shown in FIG. 57, the length of the first guide surface 710 in the direction of conveyance of a sheet S is longer than the length of the second guide surface 720 in the direction of conveyance of a sheet S. To be more specific, the downstream end of the first guide surface 710 and the downstream end of the second guide surface 720 in the direction of conveyance of a sheet S are approximately aligned in position. On the other hand, the upstream end of the first guide surface 710 is positioned upstream of the upstream end of the second guide surface 720 in the direction of conveyance of a sheet S.

The housing cover 22 includes a housing sheet guide 750 that guides a sheet S supplied from a sheet tray (not shown) toward the sheet guide 700. The housing sheet guide 750 has a third guide surface 751 to be opposed to the front surface SA of a sheet S, and a fourth guide surface 752 to be opposed to the reverse surface SB of the sheet S.

In a state where the layer transfer film cartridge FC is installed in the housing main body 21 and the housing cover 22 is closed, the first guide surface 710 is located downstream of the third guide surface 751 in the direction of conveyance of a sheet S, and the second guide surface 720 is located downstream of the fourth guide surface 752 in the direction of conveyance of a sheet S. The upstream end of the first guide surface 710 in the direction of conveyance of a sheet S is opposed to the downstream end of the fourth guide surface 752 in the direction of conveyance of a sheet S. The distance between the first guide surface 710 and the second guide surface 720 is greater than the distance between the first guide surface 710 and the fourth guide surface 752. The distance between the first guide surface 710 and the second guide surface 720 is greater than the distance between the third guide surface 751 and the fourth guide surface 752.

The sheet supply mechanism 11 is provided at the housing cover 22. The sheet supply mechanism 11 includes a supply roller 11A that conveys a sheet S toward the transfer unit 50. When the layer transfer film cartridge FC is installed into the housing main body 21 and the housing cover 22 is closed, the sheet supply roller 11A is located between the first guide surface 710 and the third guide surface 751 in the direction of conveyance of a sheet S.

In a state where the layer transfer film cartridge FC is installed in the housing 2, the sheet guide 700 (first guide surface 710 and second guide surface 720) is located higher in level than the first guide shaft 41 and the second guide shaft 42. The sheet guide 700 is located higher in level than the supply opening 32A. The first handle 81 is located higher in level than the first guide shaft 41 and the second guide shaft 42.

Next, a description will be given of the operation and advantageous effects of the layer transfer device 1 according to the present embodiment.

As shown in FIG. 53, when a user holds the handle 80 and brings the layer transfer film cartridge FC into the housing main body 21 from above for installation, the multilayer film F stretched between the supply case 32 and the take-up case 36 comes in contact with the first guide shaft 41 and the second guide shaft 42. Thereafter, when the layer transfer film cartridge FC is further moved into the installation position, the multilayer film F indicated by a broken line, as shown in FIG. 55(*a*), is stretched between adjacent members of the first guide shaft 41 and the second guide shaft 42 and the take-up case 36.

After the layer transfer film cartridge FC is installed in the housing main body 21, as the user is further closing the housing cover 22, the pressing members 22A come in contact with the leaf spring SP. Thereafter, as the user is closing the housing cover 22, the pressing members 22A press the shaft 43 via the leaf springs SP and the support member 90, causing the shaft 43 to move from the retreat position toward the use position.

The shaft 43, before reaching the use position, comes in contact with the multilayer film F stretched between the second guide shaft 42 and the take-up case 36. Thereafter, as the user is further closing the housing cover 22, the shaft 43 presses the multilayer film F stretched between the second guide shaft 42 and the take-up case 36 toward the supply case 32, and then reaches the use position.

When the shaft 43 comes in the use position, the support member 90 is restrained from rotating by a restraining portion (not shown); accordingly, as the user is further closing the housing cover 22, the leaf springs SP are compressed between the pressing members 22A and the support member 90. Consequently, when the housing cover 22 has been closed completely as shown in FIG. 55 (*b*), the biasing force of the leaf springs SP can be transmitted via the support member 90 and the shaft 43 to the multilayer film F, so that the multilayer film F can be held under an adequate tension.

To remove the layer transfer film cartridge FC from the housing main body 21, a user opens the housing cover 22, and then turns the support member 90 by hand, to move the shaft 43 from the use position to the retreat position. Subsequently, the user holds the handle 80, and draws out the layer transfer film cartridge FC in the installation/removal direction; thus, the layer transfer film cartridge FC can be removed easily from the housing main body 21.

When a sheet S is subjected to a layer transfer process, as shown in FIG. 57, a sheet S placed on the sheet tray (not shown) is conveyed by the sheet supply roller 11A of the sheet supply mechanism 11 toward the transfer unit 50, while being guided by the housing sheet guide 750, and the sheet guide 700 provided in the layer transfer film cartridge FC. Thereafter, the sheet S is, after subjected to the layer transfer process as described above, ejected by the sheet ejection mechanism 12 to the outside of the housing 2.

In the present embodiment, with the configurations described above, the following advantageous effects can be achieved.

Since the layer transfer film cartridge FC includes the sheet guide 700 having the first guide surface 710 and the second guide surface 720, the layer transfer device 1 can be downsized in comparison with an alternative configuration in which the housing of the layer transfer device includes a sheet guide provided around the layer transfer film cartridge. Further, in comparison with an alternative configuration in which a sheet is guided to pass through between a case of the layer transfer film cartridge and a housing of the layer transfer device, the accuracy in positioning of the opposed first guide surface 710 and second guide surface 720 can be ensured without the need to provide structural features for positioning two opposed guide surfaces, or the like; therefore, the layer transfer device 1 can be restrained from having a complicated structure.

Since the layer transfer film cartridge FC includes the handle 80 (81, 82), the operational ease for installation and removal of the layer transfer film cartridge FC into and from the layer transfer device 1 can be improved.

It is understood that the alternative configuration in which a sheet is guided to pass through between a case of the layer transfer film cartridge and a housing of the layer transfer device makes it difficult to provide a device-side guide surface in a portion in which a handle is to be positioned; in contrast, since the layer transfer film cartridge FC includes the sheet guide 700, at least part of the device-side guide surface can be omitted. Accordingly, the layer transfer device 1 can be restrained from having a complicated structure. Also, the alternative configuration in which a sheet is guided to pass through between the case and the housing of the layer transfer device may require, for example, that a handle of the layer transfer film cartridge be provided movably relative to the case so as to move around the device-side guide surface; in contrast, since the layer transfer film cartridge FC includes the sheet guide 700, the first handle 81 can be fixedly provided, so that the layer transfer device 1 can be restrained from having a complicated structure.

Since the guide surfaces 710, 720 include ribs 711, 721, an area of contact of the guide surfaces 710, 720 with a sheet S can be reduced. Thus, the performance of conveyance of a sheet S via the sheet guide 700 can be improved.

Since the sheet guide 700 is provided in a supply-side part (supply unit 310 for supplying the multilayer film F) of the layer transfer film cartridge FC, a sheet S can be fed precisely toward the transfer position (transfer unit 50) of the layer transfer device 1 by the sheet guide 700.

Next, a thirteenth embodiment will be described below. In the following description, elements having the same structural features as those of the twelfth embodiment described above will be designated by the same reference characters, and a description thereof will be omitted where appropriate; a detailed description will be given of features different from the above-described embodiments.

Figure 58:
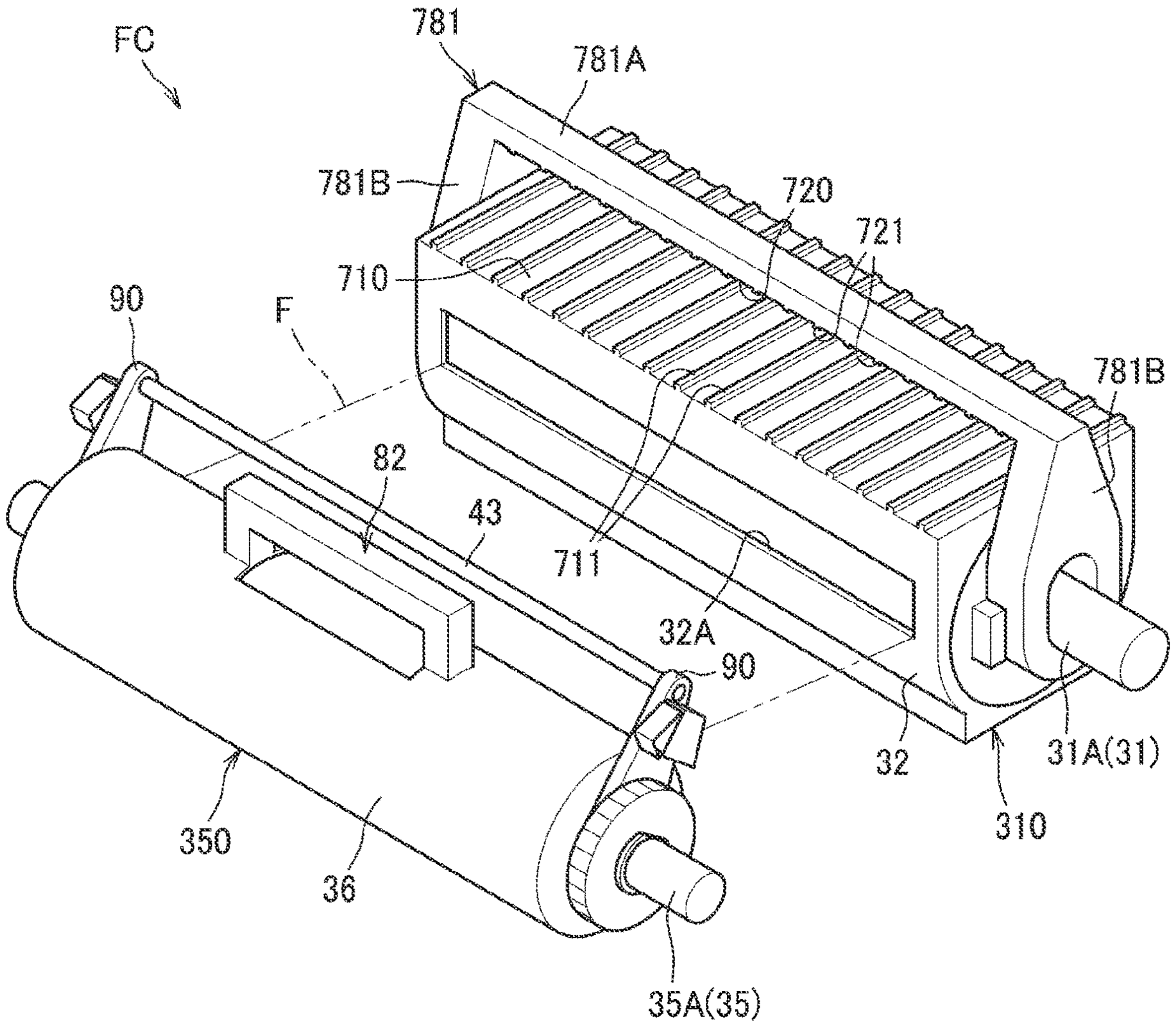
FIG. 58 is a perspective view showing a layer transfer film cartridge according to a thirteenth embodiment.
Figure 59:
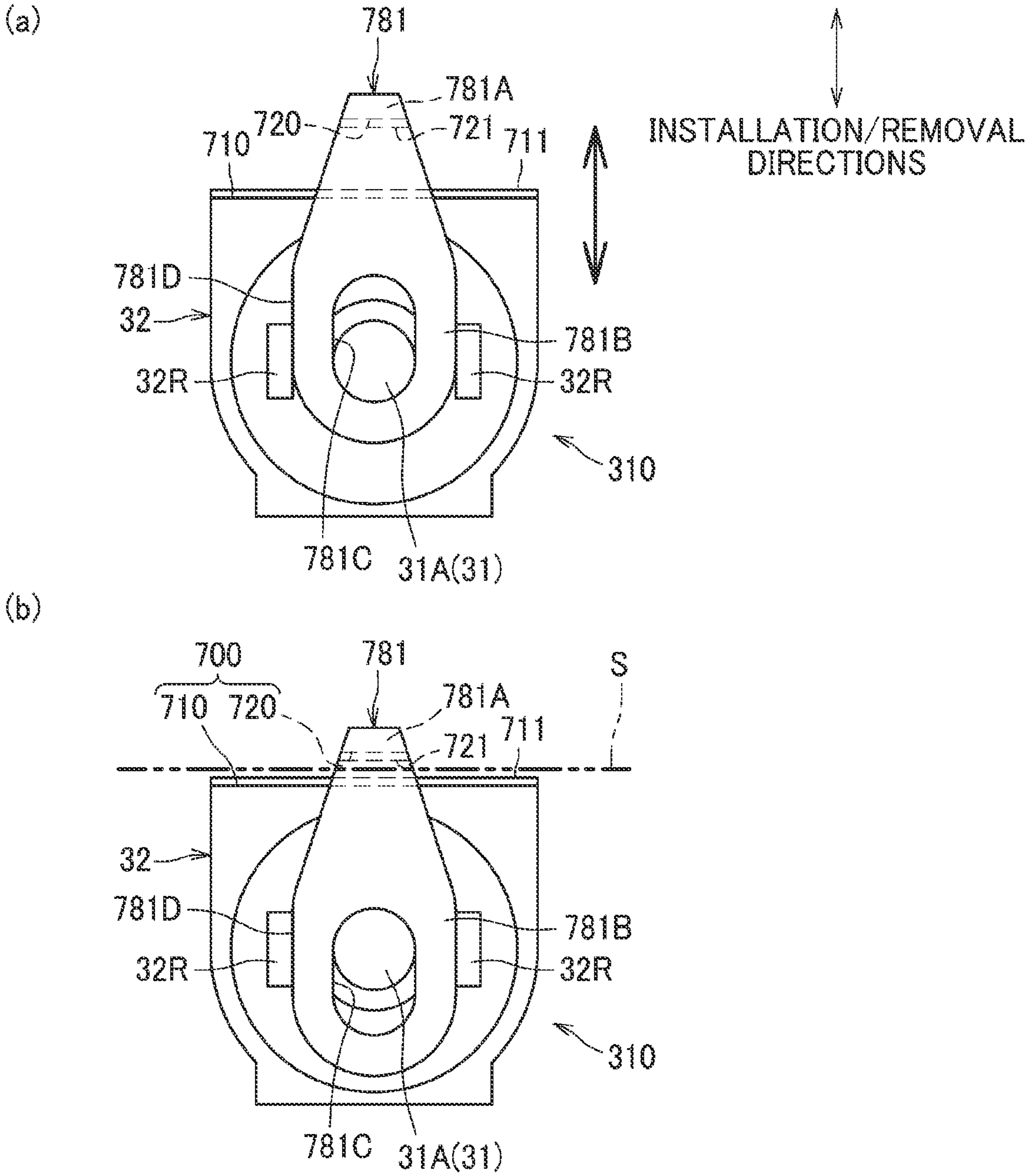
FIG. 59 includes side views (a), (b) showing a supply unit of the layer transfer film cartridge according to the thirteenth embodiment.

As shown in FIG. 58, the layer transfer film cartridge FC includes a supply unit 310, a take-up unit 350, a shaft 43, a first handle 781, a second handle 82, a support member 90, and a sheet guide 700 (see FIG. 59(*b*)).

The first handle 781 is, similar to the first handle 81 in the first embodiment, a portion that allows a user's fingers to be hooked thereon. The first handle 781 is so arranged, at the supply unit 310, as to extend in the axial direction. To be more specific, the first handle 781 is supported by the supply reel 31. The first handle 781 includes a first base portion 781A extending in the axial direction, and a two first legs 781B extending toward the supply reel 31 from both ends of the first base portion 781A which are located apart from each other in the axial direction.

The two first legs 781B are connected to the supply shaft 31A of the supply reel 31. To be more specific, as shown in FIG. 59(*a*), each of the first legs 781B has an elongate hole 781C engageable with an end portion of the supply shaft 31A protruding in the axial direction (the elongate hole 781C extending along the installation/removal directions), and a to-be-guided surface 781D extending in the installation/removal directions. The supply case 32 includes guide ribs 32R extending in the installation/removal directions to guide the to-be-guided surface 781D in the installation/removal directions.

With this configuration, the first base portion 781A as a grip portion is movable along the installation/removal directions between a first position shown in FIG. 59(*a*) and a second position shown in FIG. 59(*b*), which is closer than the first position to the supply case 32 (to the first guide surface 710).

The sheet guide 700 includes a first guide surface 710 and a second guide surface 720. The first guide surface 710 is provided on the supply case 32. The first guide surface 710 is an upper surface of the supply case 32. On the other hand, in the present embodiment, the second guide surface 720 is provided on the first base portion 781A. The second guide surface 720 is an undersurface of the first base portion 781A. The first base portion 781A is located in such a position that the supply reel 31 is located behind the first guide surface 710 as viewed from the first base portion 781. The first guide surface 710 includes a plurality of first ribs 711, and the second guide surface 720 includes a plurality of second ribs 721.

In the present embodiment, the sheet guide 700 is formed by the use of the supply case 32, and the first base portion 781A of the first handle 781. To be more specific, the first base portion 781A in the second position shown in FIG. 59(*b*) constitutes the sheet guide 700. In other words, the first base portion 781A in the second position serves as the sheet guide 700 to guide a sheet S. The distance between the two first legs 781B located apart from each other in the axial direction is greater than the width, in the axial direction, of a sheet S having a maximum size conveyable in the layer transfer device 1.

With the configurations described above, in the present embodiment, similar to the first embodiment, the layer transfer film cartridge FC includes the sheet guide 700 having the first guide surface 710 and the second guide surface 720; therefore, the layer transfer device 1 can be downsized and restrained from having a complicated structure.

Since the second guide surface 720 that constitutes the sheet guide 700 is provided on the first base portion 781A of the first handle 781, the layer transfer film cartridge FC can be made compact in size in comparison with an alternative configuration in which a sheet guide and a handle are provided separately. Accordingly, the layer transfer device 1 in which the layer transfer film cartridge FC is to be installed can be further downsized.

Since the first base portion 781A is movable between the first position shown in FIG. 59(*a*) and the second position shown in FIG. 59(*b*), and is configured to form the sheet guide 700 when positioned in the second position, the space between the first guide surface 710 and the second guide surface 720 can be optimized for conveyance of a sheet S. Accordingly, the performance of conveyance of a sheet S via the sheet guide 700 can be improved.

On the other hand, once the first base portion 781A is moved to the first position that is farther apart from the first guide surface 710 (the supply case 32), the first base portion 781A can be made easy for a user's fingers to hook thereon. Accordingly, the operations for installation and removal of the layer transfer film cartridge FC into/from the layer transfer device 1 can be carried out with increased ease.

It is to be understood that the first base portion 781A configured to be slidable along the installation/removal directions in the thirteenth embodiment may alternatively be configured to be rotatable, for example. Although the first base portion 781A that constitutes the sheet guide 700 in the thirteen embodiment is movable relative to the supply case 32, this is not a prerequisite; alternatively, it may be fixed to and provided immovably relative to the supply case. That is, the sheet guide may be formed with the first guide surface provided on the supply case and the second guide surface provided on the grip portion immovable relative to the supply case.

Although the twelfth embodiment and the thirteenth embodiment have been described above, these embodiments may be modified where appropriate for practical implementation, as will be described below by way of example.

Figure 60:
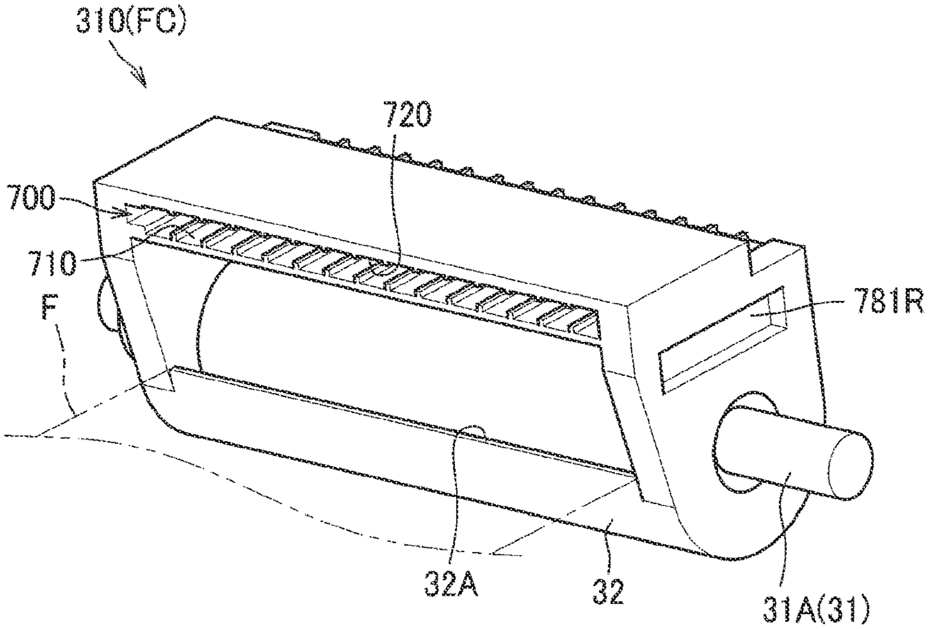
FIG. 60 is a perspective view showing a supply unit of a layer transfer film cartridge according to a modified example of the twelfth embodiment.

In the above-described embodiments, the supply unit 310 includes the first handle 81 (handle) that is so provided as to protrude from the supply case 32, but this is not a prerequisite; alternatively, the supply unit 30 may be configured to include no handle. For example, as shown in FIG. 60, the supply unit 310 (layer transfer film cartridge FC) may include slot-shaped recesses 781R as a portion that allows a user's fingers to be hooked thereon, in lieu of the handle. As one example, the recesses 781R are provided one for each of two side surfaces of the supply case 32 which face outward in the axial direction. The layer transfer film cartridge FC shown in FIG. 60 includes a sheet guide 700 having a first guide surface 710 and a second guide surface 720 provided on the supply case 32.

The supply unit 310 and the take-up unit 350 may be connected to each other via a connecting member that connects, for example, one of the supply reel 31 or the supply case 32 and one of the take-up reel 35 or the take-up case 36. In this configuration, a handle may be provided either at the supply unit 310 only or at the take-up unit 350 only.

In the above-described embodiment, the both of the first guide surface 710 and the second guide surface 720 that form the sheet guide 700 are provided with the ribs 711, 721; however, this is not a prerequisite. For example, only one of the first guide surface or the second guide surface may be provided with ribs. Alternatively, both of the first guide surface and the second guide surface may be configured to have no rib.

In the above-described embodiment, the layer transfer film cartridge includes a sheet guide provided in a supply-side part thereof for supplying the multilayer film F, but this is not a prerequisite; an alternative configuration may be such that a sheet guide is provided in a take-up-side part for taking up the multilayer film F. Yet another configuration in which the layer transfer film cartridge includes sheet guides provided one in each of a supply-side part for supplying the multilayer film and a take-up-side part for taking up the multilayer film may be feasible.

A detailed description will be given of a fourteenth embodiment with reference made mainly to FIGS. 61 to 67. In the following description, elements having substantially the same structural features as those of the first embodiment will be designated by the same reference characters, and a description thereof will be omitted.

Figure 61:
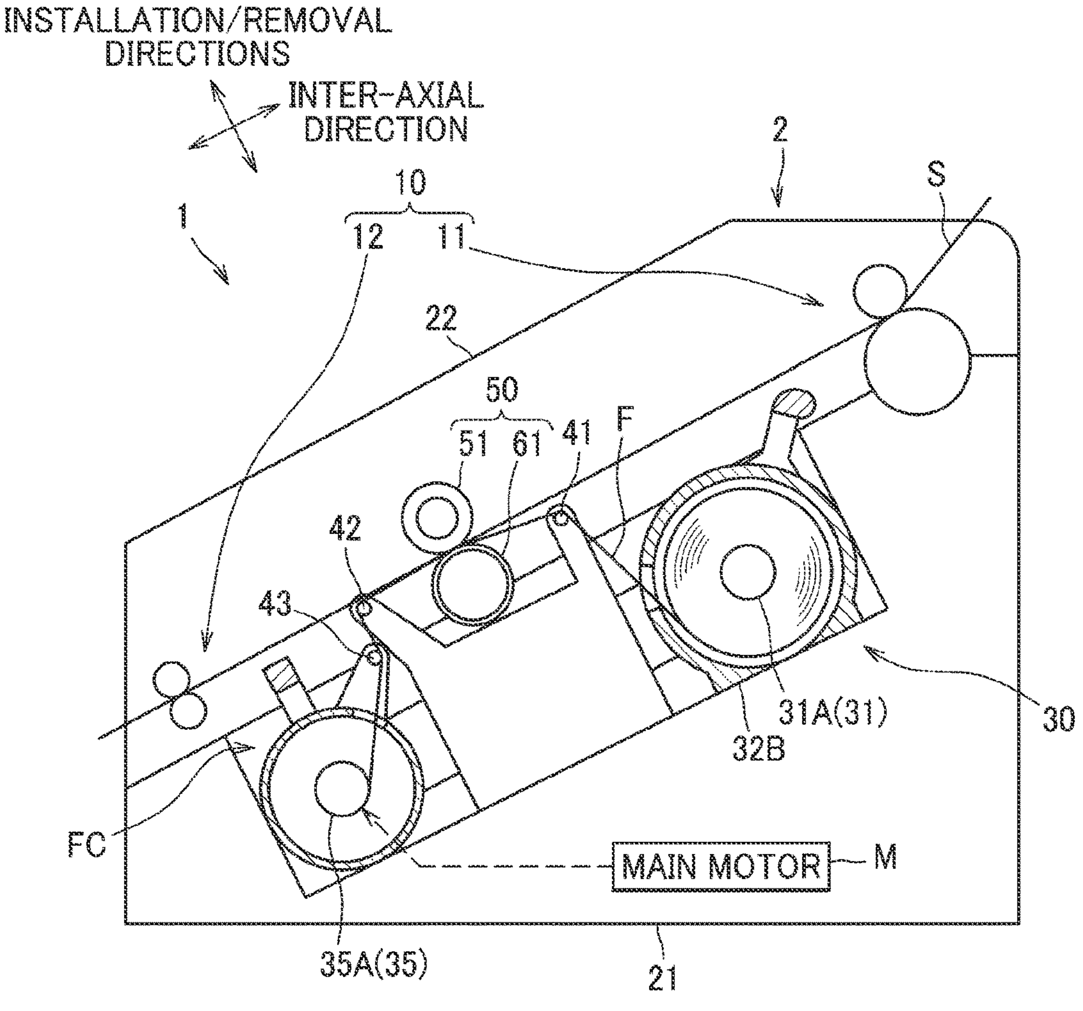
FIG. 61 is a diagram showing a layer transfer device according to a fourteenth embodiment.

As shown in FIG. 61, a layer transfer device 1 includes a housing 2, a sheet conveyor unit 10, a film supply unit 30, and a transfer unit 50. The film supply unit 30 includes a layer transfer film cartridge FC, a first guide shaft 41, a second guide shaft 42, and a main motor M as a driving source.

Figure 62:
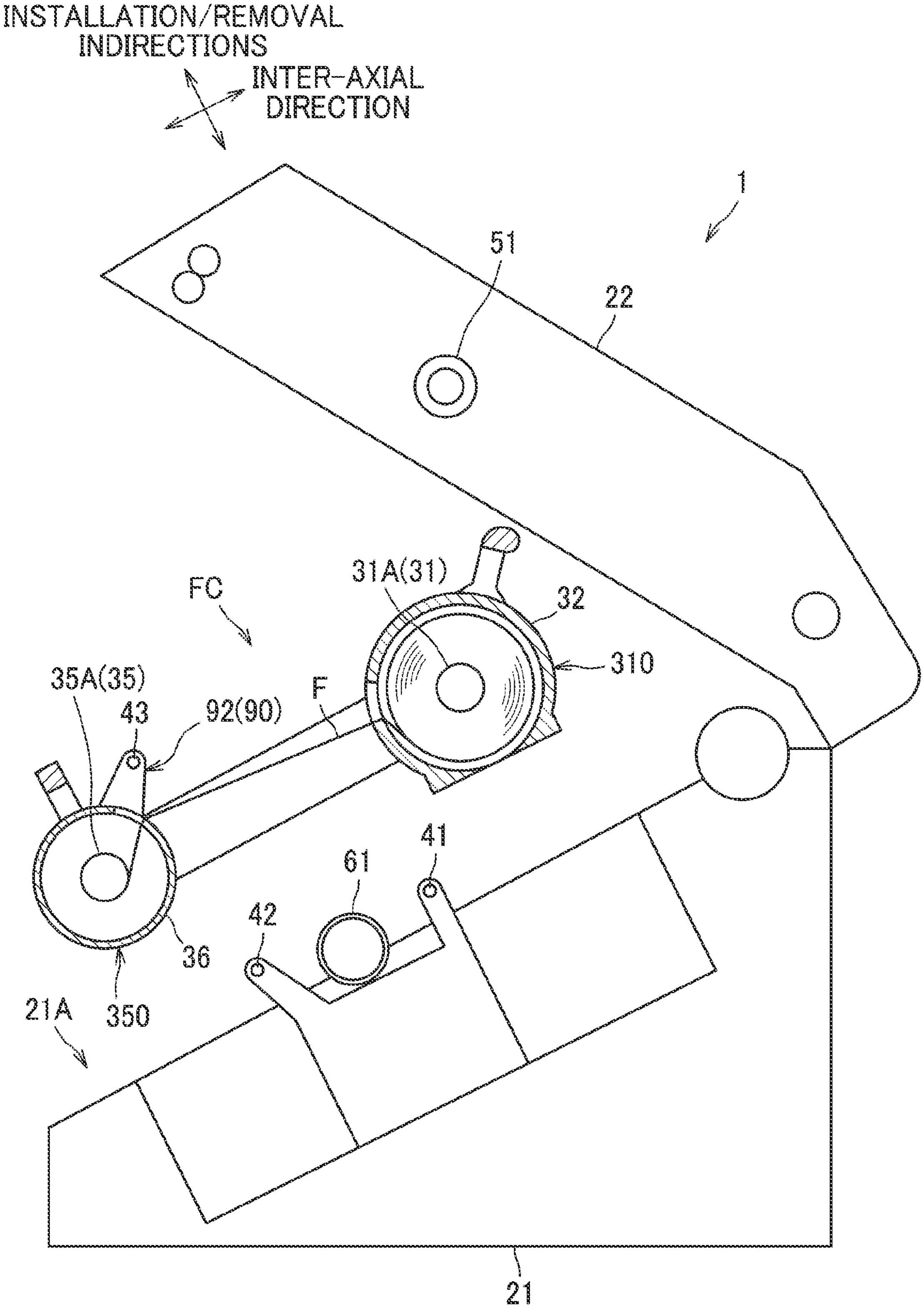
FIG. 62 is a diagram showing a state of the layer transfer device with a housing cover being open.

The layer transfer film cartridge FC is configured, as shown in FIG. 62, to be installable into and removable from the housing main body 21 through the housing opening 21A. The layer transfer film cartridge FC is a cartridge that supports a multilayer film F consisting of a plurality of layers as shown in FIG. 1 (*b*). The layer transfer film cartridge FC mainly includes a supply unit 310, a take-up unit 350, and a shaft 43. The supply unit 310 mainly includes a supply reel 31. The take-up unit 350 mainly includes a take-up reel 35. The multilayer film F is wound on the supply reel 31.

Figure 63:
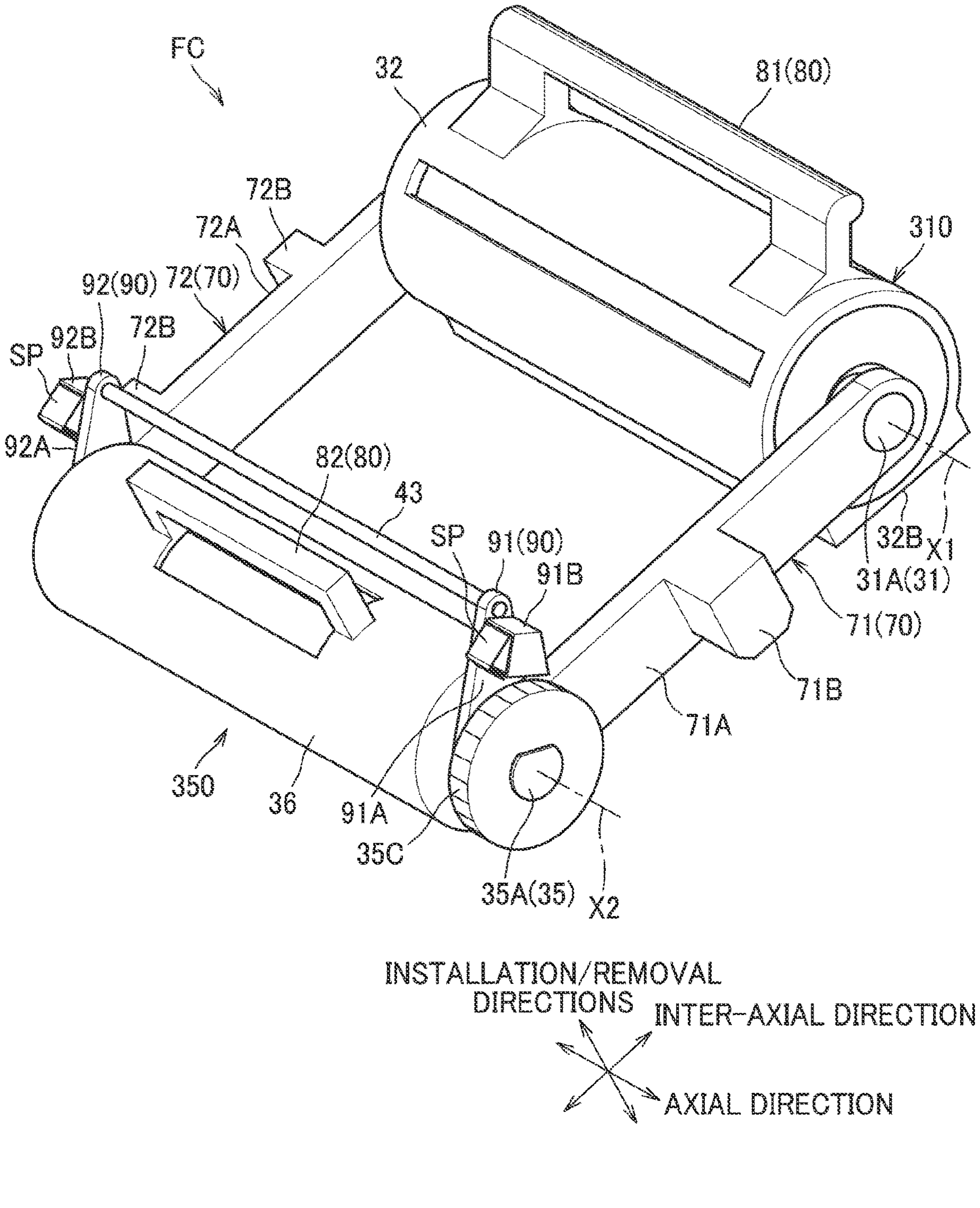
FIG. 63 is a perspective view showing a layer transfer film cartridge.

As shown in FIG. 63, the layer transfer film cartridge FC includes, in addition to the supply unit 310, the take-up unit 350 and the shaft 43 described above, a connecting portion 70, a handle 80 and a support member 90. The supply unit 310 includes, in addition to the supply reel 31 described above, a supply case 32. The take-up unit 350 includes, in addition to the take-up reel 35 described above, a take-up case 36. The supply case 32 houses the supply reel 31, and the take-up case 36 houses the take-up reel 35. The outside diameter of the take-up case 36 is smaller than the outside diameter of the supply case 32.

The connecting portion 70 is a member that connects the supply unit 310 and the take-up unit 350. The connecting portion 70 includes a first connecting portion 71 and a second connecting portion 72. The first connecting portion 71 and the second connecting portion 72 extend in a direction perpendicular to the first axial direction. To be more specific, the first connecting portion 71 and the second connecting portion 72 are each formed in the shape of a long plate elongate in the axial direction along a straight line connecting the rotation axis X1 of the supply reel 31 and the rotation axis X2 of the take-up reel 35. The first connecting portion 71 and the second connecting portion 72 are located in positions apart from the multilayer film F.

The first connecting portion 71 connects one end of ends of the supply unit 310 which are located apart from each other in the axial direction and one end of ends of the take-up unit 350 which are located apart from each other in the axial direction. Specifically, the first connecting portion 71 connects one end the supply shaft 31A and one end of the take-up shaft 35A. More specifically, the first connecting portion 71 has holes which are provided at both ends apart from each other in the inter-axial direction, and through which the supply shaft 31A and the take-up shaft 35A are inserted. The first connecting portion 71 is located between the take-up gear 35C and the take-up case 36 in the axial direction.

The connecting portion 71 includes an outer surface 71A and a first to-be-guided portion 71B. The outer surface 71A faces away from the second connecting portion 72 in the axial direction. The first to-be-guided portion 71B is a portion that is guided by a first guide GD1 which will be described later (see FIG. 64) when the layer transfer film cartridge FC in a first orientation which will be described later is installed into the housing main body 21. The first to-be-guided portion 71B is a protrusion protruding from the outer surface 71A. The first to-be-guided portion 71B protrudes from a center of the first connecting portion 71 in the inter-axial direction.

The second connecting portion 72 connects the other end of the ends of the supply unit 310 which are located apart from each other in the axial direction and the other end of the ends of the take-up unit 350 which are located apart from each other in the axial direction. Specifically, the second connecting portion 72 connects the other end of the supply shaft 31A and the other end of the take-up shaft 35A. More specifically, the second connecting portion 72 has through holes which are provided at both ends apart from each other in the inter-axial direction, and through which the supply shaft 31A and the take-up shaft 35A are inserted.

The supply case 32 and the take-up case 36 are located between the first connecting portion 71 and the second connecting portion 72 in the axial direction.

The second connecting portion 72 includes an outer surface 72A and two second to-be-guided portions 72B. The outer surface 72A faces away from the first connecting portion 71 in the axial direction. The second to-be-guided portions 72B are portions that are guided by second guides GD2 which will be described later (see FIG. 64) when the layer transfer film cartridge FC in the first orientation which will be described later is installed into the housing main body 21. The second to-be-guided portions 72B are protrusions protruding from the outer surface 72A. Each of the second to-be-guided portions 72B is located in a position different from a position of the first to-be-guided portion 71B in the inter-axial direction. In other words, each of the second to-be-guided portions 72B is located in a position shifted from a straight line passing through the center of the first to-be-guided portion 71B in the inter-axial direction and extending in the axial direction. Each of the second to-be-guided portions 72B protrudes from a position shifted from a center of the second connecting portion 72 in the inter-axial direction. To be more specific, the center of the second connecting portion 72 in the inter-axial direction is positioned at a midpoint between one of the second to-be-guided portions 72B and the other of the second to-be-guided portions 72B. The dimension of each second to-be-guided portion 72B in the inter-axial direction is smaller than the dimension of the first to-be-guided portion 71B in the inter-axial direction.

The layer transfer film cartridge FC is configured to be installable into and removable from the housing main body 21 in directions perpendicular to the axial direction and to the inter-axial direction. In the present embodiment, the direction(s) perpendicular to the axial direction and to the inter-axial direction will be referred to as "installation/removal direction(s)".

Figure 64:
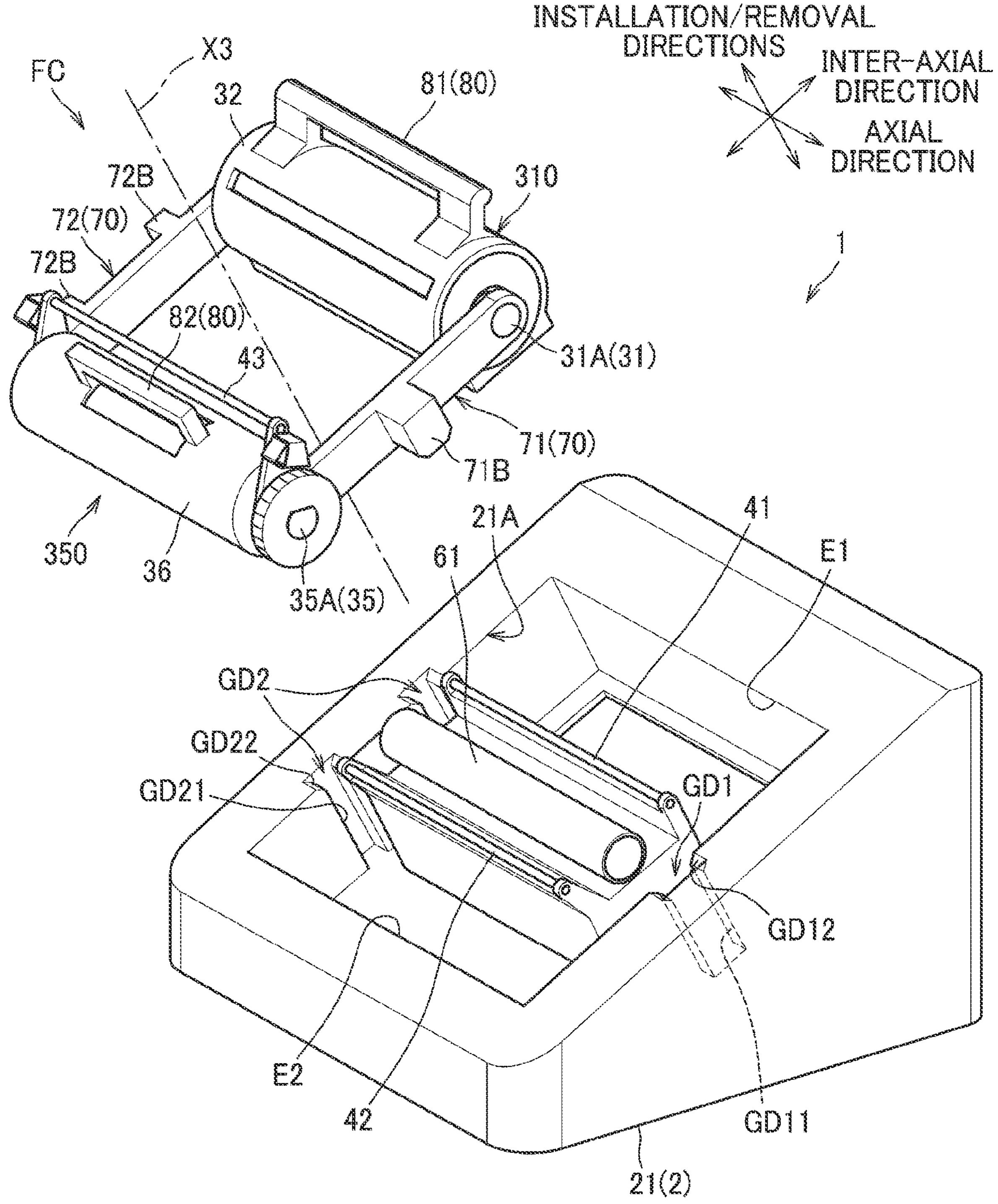
FIG. 64 is a perspective view showing the layer transfer film cartridge and a housing main body.

As shown in FIG. 64, the housing main body 21 includes a first guide GD1 and two second guides GD2. The first guide GD1 and the second guides GD2 are guides that guide the layer transfer film cartridge FC in the first orientation to the installation position. Herein, the "first orientation" is an orientation in which the layer transfer film cartridge FC is attached successfully in the housing main body 21. Specifically, the "first orientation" refers to an orientation of the layer transfer film cartridge FC positioned in the installation position. In the present embodiment, the "first orientation" refers to an orientation such that if the layer transfer film cartridge FC kept in the first orientation is guided in the housing main body 21 to the installation position, the supply reel 31 is located in a position upstream of the heating roller 61 in the direction of conveyance of a sheet S and the shaft 43 is located in a position upstream of the rotation axis X2 (see FIG. 63) of the take-up reel 35 in the direction of installation.

In describing the housing main body 21 below, the axial direction and the inter-axial direction as mentioned above are used to indicate directions determined when the layer transfer film cartridge FC is installed in the housing main body 21.

The first guide GD1 is a groove that receives the first to-be-guided portion 71B of the layer transfer film cartridge FC, and is provided at one end of ends of the housing main body 21 which are located apart from each other in the axial direction as an example of a predetermined direction. The first guide GD1 is positioned in an inner surface of the housing main body 21. The first guide GD1 extends in a direction perpendicular to the axial direction. The first guide GD1 extends in a direction perpendicular to the inter-axial direction.

To be more specific, the first guide GD1 includes a first portion GD11 extending in the direction perpendicular to the axial direction, and a second portion GD12 located in a position upstream of the first portion GD11 in the direction of installation of the layer transfer film cartridge FC. Two edges of the first portion GD11 extending in a direction perpendicular to the axial direction and to the inter-axial direction extend parallel to the direction of installation of the layer transfer film cartridge FC. The width, that is, a dimension in the inter-axial direction, of the first portion GD11, specifically, a distance between the two edges thereof, is a first width B1 (see FIG. 65). The second portion GD12 is so formed as to gradually widen toward an upstream end in the direction of installation of the layer transfer film cartridge FC.

The second guides GD2 are grooves that receive the second to-be-guided portions 72B of the layer transfer film cartridge FC, and two second guides GD2 are provided at the other end of the ends of the housing main body 21 which are located apart from each other in the axial direction. Each of the second guides GD2 is positioned in an inner surface of the housing main body 21 and opposed to the inner surface of the housing main body 21 in which the first guide GD1 is formed. Each of the second guides GD2 extends in a direction perpendicular to the direction of the axial direction. Each of the second guides GD2 extends in a direction perpendicular to the inter-axial direction.

To be more specific, each second guide GD2 includes a first portion GD21 extending in the direction perpendicular to the axial direction, and a second portion GD22 located in a position upstream of the first portion GD21 in the direction of installation of the layer transfer film cartridge FC. Two edges of the first portion GD21 extending in a direction perpendicular to the axial direction and to the inter-axial direction extend parallel to the direction of installation of the layer transfer film cartridge FC. The width, that is, a dimension in the inter-axial direction, of the first portion GD21, specifically, a distance between the two edges thereof, is a second width B2 smaller than the first width B1 (see FIG. 65). The second portion GD22 is so formed as to gradually widen toward an upstream end in the direction of installation of the layer transfer film cartridge FC.

Each second guide GD2 is configured to be asymmetrical to the first guide GD1 with respect to the axial direction. Specifically, each second guide GD2 is located in a position different from a position of the first guide GD1 in the inter-axial direction, that is, a perpendicular direction perpendicular to directions of installation and removal of the layer transfer film cartridge FC and to the predetermined direction.

Figure 65:
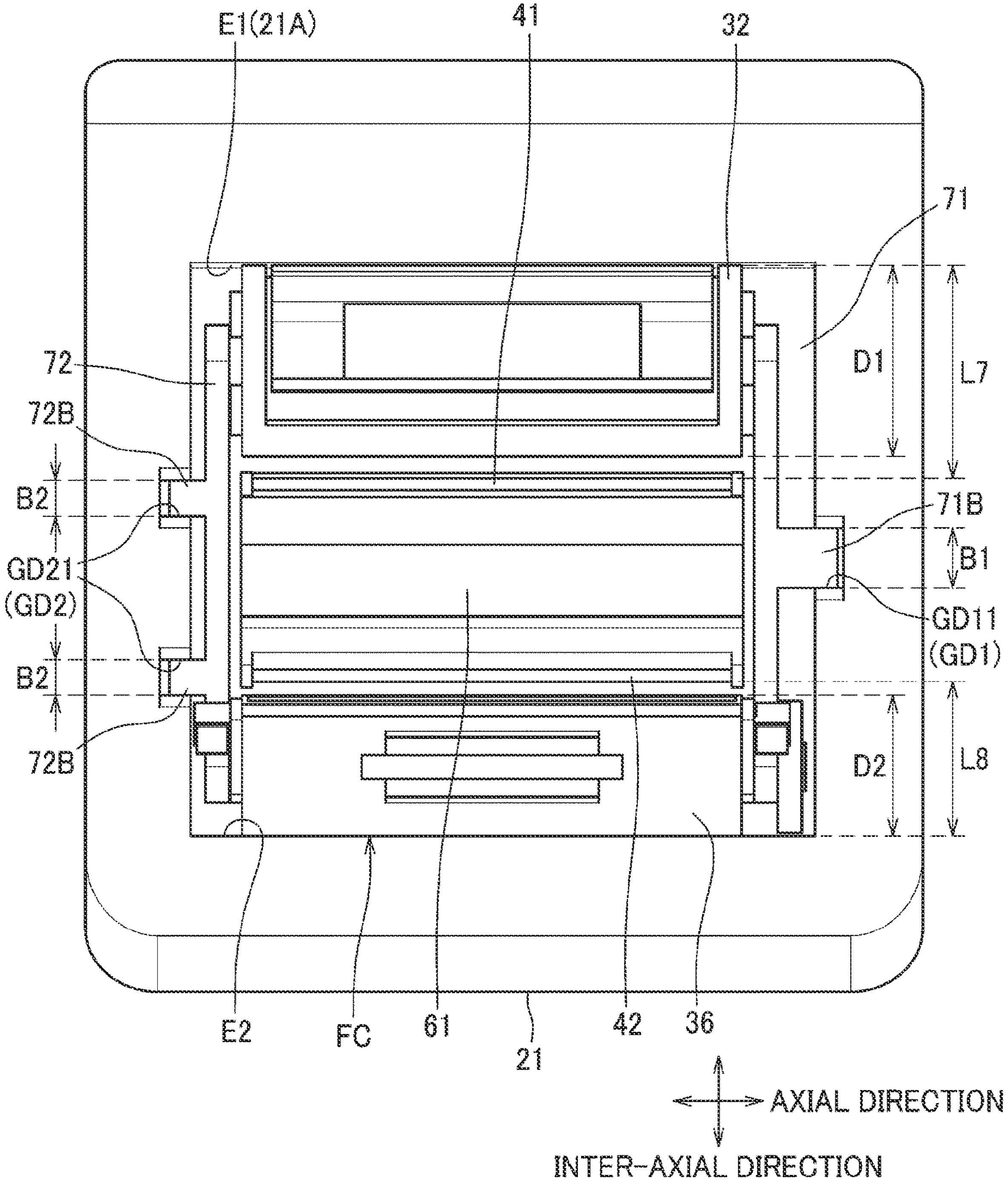
FIG. 65 is a diagram showing a relationship between respective portions of the layer transfer film cartridge and respective portions of the housing main body.

As shown in FIG. 65, the dimension, in the inter-axial direction, of the first to-be-guided portion 71B of the layer transfer film cartridge FC has a size corresponding to, specifically, approximately the same size as, the width B1 of the first guide GD1. The dimension, in the inter-axial direction, of each second to-be-guided portion 72B of the layer transfer film cartridge FC has a size corresponding to, specifically, approximately the same size as, the width B2 of the second guide GD2. To be more specific, the dimension, in the inter-axial direction, of the first to-be-guided portion 71B is slightly smaller than the width B1 of the first guide GD1. The dimension, in the inter-axial direction, of the first to-be-guided portion 71B is greater than the width B2 of the second guide GD2.

The first guide shaft 41 and the second guide shaft 42 are located apart from each other in the inter-axial direction, that is, a perpendicular direction perpendicular to the directions of installation and removal of the layer transfer film cartridge FC and to the predetermined direction. The housing opening 21A of the housing main body 21 has a first end E1 and a second end E2.

In the inter-axial direction, the first end E1 is positioned on an opposite side of the first guide shaft 41 which is opposite to another side of the first guide shaft 41 on which the second guide shaft 42 located. In the inter-axial direction, the second end E2 is positioned on an opposite side of the second guide shaft 42 which is opposite to another side of the second guide shaft 42 on which the first guide shaft 41 is located.

When viewed from a direction of installation or removal of the layer transfer film cartridge FC, a space between the first end E1 and the first guide shaft 41 has a distance L7 corresponding to an outside diameter D1 of the supply case 32. To be more specific, the distance L7 is slightly greater than the diameter D1.

When viewed from the direction of installation or removal of the layer transfer film cartridge FC, a space between the second end E2 and the second guide shaft 42 has a distance L8 corresponding to an outside diameter D2 of the take-up case 36. To be more specific, the distance L8 is slightly greater than the outside diameter D2 of the take-up case 36, and smaller than the outside diameter D1 of the supply reel 31.

Next, a description will be given of the operation and advantageous effects of the layer transfer device 1 according to the present embodiment.

As shown in FIG. 64, when the layer transfer film cartridge FC is held in the first orientation and installed into the housing main body 21, the first to-be-guided portion 71B of the layer transfer film cartridge FC can be received into the first guide GD1 of the housing main body 21, and the two second to-be-guided portions 72B can be received into the two second guides GD2 of the housing main body 21. Also, the supply case 32 can pass through a space between the first guide shaft 41 and the first end E1 of the housing opening 21, and the take-up case 36 can pass through a space between the second guide shaft 42 and the second end E2 of the housing opening 21A. Accordingly, if the layer transfer film cartridge FC is held in the first orientation relative to the housing main body 21, the layer transfer film cartridge FC can be smoothly installed into the housing main body 21.

On the other hand, when the layer transfer film cartridge FC is reversed from the first orientation about an axis X3 parallel to the directions of installation and removal of the layer transfer film cartridge FC to a second orientation, the first to-be-guided portion 71B of the layer transfer film cartridge FC interferes with a second guide GD2-side edge of the housing opening 21A in a position apart from the installation position, and each second to-be-guided portion 72B interferes with a first guide GD-side edge of the housing opening 21A in a position apart from the installation position. In this operation, even if the wider first to-be-guided portion 71B is aligned over the narrower second guide GD2, the first to-be-guided portion 71B is not received into the second guide GD2 due to difference in width.

Further, in this operation, the supply case 32 having a larger diameter interferes with the second guide shaft 42 or the second end E2 of the housing opening 21A in a position apart from the installation position. In this state of the layer transfer film cartridge FC interfering with the housing main body 21, the layer transfer film cartridge FC is restrained from moving into the installation position by the housing main body 21. Therefore, when the layer transfer film cartridge FC is set in the second orientation, the layer transfer film cartridge FC cannot be installed into the housing main body 21.

Further, in this state of the layer transfer film cartridge FC interfering with the housing main body 21 in a position apart from the installation position and thus being restrained from moving into the installation position by the housing main body 21, at least part of the layer transfer film cartridge FC protrudes through the housing opening 21A to the outside of the housing main body 21. In the present embodiment, more than half the layer transfer film cartridge FC protrudes through the housing opening 21A to the outside in the installation/removal directions.

Accordingly, in the state of the layer transfer film cartridge FC set in the second orientation and supported by the housing main body 21, at least part of the layer transfer film cartridge protrudes through the housing opening 21A outside, and thus the housing cover 22 cannot be closed, and the layer transfer process cannot be executed. In contrast, in the state of the layer transfer film cartridge FC set in the first orientation and supported by the housing main body 21, the layer transfer film cartridge FC is positioned in the installation position and does not protrude through the housing opening 21A outside, and thus the housing cover 22 can be closed, and the layer transfer process can be executed.

In the present embodiment, with the configurations described above, the following advantageous effects can be achieved.

The first guide GD1 and the second guide GD2 are configured to be asymmetrical to each other with respect to the axial direction; therefore, if a user attempting to install, into the housing main body 21, the layer transfer film cartridge FC erroneously held in the second orientation, the layer transfer film cartridge FC interferes with the housing main body 21 before reaching its installation position, so that improper placement of the layer transfer film cartridge FC during assembly can be prevented.

Since at least part of the layer transfer film cartridge FC in the second orientation interfering with the housing main body 21 in a position apart from the installation position and restrained from moving to the installation position by the housing main body 21 protrudes through the housing opening 21A outside, a user can readily become aware of the improper placement during assembly.

Since the outside diameter of the take-up case 36 is smaller than the outside diameter of the supply case 32, the take-up case 36 for housing the multilayer film F having undergone the layer transfer process and thus reduced in layer thickness can be made compact in size, so that the layer transfer film cartridge FC can be downsized.

The fourteenth embodiment described above may be modified and implemented in various forms as will be described below by way of example. In the following description, elements having substantially the same structural features as those of the fourteenth embodiment will be designated by the same reference characters, and a description thereof will be omitted.

Figure 66:
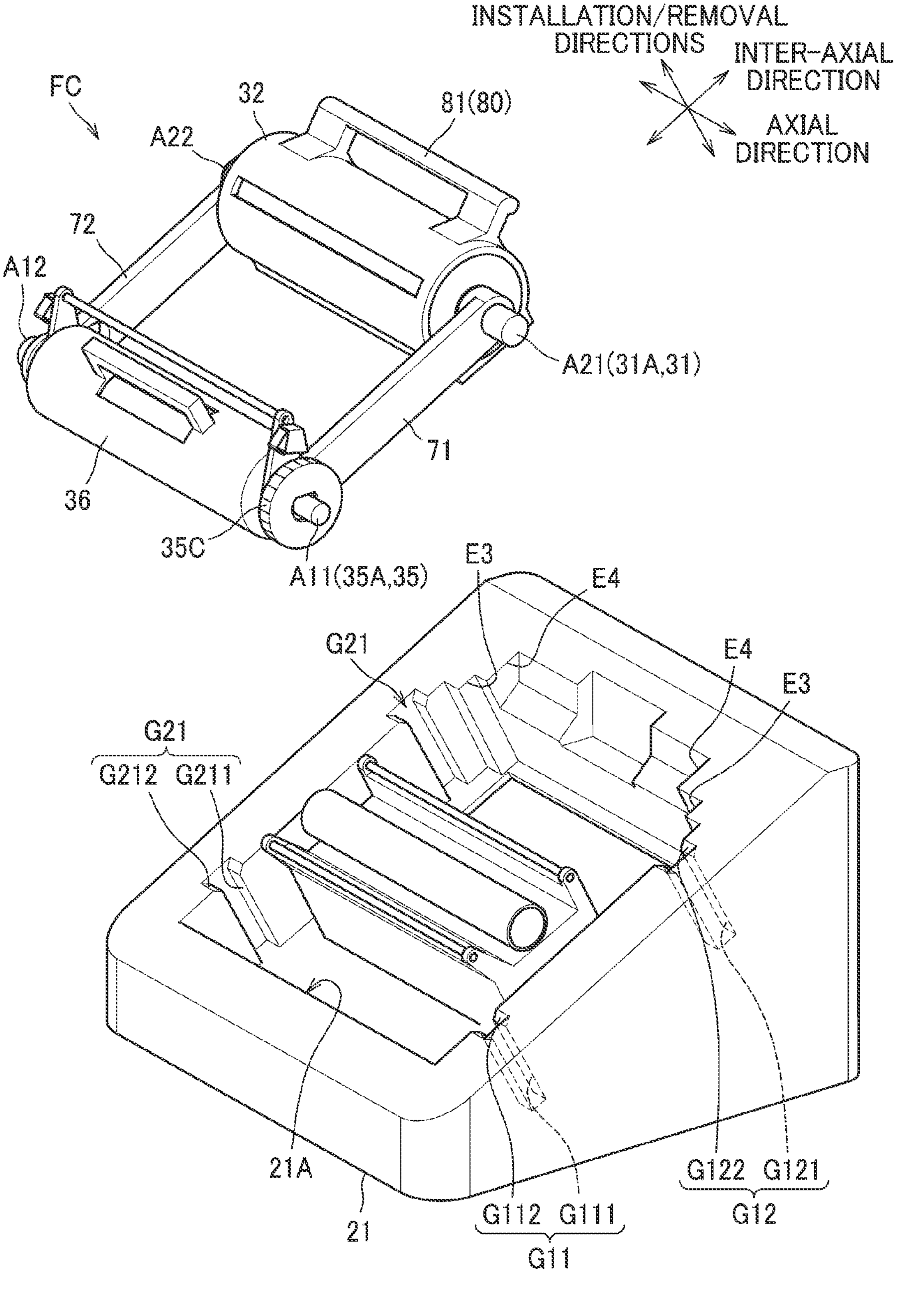
FIG. 66 is a diagram showing a layer transfer device according to a modified example of the fourteenth embodiment.

The first guide, the second guide, the first to-be-guided portion, and the second to-be-guided portion may have any shapes, locations and numbers, without limitations, and may be configured for example as shown in FIG. 66. In an alternative embodiment shown in FIG. 66, the housing main body 21 includes two first guides G11, G12, and two second guides G21. The two first guides G11, G12 and the two second guides G21 are configured to be asymmetric with respect to the axial direction.

To be more specific, the first guide G11 includes a first portion G111 extending in a direction perpendicular to the axial direction, and a second portion G112 located in a position upstream of the first portion G111 in the direction of installation of the layer transfer film cartridge FC. Two edges of the first portion G111 extending in a direction perpendicular to the axial direction and to the inter-axial direction extend parallel to the direction of installation of the layer transfer film cartridge FC. The width, that is, a dimension in the inter-axial direction, of the first portion G111, specifically, a distance between the two edges thereof, is a first width B3 (see FIG. 67). The second portion G112 is so formed as to gradually widen toward an upstream end in the direction of installation of the layer transfer film cartridge FC.

The first guide G12 includes a first portion G121 extending in a direction perpendicular to the axial direction, and a second portion G122 located in a position upstream of the first portion G121 in the direction of installation of the layer transfer film cartridge FC. Two edges of the first portion G121 extending in a direction perpendicular to the axial direction and to the inter-axial direction extend parallel to the direction of installation of the layer transfer film cartridge FC. The width, that is, a dimension in the inter-axial direction, of the first portion G121, specifically, a distance between the two edges thereof, is a second width B4 greater than the first width B3 (see FIG. 67). The second portion G122 is so formed as to gradually widen toward an upstream end in the direction of installation of the layer transfer film cartridge FC.

Each of the second guides G21 includes a first portion G211 extending in the direction perpendicular to the axial direction, and a second portion G212 located in a position upstream of the first portion G211 in the direction of installation of the layer transfer film cartridge FC. Two edges of the first portion G211 extending in a direction perpendicular to the axial direction and to the inter-axial direction extend parallel to the direction of installation of the layer transfer film cartridge FC. The width, that is, a dimension in the inter-axial direction, of the first portion G211, specifically, a distance between the two edges thereof, is a second width B4 that is the same width as that of the first portion G121, i.e., greater than the first width B3 (see FIG. 67). The second portion G212 is so formed as to gradually widen toward an upstream end in the direction of installation of the layer transfer film cartridge FC.

The layer transfer film cartridge FC includes one end portion A11 of the take-up shaft 35A and one end portion A21 of the supply shaft 31A, which serve as a first to-be-guided portion. The layer transfer film cartridge FC further includes another end portion A12 of the take-up shat 35A and another end portion A22 of the supply shaft 31A, which serve as a second to-be-guided portion.

The one end portion A11 of the take-up shaft 35A protrudes from a surface, at one of ends located apart from each other in the axial direction, of the layer transfer film cartridge FC, specifically, from a surface of the take-up gear 35C facing away from the first connecting portion 71. The one end portion A21 of the supply shaft 31A protrudes from a surface, at one of ends located apart from each other in the axial direction, of the layer transfer film cartridge FC, specifically, from a surface of the first connecting portion 71 facing away from the supply case 32.

The other end portion A12 of the take-up shaft 35A and the other end portion A22 of the supply shaft 31A protrude from a surface, at the other one of the ends located apart from each other in the axial direction, of the layer transfer film cartridge FC, specifically from a surface of the second connecting portion 72 facing away from the take-up case 36.

The one end portion A11 of the take-up shaft 35A is a portion to be guided by the narrower first guide G11 when the layer transfer film cartridge FC in the first orientation is installed into the housing main body 21, and is so formed as to have a size corresponding to the width B3 of the first portion G111 of the narrower first guide G11. To be more specific, the outside diameter of the one end portion A11 of the take-up shaft 35A is slightly smaller than the width B3 of the first portion G111 of the first guide G11. The one end portion A21 of the supply shaft 31A is a portion to be guided by the wider first guide G12 when the layer transfer film cartridge FC in the first orientation is installed into the housing main body 21, and is so formed as to have a size corresponding to the width B4 of the first portion G121 of the wider first guide G12. To be more specific, the outside diameter of the one end portion A21 of the supply shaft 31A is slightly smaller than the width B4 of the first portion G121 of the first guide G12. The outside diameter of the one end portion A21 of the supply shaft 31A is greater than the width B3 of the first portion G111 of the first guide G11.

The other end portion A12 of the take-up shaft 35A is a portion to be guided by the second guide G21 when the layer transfer film cartridge FC in the first orientation is installed into the housing main body 21, and is so formed as to have a size corresponding to the width B4 of the first portion G211 of the second guide G21. To be more specific, the outside diameter of the other end portion A12 of the take-up shaft 35A is slightly smaller than the width B4 of the first portion G211 of the second guide G21. The other end portion A22 of the supply shaft 31A is a portion to be guided by the second guide G21 when the layer transfer film cartridge in the first orientation is installed into the hosing main body 21, and is so formed as to have a size corresponding to the width B4 of the first portion G211 of the second guide G21. To be more specific, the outside diameter of the other end portion A22 of the supply shaft 31A is slightly smaller than the width B4 of the first portion G211 of the second guide G21.

In short, the outside diameter of the other end portion A12 of the take-up shaft 35A, the outside diameter of the one end portion A21 of the supply shaft 31A, and the outside diameter of the other end portion A22 of the supply shaft 31A are equally sized, specifically, to have substantially the same size equivalent to the width B4 which is greater than the width B3. The outside diameter of the one end portion A11 of the take-up shaft 35A is smaller than the outside diameters of the other end portion A12 of the take-up shaft 35A, the one end portion A21 of the supply shaft 31A, and the other end portion A22 of the supply shaft 31A.

The housing opening 21A of the housing main body 21 has two third ends E3 oriented along the end surfaces, located apart from each other in the axial direction, of the supply case 32, and two fourth ends E4 oriented along the end surfaces, located apart from each other in the axial direction, of the first handle 81. The two third ends E3 are located apart from each other in the axial direction. The two fourth ends E4 are located apart from each other in the axial direction.

Figure 67:
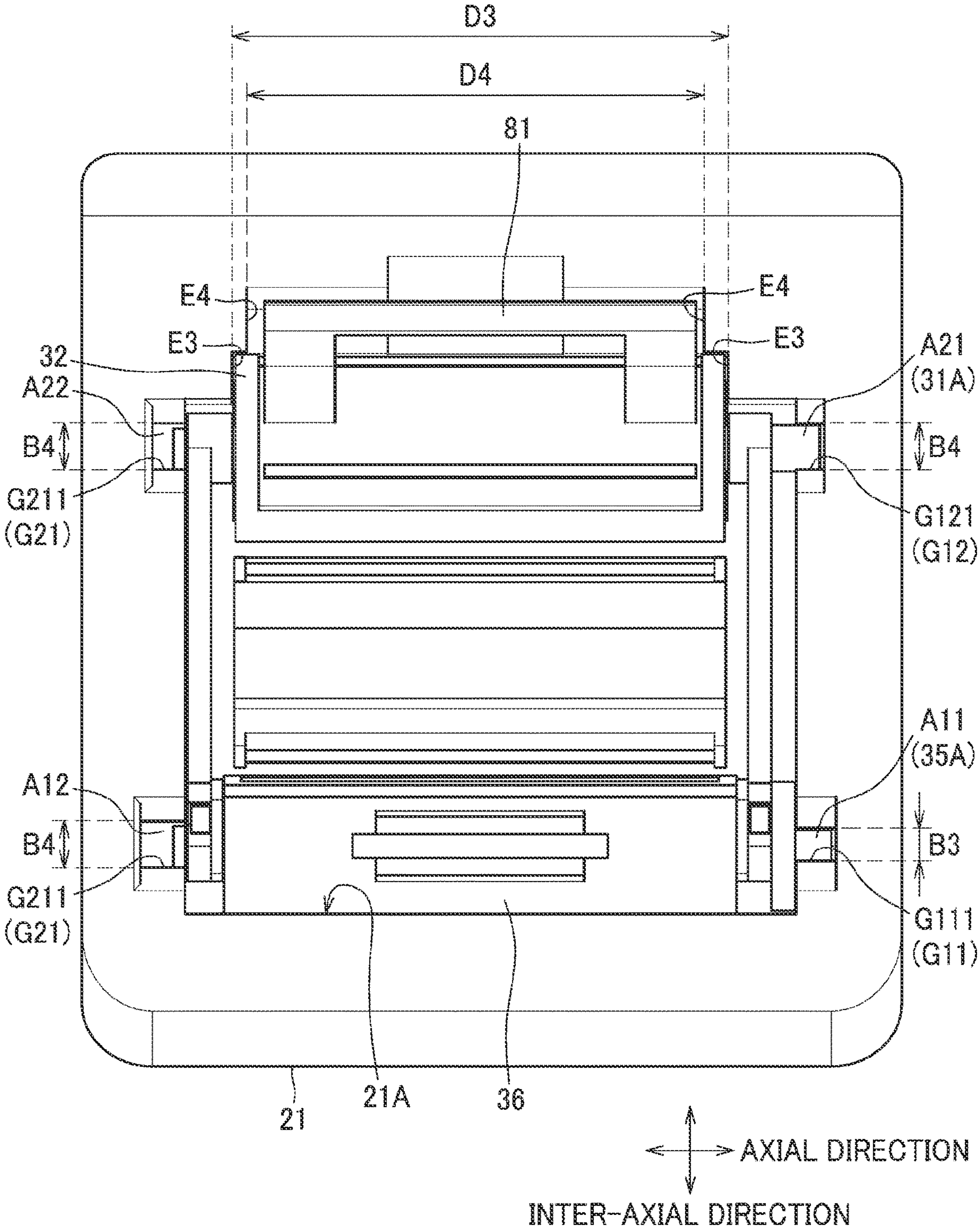
FIG. 67 is a diagram showing a relationship between respective portions of a layer transfer film cartridge of FIG. 66 and respective portions of a housing main body of FIG. 66.

As shown in FIG. 67, the distance D3 between the two third ends E3 in the axial direction is substantially the same as the dimension of the supply case 32 in the axial direction, i.e., as the distance between the ends of the supply case 32 located apart from each other in the axial direction. Specifically, the distance D3 is slightly greater than the dimension of the supply case 32 in the axial direction. In this configuration, the dimension of the take-up case 36 in the axial direction is different from the dimension of the supply case 32 in the axial direction. More specifically, the dimension of the take-up case 36, i.e., the distance between the end surfaces of the take-up case 36 located apart from each other in the axial direction, is greater than the dimension of the supply case 32 in the axial direction. Therefore, the distance D3 between the two third ends E3 located apart from each other in the axial direction is smaller than the dimension of the take-up case 36 in the axial direction.

The distance D4 between two fourth ends E4 located apart from each other in the axial direction is smaller than the distance D3, and slightly greater than the dimension of the first handle 81 in the axial direction. The distance D4 is smaller than the dimension of the supply case 32 in the axial direction.

With this configuration, if an attempt to install, into the housing main body 21, the layer transfer film cartridge FC held in the second orientation is made, the other end portion A22 of the supply shaft 31A interferes with the narrower first guide G11, and thus the layer transfer film cartridge FC is restrained from moving to the installation position by the first guide G11. Also, if an attempt to install, into the housing main body 21, the layer transfer film cartridge FC held in the second orientation is made, the take-up case 36 having the larger dimension in the axial direction interferes with the third end E3 or the fourth end E4, and thus the layer transfer film cartridge FC is restrained from moving to the installation position by the third end E3 or the fourth end E4. Accordingly, in this configuration as well, the improper placement of the layer transfer film cartridge FC during assembly can be prevented.

In this configuration, the one end portion A11 of the take-up shaft 35A and the one end portion A21 of the supply shaft 31A are configured as the first to-be-guided portion, and the other end portion A12 of the take-up shaft 35A and the other end portion A22 of the supply shaft 31A are configured as the second to-be-guided portion; however, for the first to-be-guided portion, one end portion of end portions of the take-up unit which are located apart from each other in the axial direction of the take-up reel and one end portion of end portions of the supply unit which are located apart from each other in the axial direction of the supply reel may suffice, and thus, for example, protrusions provided at one end of ends of the take-up case located apart from each other in the axial direction and at one end of ends of the supply case located apart from each other in the axial direction may be available for that purpose. For the second to-be-guided portion, another end portion of end portions of take-up unit located apart from each other in the axial direction of the take-up reel and another end portion of end portions of the supply unit located apart from each other in the axial direction of the supply reel may suffice; and thus, for example, protrusions provided at another end of the ends of the take-up case located apart from each other in the axial direction and at another end of the ends of the supply case located apart from each other in the axial direction may be available for that purpose.

Also in this configuration, the dimension of the take-up case 36 in the axial direction is larger than the dimension of the supply case in the axial direction; however, for example, the dimension of the take-up case in the axial direction may be smaller than the dimension of the supply case in the axial direction.

In the above-described embodiment, the outside diameter of the take-up case 36 is smaller than the outside diameter of the supply case 32; however, the outside diameter of the take-up case may be larger than the outside diameter of the supply case. It is understood that the take-up torque to be imparted to the take-up reel may be made lower in this alternative configuration in comparison with the embodiment in which the outside diameter of the take-up case is smaller than the outside diameter of the supply case. In this alternative configuration, the smaller the take-up case, the smaller the space that can be afforded for accommodating the multilayer film in the take-up case would become; therefore, the take-up torque should be made higher to take up the multilayer film under an increased tension, thereby reducing the roll diameter of the multilayer film in the take-up case, so that the used multilayer film could be accommodated in the small space. In contrast, if the larger take-up case is available, such constraints can be relaxed, and the take-up torque can be made lower.

The supply case and the take-up case should not necessarily house the reels in entirety, and may be configured to house at least part of the reels. For example, the supply case and the take-up case may be configured to house half the reels downstream of rotation axes of the reels in the direction of installation. The supply case and the take-up case may have a plurality of holes and/or slits, or for example, may be made of mesh.

In the embodiment shown in FIG. 64, the width of the second guide GD2 is smaller than the width of the first guide GD1; however, for example, the width of the second guide may be greater than the width of the first guide, or the width of the second guide may be the same as the width of the first guide.

In the embodiment shown in FIG. 64, the number of the second to-be-guided portions and the number of the second guides are two, respectively; however, the numbers of the second to-be-guided portions and the second guide portions may be one, three or more, respectively. Similarly, the numbers of the first to-be-guided portion and the first guide portion may be selected among any numbers.

In the above-described embodiment, the axial direction is illustrated as an example of predetermined direction; however, the predetermined direction may alternatively be an inter-axial direction.

In the above-described embodiment, the connecting portion 70 is comprised of two connecting portions, i.e., of the first connecting portion 71 and the second connecting portion 72; however, the connecting portion may be of a single member (e.g., the first connecting portion only), or the connecting portion may not be provided. The connecting member may only be required to connect the supply unit and the take-up unit, and thus may be a member that connects the supply case and the take-up case.

A detailed description will be given of a fifteenth embodiment with reference made mainly to FIGS. 68 to 72. In the following description, elements having substantially the same structural features as those of the first embodiment will be designated by the same reference characters, and a description thereof will be omitted.

Figure 68:
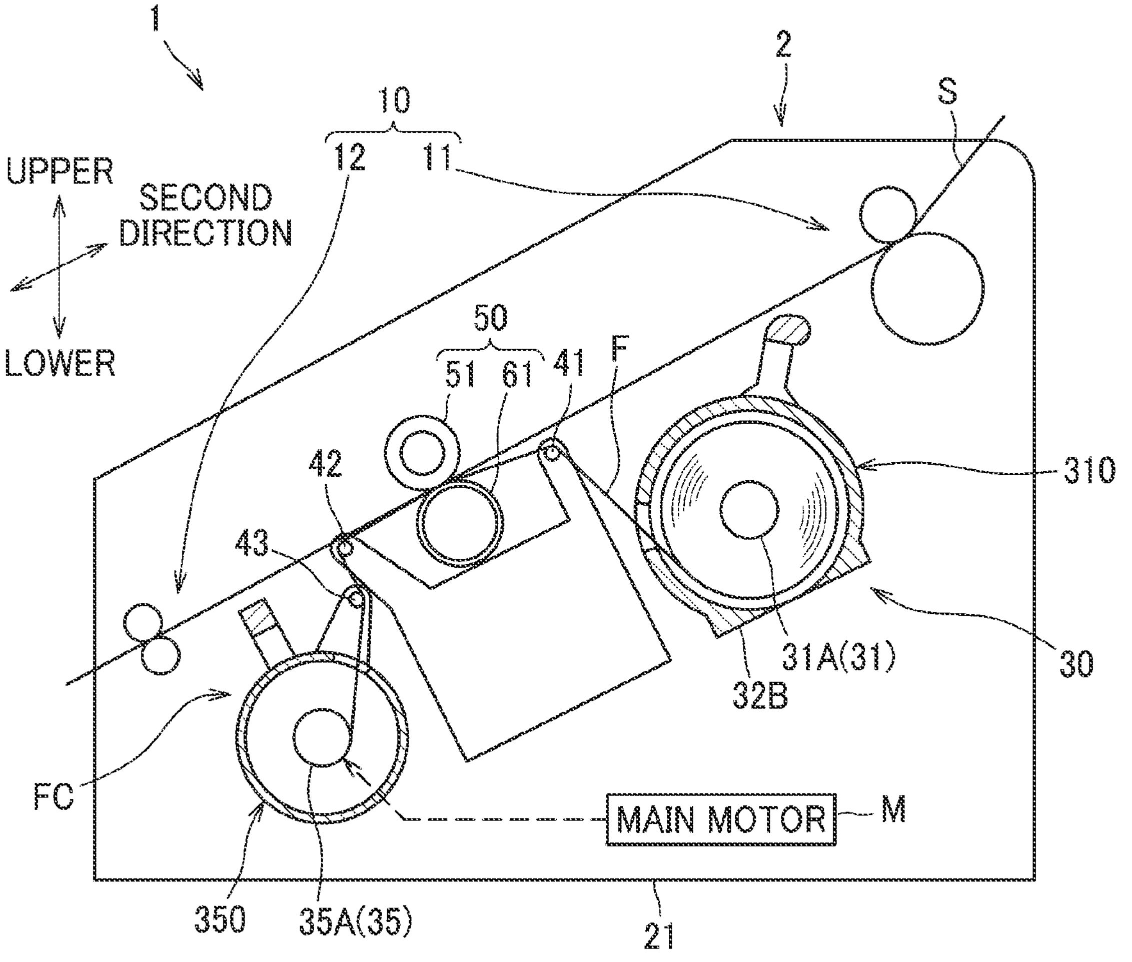
FIG. 68 is a diagram showing a layer transfer device according to a fifteenth embodiment.

As shown in FIG. 68, a layer transfer device 1 includes a housing 2, a sheet conveyor unit 10, a film supply unit 30, and a transfer unit 50.

Figure 69:
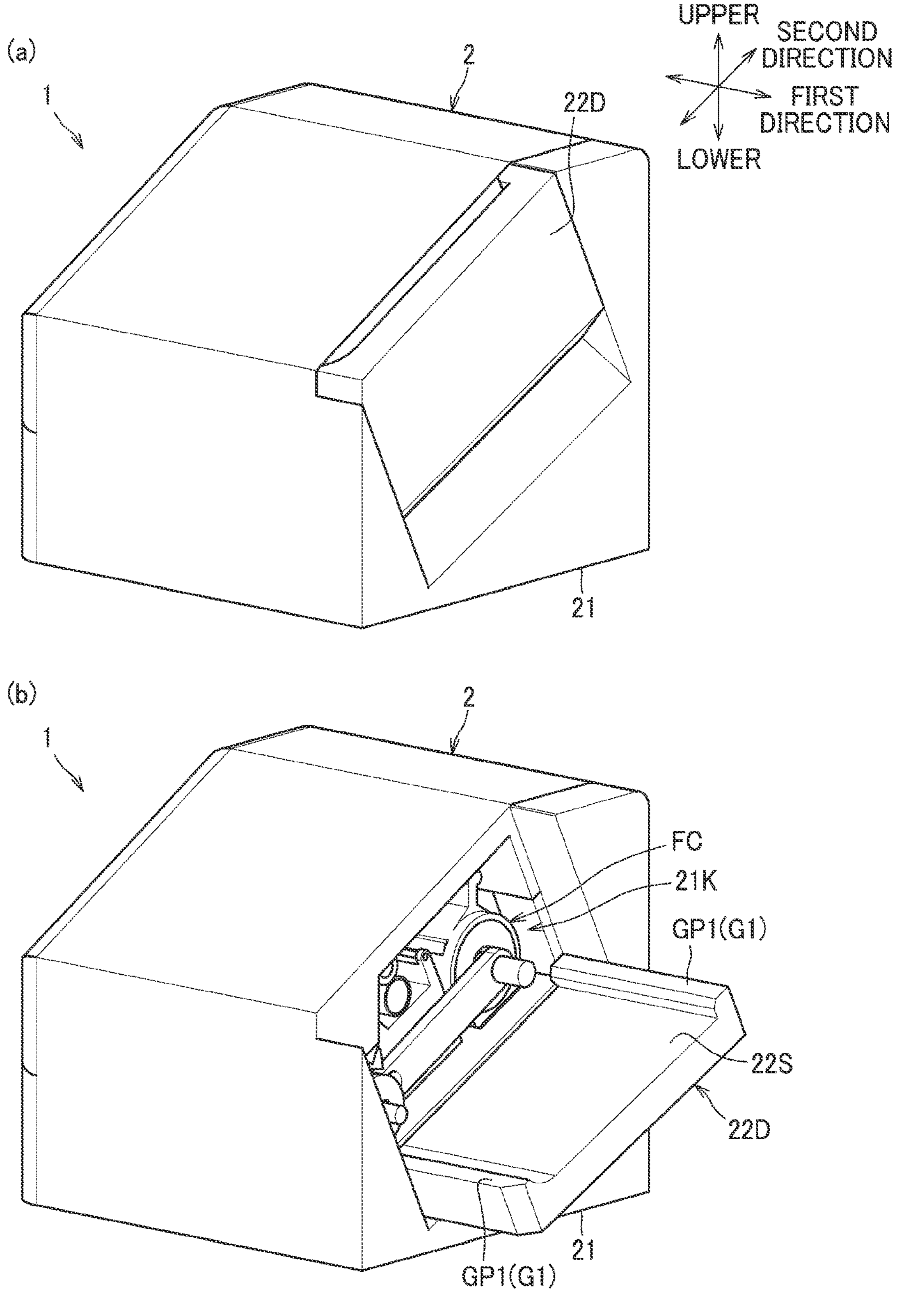
FIG. 69 shows perspective views of the layer transfer device, including: a view (a) showing a state in which a rack is in a close position; and a view (b) showing a state in which the rack is in an open position.

As shown in FIG. 69(*a*), (*b*), the housing 2 is made of plastic or the like, and includes a housing main body 21 and a rack 22D. The housing main body 21 has a housing opening 21K at its side portion. The housing opening 21K is an opening through which to install and remove a layer transfer film cartridge FC which will be described later. The housing opening 21K opens in a first direction perpendicular to a vertical direction. Herein, the "first direction perpendicular to the vertical direction" may be a direction slightly angled (for example, at a ±20-degree slant) with respect to the direction perpendicular to the vertical direction. The side portion of the housing main body 21 which has the housing opening 21K has a surface extending in directions perpendicular to the first direction, and the housing opening 21K is a through hole formed in that surface.

Figure 70:
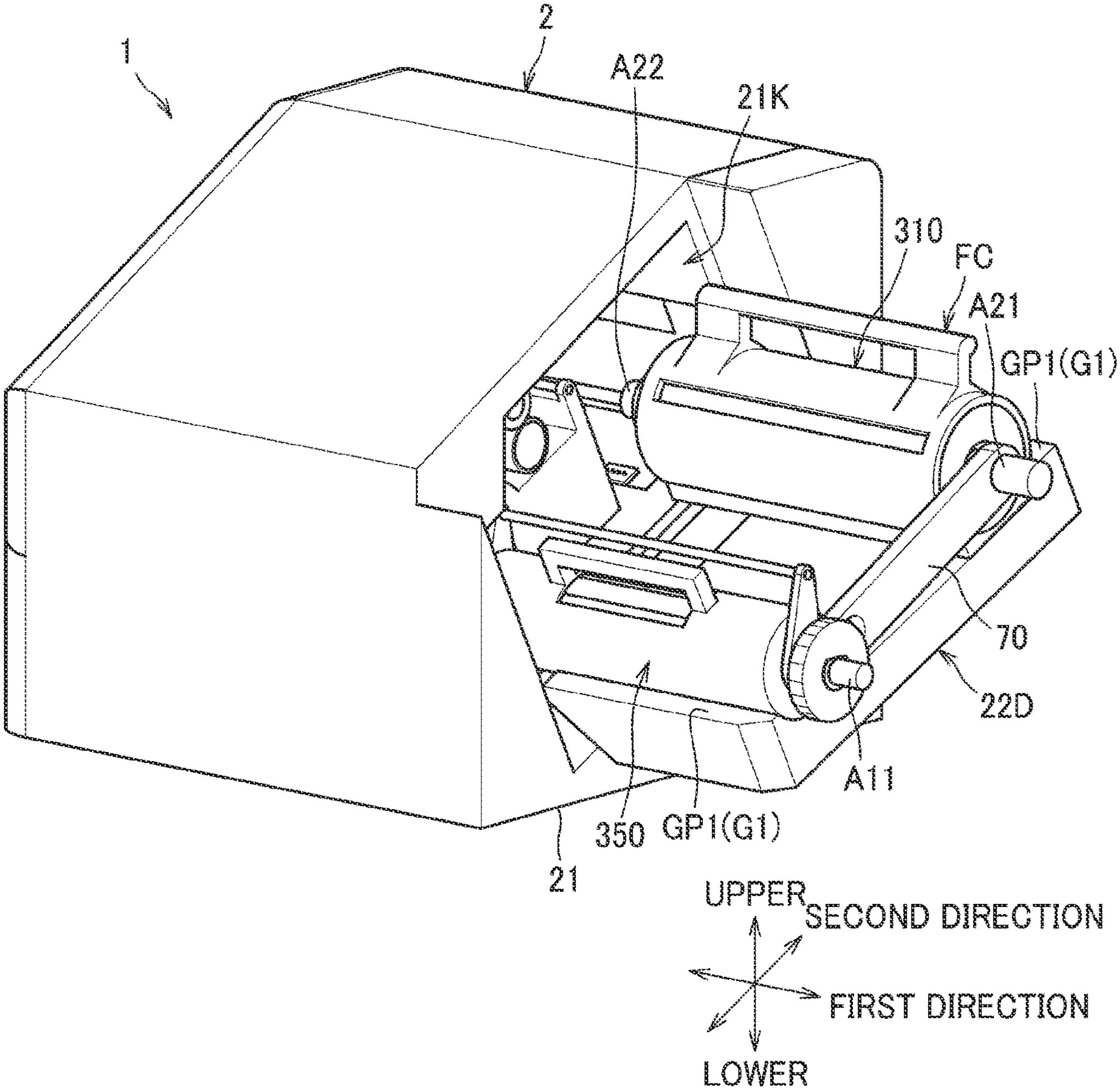
FIG. 70 is a diagram showing a state in which the layer transfer film cartridge is put on the rack.

As shown in FIG. 70, the rack 22D is a rest that supports the layer transfer film cartridge FC from below. As shown in FIG. 69(*a*), (*b*), the rack 22D is supported rotatably by the housing main body 21. The rack 22D is configured to be rotatable between a close position (position shown in FIG. 69(*a*)) in which the housing opening 21K is closed and an open position (position shown in FIG. 69(*b*)) in which the housing opening 21K is opened. The rack 22D is configured to be rotatable relative to the housing main body 21 about a rotation axis along a second direction which will be described later.

The rack 22D in the open position extends from a position adjacent to the hosing opening 21K inside the housing main body 21 to the outside of the housing main body 21 in the first direction. The rack 22D has a first support surface 22S and includes a first guide G1.

The first support surface 22S is a surface that supports the layer transfer film cartridge FC from below. The first support surface 22S extends along the first direction and the second direction perpendicular to the first direction and transverse diagonally to the vertical direction. The first support surface 22S can support the layer transfer film cartridge FC in such a way that the layer transfer film cartridge FC does not slip off even if a user releases his/her hand from the layer transfer film cartridge FC.

The first guide G1 is one example of a first cartridge guide that guides the layer transfer film cartridge FC placed on the rack 22D (see FIG. 70), toward the installation position in the housing main body 21 along the first direction. The first guide G1 consists of two first protrusions GP1 which are arranged apart from each other in the second direction and between which the layer transfer film cartridge FC placed on the rack 22D is held.

The first protrusions GP1 protrude from ends of the first support surface 22S which are located apart from each other in the second direction. Each of the first protrusions GP1 is formed in a shape of a rib elongate in the first direction.

Referring back to FIG. 68, the sheet conveyor unit 10 includes a sheet feed mechanism 11 and a sheet ejection mechanism 12. The sheet conveyor unit 10 is caused to rotate by a main motor M which will be described later. The sheet feed mechanism 11 conveys sheets S on a sheet tray (not shown) one by one toward the transfer unit 50. The sheet ejection mechanism 12 is a mechanism that ejects a sheet S which has passed through the transfer unit 50, to the outside of the housing 2.

The film supply unit 30 includes a layer transfer film cartridge FC, a first guide shaft 41, a second guide shaft 42, and a main motor M as a driving source.

Figure 71:
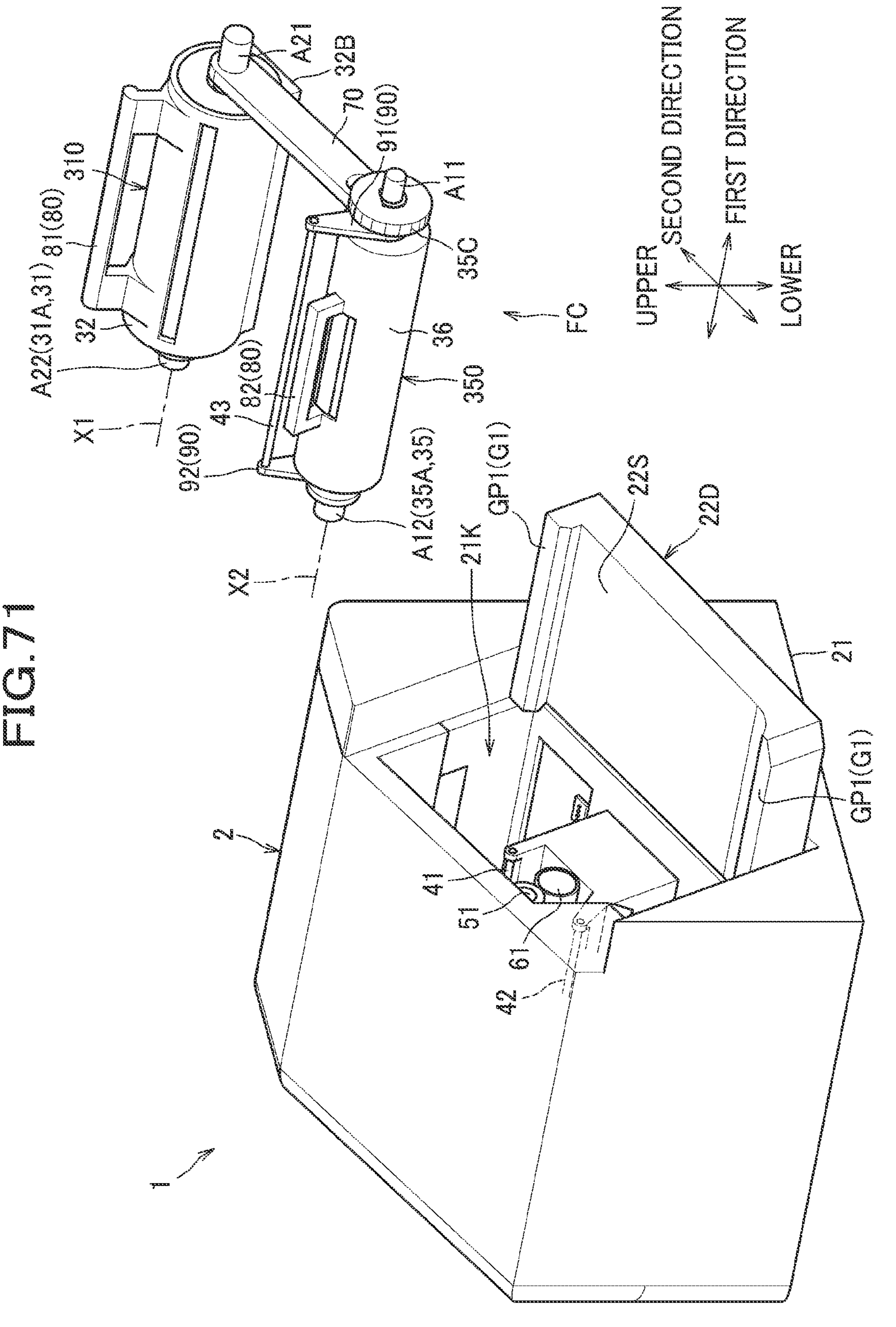
FIG. 71 is a diagram showing a state in which the layer transfer film cartridge is removed from the housing.

The layer transfer film cartridge FC is configured, as shown in FIG. 71, to be installable into and removable from the housing main body 21 through the housing opening 21K. The layer transfer film cartridge FC is a cartridge that supports a multilayer film F consisting of a plurality of layers as shown in FIG. 1(*b*). The layer transfer film cartridge FC mainly includes a supply unit 310, a take-up unit 350, and a shaft 43. The supply unit 310 mainly includes a supply reel 31. The take-up unit 350 mainly includes a take-up reel 35. The multilayer film F is wound on the supply reel 31.

The transfer unit 50 includes a pressure roller 51 and a heating roller 61. The transfer unit 50 applies heat and pressure to portions of a sheet S and a multilayer film F laid on each other and nipped between the pressure roller 51 and the heating roller 61. The pressure roller 51 and the heating roller 61 extend in the first direction. The pressure roller 51 and the heating roller 61 are each supported by the housing main body 21 rotatably about a rotation axis extending along the first direction.

At least one roller of the pressure roller 51 and the heating roller 61 is configured to be caused to move between a contact position in which one roller is in contact with the other roller and a separate position in which one roller is located apart from the other roller. The movement of the one roller may be actuated by a contact/separation mechanism (not shown). The contact/separation mechanism may be further configured to position the one roller in the separate position when the rack 22D is in the open position, and to position the one roller in the contact position when the rack 22D is in the close position. To be more specific, when a process of transferring the transfer layer F22 of the multilayer film F onto a toner image of a sheet S is started, the contact/separation mechanism moves the one roller from the separate position to the contact position. On the other hand, when such a process of transferring the transfer layer F22 onto a toner image, i.e., the layer transfer process, has been completed, the contact/separation mechanism moves the one roller from the contact position to the separate position. The layer transfer process is executed on condition that the rack 22D is in the close position.

The pressure roller 51 is a roller comprising a cylindrical metal core with its cylindrical surface coated with a rubber layer made of silicone rubber. The pressure roller 51 is located above the multilayer film F, and is contactable with a reverse side (opposite to a side on which a toner image is formed) of the sheet S.

The pressure roller 51, which in combination with the heating roller 61, nips the sheet S and the multilayer film F, is driven to rotate by the main motor M and causes the heating roller 61 to rotate accordingly. The sheet S and the multilayer film F nipped between the pressure roller 51 and the heating roller 61 as described above are conveyed by rotation of the pressure roller 51 and the heating roller 61.

The heating roller 61 is a roller comprising a cylindrical metal tube with a heater located inside, to heat the multilayer film F and the sheet S. The heating roller 61 is located under the multilayer film F, and is in contact with the first surface FA of the multilayer film F.

With the layer transfer device 1 configured as described above, sheets S stacked on the sheet tray (not shown) with front surfaces facing downward are conveyed one by one toward the transfer unit 50 by the sheet feed mechanism 11. Each sheet S is laid on a multilayer film F supplied from the supply reel 31 at a position upstream of the transfer unit 50 in a sheet conveyance direction, and conveyed to the transfer unit 50 with a toner image of the sheet S being kept in contact with the multilayer film F.

In the transfer unit 50, the sheet S and the multilayer film F nipped and passing through between the pressure roller 51 and the heating roller 61 are heated and pressurized by the heating roller 61 and the pressure roller 51, so that the transfer layer F22 is transferred onto the toner image.

After the layer transfer is done, the sheet S and the multilayer film F adhered to each other are conveyed to the second guide shaft 42. When the sheet S and the multilayer film F travels past the second guide shaft 42, the direction of conveyance of the multilayer film F is changed into a direction different from the direction of conveyance of the sheet S; thereby the multilayer film F is peeled from the sheet S.

The multilayer film F peeled from the sheet S is taken up on the take-up reel 35. On the other hand, the sheet S from which the multilayer film F is peeled has a foil transferred surface facing downward and is ejected to the outside of the housing 2 by the sheet ejection mechanism 12.

As shown in FIG. 71, the layer transfer film cartridge FC includes, in addition to the supply unit 310, the take-up unit 350 and the shaft 43 described above, a connecting portion 70, a handle 80, and a support member 90. The supply unit 310 includes, in addition to the supply reel 31 described above, a supply case 32. The take-up unit 350 includes, in addition to the take-up reel 35 described above, a take-up case 36. The supply case 32 houses the supply reel 31, and the take-up reel 36 houses the take-up reel 35.

The connecting portion 70 is a member that connects one end portion A21 of the supply unit 310 and one end portion A11 of the take-up unit 350. To be more specific, as shown in FIG. 70, the connecting portion 70 connects the one end portion A21 that is one of end portions of the supply unit 310 which is positioned farther than the other from the housing opening 21K when the layer transfer film cartridge FC is placed on the rack 22D and the one end portion A11 that is one of end portions of the take-up unit 350 which is positioned farther than the other from the housing opening 21K when the layer transfer film cartridge FC is placed on the rack 22D. From another point of view, the connecting portion 70 connects the one end portion A21 that is one of end portions of the supply unit 310 which is positioned farther than the other from the housing main body 21 when the layer transfer film cartridge FC is placed on the rack 22D and the one end portion A11 that is one of end portions of the take-up unit 350 which is positioned farther than the other from the housing main body 21 when the layer transfer film cartridge FC is placed on the rack 22D. As shown in FIG. 71, the other end portion A22 (opposite to the one end portion A21) of the end portions of the supply unit 310 and the other end portion A12 (opposite to the one end portion A11) of the end portions of the take-up unit 350 are not connected.

In the present embodiment, the end portions A21, A22 of the supply unit 310 are end portions of the supply shaft 31A of the supply reel 31, and the end portions A11, A12 of the take-up unit 350 are end portions of the take-up shaft 35A of the take-up reel 35; however, for example, the end portions of the supply unit 310 may be end portions of the supply case 32, and the end portions of the take-up unit 350 may be end portions of the take-up case 36.

The connecting portion 70 is formed in the shape of a long plate elongate in the axial direction along a straight line connecting the rotation axis X1 of the supply reel 31 and the rotation axis X2 of the take-up reel 35. The connecting portion 70 is located between the take-up gear 35C and the take-up case 36 in the axial direction.

The layer transfer film cartridge FC, when placed on the rack 22D with the rotation axis X1 of the supply reel 31 oriented along the first direction and the other end portion A22 of the supply unit 310 facing to the housing opening 21K, is installable into the housing main body 21 along the first guide G1.

Figure 72:
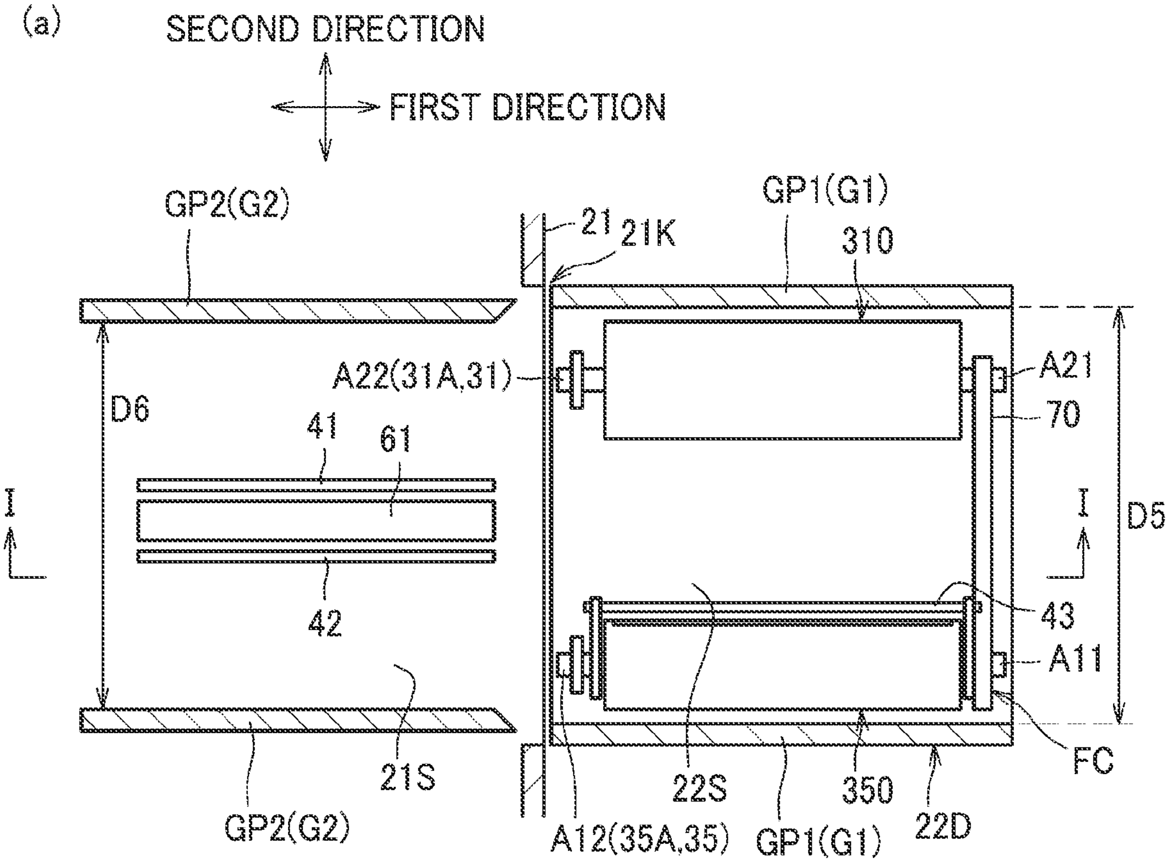
FIG. 72 includes: a section view (a) showing a relationship between a first guide and an inner guide; and a section view (b) taken along line I-I of FIG. 72(*a*).
Figure 72:
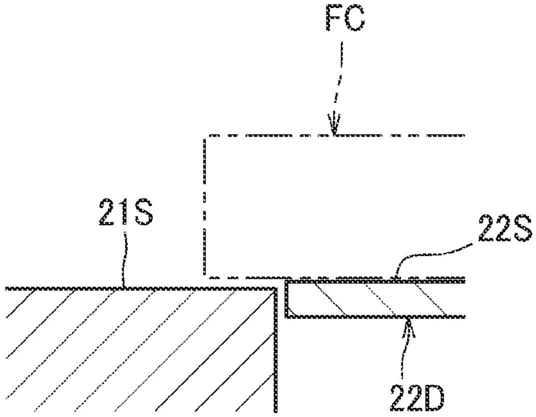

As shown in FIG. 72(*a*), the housing main body 21 comprises an inner guide G2 that guides the layer transfer film cartridge FC in the first direction within the housing main body 21. The inner guide G2 consists of two second protrusions GP2 which are arranged apart from each other in the second direction and between which the layer transfer film cartridge FC is held. The distance D5 between the two first protrusions GP1 provided on the rack 22D is longer than the distance D6 between the two second protrusions GP2.

As shown in FIG. 72(*b*), the housing main body 21 has a second support surface 21S that supports the layer transfer film cartridge FC from below within the housing main body 21. The first support surface provided on the rack 22D is located higher in level than the second support surface 21S.

Next, a description will be given of the operation and advantageous effects of the layer transfer device 1 according to the present embodiment.

When the layer transfer film cartridge FC is installed into the housing main body 21, first, as shown in FIG. 70, the layer transfer film cartridge FC is placed on the rack 22D. To be more specific, the layer transfer film cartridge FC is oriented with its one end portion (one of end portions not provided with the connecting portion 70) facing to the housing opening 21K, and placed on the rack. In this operation, because the distance D5 between the two first protrusions GP1 is longer than the distance D6 between the two second protrusions GP2, as shown in FIG. 72(*a*), a user can easily place the layer transfer film cartridge FC into a broader space between the first protrusions GP1.

Next, the user causes the layer transfer film cartridge FC to slide on the first support surface 22S of the rack 22D, and thereby causes the layer transfer film cartridge FC to move into the housing main body 21 along the first direction. In this operation, because the distance D6 between the two second protrusions GP2 is shorter than the distance D5 between the two first protrusions GP1, a shift in the position of the layer transfer film cartridge FC in the second direction can be restrained, so that the layer transfer film cartridge FC can be guided in a stable posture to the installation position.

Further, in this operation, because the second support surface 21S is positioned lower in level than the first support surface 22S, as shown in FIG. 72(*b*), the layer transfer film cartridge FC can be restrained from getting caught on an edge of the second support surface 21S, so that the layer transfer film cartridge FC can be moved to the installation position inside the housing main body 21 smoothly. When the layer transfer film cartridge FC is removed from the housing main body 21, a user may hold the connecting portion 70 and lift the connecting portion 70-side edge of the layer transfer film cartridge FC slightly, so that the layer transfer film cartridge FC can be moved easily from the second support surface 21S to the first support surface 22S.

In the present embodiment, with the configurations described above, the following advantageous effects can be achieved.

Since the layer transfer film cartridge FC being installed along the first direction perpendicular to the vertical direction into the housing main body 21 can be supported by the rack 22D, even if the layer transfer film cartridge FC is heavy in weight, the layer transfer film cartridge FC can be installed and removed along the first direction with ease.

Since the other end portion A22 of the supply unit 310 and the other end portion A12 of the take-up unit 350 are not connected, the layer transfer film cartridge FC can be installed along the first direction without interfering with a member (e.g., heating roller 61) located between the supply unit 310 and the take-up unit 350 in the housing main body 21.

When the layer transfer film cartridge FC is placed on the rack 22D, the layer transfer film cartridge FC may be put in a larger space provided between the two first protrusions GP1; therefore, the operation of placing the layer transfer film cartridge FC on the rack 22D can be carried out with ease. When the layer transfer film cartridge FC placed on the rack 22D is installed along the first direction into the housing main body 21, the layer transfer film cartridge FC is guided through a smaller space provided between the two second protrusions GP2; therefore, the layer transfer film cartridge FC can be guided in a stable posture to the installation position.

Since the second support surface 21S is positioned lower in level than the first support surface 22S, the layer transfer film cartridge FC placed on the rack 22D and installed along the first direction into the housing main body 21 can be restrained from getting caught on an edge of the second support surface 21S; accordingly, the operation of installing the layer transfer film cartridge FC can be carried out with ease.

The fifteenth embodiment described above can be modified and implemented in various forms as will be described below by way of example. In the following description, elements having substantially the same structural features as those of the above-described embodiment will be designated by the same reference characters, and a description thereof will be omitted.

Figure 73:
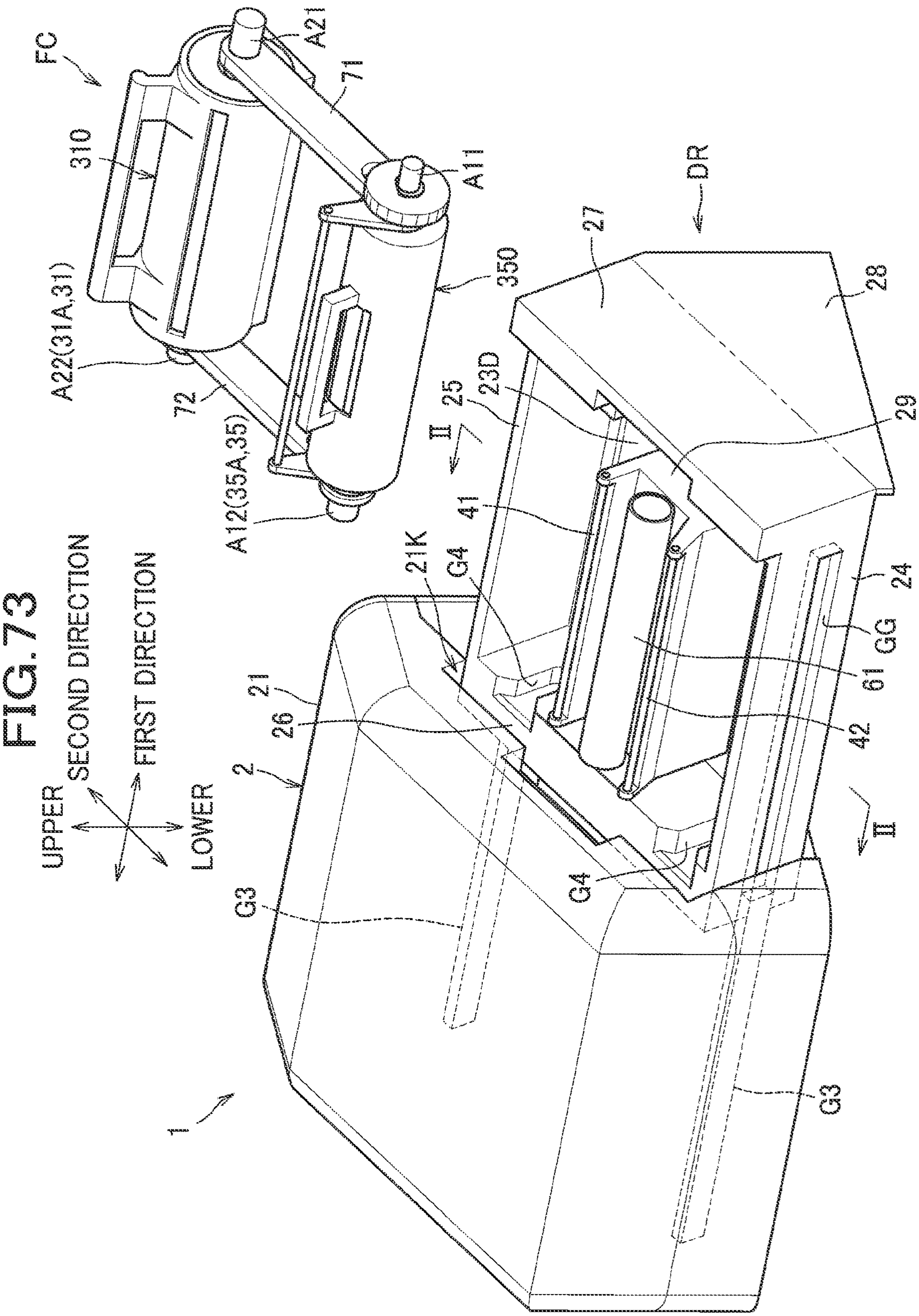
FIG. 73 is a perspective view showing a layer transfer device according to a modified example of the fifteenth embodiment.

In the fifteenth embodiment, a structure in which the rack 22D is rotatable is illustrated, but an alternative configuration in which a rack 23D is movable along the first direction for example as shown in FIG. 73 may be feasible.

Figure 74:
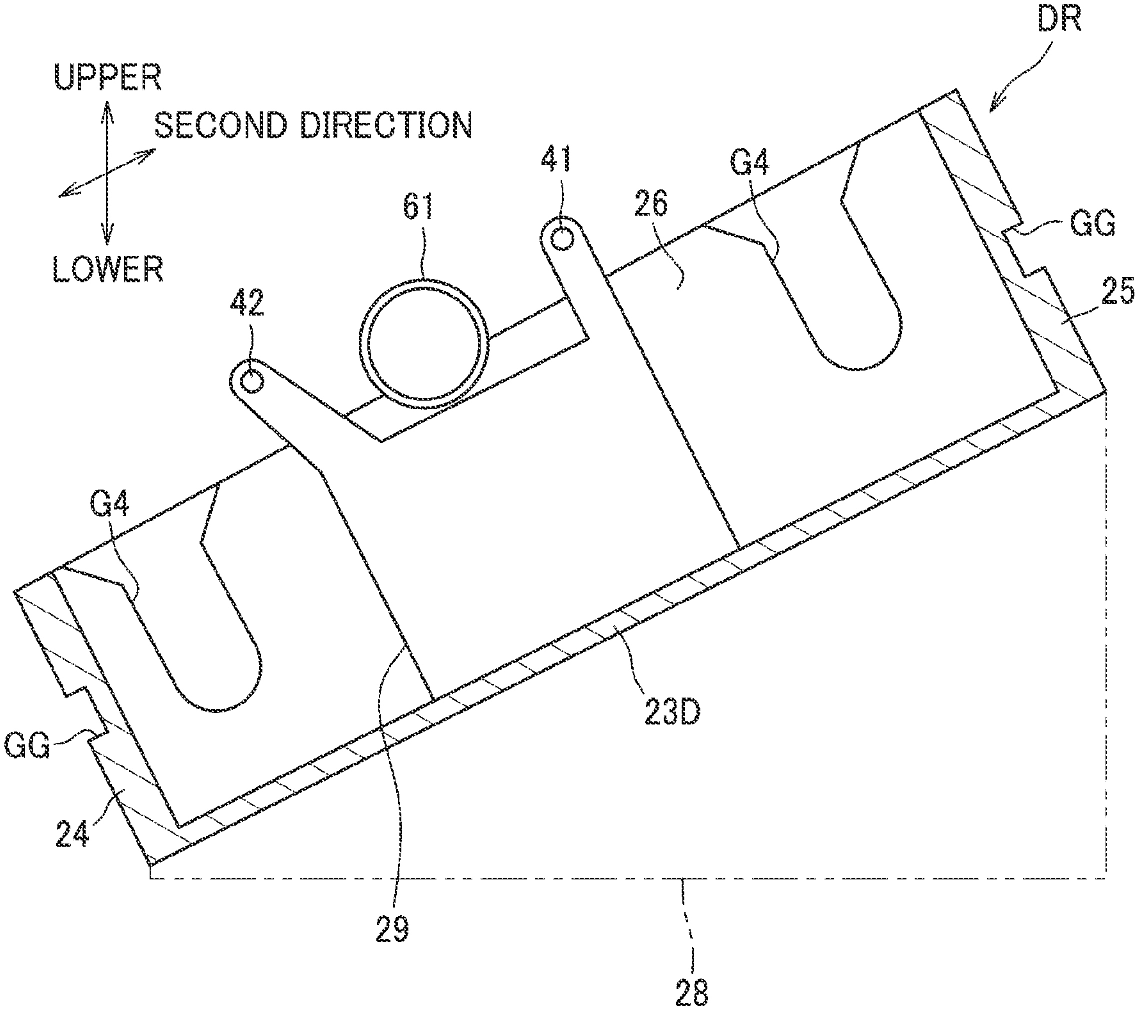
FIG. 74 is a section view taken along line II-II of FIG. 73.

Specifically, in this alternative configuration, the housing 2 includes a drawer DR. The drawer DR is configured to be slidable in the first direction through the housing opening 21K of the housing main body 21. The bottom wall of the drawer DR forms the rack 23D (see also FIG. 74).

The housing main body 21 includes first guides G3 that guide the drawer DR in the first direction. The first guides G3 are each formed in a shape of a rib extending in the first direction. The first guides G3 are located one at each of one end and the other end of the housing main body 21 which are located apart from each other in the second direction.

The drawer DR can be guided by the first guides G3 and thereby rendered movable through the housing opening 21K between an inside position inside of the housing main body 21 and an outside position outside of the housing main body 21 (position shown in the drawing). That is, the rack 23D can be guided by the first guides G3 and thereby rendered movable through the housing opening 21K between an inside position inside of the housing main body 21 and an outside position outside of the housing main body 21 (position shown in the drawing).

The rack 23D is provided with the heating roller 61, the first guide shaft 41, and the second guide shaft 42. To be more specific, the heating roller 61, the first guide shaft 41, and the second guide shaft 42 are supported by a mount 29. The mount 29 is provided on the rack 23D.

The drawer DR further includes, in addition to the rack 23D described above, a first wall 24, a second wall 25, a third wall 26, a cover 27, and a leg 28.

The first wall 24 extends upward from one end of ends of the rack 23D which are located apart from each other in the second direction. The second wall 25 extends upward from the other end of the ends of the rack 23D which are located apart from each other in the second direction. The first wall 24 and the second wall 25 extend along the first direction and a direction perpendicular to the second direction. The heating roller 61, the first guide shaft 41, the second guide shaft 42, and the mount 29 are located between the first wall 24 and the second wall 25. A guide groove GG is formed in a surface of the first wall 24 facing away from the second wall 25. The guide groove GG extends along the first direction. The first guide G3 of the housing main body 21 is fitted in the guide groove GG. Also in a surface of the second wall 25 facing away from the first wall 24, another guide groove GG having similar structural features is formed (see FIG. 74).

The third wall 26 extends upward from a housing opening 21K-side end portion of the rack 23D positioned in the outside position. The third wall 26 is connected to the first wall 24 and the second wall 25. The third wall 26 is located apart from the heating roller 61, the first guide shaft 41, the second guide shaft 42, and the mount 29 in the first direction. The third wall 26 extends along the second direction and a direction perpendicular to the second direction and to the first direction.

The third wall 26 comprises second guides G4. The second guides G4 are guides that guide the layer film cartridge FC toward the heating roller 61 when the rack 23D is positioned in the outside position. The second guides G4 are grooves formed in the third wall 26 and extending in a direction perpendicular to the second direction and to the first direction. The second guides G4 are an example of a second cartridge guide.

The second guides G4 are provided one on each of one end side and the other end side of the third wall 26 which are located apart from each other in the second direction. To be more specific, the heating roller 61, the first guide shaft 41, and the second guide 42 are located between positions corresponding to the two second guides G4 in the second direction. The second guide G4 located on the one end side in the second direction guides the other end portion A12 of the take-up unit 350. The second guide G4 located on the other end side in the second direction guides the other end portion A22 of the supply unit 310.

The cover 27 extends upward from an end portion, opposite to the housing opening 21K-side end portion, of the rack 23D positioned in the outside position. The cover 27 is configured to cover the housing opening 21K when the rack 23D is positioned in the inside position. The cover 27 is located apart from the heating roller 61, the first guide shaft 41, the second guide shaft 42, and the mount 29 in the first direction. The cover 27 extends in the second direction and a direction perpendicular to the second direction and to the first direction. The cover 27 comprises two second guides G4 (not shown) similar to the two second guides G4 provided in the third wall 26. The second guide G4 on one end side of the cover 27 which is closer to one end of ends thereof located apart from each other in the second direction serves to guide the one end portion A11 of the take-up unit 350. The second guide G4 on the other end side of the cover 27 which is closer to the other end of the ends thereof located apart from each other in the second direction serves to guide the one end portion A21 of the supply unit 310. The cover 27 is connected to the first wall 24 and to the second wall 25. The heating roller 61, the first guide shaft 41, the second guide shaft 42, and the rack 29 are located between the third wall 26 and the cover 27.

The leg 28 is a portion that supports the rack 23D from below, when the rack 23D is protruded out from the housing main body 21 in the first direction. The leg 28 is configured as a member independent of the housing main body 21.

To be more specific, the leg 28 extends downward from a lower end of the cover 27 as indicated by the chain double-dashed line in FIG. 73. In other words, the leg 28 extends downward from the end portion opposite to the housing opening 21K-side end portion of the rack 23D. The leg 28 has a lower end positioned in the same positon as a position of the lower end of the housing main body 21 in the vertical direction. Therefore, the lower end of the leg 28 can stand on its lower end in contact with the surface on which the housing main body 21 is placed, and thus the rack 23D can be restrained from bending under the weight of the layer transfer film cartridge FC by the leg 28.

The layer transfer film cartridge FC, unlike the configuration of the above-described embodiment, the supply unit 310 and the take-up unit 350 are connected by a first connecting portion 71 and a second connecting portion 72. The first connecting portion 71 connects the one end portion A21 of the supply unit 310 and the one end portion A11 of the take-up unit 350. The second connecting portion 72 connects the other end portion A22 of the supply unit 310 and the other end portion A12 of the take-up unit 350.

When the layer transfer film cartridge FC is placed on the rack 23D, the first connecting portion 71 is located between the mount 29 and the cover 27. The second connecting portion 72 of the layer transfer film cartridge FC placed on the rack 23D is located between the mount 29 and the third wall 26.

With this configuration, when the layer transfer film cartridge FC is placed on the rack 23D, the end portions A21, A22 of the supply unit 310 and the end portions A11, A12 of the take-up unit 350 are guided by the respective second guides G4 of the drawer DR; therefore, the layer transfer film cartridge FC can be located in place precisely relative to the heating roller 61. After the layer transfer film cartridge FC is placed on the rack 23D, the drawer DR is pushed into the housing main body 21 along the first guides G3 whereby the layer transfer film cartridge FC is installed in the housing main body 21. In other words, thanks to the first guides G3 that guide the layer transfer film cartridge FC via the rack 23D along the first direction, even if the layer transfer film cartridge FC is heavy in weight, the layer transfer film cartridge FC can be installed and removed along the first direction with ease.

The embodiment of FIG. 71 is configured such that the other end portion A22 of the supply unit 310 and the other end portion A12 of the take-up unit 350 are not connected; however, the embodiment of FIG. 71 may alternatively be configured such that a connecting portion bent in such a manner as not to interfere with the heating roller 61, the first guide shaft 41, and the second guide shaft 42 is provided to connect the other end portion A22 of the supply unit 310 and the other end portion A12 of the take-up unit 350.

In the embodiment of FIG. 71, the rack 23D is configured to be movable relative to the housing main body 21; however, the rack may, for example, be fixed to the housing main body.

In the above-described embodiment, the shaft 43 is configured to be movable relative to the connecting portion 70; however, the shaft may alternatively be fixed to the connecting portion or the take-up case, or the like, immovably relative to the connecting portion.

In the above-described embodiments, the connecting portions 70 to 72 are provided, but the connecting portions may not be provided. The connecting portion may be any portion connecting the supply unit and the take-up unit, and thus may be a portion that connects the supply case and the take-up case.

The connecting portion may be formed integrally with the supply case and/or the take-up case and configured to be connected indirectly to the supply reel and the take-up reel via the supply case or the take-up case. The connecting portion may not be in the shape of a plate, but may be in the shape of a rod fixed to the supply case and the take-up case. The connecting portion may be made of plastic, or made of metal. The support member may be rotatably connected to the connecting portion.

The structure for fixing the take-up case or the supply case to the connecting portion may be any structure without limitation. For example, the take-up case and the supply case may be fixed directly to the connecting portion. Alternatively, for example, connections between the connecting portions 71, 72 and the take-up case 36 may be made by a hollow member, and the take-up gear 35C or the like may be attached to the end portion of the take-up shaft 35A of the take-up reel 35 which is inserted in the hollow member. In this configuration, the take-up reel 35 is rotatably supported by the hollow member.

Although the layer transfer device 1 in which the layer transfer film cartridge is used is described in the first to the fifteenth embodiments and their modified examples as a device independent of an image forming apparatus such as a laser printer, the layer transfer device may be configured integrally with an image forming apparatus. Although the layer transfer device is exemplified by a device for transferring the transfer layer F22 onto a toner image on a sheet S, the layer transfer device may, for example, be a device for transferring a transfer layer onto an ink image formed on a sheet, or a device for transferring a transfer layer by a thermal head, or the like.

In the above-described embodiments and modified examples, the transfer layer F22 including foil is illustrated as an example; however, the transfer layer may, for example, not include foil or colorant, and be formed of thermoplastic resin In the above-described embodiments and modified examples, the multilayer film F is configured to have four layers, but as long as the multilayer film includes a transfer layer and a supporting layer, the number of layers may be any number.

The elements described in the above-described embodiments and modified examples may be implemented selectively and in combination as desired.

The invention claimed is:

1. A layer transfer film cartridge, comprising:

a supply reel on which a multilayer film including a transfer layer and a supporting layer supporting the transfer layer is wound;

a supply case that houses the supply reel;

a take-up reel on which to take up the multilayer film; and a first handle supported by the supply case or the supply reel, wherein the first handle is supported at one of ends of the supply reel located apart from each other in a first axial direction along rotation axis of the supply reel and at one of ends of the take-up reel located apart from each other in a second axial direction along a rotation axis of the take up reel, wherein the supply case has a flat surface extending in the first axial direction, wherein the first handle comprises:

a first base portion extending in an inter-axial direction along a straight line connecting the rotation axis of the supply reef and the rotation axis of the take up reel;

a first supply-side leg extending from one of ends of the first base portion located apart from each other in the inter-axial direction and supported at the one of ends of the supply reel located apart from each other in the first axial direction, and a first take-up-side leg extending from another of the ends of the first base portion located apart from each other in the inter-axial direction and supported at the one of ends of the take-up reel located apart from each other in the second axial direction, and wherein the supply reel is located between the flat surface and the first base portion in a direction perpendicular to the first axial direction and to the inter-axial direction.

2. The layer transfer film cartridge according to claim 1, comprising a second handle supported at another end of the supply reel in the first axial direction and at another end of the take-up reel in the second axial direction.

3. The layer transfer film cartridge according to claim 1, wherein the supply case has a supply opening through which to draw out the multilayer film wound on the supply reel, to an outside of the supply case, and wherein the layer transfer film cartridge further comprises a seal structure that is provided to close the supply opening, the seal structure including a first contact portion which contacts a transfer layer-side surface of the multilayer film and a second contact portion which contacts a supporting layer-side surface of the multilayer film, to nip the multilayer film between the first contact portion and the second contact portion in a manner that permits the multilayer film to be drawn out.

4. The layer transfer film cartridge according to claim 3, wherein at least one of the first contact portion and the second contact portion is composed of an elastic body.

5. The layer transfer film cartridge according to claim 1, wherein the supply case has a supply opening through which to draw out the multilayer film wound on the supply reel, wherein the layer transfer film cartridge further comprises a cover member with which the supply opening is openably closeable, and wherein the cover member in a state where the supply opening is closed therewith nips the multilayer film drawn out through the supply opening and positioned between the cover member and the supply case.

6. The layer transfer film cartridge according to claim 5, wherein the cover member includes a first seal member so provided as to come in contact with the multilayer film when the supply opening is closed with the cover member, the first seal member being composed of an elastic body.

7. The layer transfer film cartridge according to claim 1, further comprising:

a take-up case that houses the take-up reel; and a remaining amount indicating member, wherein the remaining amount indicating member includes a contact portion that contacts a surface of the multilayer film wound on the take-up reel and moves in accordance with an amount of the multilayer film wound thereon, and an indicator end portion that is located at an outside of the take-up case and moves in accordance with movement of the contact portion to indicate a remaining amount of the multilayer film.

8. The layer transfer film cartridge according to claim 7, further comprising a spring that causes the contact portion to be pressed against the multilayer film wound on the take-up reel.

9. The layer transfer film cartridge according to claim 1, further comprising a remaining amount indicating member, wherein the remaining amount indicating member includes a contact portion that contacts a surface of the multilayer film wound on the supply reel and moves in accordance with an amount of the multilayer film wound thereon, and an indicator end portion that is located at an outside of the supply case and moves in accordance with movement of the contact portion to indicate a remaining amount of the multilayer film.

10. The layer transfer film cartridge according to claim 9, further comprising a spring that causes the contact portion to be pressed against the multilayer film wound on the supply reel.

11. The layer transfer film cartridge according to claim 1, further comprising a draw-in mechanism configured to draw the multilayer film into the supply case.

12. The layer transfer film cartridge according to claim 11, wherein the supply case has a supply opening through which the multilayer film wound on the supply reel is allowed to pass, wherein the draw-in mechanism is located in the supply case, and includes a dancer roller around which the multilayer film is looped, and wherein the dancer roller is movable along a direction of rotation of the supply reel between a first position and a second position farther than the first position from the supply opening.

13. The layer transfer film cartridge according to claim 1, which is installable into and removable from a housing of a layer transfer device for transferring the transfer layer on a sheet, the layer transfer film cartridge further comprising a take-up case that houses the take-up reel, the take-up case having an outside diameter different from an outside diameter of the supply case, wherein the layer transfer film cartridge set in a first orientation and put to the housing is installable into the housing, while the layer transfer film cartridge reversed from the first orientation about an axis parallel to directions of installation and removal of the layer transfer film cartridge to a second orientation and put to the housing is not installable due to interference of one of the supply case and the take-up case having a larger diameter with the housing.

14. A layer transfer device for transferring a transfer layer onto a sheet, the layer transfer device comprising:

a housing having a housing opening; and the layer transfer film cartridge according to claim 1, wherein the layer transfer film cartridge is installable into and removable from the housing through the housing opening, wherein the housing comprises:

a first guide configured to guide the layer transfer film cartridge in a first orientation to an installation position; and a second guide configured to guide the layer transfer film cartridge in the first orientation to the installation position, the second guide and the first guide being asymmetrical with respect to a predetermined direction.

15. The layer transfer device according to claim 14, wherein the first guide and the second guide extend in a direction perpendicular to a first axial direction along a rotation axis of the supply reel.

16. A layer transfer film cartridge, comprising:

a supply reel on which a multilayer film including a transfer layer and a supporting layer supporting the transfer layer is wound;

a supply case that houses the supply reel;

a take-up reel on which to take up the multilayer film;

a first handle supported by the supply case or the supply reel; and a sheet guide having a first guide surface provided on the supply case, and a second guide surface opposed to the first guide surface, the second guide surface being located in such a position that the supply reel is positioned behind the first guide surface as viewed from the second guide surface.

17. The layer transfer film cartridge according to claim 16, wherein the second guide surface is provided on the supply case, and wherein the first handle includes a grip portion extending in a first axial direction along a rotation axis of the supply reel, the grip portion being located in such a position that the first guide surface and the second guide surface are positioned between the grip portion and the supply reel.

18. A layer transfer film cartridge installable into and removable from a housing of a layer transfer device for transferring a transfer layer on a sheet, the layer transfer film cartridge comprising:

a supply reel on which a multilayer film including the transfer layer and a supporting layer porting the transfer layer is wound;

a supply case that houses the supply reel, a take-up reel on which to take up the multilayer film;

a first handle supported by the supply case of the supply reel; and a memory comprising a contact surface, wherein at least part of the supply reel is located between the memory and the first handle, and wherein the contact surface faces downward and comes in contact with an electrical contact located in the housing in a state where the layer transfer film cartridge is installed and positioned in an installation position in the housing.

19. The layer transfer film cartridge according to claim 18, wherein the first handle is supported by the supply case, wherein at least part of the supply reel is located between the memory and the first handle in a perpendicular direction perpendicular to a first axial direction along a rotation axis of the supply reel and to an inter-axial direction that is a direction of arrangement of a rotation axis of the supply reel and a rotation axis of the take-up reel.

20. A layer transfer device for transferring a transfer layer onto a sheet, the layer transfer device comprising:

a housing having a housing opening; and a layer transfer film cartridge according to claim 18; and wherein the electric contact faces the housing opening, and wherein the layer transfer film cartridge is removably installable in the housing through the housing opening.

21. The layer transfer device according to claim 20, wherein when the layer transfer film cartridge is in the installation position, at least part of the supply reel is located between the housing opening and the electric contact in a perpendicular direction perpendicular to a first axial direction along a rotation axis of the supply reel.

22. The layer transfer device according to claim 21, wherein the perpendicular direction is a direction perpendicular to the first axial direction and to an inter-axial direction that is a direction of arrangement of a rotation axis of the supply reel and a rotation axis of the take-up reel.

23. The layer transfer device according to claim 21, wherein at least part of the supply reel is located between the memory and the first handle in the perpendicular direction.

24. The layer transfer device according to claim 23, wherein the memory is provided in the supply case.

* * * * *